United States Patent
Matsumoto et al.

(10) Patent No.: US 8,319,916 B2
(45) Date of Patent: *Nov. 27, 2012

(54) METHOD OF PRODUCING ORGANIC NANOPARTICLES, ORGANIC NANOPARTICLES THUS OBTAINED, INKJET INK FOR COLOR FILTER, COLORED PHOTOSENSITIVE RESIN COMPOSITION AND PHOTOSENSITIVE RESIN TRANSFER MATERIAL, CONTAINING THE SAME, AND COLOR FILTER, LIQUID CRYSTAL DISPLAY DEVICE AND CCD DEVICE, PREPARED USING THE SAME

(75) Inventors: Keisuke Matsumoto, Fujinomiya (JP); Takayuki Kusano, Kanagawa (JP); Yousuke Miyashita, Minami-ashigara (JP); Koreshige Ito, Fujinomiya (JP); Tomohiro Kodama, Fujinomiya (JP); Hideaki Ito, Fujinomiya (JP); Naoya Shibata, Minami-ashigara (JP); Hidenori Takahashi, Shizuoka (JP); Haruhiko Yoshino, Fujinomiya (JP); Tetsu Kamosaki, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 99 days.

This patent is subject to a terminal disclaimer.

(21) Appl. No.: 12/161,940

(22) PCT Filed: Nov. 8, 2006

(86) PCT No.: PCT/JP2006/322306
§ 371 (c)(1),
(2), (4) Date: Jul. 23, 2008

(87) PCT Pub. No.: WO2007/083431
PCT Pub. Date: Jul. 26, 2007

(65) Prior Publication Data
US 2009/0059138 A1 Mar. 5, 2009

(30) Foreign Application Priority Data

Jan. 23, 2006 (JP) ................... 2006-014399
Feb. 1, 2006 (JP) ................... 2006-024630
Mar. 1, 2006 (JP) ................... 2006-055274
May 8, 2006 (JP) ................... 2006-129714

(51) Int. Cl.
*G02F 1/1335* (2006.01)
*G02B 5/23* (2006.01)
*G02B 5/22* (2006.01)

(52) U.S. Cl. ........... 349/106; 252/586; 257/E31.127; 257/432; 359/885; 522/74; 524/81; 524/88; 524/92

(58) Field of Classification Search ............. 349/106; 524/81, 92, 88; 522/74; 252/586; 359/885; 257/432, E31.127
See application file for complete search history.

(56) References Cited

U.S. PATENT DOCUMENTS

| 1,600 | A | 5/1840 | MacGregor |
| 32,250 | A | 5/1861 | Jackson et al. |
| 1,351,352 | A | 8/1920 | Stevens |
| 1,592,713 | A | 7/1926 | Bendixen |
| 1,692,617 | A | 11/1928 | Bowen |
| 2,176,899 | A | 10/1939 | Gordon et al. |
| 2,464,588 | A | 3/1949 | Knudsen et al. |
| 2,642,419 | A | 6/1953 | Waugh et al. |
| 2,984,462 | A | 5/1961 | O'Connor |
| 3,018,091 | A | 1/1962 | Duggins |
| 3,290,016 | A | 12/1966 | Lennon et al. |
| 3,415,650 | A | 12/1968 | Frame et al. |
| 3,443,748 | A | 5/1969 | Hooper |
| 3,486,741 | A | 12/1969 | Midgette |
| 3,529,936 | A | 9/1970 | Müller-rid et al. |
| 3,615,543 | A | 10/1971 | Rosenoff |
| 3,638,917 | A | 2/1972 | Osten |
| 3,709,828 | A | 1/1973 | Marks |
| 3,845,938 | A | 11/1974 | Schold |
| 3,893,811 | A | 7/1975 | Good et al. |

(Continued)

FOREIGN PATENT DOCUMENTS
EP 0824036 A1 2/1998
(Continued)

OTHER PUBLICATIONS

International Search Report mailed Jul. 25, 2006 for PCT/JP2006/309268.

(Continued)

*Primary Examiner* — Bijan Ahvazi
(74) *Attorney, Agent, or Firm* — Birch, Stewart, Kolasch & Birch, LLP

(57) ABSTRACT

A method of producing organic nanoparticles, comprising:
  mixing a solution of an organic material dissolved in a good solvent with a solvent that is compatible with the good solvent but is a poor solvent for the organic material, to prepare a dispersion in which the organic material is being formed to organic fine particles of a size in the order of nanometer;
wherein the dispersion contains a polymer compound having a weight-average molecular weight of 1,000 or more represented by the following formula (1):

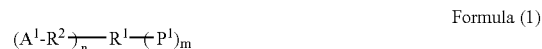

Formula (1)

wherein $R^1$ represents a (m+n)-valent connecting group; $R^2$ represents a single bond or a divalent connecting group; $A^1$ represents a specific monovalent organic group; when n is two or more, plural $A^1$s may be the same or different; m represents 1 to 8; n represents 2 to 9; m+n is 3 to 10; and $P^1$ represents a polymer compound residue.

21 Claims, 5 Drawing Sheets

U.S. PATENT DOCUMENTS

| | | | |
|---|---|---|---|
| 4,289,733 A | 9/1981 | Saito et al. | |
| 4,373,093 A | 2/1983 | Olson et al. | |
| 4,391,648 A | 7/1983 | Ferrill, Jr. | |
| 4,464,240 A | 8/1984 | Hansen | |
| 4,621,928 A | 11/1986 | Schreiber | |
| 4,666,669 A | 5/1987 | Mumaw | |
| 4,898,998 A | 2/1990 | Kubo et al. | |
| 5,294,728 A | 3/1994 | Emmons et al. | |
| 5,645,963 A * | 7/1997 | Chang | 430/7 |
| 5,837,041 A | 11/1998 | Bean et al. | |
| 5,854,323 A * | 12/1998 | Itabashi et al. | 524/88 |
| 5,882,114 A | 3/1999 | Fukuyo et al. | |
| 5,961,213 A | 10/1999 | Tsuyuki et al. | |
| 5,985,535 A | 11/1999 | Urabe | |
| 6,000,840 A | 12/1999 | Paterson | |
| 6,042,792 A | 3/2000 | Shefer et al. | |
| 6,153,001 A | 11/2000 | Suzuki et al. | |
| 6,245,832 B1 | 6/2001 | Suzuki et al. | |
| 6,395,805 B1 | 5/2002 | Takao et al. | |
| 6,410,619 B2 | 6/2002 | Greene et al. | |
| 6,422,736 B1 | 7/2002 | Antoniades et al. | |
| 6,443,611 B1 | 9/2002 | Hasberg et al. | |
| 6,572,227 B2 | 6/2003 | Yamashita et al. | |
| 2002/0101783 A1 | 8/2002 | Hasberg et al. | |
| 2002/0112644 A1* | 8/2002 | Nakamura et al. | 106/401 |
| 2002/0156154 A1 | 10/2002 | Ando et al. | |
| 2003/0077536 A1 | 4/2003 | Yamashita et al. | |
| 2003/0108804 A1* | 6/2003 | Cheng et al. | 430/7 |
| 2003/0152857 A1 | 8/2003 | Sugiura et al. | |
| 2003/0198761 A1 | 10/2003 | Kaeding et al. | |
| 2004/0027415 A1 | 2/2004 | Yamashita et al. | |
| 2004/0106057 A1 | 6/2004 | Tomita et al. | |
| 2004/0121256 A1 | 6/2004 | Suzuki et al. | |
| 2005/0206829 A1* | 9/2005 | Hashimoto et al. | 349/153 |
| 2007/0012221 A1 | 1/2007 | Maeta et al. | |
| 2009/0033844 A1 | 2/2009 | Ando et al. | |
| 2009/0045535 A1* | 2/2009 | Miyashita et al. | 264/8 |
| 2009/0059138 A1 | 3/2009 | Matsumoto et al. | |
| 2009/0069473 A1* | 3/2009 | Kusano et al. | 524/155 |
| 2009/0071373 A1* | 3/2009 | Izumi et al. | 106/493 |
| 2009/0071908 A1 | 3/2009 | Miyashita et al. | |
| 2009/0101043 A1 | 4/2009 | Ogata et al. | |

FOREIGN PATENT DOCUMENTS

| | | |
|---|---|---|
| EP | 1541637 A1 | 6/2005 |
| JP | 55-10545 B2 | 3/1980 |
| JP | 1-115976 A | 5/1989 |
| JP | 03-021339 A | 1/1991 |
| JP | 3-161592 A | 7/1991 |
| JP | 5-17133 A | 1/1993 |
| JP | 5-214008 A | 8/1993 |
| JP | 6-79168 A | 3/1994 |
| JP | 06-114259 A | 4/1994 |
| JP | 9-77991 A | 3/1997 |
| JP | 10-043570 A | 2/1998 |
| JP | 10-230158 A | 9/1998 |
| JP | 11-237760 A | 8/1999 |
| JP | 2000-239554 A | 9/2000 |
| JP | 2001-31900 A | 2/2001 |
| JP | 2002-179976 A | 6/2002 |
| JP | 2002-194244 A | 7/2002 |
| JP | 2003-113341 A | 4/2003 |
| JP | 2003-260347 A | 9/2003 |
| JP | 2004-1471 A | 1/2004 |
| JP | 2004-43776 A | 2/2004 |
| JP | 2004-91560 A | 3/2004 |
| JP | 2004-123853 A | 4/2004 |
| JP | 2004-181312 A | 7/2004 |
| JP | 2004-262941 A | 9/2004 |
| JP | 2004-292632 A | 10/2004 |
| JP | 2006-104448 A | 4/2006 |
| JP | 2007-262378 A | 10/2007 |
| WO | WO-02/092700 A1 | 11/2002 |
| WO | WO-2006/121016 A1 | 11/2006 |

OTHER PUBLICATIONS

Office Action mailed Nov. 10, 2009 in corresponding U.S. Appl. No. 11/919,982.

Office Action mailed May 6, 2009 in corresponding U.S. Appl. No. 11/919,962.

Office Action mailed Aug. 3, 2009 in co-pending U.S. Appl. No. 11/920,082.

International Search Report mailed Jul. 18, 2006 for PCT/JP2006/309270.

Office Action mailed Sep. 28, 2009 in corresponding Korean Application No. 2007-7028498.

Concise Explanation of Documents (JP-11-237760-A, WO-02/092700-A1, JP-6-79168-A and JP-2004-91560-A).

Concise Explanation of Documents (JP-6-79168-A, JP-2004-91560-A, JP-2000-239554-A, JP-2004-43776-A and JP-2004-123853-A).

Office Action Feb. 2, 2010 in co-pending U.S. Appl. No. 11/920,082.

Office Action Mar. 19, 2009 in co-pending U.S. Appl. No. 11/919,988.

Office Action Aug. 18, 2009 in co-pending U.S. Appl. No. 11/919,988.

Notice of Reasons for Rejection dated Dec. 13, 2011 for Japanese Application No. 2006-129714.

Notice of Reasons for Rejection dated Dec. 13, 2011 for Japanese Application No. 2006-533384.

* cited by examiner 75  74  75

METHOD OF PRODUCING ORGANIC NANOPARTICLES, ORGANIC NANOPARTICLES THUS OBTAINED, INKJET INK FOR COLOR FILTER, COLORED PHOTOSENSITIVE RESIN COMPOSITION AND PHOTOSENSITIVE RESIN TRANSFER MATERIAL, CONTAINING THE SAME, AND COLOR FILTER, LIQUID CRYSTAL DISPLAY DEVICE AND CCD DEVICE, PREPARED USING THE SAME

TECHNICAL FIELD

The present invention relates to a method of producing organic nanoparticles, organic nanoparticles thus obtained, an inkjet ink for color filter, a colored photosensitive resin composition and a photosensitive resin transfer material, containing the same, and a color filter, a liquid crystal display device and a CCD device, prepared by using the same.

BACKGROUND ART

In recent years, studies to reduce the size of particles have progressed. In particular, intensive study has been conducted to reduce the particles into nanometer sized, for example, in the range of 10 to 100 nm, which can hardly be realized by methods of pulverization and others. Further, attempts have been made not only to provide particles whose particle sizes are reduced to be of the order of nanometers, but also to form them having monodispersity.

Such fine particles in the nanometer size, whose size is between common bulk particles and molecules or atoms, are said to have potentially unexpectedly new properties. It is also possible to stabilize properties of such nanoparticles by raising the monodispersity thereof. Thus, the nanoparticles are finding applications in various fields, and various studies are under progress increasingly, in a wide range of fields including biochemistry, new material, electronic element, light-emitting display device, printing, medicine and others.

In particular, organic nanoparticles made of an organic compound involve great potential as a functional material, because the organic compounds, per se, can be modified diversely. For example, polyimide has been utilized in various fields because of, for example, the following reasons: polyimide is a chemically and mechanically stable material owing to, for example, its heat resistance, solvent resistance, and mechanical characteristics, and is excellent in electrical insulating property. In addition, polyimides are finding application in a further wider range of industrial fields, by forming them as fine particles and combining their properties and shape of polyimides. For example, use of polyimide formed as fine particles as an additive to the powder toner for image formation was proposed (Patent Document 1).

Further, among the organic nanoparticles, organic pigments are used in such applications as painting, a printing ink, an electrophotographic toner, an inkjet ink, and a color filter, and thus these organic pigments are now important compounds essential for our everyday life. Particularly, organic pigments are demanded in high-performance with practical importance including pigments for an inkjet ink and a color filter.

Dyes have been used as the colorants for inkjet inks, but pigments are employed recently for solving problems of the dyes in water resistance and light resistance. Images obtained by using a pigment ink have an advantage that they are superior in light resistance and water resistance to the images formed by using a dye-based ink. However, it is difficult to give fine particles having excellent monodispersity and having nanometer size, so that the pigment particles can hardly penetrate into the pores on paper surface. As a result, such an image has a problem that the adhesiveness thereof to paper is weaker.

Further, the increase in the number of pixels of a digital camera, there is increased need for reduction in thickness of the color filter for use in optical elements such as a CCD sensor and a display device. Organic pigments have been used in color filters whose thickness depends significantly on the particle diameter of the organic pigment to be used therein, and hence it is needed to produce fine particles in a nanometer sized, with having stability in a monodispersed state.

As for production methods of organic particles, studies are made on, for example, a gas-phase method (a method of sublimating a sample under inert gas atmosphere and depositing particles on a substrate), a liquid-phase method (a reprecipitation method for obtaining fine particles, for example, by injecting a sample that has been dissolved in a good solvent, into a poor solvent of which the stirring condition and the temperature are controlled), and a laser-ablation method (a method of reducing the size of particles by laser-ablation to a sample dispersed in a solution with laser irradiated thereto). There are also reports on an attempt of preparation of monodispersed particles having a desired particle size by those methods. Of those, the liquid-phase method has been attracting attention, since it is a method of producing organic particles excellent in its simplicity and productivity (see Patent Document 2, Patent Document 3, and the like). The crystalline form and the nature of the surface of each of organic particles produced by the liquid-phase method can be controlled by adjusting conditions under which the particles are formed in accordance with, for example, the kind of solvent, the rate of injection, and temperature. Patent Document 3 describes an example in which the crystalline form of a quinacridone pigment is adjusted in accordance with a poor solvent kind.

With regard to an improvement in dispersibility of particles, an organic pigment has been conventionally dispersed on an industrial scale by using various dispersing machines (such as a roll mill, a ball mill, and an attritor). In this case, however, a particle in the pigment is reduced in size, with the result that the viscosity of the pigment dispersion may increase. The increase in viscosity makes it difficult to take the pigment dispersion out of a dispersing machine, makes it impossible to transfer the pigment dispersion through a pipeline, and, furthermore, causes gelling of the dispersion during storage so that the pigment dispersion cannot be used. A dispersing agent that aids the dispersion, or a polymer that stabilizes the dispersion has been added for solving them, but it cannot attain a sufficient effect (see, for example, Non-Patent Document 1).

In an organic-pigment dispersion for a color filter, in order to improve the dispersibility, a polymer or a pigment-dispersing agent capable of imparting both alkali developability and dispersion stability needed for the production of a color filter is added (see, for example, Patent Document 4). However, such methods have not satisfied the demand yet because of, for example, the following reasons: such methods require a long period of time for dispersing, and involves an increase in viscosity of the dispersion.

In addition, an example in which dispersibility is improved by using pigment particles prepared by the liquid-phase method has been reported. Patent Document 5 describes an example in which pigment particles in a water dispersed state is prepared by the liquid-phase method. However, this method is a method of providing pigment particles in an aqueous dispersed state, and the document describes nothing about a method of providing pigment particles in an organic solvent dispersed state.

Patent Document 6 describes a method of forming the pigment by dissolving a pigment in a basic compound and/or a basic solution and adding a liquid of a neutral compound and/or a liquid of an acidic compound, or a neutral liquid and/or an acidic liquid. However, organic pigment particles obtained by the method have large primary particle diameters, and then the method has not sufficiently satisfied a demand for a reduction in particle size.

[Patent Document 1] JP-A-11-237760 ("JP-A" means unexamined published Japanese patent application)
[Patent Document 2] JP-A-6-79168
[Patent Document 3] JP-A-2004-91560
[Patent Document 4] JP-A-2000-239554
[Patent Document 5] JP-A-2004-43776
[Patent Document 6] JP-A-2004-123853
[Non-Patent Document 1] Pigment dispersion technique-surface treatment and how to use dispersing agent, and evaluation for dispersibility-, TECHNICAL INFORMATION INSTITUTE CO., LTD, 1999

DISCLOSURE OF INVENTION

An object of the present invention is to provide a method of producing organic nanoparticles, specifically a method of producing organic nanoparticles higher in dispersion stability without causing aggregation efficiently in a dispersion. Other objects of the present invention are: to provide organic nanoparticles having a size in the order of nanometer and a sharp particle-diameter distribution peak and the production method thereof; to provide an inkjet ink for color filter, a colored photosensitive resin composition, and a photosensitive resin transfer material, containing the organic nanoparticles; and additionally to provide a color filter, a display device, and a CCD device, having high contrast and superior in display characteristics, prepared by using the same.

According to the present invention, there is provided the following means:

(1) A method of producing organic nanoparticles, comprising: mixing a solution of an organic material dissolved in a good solvent with a solvent that is compatible with the good solvent but is a poor solvent for the organic material, to prepare a dispersion in which the organic material is being formed to organic fine particles of a size in the order of nanometer;
wherein the dispersion contains a polymer compound having a weight-average molecular weight of 1,000 or more represented by the following formula (1):

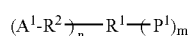

[Chemical formula 1]

Formula (1)

wherein $R^1$ represents a (m+n)-valent connecting group; $R^2$ represents a single bond or a divalent connecting group; $A^1$ represents a monovalent organic group having a group selected from the group consisting of an acidic group, a nitrogen-containing basic group, a urea group, a urethane group, a group having a coordinating oxygen atom, a hydrocarbon group having 4 or more carbon atoms, an alkoxy silyl group, an epoxy group, an isocyanate group, and a hydroxyl group, or a monovalent organic group containing an organic dye structure or heterocycle each of which may further be substituted; when n is two or more, plural $A^1$s may be the same or different; m represents 1 to 8; n represents 2 to 9; m+n is within the range of 3 to 10; and $P^1$ represents a polymer compound residue;

(2) The method of producing organic nanoparticles as described in the above item (1), wherein the polymer compound is represented by the following formula (2):

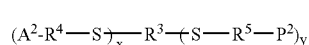

[Chemical formula 2]

Formula (2)

wherein $R^3$ represents a (x+y)-valent connecting group; $R^4$ and $R^5$ each independently represent a single bond or a divalent connecting group; $A^2$ represents a monovalent organic group having a group selected from the group consisting of an acidic group, a nitrogen-containing basic group, a urea group, a urethane group, a group having a coordinating oxygen atom, a hydrocarbon group having 4 or more carbon atoms, an alkoxy silyl group, an epoxy group, an isocyanate group, and a hydroxyl group, or a monovalent organic group containing an organic dye structure or heterocycle each of which may further be substituted; when x is 2 or more, $A^2$s may be the same as or different from each other; y is a number of 1 to 8; x is a number of 2 to 9; x+y is 3 to 10; and $P^2$ represents a polymer compound residue.

(3) The method of producing organic nanoparticles as described in the above item (1) or (2), wherein $A^1$ or $A^2$ is a monovalent organic group having a group selected from the group consisting of an acidic group, a nitrogen-containing basic group, a urea group, and a hydrocarbon group having 4 or more carbon atoms.

(4) The method of producing organic nanoparticles as described in any one of the above items (1) to (3), wherein the polymer compound residue represented by $P^1$ or $P^2$ is a group derived from at least one polymer or copolymer selected from the group consisting of vinyl monomer-based polymers or copolymers, ester compound polymers, ether compound polymers, urethane compound polymers, amide compound polymers, epoxy compound polymers, silicone compound polymers, and the modified polymers and copolymers thereof.

(5) A method of producing organic nanoparticles, comprising: mixing an organic pigment solution of a pyrrolopyrrole compound pigment dissolved in a good solvent with a solvent that is compatible with the good solvent but is a poor solvent for the pyrrolopyrrole compound pigment, to prepare a dispersion in which the organic pigment is being formed to organic fine particles of a size in the order of nanometer; wherein the dispersion contains a polymer compound having a weight-average molecular weight of 1,000 or more.

(6) The method of producing organic nanoparticles as described in any one of the above items (1) to (4), wherein the organic nanoparticles are particles of a pyrrolopyrrole compound pigment.

(7) The method of producing organic nanoparticles as described in the above item (5) or (6), wherein the pyrrolopyrrole compound pigment is a pigment represented by the following formula (V):

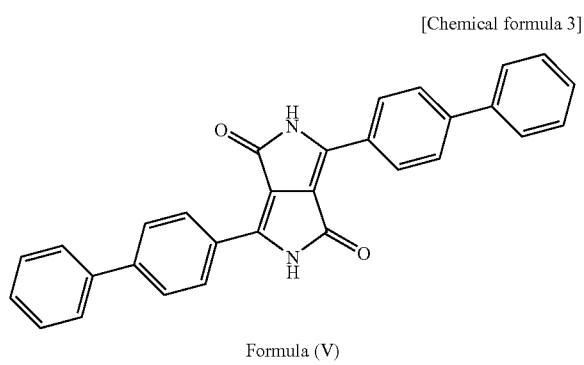

Formula (V)

(8) The method of producing organic nanoparticles as described in the above item (5) or (6), wherein the pyrrolopyrrole compound pigment is a pigment represented by the following formula (Z):

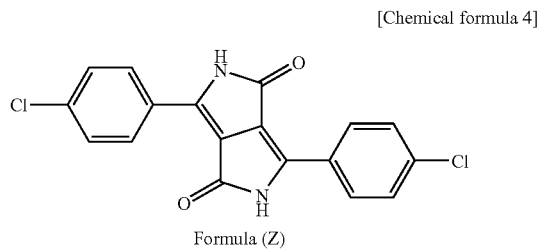

Formula (Z)

(9) The method of producing organic nanoparticles as described in the above item (5) or (6), wherein the pyrrolopyrrole compound pigment is a pigment represented by the following formula (W):

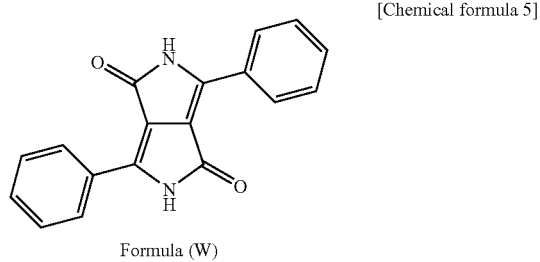

Formula (W)

(10) A method of producing organic nanoparticles, comprising: mixing an organic pigment solution of a dioxazine compound pigment dissolved in a good solvent with a solvent that is compatible with the good solvent but is a poor solvent for the dioxazine compound pigment, to prepare a dispersion in which the organic pigment is being formed to organic fine particles of a size in the order of nanometer; wherein the dispersion contains a polymer compound having a weight-average molecular weight of 1,000 or more.

(11) The method of producing organic nanoparticles as described in any one of the above items (1) to (4), wherein the organic nanoparticles are particles of a dioxazine compound pigment.

(12) The method of producing organic nanoparticles as described in the above item (10) or (11), wherein the dioxazine compound pigment is C.I. Pigment Violet 37.

(13) The method of producing organic nanoparticles as described in the above item (10) or (11), wherein the dioxazine compound pigment is C.I. Pigment Violet 23.

(14) A method of producing organic nanoparticles, comprising: mixing an organic pigment solution of a phthalocyanine compound pigment dissolved in a good solvent with a solvent that is compatible with the good solvent but is a poor solvent for the phthalocyanine compound pigment, to prepare a dispersion in which the organic pigment is being formed to organic fine particles of a size in the order of nanometer; wherein the dispersion contains a polymer compound having a weight-average molecular weight of 1,000 or more.

(15) The method of producing organic nanoparticles as described in any one of the above items (1) to (4), wherein the organic nanoparticles are particles of a phthalocyanine compound pigment.

(16) The method of producing organic nanoparticles as described in the above item (14) or (15), wherein the phthalocyanine compound pigment is C.I. Pigment green 7.

(17) The method of producing organic nanoparticles as described in the above item (14) or (15), wherein the phthalocyanine compound pigment is C.I. Pigment green 36.

(18) The method of producing organic nanoparticles as described in the above item (14) or (15), wherein the phthalocyanine compound pigment is C.I. Pigment green 15:6.

(19) The method of producing organic nanoparticles as described in any one of the above items (1) to (18), further including the step of concentrating the dispersion.

(20) The method of producing organic nanoparticles as described in any one of the above items (1) to (19), wherein the polymer compound is a polymer compound having an acidic group.

(21) The method of producing organic nanoparticles as described in any one of the above items (1) to (20), wherein the acidic group of the polymer compound is a carboxyl group.

(22) The method of producing organic nanoparticles as described in any one of the above items (1) to (21), wherein the polymer compound has a weight-average molecular weight of 3,000 to 100,000.

(23) The method of producing organic nanoparticles as described in any one of the above items (1) to (22), wherein a pigment dispersant having an amino group coexists in any of the steps, in the preparation of the organic nanoparticles in the dispersion.

(24) The method of producing organic nanoparticles as described in any one of the above items (1) to (23), wherein at least one compound represented by formula (D1), (D3), or formula (D4) is added, in the preparation of the organic nanoparticles in the dispersion:

[Chemical formula 6]

A-N=N—X—Y     Formula (D1)

wherein A represents a component capable of forming an azo dye together with X-Y; X represents a single bond, or a group selected from divalent connecting groups represented by structural formulae of formulae (i) to (v) set forth below; and Y represents a group represented by the following formula (D2);

[Chemical formula 7]

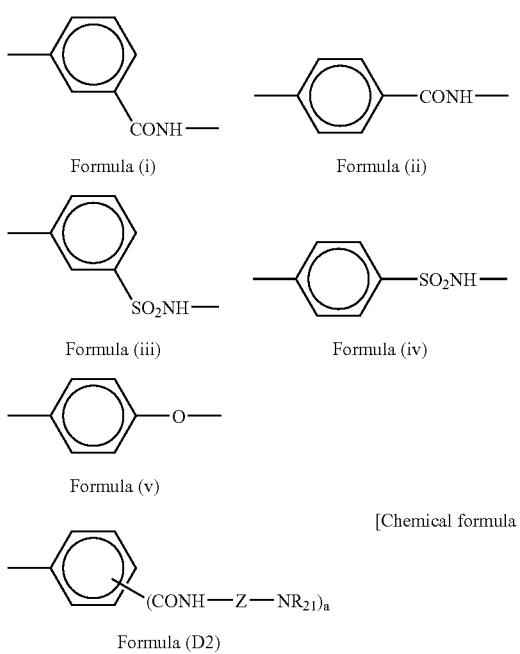

Formula (i)

Formula (ii)

Formula (iii)

Formula (iv)

Formula (v)

[Chemical formula 8]

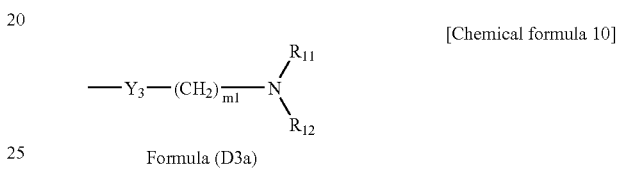

Formula (D2)

wherein Z represents a lower alkylene group; —$NR_{21}$ represents a lower alkylamino group, or a nitrogen-containing, 5- or 6-membered, saturated heterocyclic group; and a represents 1 or 2;

[Chemical formula 9]

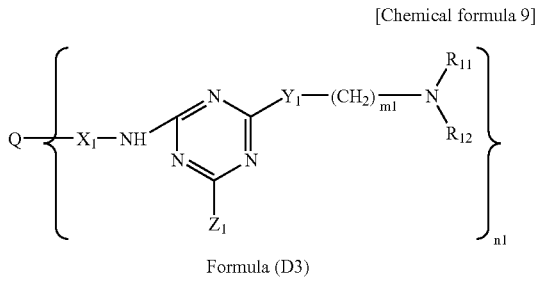

Formula (D3)

wherein Q represents a residue of an organic dye selected from anthraquinone compound dyes, azo compound dyes, phthalocyanine compound dyes, quinacridone compound dyes, dioxazine compound dyes, anthrapyrimidine compound dyes, anthanthrone compound dyes, indanthrone compound dyes, flavanthrone compound dyes, pyranthone compound dyes, perynone compound dyes, perylene compound dyes, and thioindigo compound dyes; $X_1$ represents —CONH—$Y_2$—, —$SO_2$NH—$Y_2$—, or —$CH_2$NHCOCH$_2$NH—$Y_2$—; $Y_2$ represents an alkylene group or an arylene group, each of which may be substituted; $R_{11}$ and $R_{12}$ each independently represent a substituted or unsubstituted alkyl group, alternatively, $R_{11}$, and $R_{12}$ may be bonded together to form a heterocyclic group which at least contains a nitrogen atom; $Y_1$ represents —NH— or —O—; $Z_1$ represents a hydroxyl group or a group represented by formula (D3a) with the proviso that in the case where n1 is 1, $Z_1$ may be —NH—$X_1$-Q; m1 represents an integer of 1 to 6; and n1 represents an integer of 1 to 4;

[Chemical formula 10]

$$-Y_3-(CH_2)_{\overline{m1}}N\begin{matrix}R_{11}\\R_{12}\end{matrix}$$

Formula (D3a)

wherein $Y_3$ represents —NH— or —O—; and m1, $R_{11}$, and $R_{12}$ have the same meanings as those in formula (D3); and

[Chemical formula 11]

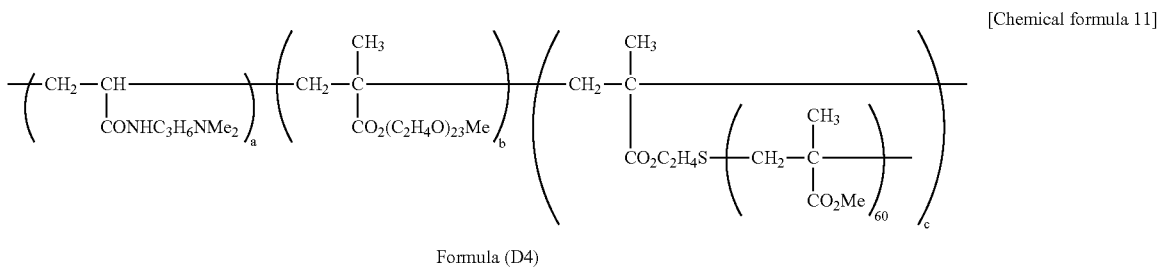

Formula (D4)

a:b:c = 15:20:65 (mass ratio)

wherein Me represents a methyl group;

(25) The method of producing organic nanoparticles as described in any one of the above items (1) to (24), wherein the poor solvent for the organic material is a solvent selected from the group consisting of aqueous solvents, alcohol compound solvents, ketone compound solvents, ether compound solvents, ester compound solvents, and mixtures thereof;

(26) The method of producing organic nanoparticles as described in any one of the above items (1) to (25), wherein the good solvent for the organic material is a solvent selected from the group consisting of aqueous solvents, alcohol compound solvents, ketone compound solvents, ether compound solvents, sulfoxide compound solvents, ester compound solvents, amide compound solvents, and mixtures thereof;

(27) The method of producing organic nanoparticles as described in any one of the above items (1) to (26), wherein, in the preparation of the organic fine particles in the dispersion, the organic material solution and the poor solvent are mixed with each other, allowing formation of the organic fine particles, and the organic fine particles are concentrated and thereafter added with the polymer compound, to give a concentrated solution of the organic fine particles.

(28) The method of producing organic nanoparticles as described in any one of the above items (1) to (27), wherein, in formation of the organic fine particles by mixing the organic material solution and the poor solvent, the fine particles are formed in 10 L or more of the poor solvent.

(29) Organic nanoparticles, produced by the method as described in any one of the above items (1) to (28).

(30) An inkjet ink for color filter, containing the organic nanoparticles as described in the above item (29) in a medium containing a polymerizable monomer and/or a polymerizable oligomer.

(31) A colored photosensitive resin composition, containing, at least, the organic nanoparticles as described in the above item (29), a binder, a monomer or oligomer, and a photopolymerization initiator or photopolymerization initiator system.

(32) A photosensitive resin transfer material, having at least a photosensitive resin layer containing the colored photosensitive resin composition as described in the above item (31) formed on a temporary support.

(33) A color filter, prepared by using the inkjet ink as described in the above item (30), the colored photosensitive resin composition as described in the above item (31) and/or the photosensitive resin transfer material as described in the above item (32).

(34) A liquid crystal display device installed with the color filter as described in the above item (33);

(35) The liquid crystal display device as described in the above item (34), wherein the display device is a device of a VA-mode.

(36) A CCD device installed with the color filter as described in the above item (33).

Other and further features and advantages of the invention will appear more fully from the following description, taking the accompanying drawings into consideration.

BRIEF DESCRIPTION OF DRAWINGS

FIG. 1-2 is a sectional view schematically showing another preferred embodiment of the production apparatus that can be used in the production method of the present invention.

FIG. 1-3 is a partially enlarged sectional view schematically showing a mixing chamber as an embodiment of the production apparatus shown in FIG. 1-2.

FIG. 1-4 is a partially enlarged sectional view schematically showing a mixing chamber as another embodiment of the production apparatus shown in FIG. 1-2.

FIG. 2 is a sectional view schematically showing another preferred embodiment of the production apparatus that can be used in the production method of the present invention.

FIG. 3 is a sectional view schematically showing still another embodiment of the production apparatus that can be used in the production method of the present invention.

FIG. 4-1 is a front view schematically showing an example of a dissolver stirring blade that can be used in the production method of the present invention.

FIG. 4-2 is a photograph substituted for drawing, showing the dissolver stirring blade shown in FIG. 4-1.

BEST MODE FOR CARRYING OUT INVENTION

Figure 1:
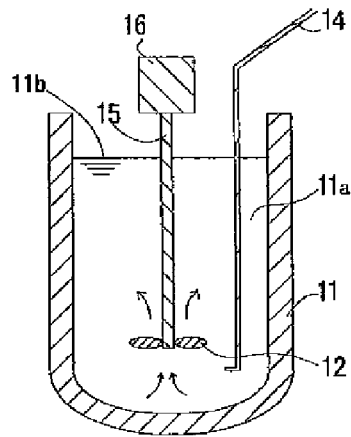
FIG. 1-1 is a sectional view schematically showing a preferred embodiment of the production apparatus that can be used in the production method of the present invention.

Hereinafter, the method of producing organic nanoparticles according to the present invention will be explained.

As an organic material to be used in the method of producing organic nanoparticles of the present invention, examples include an organic pigment; an organic dye; fullerene; a polymer organic material such as polydiacetylene or polyimide; or a particle composed of an aromatic hydrocarbon or an aliphatic hydrocarbon (such as an aromatic hydrocarbon or aliphatic hydrocarbon having orientation, or an aromatic hydrocarbon or aliphatic hydrocarbon having sublimation property). Of those, an organic pigment, an organic dye, or a polymer organic material is preferable, and an organic pigment is particularly preferable. In addition, the organic particle may be used singly, two or more of them, or in combination of two or more.

The organic pigment is not limited in the color tone thereof. Specifically, examples thereof include a perylene, perynone, quinacridone, quinacridonequinone, anthraquinone, anthanthrone, benzimidazolone, condensed disazo, disazo, azo, indanthrone, phthalocyanine, triaryl carbonium, dioxazine, aminoanthraquinone, diketopyrrolopyrrole, thioindigo, isoindoline, isoindolinone, pyranthrone or isoviolanthrone-compound pigment, or a mixture thereof.

More specifically, examples of the organic pigment include perylene-compound pigments, such as C.I. Pigment Red 190 (C.I. No. 71140), C.I. Pigment Red 224 (C.I. No. 71127), C.I. Pigment Violet 29 (C.I. No. 71129), or the like; perynone-compound pigments, such as C.I. Pigment Orange 43 (C.I. No. 71105), C.I. Pigment Red 194 (C.I. No. 71100) or the like; quinacridone-compound pigments, such as C.I. Pigment Violet 19 (C.I. No. 73900), C.I. Pigment Violet 42, C.I. Pigment Red 122 (C.I. No. 73915), C.I. Pigment Red 192, C.I. Pigment Red 202 (C.I. No. 73907), C.I. Pigment Red 207 (C.I. Nos. 73900, 73906), C.I. Pigment Red 209 (C.I. No. 73905) or the like; quinacridonequinone-compound pigments, such as C.I. Pigment Red 206 (C.I. No. 73900/73920), C.I. Pigment Orange 48 (C.I. No. 73900/73920), C.I. Pigment Orange 49 (C.I. No. 73900/73920), or the like; anthraquinone-compound pigments, such as C.I. Pigment Yellow 147 (C.I. No. 60645) or the like; anthanthrone-compound pigments, such as C.I. Pigment Red 168 (C.I. No. 59300) or the like; benzimidazolone-compound pigments, such as C.I. Pigment Brown 25 (C.I. No. 12510), C.I. Pigment Violet 32 (C.I. No. 12517), C.I. Pigment Yellow 180 (C.I. No. 21290), C.I. Pigment Yellow 181° C.I. No. 11777), C.I. Pigment Orange 62 (C.I. No. 11775), C.I. Pigment Red 185 (C.I. No. 12516), or the like; condensed disazo-compound pigments, such as C.I. Pigment Yellow 93 (C.I. No. 20710), C.I. Pigment Yellow 94 (C.I. No. 20038), C.I. Pigment Yellow 95 (C.I. No. 20034), C.I. Pigment Yellow 128 (C.I. No. 20037), C.I. Pigment Yellow 166 (C.I. No. 20035), C.I. Pigment Orange 34 (C.I. No. 21115), C.I. Pigment Orange 13 (C.I. No. 21110), C.I. Pigment Orange 31 (C.I. No. 20050), C.I. Pigment Red 144 (C.I. No. 20735), C.I. Pigment Red 166 (C.I. No. 20730), C.I. Pigment Red 220 (C.I. No. 20055), C.I. Pigment Red 221 (C.I. No. 20065), C.I. Pigment Red 242 (C.I. No. 20067), C.I. Pigment Red 248, C.I. Pigment Red 262, C.I. Pigment Brown 23 (C.I. No. 20060), or the like; disazo-compound pigments, such as C.I. Pigment Yellow 13 (C.I. No. 21100), C.I. Pigment Yellow 83 (C.I. No. 21108), C.I. Pigment Yellow 188 (C.I. No. 21094), or the like; azo-compound pigments, such as C.I. Pigment Red 187 (C.I. No. 12486), C.I. Pigment Red 170 (C.I. No. 12475), C.I. Pigment Yellow 74 (C.I. No. 11714), C.I. Pigment Yellow 150 (C.I. No. 48545), C.I. Pigment Red 48 (C.I. No. 15865), C.I. Pigment Red 53 (C.I. No. 15585), C.I. Pigment Orange 64 (C.I. No. 12760), C.I. Pigment Red 247 (C.I. No. 15915), or the like; indanthrone-compound pigments, such as C.I. Pigment Blue 60 (C.I. No. 69800), or the like; phthalocyanine-compound pigments, such as C.I. Pigment Green 7 (C.I. No. 74260), C.I. Pigment Green 36 (C.I. No. 74265), C.I. Pigment Green 37 (C.I. No. 74255), C.I. Pigment Blue 16 (C.I. No. 74100), C.I. Pigment Blue 75 (C.I. No. 74160:2), C.I. Pigment Blue 15:6 (C.I. No. 74160), C.I. Pigment Blue 15:3 (C.I. No. 74160), or the like; triaryl carbonium-compound pigments, such as C.I. Pigment Blue 56 (C.I. No. 42800), C.I. Pigment Blue 61 (C.I. No. 42765:1), or the like; dioxazine-compound pigments, such as C.I. Pigment Violet 23 (C.I. No. 51319), C.I. Pigment Violet 37 (C.I. No. 51345), or the like; aminoanthraquinone-compound pigments, such as C.I. Pigment Red 177 (C.I. No. 65300), or the like; diketopyrrolopyrrole-compound pigments, such as C.I. Pigment Red 254 (C.I. No. 56110), C.I. Pigment Red 255 (C.I. No. 561050), C.I. Pigment Red 264, C.I. Pigment Red 272 (C.I. No. 561150), C.I. Pigment Orange 71, C.I. Pigment Orange 73, or the like; thioindigo-compound pigments, such as C.I. Pigment Red 88 (C.I. No. 73312), or the like; isoindoline-compound pigments, such as C.I. Pigment Yellow 139 (C.I. No. 56298), C.I. Pigment Orange 66 (C.I. No. 48210), or the like; isoindolinone-compound pigments, such as C.I. Pigment Yellow 109 (C.I. No. 56284), C.I. Pigment Yellow 185 (C.I. No. 56290), C.I. Pigment Orange 61 (C.I. No. 11295), or the like; pyranthrone-compound pigments, such as C.I. Pigment Orange 40 (C.I. No. 59700), C.I. Pigment Red 216 (C.I. No. 59710), or the like; quinophthalone-based pigments, such as C.I. Pigment Yellow 138, or the like; or isoviolanthrone-compound pigments, such as C.I. Pigment Violet 31 (C.I. No. 60010), or the like. Among these, preferred are quinacridone-compound pigments, diketopyrrolopyrrole-compound pigments, dioxazine-compound pigments, phthalocyanine-compound pigments, and azo-compound pigments; and more preferred are diketopyrrolopyrrole-compound pigments, dioxazine-compound pigments, and phthalocyanine-compound pigments.

According to the production method of the present invention, it is possible to produce fine particles of a diketopyrrolopyrrole-compound pigment (hereinafter, also referred to simply as "pyrrolopyrrole-compound pigment") in a nanometer size with a sharp particle diameter distribution. In addition, such the pigment fine particles, when used in a color filter, give a color filter that has desired color purity and high contrast simultaneously and that is superior in light fastness and resistant to generation of deposition as well. A liquid crystal display device installed with such a color filter is superior in display blackness (black depth) and red reproducibility and resistant to display irregularity.

Among the diketopyrrolopyrrole compound pigments above, C.I.P.R. 254 (represented by the following formula (Z)), 255 (represented by the following formula (W)) and C.I.P.R. 264 (represented by the following formula (V)) are particularly preferable, and C.I.P.R. 254 is more preferable from the point of absorption spectrum. Any commercially available pigment, such as Irgaphor Red B-CF, Cromophtal DPP Red BO, Irgazin DPP Red BO or Microlen DPP RED BP, may be used as the C.I.P.R. 254. Cromophtal Coral Red C, Irgazin DPP Red 5G or the like may be used as the C.I.P.R. 255. Hostapeperm Rubin D3B LP2615, Irgazin DPP Rubin TR or the like may be used as the C.I.P.R. 264.

[Chemical formula 12]

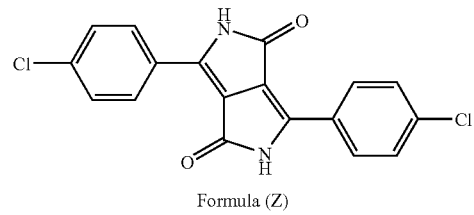

Formula (Z)

[Chemical formula 13]

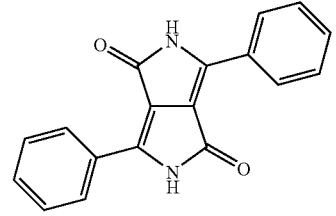

Formula (W)

[Chemical formula 14]

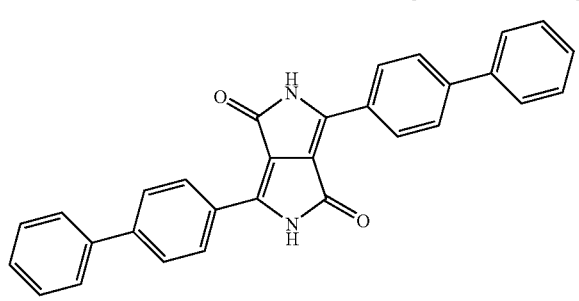

Formula (V)

Recently, C.I.P.B. 15:6 (phthalocyanine compound pigment) has been used frequently as a colorant for blue pixel of color filter, and the color purity of color filter has been improved. However, light sources frequently used in liquid crystal display devices, such as cold-cathode tube, have a slight light emission also at a wavelength longer than the blue emission peak, and thus, the color filter showed a chromaticity lower than that of NTSC.

It is possible to overcome this problem by adding a dioxazine compound pigment such as C.I.P.V. 23 or 37 (in an amount of ca. 5%). Although it would be possible to improve the contrast and display characteristics further with this color filter that is higher in color purity, no favorable result was obtained by the conventional bead dispersion method or salt milling method.

In contrast, according to the production method of the present invention, it is possible to obtain a dioxazine compound pigment as nanometer-sized pigment particles having uniform particle diameter distribution. It is also possible to make a dispersion containing the dioxazine compound pigment fine particles superior in stability with a lapse of time. Therefore, the color filter using the same is superior in both color purity and contrast and is also superior in light fastness. Liquid crystal display devices using such the color filter are superior in display blackness, blue definition, and reproducibility and resistant to display irregularity. As the C.I.P.V. 23, a commercially available product, such as Cromofine Violet RE, Fastgen Super Violet BBL, Helio Fast Violet EB, Microlith Violet RL-WA or Sanyo Fast Violet BLD, may be used. As the C.I.P.V. 37, a commercially available product such as Cromophtal Violet B or Microlith Violet B-A may be used.

In addition to those described above, examples of the phthalocyanine compound pigments for use in the present invention also include the pigments described as color filter pigments in "Dictionary of Pigments", Sep. 25, 2000, published by Asakura Publishing Company Ltd., pp. 300 to 314; and among them, pigment blue 15:6, pigment green 7, and pigment green 36 are favorable from the point of absorption spectrum.

Structurally, phthalocyanine compound pigments are chemically stable and superior in heat resistance and light fastness. In addition, they have higher coloring efficiency and have been used as the base pigments for the B and G pixels of color filter. These pigments, when used as fine particles, would improve the contrast and the display characteristics of the resulting color filter further. However, it was not possible to obtain favorable results by conventional bead dispersion or salt milling method. In contrast, it is possible according to the production method of the present invention to obtain a nanometer-sized pigment having uniform particle diameter distribution and to give a pixel material favorable for color filter, even when a phthalocyanine compound pigment is used.

In the production method according to the present invention, two or more organic pigments or solid solutions of organic pigment may be used in combination, or alternatively, a pigment may be used in combination with a common dye.

The dye for use in the present invention is not particularly limited, and dye commonly used for color filters may be used. Examples thereof include the dyes described in JP-A-64-90403, JP-A-64-91102, JP-A-1-94301 and JP-A-6-11614, Japanese Patent No. 2592207, U.S. Pat. Nos. 4,808,501, 5,667,920, and 5,059,500, JP-A-5-333207, JP-A-6-35183, JP-A-6-51115, JP-A-6-194828, JP-A-8-211599, JP-A-4-249549, JP-A-10-123316, JP-A-11-302283, JP-A-7-286107, JP-A-2001-4823, JP-A-8-15522, JP-A-8-29771, JP-A-8-146215, JP-A-11-343437, JP-A-8-62416, JP-A-2002-14220, JP-A-2002-14221, JP-A-2002-14222, JP-A-2002-14223, JP-A-8-302224, JP-A-8-73758, JP-A-8-179120 and JP-A-8-151531, and others.

Various dyes different in chemical structure, such as pyrazole azo dyes, anilino azo dyes, triphenylmethane dyes, anthraquinone dyes, anthrapyridone dyes, benzylidene dyes, oxonol dyes, pyrazolotriazole azo dyes, pyridone azo dyes, cyanine dyes, phenothiazine dyes, pyrrolopyrazole azomethine dyes, xanthene dyes, phthalocyanine dyes, benzopyran dyes, and indigo dyes, may be used.

Further, in a case of a resist system in which development is performed in water or an alkaline solution, an acid dye and/or a derivative thereof may favorably be used from the viewpoint of completely removing the binder and/or the dye in a light-unirradiated portion by the development.

Further, for example, a direct dye, a basic dye, a mordant dye, an acid mordant dye, an azoic dye, a disperse dye, an oil-soluble dye, a dye for food and/or derivatives thereof may also be usefully used.

The acid dye is not particularly limited, so long as it is a dye having an acidic group such as, for example, a sulfonic acid and a carboxylic acid. However, it is necessary to select the acid dye by taking into consideration all of required properties, such as solubility against an organic solvent or a developer, formability of a salt with a basic compound, light absorbance, an interaction with any one of other components in the composition, light resistance and heat resistance.

Specific examples of the above-described acid dye are described below, but the present invention is not restricted to these examples. Examples thereof include Acid Alizarin Violet N; Acid Black 1, 2, 24, 48; Acid Blue 1, 7, 9, 15, 18, 23, 25, 27, 29, 40, 45, 62, 70, 74, 80, 83, 86, 87, 90, 92, 103, 112, 113, 120, 129, 138, 147, 158, 171, 182, 192, 243 and 324:1; Acid Chrome Violet K; Acid Fuchsin; Acid Green 1, 3, 5, 9, 16, 25, 27 and 50; Acid Orange 6, 7, 8, 10, 12, 50, 51, 52, 56, 63, 74 and 95; Acid Red 1, 4, 8, 14, 17, 18, 26, 27, 29, 31, 34, 35, 37, 42, 44, 50, 51, 52, 57, 66, 73, 80, 87, 88, 91, 92, 94, 97, 103, 111, 114, 129, 133, 134, 138, 143, 145, 150, 151, 158, 176, 183, 198, 211, 215, 216, 217, 249, 252, 257, 260, 266 and 274; Acid Violet 6B, 7, 9, 17 and 19; Acid Yellow 1, 3, 7, 9, 11, 17, 23, 25, 29, 34, 36, 42, 54, 72, 73, 76, 79, 98, 99, 111, 112, 114, 116, 184, and 243; Food Yellow 3; and derivatives of theses dyes.

In addition to the above dyes, acid dyes such as azo type, xanthene type and phthalocyanine type dyes are preferable, and acid dyes such as C.I. solvent Blue 44 and 38; C.I. Solvent Orange 45; and Rhodamine B; Rhodamine 110; and derivatives thereof are preferably used.

Alternatively, an azo dye, a cyanine dye, a merocyanine dye or a coumarin dye may be used as the organic dye, and polydiacetylene, polyimide or the like as the polymer organic material.

[Formation of Organic Fine Particles]

Hereinafter, formation of the organic nanoparticles will be explained.

In the production method according to the present invention, the organic nanoparticles (in the present invention, "nanoparticles" mean nanometer-sized particles and are also referred to as "fine particles") are formed by mixing an organic material solution containing an organic material dissolved in a good solvent with a solvent compatible with the good solvent but functions as a poor solvent for the organic material (hereinafter, this solvent will be referred to as a "poor solvent for organic material" or simply as a "poor solvent") (hereinafter, this method will be sometimes referred to as "fine-particle formation method", and the organic-nanoparticle-containing dispersion thus obtained as "organic fine-particle formed liquid" or "organic nanoparticle dispersion"). In this connection, it is necessary for a poor solvent and a good solvent chosen for combination to show a sufficient difference between their solubility for the organic pigment; and it is necessary to select proper solvents depending on the material to be used. However, any combination of solvents may be employed as long as they can carry out the above-described steps.

For the poor solvent for the organic material, there is no particular limitation as long as the poor solvent is compatible, or mixes uniformly, with a good solvent for dissolving the organic material. With respect to the poor solvent for the organic material, the solubility of the organic material in the poor solvent is preferably 0.02 mass % or less, more preferably 0.01 mass % or less. The solubility of the organic material in the poor solvent has no particular lower limit, but it is practical that the solubility is 0.000001 mass % or more in consideration of an organic material ordinarily used. The solubility may be solubility in the case where the organic material is dissolved in the presence of an acid or an alkali. Furthers compatibility or uniform mixing property between the good solvent and the poor solvent is such that the solubility of the good solvent in the poor solvent is preferably 30 mass % or more, more preferably 50 mass % or more. The solubility of the good solvent in the poor solvent has no particular upper limit, but it is practical that the solvents can mix with each other at an arbitrary ratio.

Examples of the poor solvents include aqueous solvents (e.g., water, hydrochloric acid, and aqueous sodium hydroxide solution), alcohol compound solvents, ketone compound solvents, ether compound solvents, aromatic compound solvents, carbon disulfide solvents, aliphatic compound solvents, nitrile compound solvents, halogen-containing compound solvents, ester compound solvents, ionic liquids, and mixed solvents thereof. Preferable poor solvents include aqueous solvents, alcohol compound solvents, ketone compound solvents, ether compound solvents, ester compound solvents and mixed solvents thereof; and more preferable poor solvents include aqueous solvents, alcohol compound solvents and ester compound solvents.

Examples of the alcohol compound solvents include methanol, ethanol, isopropyl alcohol, n-propyl alcohol, 1-methoxy-2-propanol, and the like. Examples of the ketone compound solvents include acetone, methyl ethyl ketone, methyl isobutyl ketone, cyclohexanone, and the like. Examples of ether compound solvents include dimethylether, diethylether, tetrahydrofuran, and the like. Examples of the aromatic compound solvents include benzene, toluene, and the like. Examples of the aliphatic compound solvents include hexane, and the like. Examples of the nitrile compound solvents include acetonitrile, and the like. Examples of the halogen-containing compound solvents include dichloromethane, trichloroethylene, and the like. Examples of the ester compound solvents include ethyl acetate, ethyl lactate, 2-(1-methoxy)propyl acetate, and the like. Examples of the ionic liquids include a salt of 1-butyl-3-methylimidazolium and $PF_6^-$, and the like.

Next, the good solvent for dissolving the organic material will be described.

For the good solvent, there is no particular limitation as long as the good solvent can dissolve the organic material to be used, and is compatible, or uniformly mixed, with the poor solvent described above. With respect to the solubility of the organic material in the good solvent, the solubility of the organic material is preferably 0.2 mass % or more, and more preferably 0.5 mass % or more. The solubility of the organic material in the good solvent has no particular upper limit, but it is practical that the solubility is 50 mass % or less in consideration of an organic material to be ordinarily used. The solubility may be solubility in the case where the organic material is dissolved in the presence of an acid or an alkali. A preferable range for compatibility or uniform mixing property between the good solvent and the poor solvent is as described above.

Examples of the good solvents include aqueous solvents (e.g., water, hydrochloric acid, and aqueous sodium hydroxide solution), alcohol compound solvents, amide compound solvents, ketone compound solvents, ether compound solvents, aromatic compound solvents, carbon disulfide, aliphatic compound solvents, nitrile compound solvents, sulfoxide compound solvents, halogen-containing compound solvents, ester compound solvents, ionic liquids, mixed solvents thereof, and the like. Among these, aqueous solvents, alcohol compound solvents, ketone compound solvents, ether compound solvents, sulfoxide compound solvents, ester compound solvents, amide compound solvents, and the mixed solvents thereof are preferable; aqueous solvents, alcohol compound solvents, ester compound solvents, sulfoxide compound solvents, and amide compound solvents are more preferable; aqueous solvents, sulfoxide compound solvents, and amide compounds solvents are further preferable; and sulfoxide compound solvents or amide compounds solvents are particularly preferable.

Examples of the sulfoxide compound solvent include dimethyl sulfoxide, diethyl sulfoxide, hexamethylene sulfoxide, and sulfolane. Examples of the amide compound solvent include N,N-dimethylformamide, 1-methyl-2-pyrrolidone, 2-pyrrolidinone, 1,3-dimethyl-2-imidazolidinone, 2-pyrrolidinone, ε-caprolactam, formamide, N-methylformamide, acetamide, N-methylacetamide, N,N-dimethylacetamide, N-methylpropaneamide, and hexamethylphosphoric triamide.

Further, the concentration of the organic material solution prepared by dissolving the organic material in the good solvent is preferably in the range of from the saturation concentration of the organic material with respect to the good solvent under a condition at the time of the dissolution to about one hundredth of the saturation concentration.

The condition under which the organic material solution is prepared is not particularly restricted, and can be selected from a range from a normal pressure condition to a subcritical or supercritical condition. The temperature in the case where the solution is prepared under normal pressure is preferably −10 to 150° C., more preferably −5 to 130° C., and particularly preferably 0 to 100° C.

The above-described examples of the good solvent and those of the poor solvents overlap, but the identical solvent is not selected for both the good solvent and the poor solvent. Any solvents may be used in combination of them as long as an organic material to be used shows solubility in the good solvent sufficiently higher than that in the poor solvent. Specifically, the difference in solubility between them is preferably 0.2 mass % or more, and more preferably 0.5 mass % or more. There is no particular upper limit to the difference in solubility between the good solvent and the poor solvent. However, if ordinarily used organic materials are taken into consideration, it is practical that the upper limit is 50 mass % or less.

In the present invention, it is necessary that the organic material be uniformly dissolved in the good solvent, and further it is preferred that the organic material be dissolved when the solvent is acidic or alkaline. In general, in the case of a pigment having in the molecule thereof a group dissociative under alkaline conditions, an alkaline solvent is used, and in the case of a pigment having no group dissociative under alkaline conditions but having in the molecule thereof many nitrogen atoms, to which protons easily adhere, an acidic solvent is used. For example, quinacridone-, diketopyrrolopyrrole-, and condensed disazo-compound pigments are dissolved in alkaline conditions, while phthalocyanine-compound pigments are dissolved in acidic conditions.

Examples of a base that can be used in the case that the pigment is dissolved in an alkaline condition, include inorganic bases, such as lithium hydroxide, sodium hydroxide, potassium hydroxide, calcium hydroxide, and barium hydroxide; and organic bases, such as trialkylamine, diazabicycloundecene (DBU), and metal alkoxides. An inorganic base is preferred.

The amount of the base to be used is not particularly limited, as long as the base in the amount can homogeneously dissolve the pigment. In the case of the inorganic base, the amount thereof is preferably from 1.0 to 30 mole equivalents, more preferably from 1.0 to 25 mole equivalents, and further preferably from 1 to 20 mole equivalents, to the organic material. In the case of the organic base, the amount thereof is preferably from 1.0 to 100 mole equivalents, more preferably from 5.0 to 100 mole equivalents, and further preferably from 20 to 100 mole equivalents, to the organic material.

Examples of an acid to be used in the case that the pigment is dissolved in the acidic solvent, include inorganic acids, such as sulfuric acid, hydrochloric acid, and phosphoric acid; and organic acids, such as acetic acid, trifluoroacetic acid, oxalic acid, methanesulfonic acid, and trifluoromethanesulfonic acid. Among these, the inorganic acids are preferable, and sulfuric acid is especially preferable.

The amount of the acid to be used is not particularly limited, as long as the acid in the amount can homogenously dissolve the organic material. In many cases, the acid is used in a larger or more excessive amount than the base. Regardless the kind of the acid being an inorganic acid or an organic acid, the amount of the acid to be used is preferably from 3 to 500 mole equivalents, more preferably from 10 to 500 mole equivalents, and further preferably from 30 to 200 mole equivalents, to the organic material.

In the case where an alkali or an acid is mixed with the organic solvent and the mixture is used as a good solvent for the organic pigment, a solvent having high solubility for the alkali or the acid such as water or a lower alcohol can be added in a slight amount to the organic solvent in order that the alkali or the acid may be completely dissolved. The amount of water or the lower alcohol is preferably 50 mass % or less, or more preferably 30 mass % or less with respect to the total amount of the organic material solution. Specific examples thereof that can be used include water, methanol, ethanol, n-propanol, isopropanol, and butyl alcohol.

The condition for the poor solvent at the time of forming the organic particles is not particularly restricted, and can be selected from a range from a normal pressure condition to a subcritical or supercritical condition. The temperature at which the organic particles are formed under normal pressure is preferably −30 to 100° C., more preferably −10 to 60° C., and particularly preferably 0 to 30° C. The viscosity of the liquid containing formed organic fine particles is preferably in the range of from 0.5 to 80.0 mPa·s, and more preferably from 1.0 to 50.0 mPa·s.

The method of mixing the organic material solution with the poor solvent is not particularly limited, but it is preferable to mix these solutions by adding the organic material solution to the poor solvent, and it is more preferred that that the poor solvent be in a state of being stirred at the time of mixing. The stirring rate is preferably 100 to 10,000 rpm, more preferably 150 to 8,000 rpm, and particularly preferably 200 to 6,000 rpm. A pump or the like may be or may not be used for adding. As the adding method, a method of adding a liquid inside the other liquid or a method of adding a liquid outside the other liquid may be used; a method of adding a liquid inside the other liquid is preferable. In the present invention, it is preferred that one of the liquids be successively fed from inside of the other liquid through a feed pipe using a pump. The inner diameter of the feed pipe is preferably in the range of from 0.1 mm to 200 mm, and more preferably from 0.2 mm to 100 mm. The speed fed from the feed pipe into the other liquid is preferably in the range of from 1 to 10,000 ml/min, and more preferably from 5 to 5,000 ml/min.

The mixing ratio of the organic material solution and the poor solvent (a ratio of good solvent/poor solvent in the liquid containing formed organic fine particles) is preferably in a range of from 1/50 to 2/3, more preferably from 1/40 to 1/2, and especially preferably from 1/20 to 3/8, in terms of volume ratio.

The concentration in the liquid containing formed organic fine particles is not particularly limited, as long as the organic particles can be prepared, but the amount of the organic particles is preferably 10 to 40,000 mg, more preferably 20 to 30,000 mg, and particularly preferably 50 to 25,000 mg, per 1,000 ml of the dispersion solvent.

There is no particular limitation to the scale of preparation at the time when the organic nanoparticles are prepared. However, it is preferred that the preparation scale is such that the amount of the poor solvent to be mixed is preferably from 10 to 2,000 L, and more preferably from 50 to 1,000 L.

As to an average particle diameter of organic particles, an average scale of a group can be represented by digitalizing by several measurement methods. There are frequently-used parameters, such as mode diameter indicating the maximum value of distribution, median diameter corresponding to the median value in the integral frequency distribution curve, and various average diameters (e.g., number-averaged diameter, length-averaged diameter, area-averaged diameter, weight-averaged diameter, volume-averaged diameter, or the like), and the like. In the present invention, the average particle diameter means a number-averaged diameter, unless otherwise specified. The average diameter of the organic nanoparticles (primary particles) is in a nanometer size range, and the average diameter is preferably 1 nm to 1 μm, more preferably 1 to 200 nm, still more preferably 2 to 100 nm, and particularly preferably 5 to 80 nm. The particles prepared by the production method according to the present invention may be crystalline or amorphous particles, or the mixture thereof.

Further, in the present invention, a ratio (Mv/Mn) of volume-averaged diameter (Mv) to number-averaged diameter (Mn) is used as the indicator of the monodispersity of particles (degree of the uniformity in particle size), unless otherwise particularly specified. The monodispersity, the ratio Mv/Mn, of the organic nanoparticles (primary particles) is preferably 1.0 to 2.0, more preferably 1.0 to 1.8, and particularly preferably 1.0 to 1.5.

Examples of a method of measuring the particle diameter of the organic particle include a microscopic method, a gravimetric method, a light scattering method, a light shielding method, an electric resistance method, an acoustic method, and a dynamic light scattering method. Of these, the microscopic method and the dynamic light scattering method are particularly preferable. Examples of a microscope to be used in the microscopic method include a scanning electron microscope and a transmission electron microscope. Examples of a particle measuring device according to the dynamic light scattering method include Nanotrac UPA-EX 150 manufactured by NIKKISO Co., Ltd., and a dynamic light scattering photometer DLS-7000 series manufactured by OTSUKA ELECTRONICS CO., LTD.

[Dispersing Agent]

In the method of producing organic nanoparticles of the present invention, when a dispersion of the organic nanoparticles is prepared, a dispersing agent is preferably incorporated therein. There is no particular limitation imposed on the step of incorporating the dispersing agent, but it is preferred to add the dispersing agent to both or any one of the organic material solution and the poor solvent. Further, it is also preferred to add a dispersing agent solution in a route separate from the above-described two solutions at the time when the organic nanoparticles are prepared. Besides, it is also preferred to use pigment particles that have been previously surface-processed with a dispersing agent; the pigment particles may be subjected to a surface treatment capable of promoting adsorption of the dispersing agent onto the pigment particles. The dispersing agent has functions (1) that the dispersing agent is rapidly adsorbed on the surface of the produced pigment, to form fine nanoparticles, and (2) that the dispersing agent prevents these particles from aggregating again.

As the dispersing agent, use can be made of an anionic, cationic, amphoteric, nonionic or pigment-derivative-type, and low-molecular-weight or polymer dispersing agent. The molecular weight of the polymer dispersing agent for use may be any value, as long as the dispersing agent can be uniformly dissolved in a solution, but the polymer dispersing agent preferably has a molecular weight of 1,000 to 2,000,000, more preferably of 5,000 to 1,000,000, still more preferably of 10,000 to 500,000, and particularly preferably of 10,000 to 100,000. Examples of the polymer dispersing agent include polyvinyl pyrrolidone, polyvinyl alcohol, polyvinyl methyl ether, polyethylene oxide, polyethylene glycol, polypropylene glycol, polyacrylamide, vinyl alcohol/vinyl acetate copolymer, partial-formal products of polyvinyl alcohol, partial-butyral products of polyvinyl alcohol, vinylpyrrolidone/vinyl acetate copolymer, polyethylene oxide/propylene oxide block copolymer, polyacrylic acid salts, polyvinyl sulfuric acid salts, poly(4-vinylpyridine) salts, polyamides, polyallylamine salts, condensed naphthalenesulfonic acid salts, cellulose derivatives, and starch derivatives. Besides, natural polymers can be used, examples of which include alginic acid salts, gelatin, albumin, casein, gum arabic, tragacanth gum, and ligninsulfonic acid salts. Above all, it is preferred to use polyvinyl pyrrolidone. These polymers may be used singly or in combination of two or more. These dispersing agents may be used singly or in combination of two or more thereof. The dispersing agents to be used when dispersing a pigment are described in detail in "Dispersion Stabilization of Pigment and Surface Treatment Technique/Evaluation" (published by Japan Association for International Chemical Information, on December 2001), pp. 29-46.

Examples of the anionic dispersing agent (anionic surfactant) include N-acyl-N-alkyltaurine salts, fatty acid salts, alkylsulfates, alkylbenzenesulfonates, alkylnaphthalenesulfonates, dialkylsulfosuccinates, alkylphosphates, naphthalenesulfonic acid/formalin condensates, and polyoxyethylenealkylsulfates. Among these, N-acyl-N-alkyltaurine salts are particularly preferable. As the N-acyl-N-alkyltaurine salts, those described in JP-A-3-273067 are preferable. These anionic dispersing agents may be used singly or in combination of two or more thereof.

Examples of the cationic dispersing agent (cationic surfactant) include quaternary ammonium salts, alkoxylated polyamines, aliphatic amine polyglycol ethers, aliphatic amines, diamines and polyamines derived from aliphatic amine and aliphatic alcohol; imidazolines derived from aliphatic acid, and salts of these cationic substances. These cationic dispersing agents may be used singly or in combination of two or more thereof.

The amphoteric dispersing agent is a dispersing agent having, in the molecule thereof, an anionic group moiety which the anionic dispersing agent has in the molecule and a cationic group moiety which the cationic dispersing agent has in the molecule.

Examples of the nonionic dispersing agents (nonionic surfactant) include polyoxyethylenealkyl ethers, polyoxyethylenealkylaryl ethers, polyoxyethylene fatty acid esters, sorbitan fatty acid esters, polyoxyethylenesorbitan fatty acid esters, polyoxyethylenealkylamines, and glycerin fatty acid esters. Among these, polyoxyethylenealkylaryl ethers are preferable. These nonionic dispersing agents may be used singly or in combination of two or more thereof.

The pigment-derivative-type dispersing agent is defined as a dispersing agent that is derived from an organic pigment as a parent material and prepared by chemically modifying a structure of the parent material or that is obtained by a pigment-forming reaction of a chemically-modified pigment precursor. Examples of the pigment-derivative-type dispersing agent include sugar-containing pigment-derivative-type dispersing agents, piperidyl-containing pigment-derivative-type dispersing agents, naphthalene- or perylene-derivative pigment-derivative-type dispersing agents, pigment-derivative-type dispersing agents having a functional group linked through a methylene group to a pigment parent structure, pigment-derivative-type dispersing agents (parent structure) chemically modified with a polymer, pigment-derivative-type dispersing agents having a sulfonic acid group, pigment-derivative-type dispersing agents having a sulfonamido group, pigment-derivative-type dispersing agents having an ether group, and pigment-derivative-type dispersing agents having a carboxylic acid group, carboxylate group, or carboxamido group.

In the producing method of the present invention, when a solution of the organic material dissolved in the good solvent is prepared, it is preferred that a pigment dispersing agent containing an amino group coexists with the organic material. The term "amino group" described herein embraces a primary amino group, a secondary amino group, and a tertiary amino group. The number of amino groups may be one or plural. The pigment dispersing agent containing an amino group may be a pigment derivative compound wherein a substituent having an amino group is introduced to the skeleton of the pigment or may be a polymer compound polymerized using a monomer having an amino group as a polymerization component. Examples of these compounds include compounds described in JP-A-2000-239554, JP-A-2003-96329, JP-A-2001-31885, JP-A-10-339949, and JP-B-5-72943 ("JP-B" means examined Japanese patent publication). However, the present invention is not limited to these compounds.

As the dispersing agent that can be used in the producing method of the present invention, it is preferred to use at least one compound selected from compounds represented by formula (D1), (D3), or (D4) set forth below.

<1. Compound Represented by Formula (D1)>
[Chemical formula 15]

$$A\text{-}N{=}N\text{---}X\text{---}Y \qquad \text{Formula (D1)}$$

In formula (D1), A represents a component capable of forming an azo dye together with X-Y. The component A can be arbitrary selected as long as the component is capable of forming an azo dye upon coupling with a diazonium compound. Specific examples of the component A are shown below, but the present invention is not limited to these compounds.

[Chemical formula 16]

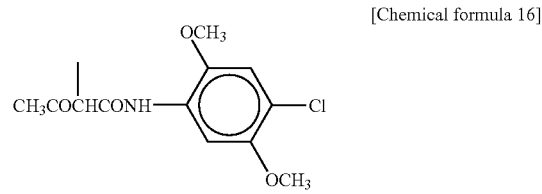

Formula 1-1

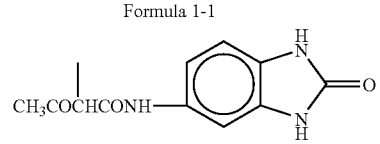

Formula 1-2

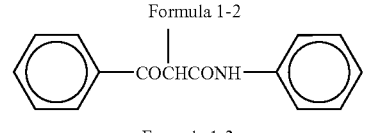

Formula 1-3

-continued

Formula 1-4

Formula 1-5

Formula 1-6  Formula 1-7

Formula 1-8

Formula 1-9  Formula 1-10

Formula 1-11  Formula 1-12

In formula (D1), X represents a single bond, or a group selected from divalent connecting groups represented by structural formulae of formulae (i) to (v) set forth below.

[Chemical formula 18]

Formula (i)

-continued

Formula (ii)

Formula (iii)

Formula (iv)

Formula (v)

In formula (D1)), Y represents a group represented by the following formula (D2).

[Chemical formula 19]

Formula (D2)

In formula (D2), Z represents a lower alkylene group. In other words, Z can be expressed as —$(CH_2)_b$— wherein b represents an integer of from 1 to 5, and preferably 2 or 3. In formula (D2), —$NR_{21}$ represents a lower alkylamino group, or a nitrogen-containing, 5- or 6-membered, saturated heterocyclic group. In the case where said —$NR_{21}$ represents a lower alkylamino group, the lower alkylamino group can be expressed as —$N(C_rH_{2r+1})_2$ wherein r represents an integer of from 1 to 4, and preferably 1 or 2. In the case where said —$NR_{21}$ represents a nitrogen-containing, 5- or 6-membered, saturated heterocyclic group, the heterocyclic group is preferably any one of the heterocyclic groups shown by the following structural formulae.

[Chemical formula 20]

Pyrrolidine ring  Pyperidine ring  Morpholine ring

Each of Z and —$NR_{21}$ in the above-described formula (D2) may optionally have a lower alkyl group or an alkoxy group, as a substituent. In the above-described formula (D2), a represents 1 or 2, and preferably 2.

Specific examples of the compound represented by formula (D1) are shown below, but the present invention is not limited to these examples.

[Chemical formula 21]
1.
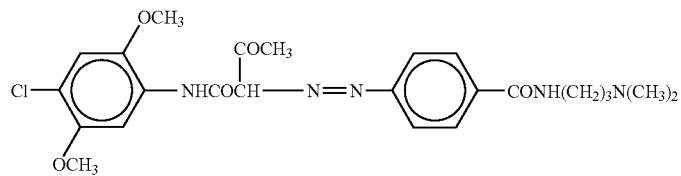
2.
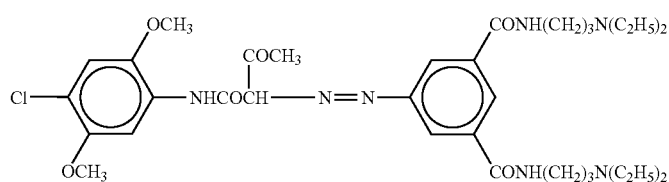
3.
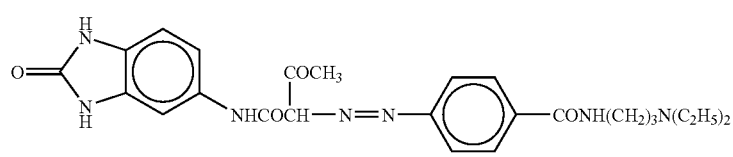
4.
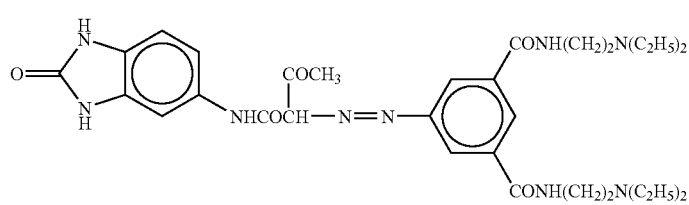
5.
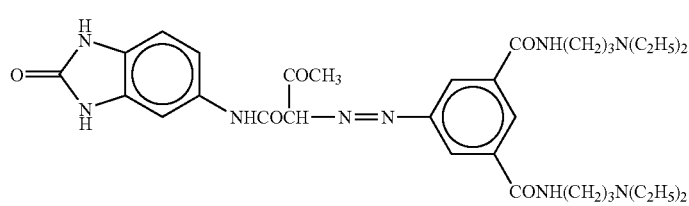
6.
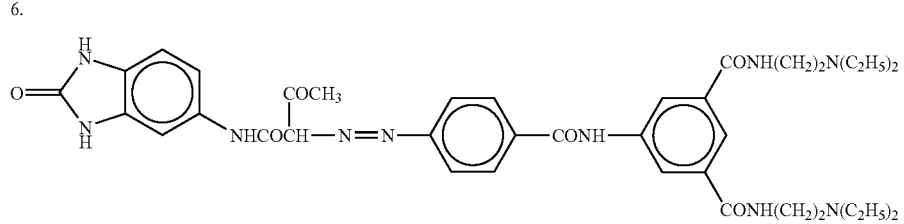
7.
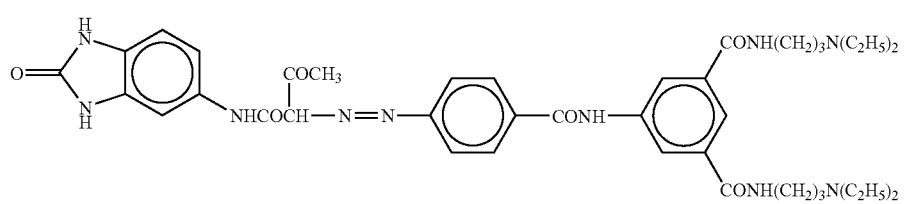

-continued
[Chemical formula 22]
8.
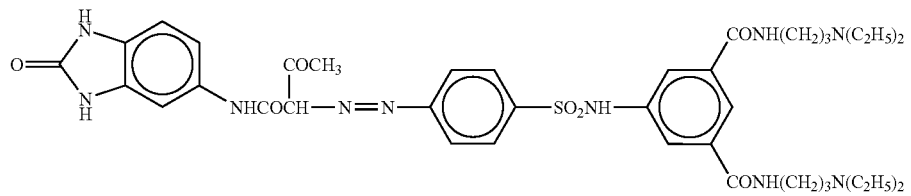
9.
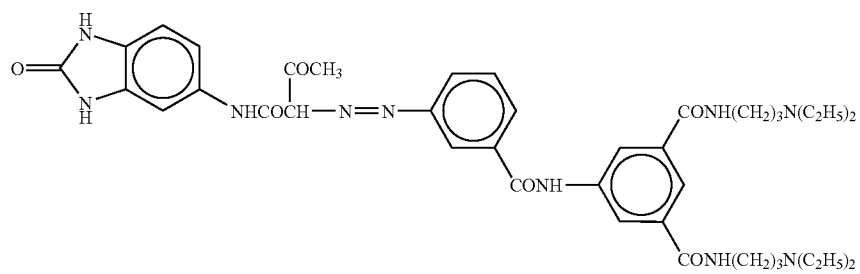
10.
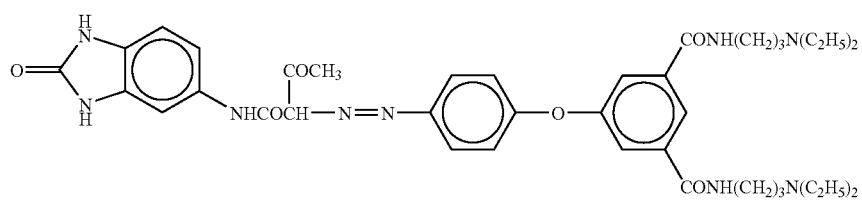
11.
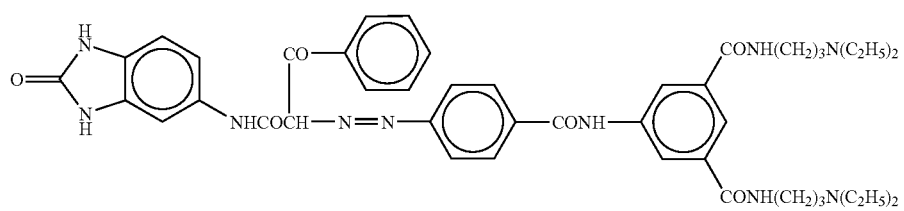
12.
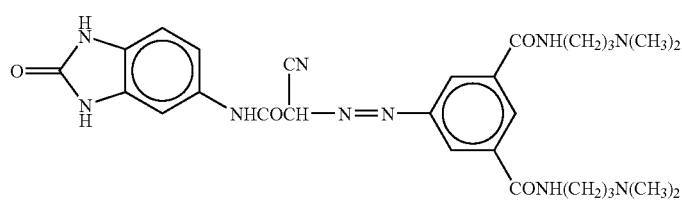
13.
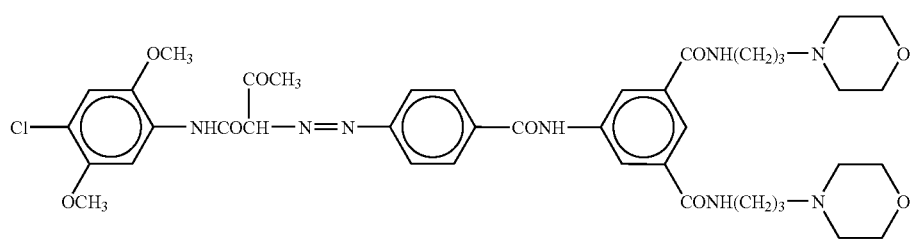

14.
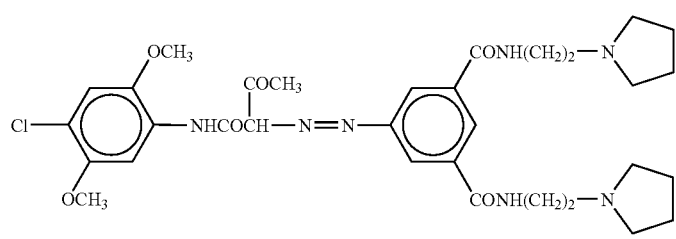
15.
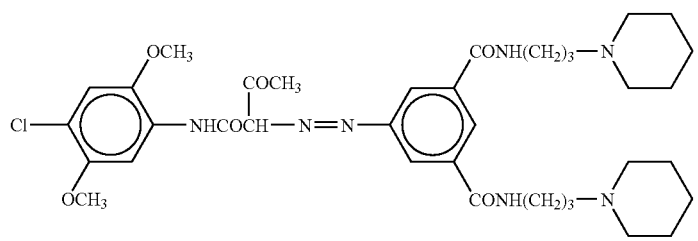
16.
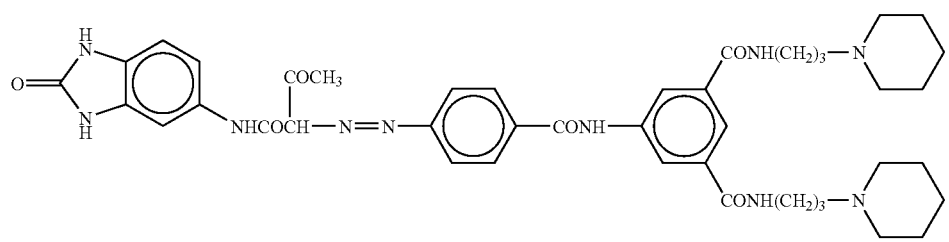
17.
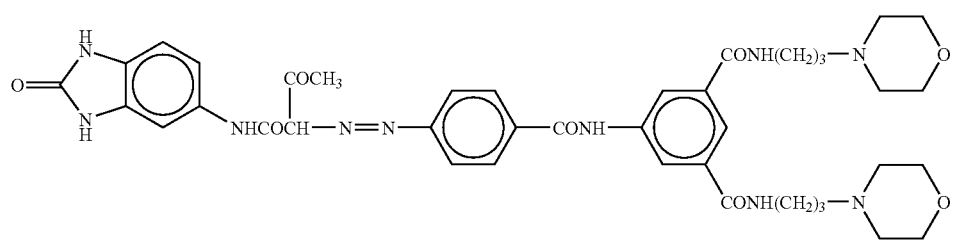
18.
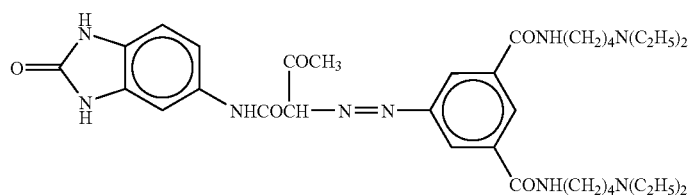
19.
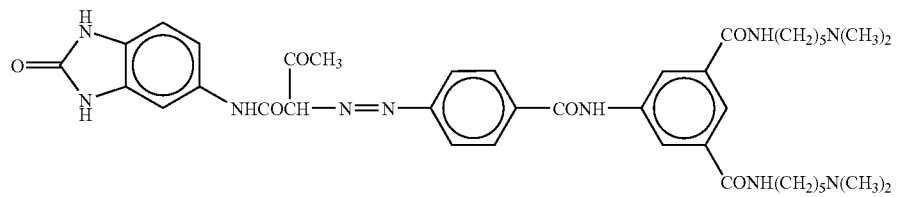

20.

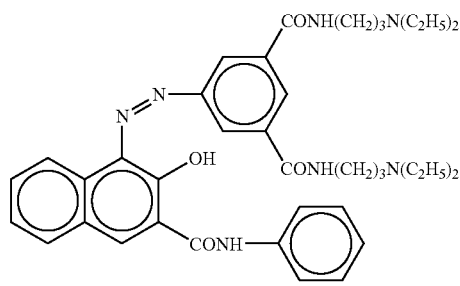

21.

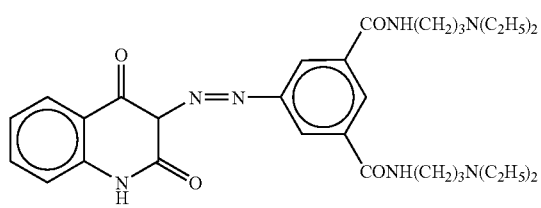

22.

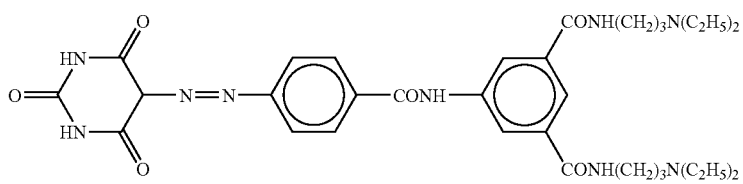

The compound represented by formula (D1) can be synthesized referring to the method described in, for example, JP-A-2000-239554.

<2. Compound Represented by Formula (D3)>

[Chemical formula 25]

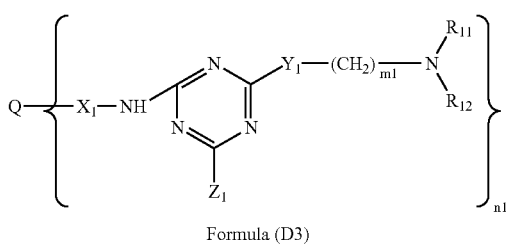

Formula (D3)

In formula (D3), Q represents a residue of an organic dye selected from anthraquinone compound dyes, azo compound dyes, phthalocyanine compound dyes, quinacridone compound dyes, dioxazine compound dyes, anthrapyrimidine compound dyes, anthanthrone compound dyes, indanthrone compound dyes, flavanthrone compound dyes, pyranthrone compound dyes, perynone compound dyes, perylene compound dyes, and thioindigo compound dyes. Among these organic dyes, preferred are azo compound dyes and dioxazine compound dyes. The azo compound dyes are more preferred.

$X_1$ represents —CO—, —CONH—$Y_2$—, —SO$_2$NH—$Y_2$—, or —CH$_2$NHCOCH$_2$NH—$Y_2$—. $X_1$ is preferably —CO— or —CONH—$Y_2$—.

$Y_2$ represents an alkylene group or an arylene group, each of which may be substituted. Among these groups, preferred are a phenylene group, a toluylene group, and a hexylene group. The phenylene group is more preferred.

$R_{11}$, and $R_{12}$ each independently represent a substituted or unsubstituted alkyl group, alternatively, $R_{11}$ and $R_{12}$ may be bonded together to form a heterocyclic group which at least contains a nitrogen atom. Among these groups, preferred are a methyl group, an ethyl group, a propyl group, and a pyrrolidinyl group which contains a nitrogen atom. The ethyl group is more preferred.

$Y_1$ represents —NH— or —O—.

$Z_1$ represents a hydroxyl group or a group represented by formula (D3a) with the proviso that in the case where n1 is 1, $Z_1$ may be —NH—$X_1$-Q. m1 represents an integer of 1 to 6, and preferably 2 or 3. n1 represents an integer of 1 to 4, and preferably 1 or 2.

[Chemical formula 26]

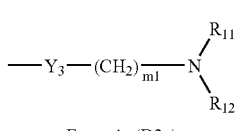

Formula (D3a)

In formula (D3a), $Y_3$ represents —NH— or —O—, and m1, $R_{11}$, and $R_{12}$ have the same meanings as those in formula (D3).

The compounds represented by formula (D3) are specifically represented, for example, by the following formulae.

[Chemical formula 27]
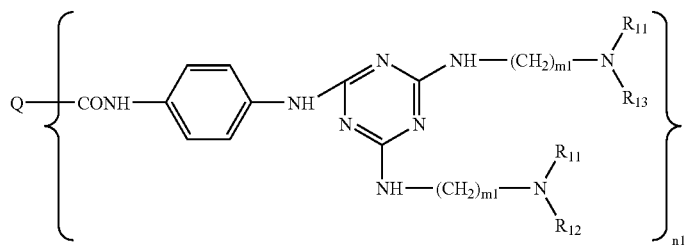
Formula (D 3-1)
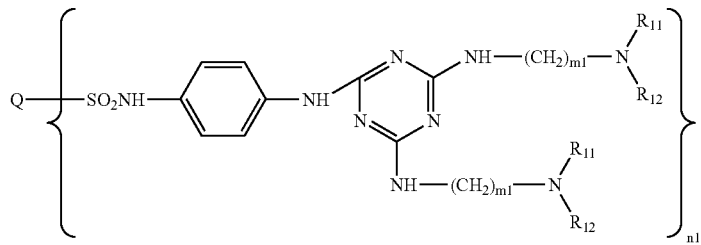
Formula (D 3-2)
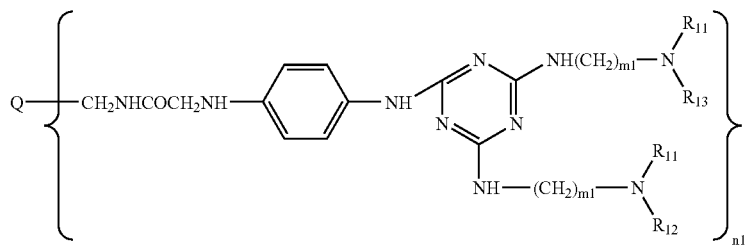
Formula (D 3-3)
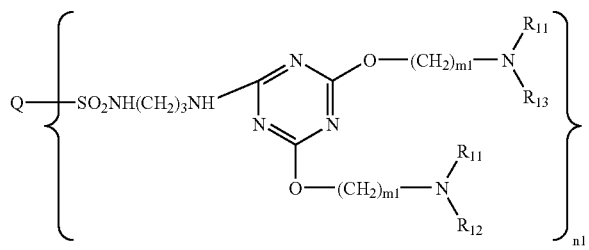
Formula (D 3-4)
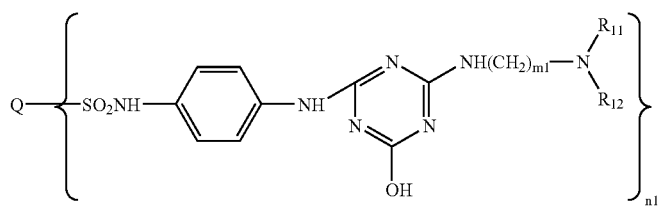
Formula (D 3-5)
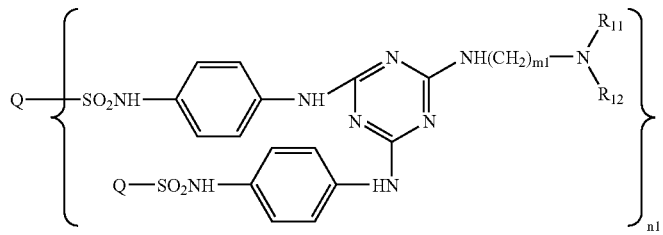
Formula (D 3-6)

In formulas (D3-1) to (D3-6), Q, m1, n1, $R_{11}$, and $R_{12}$ have the same meanings as those in formula (D3). Specific examples of the compound represented by formula (D3) are shown below, but the present invention is not meant to be limited to these. In the following, Cu-Pc represents copper phthalocyanine.
[Chemical formula 28]
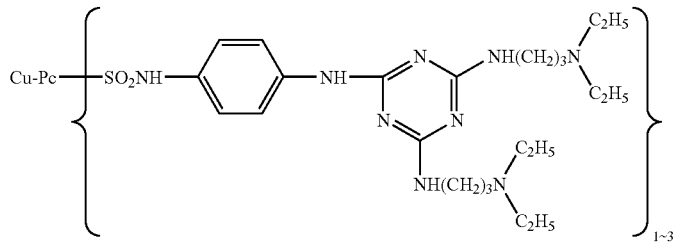
(a)
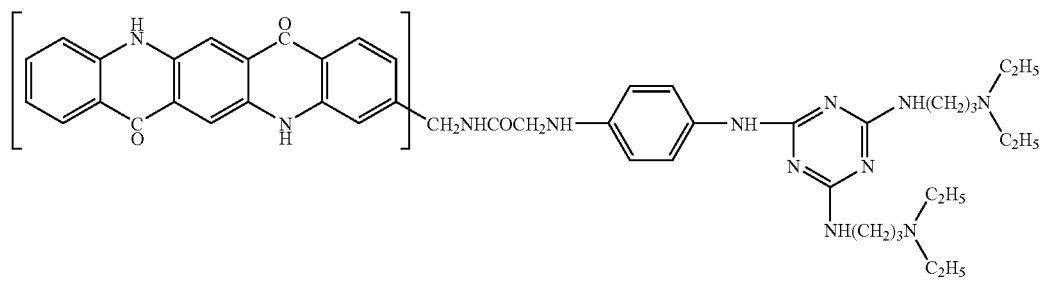
(b)
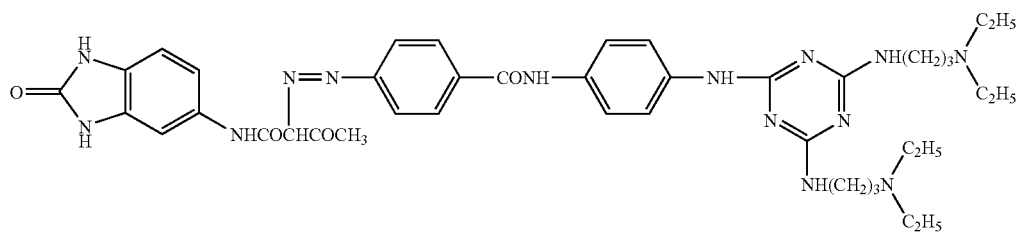
(c)
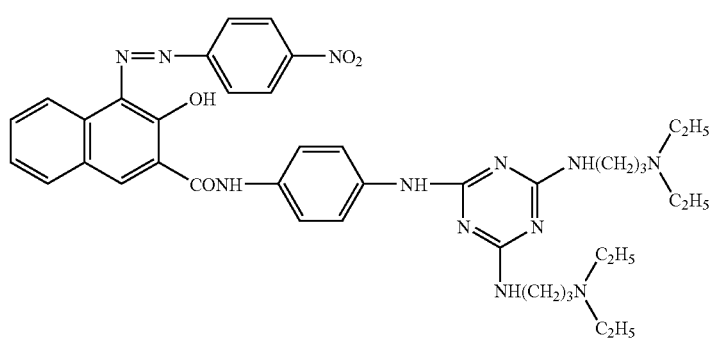
(d)
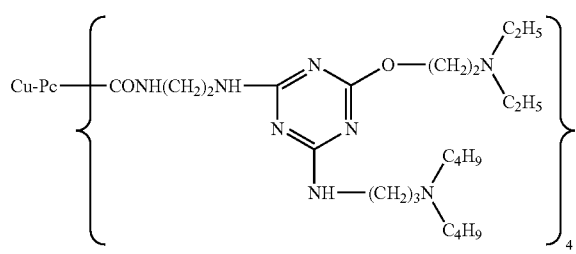
(e)

-continued

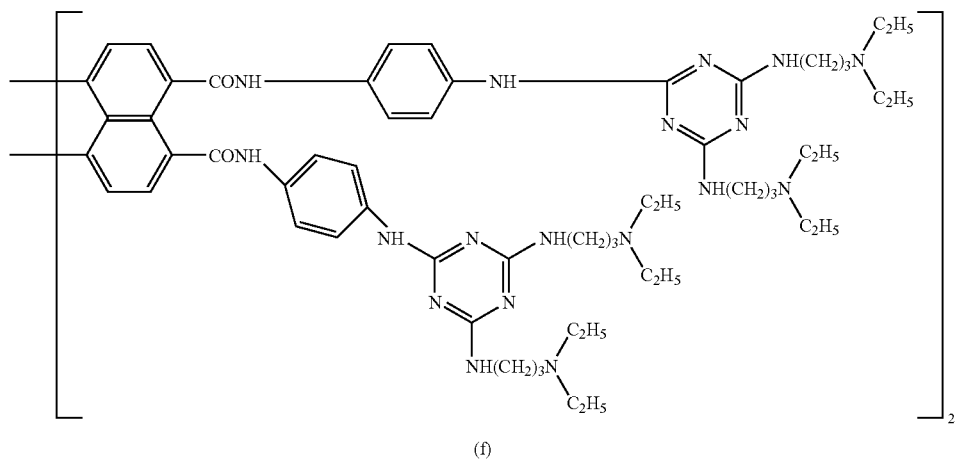

(f)

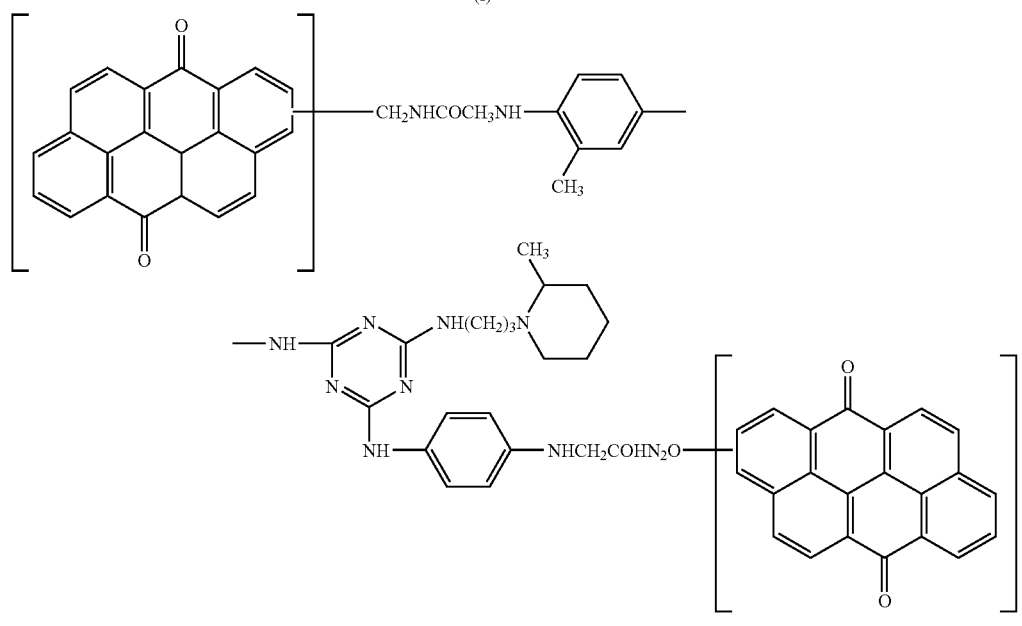

(g)

The compounds represented by formula (D3) can be obtained, for example, by reaction of a dye compound with an intermediate which is obtained by a reaction of a halogenated triazine compound with an amine compound having $R_{11}$ and $R_{12}$ and an alcohol compound having $R_{11}$ and $R_{12}$. The disclosure of the specification of JP-B-5-72943 can be also referred for the synthesis of the compound.

<3. Pigment Dispersing Agent Containing Graft Copolymer>

In the method of producing organic nanoparticles of the present invention, it is also preferred to use a dispersing agent containing a graft copolymer having an amino group and an ether group and also, if necessary, containing properly selected other component(s).

The above-described graft copolymer at least has an amino group and an ether group, and also may contain other monomers as a copolymer unit.

The weight-average molecular weight of the graft copolymer is preferably in a range of from 3,000 to 100,000, and more preferably in a range of from 5,000 to 50,000. If the weight-average molecular weight is less than 3,000, it is difficult to prevent the pigment fine particles from aggregating, which sometimes results in elevation of viscosity. If the weight-average molecular weight is more than 100,000, solubility to an organic solvent becomes insufficient, which sometimes results in elevation of viscosity.

It is preferred that the above-described graft copolymer contain as copolymer units, at least (i) a polymerizable oligomer having an ethylenically unsaturated double bond at a terminal, (ii) a monomer having an amino group and an ethylenically unsaturated double bond, and (iii) a polymerizable monomer having an ether group, and also, if necessary, contain (iv) other monomer(s).

The content of each of the copolymer units in the graft copolymer is as follows: the content of (i) the polymerizable oligomer is preferably in the range of from 15 to 98 mass %, more preferably from 25 to 90 mass %, the content of (ii) the amino-group-containing monomer is preferably in the range of from 1 to 40 mass %, more preferably from 5 to 30 mass %, and the content of (iii) the polymerizable monomer having an ether group is preferably in the range of from 1 to 70 mass %, more preferably from 5 to 60 mass %.

If the content of the polymerizable oligomer is less than 15 mass %, a stereo-repulsion effect that should be attained by a dispersing agent is hardly obtained, and it sometimes becomes difficult to prevent the organic nanoparticles from aggregating. If the content of the polymerizable oligomer is more than 98 mass %, the ratio of the nitrogen-containing monomer relatively decreases so that adsorption capacity to organic particles is lowered, and dispersibility sometimes becomes insufficient. If the content of the nitrogen-containing monomer is less than 1 mass %, dispersibility sometimes becomes insufficient owing to reduction of the adsorption capacity to organic particles. If the content of the nitrogen-group-containing monomer is more than 40 mass %, the ratio of the polymerizable oligomer relatively decreases so that a stereo-repulsion effect that should be attained by a dispersing agent is hardly obtained, and it sometimes becomes difficult to sufficiently prevent the organic particles from aggregating. If the content of the polymerizable monomer having an ether group is less than 1 mass %, development suitability at the time of production of color filters and the like sometimes become insufficient. If the content of the polymerizable monomer having an ether group is more than 70 mass %, a capacity as a dispersing agent sometimes reduces.

(i) Polymerizable Oligomer

The polymerizable oligomer (hereinafter, sometimes also referred to as "macro monomer") has a group having an ethylenically unsaturated double bond at one or both ends (terminals) thereof. Among the aforementioned polymerizable oligomers, it is preferred in the present invention that the oligomer has a group having an ethylenically unsaturated double bond at only one of the ends of the oligomer.

As the aforementioned oligomer, homopolymers or copolymers formed from at least one monomer selected from such monomers as alkyl (meth)acrylates, hydroxyalkyl (meth)acrylates, styrene, acrylonitrile, vinyl acetate, and butadiene can be mentioned. Among these oligomers, preferred are homopolymers or copolymers of alkyl (meth)acrylates and polystyrene. In the present invention, these oligomers may be further substituted. There is no particular limitation to the substituent; a halogen atom can be mentioned as an example of the substituent.

Examples of the group having an ethylenically unsaturated double bond include a (meth)acryloyl group and a vinyl group. Among these groups, (meth)acryloyl group is especially preferred.

Among these polymerizable oligomers for use in the present invention, preferred are oligomers represented by formula (E6) set forth below.

[Chemical formula 30]

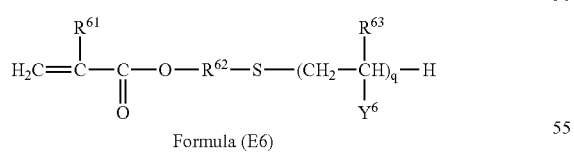

Formula (E6)

In the above-described formula (E6), $R^{61}$ and $R^{63}$ each represent a hydrogen atom or a methyl group. $R^{62}$ represents an alkylene group which has 1 to 8 carbon atoms and which may be substituted by an alcoholic hydroxyl group, and $R^{62}$ preferably represents an alkylene group having 2 to 4 carbon atoms. $Y^6$ represents a phenyl group, a phenyl group having an alkyl group having 1 to 4 carbon atoms, or —COOR$^{64}$ (R$^{64}$ represents an alkyl group which has 1 to 6 carbon atoms and which may be substituted by an alcoholic hydroxyl group or halogen atom; a phenyl group, or an aralkyl group having 7 to 10 carbon atoms); and $Y^6$ preferably represents a phenyl group or —COOR$^{164}$ (R$^{164}$ represents an alkyl group which has 1 to 4 carbon atoms and which may be substituted with an alcoholic hydroxyl group). q represents a number of from 20 to 200.

Specific examples of the polymerizable oligomer include poly-2-hydroxyethyl (meth)acrylate, polystyrene, poly-methyl (meth)acrylate, poly-n-butyl (meth)acrylate, poly-i-butyl (meth)acrylate, and copolymers of these. Among these polymers, preferred are polymers having a (meth)acryloyl group bonded to one terminal of the molecule.

The polymerizable oligomer may be a commercially available product, or may be appropriately synthesized. Examples of the commercially available product include: a single-terminal-methacryloylated polystyrene oligomer (Mn=6,000, trade name: AS-6, manufactured by TOAGOSEI CO., LTD.); a single-terminal-methacryloylated polymethyl methacrylate oligomer (Mn 6,000, trade name: AA-6, manufactured by TOAGOSEI CO., LTD.); a single-terminal-methacryloylated poly-n-butyl acrylate oligomer (Mn=6,000, trade name: AB-6, manufactured by TOAGOSEI CO., LTD.); a single-terminal-methacryloylated polymethyl methacrylate/2-hydroxyethyl methacrylate oligomer (Mn=7,000, trade name: AA-714, manufactured by TOAGOSEI CO., LTD.); a single-terminal-methacryloylated polybutyl methacrylate/2-hydroxyethyl methacrylate oligomer (Mn=7,000, trade name: 707 S, manufactured by TOAGOSEI CO., LTD.); and a single-terminal-methacryloylated poly-2-ethylhexyl methacrylate/2-hydroxyethyl methacrylate oligomer (Mn=7,000, trade name: AY-707 S or AY-714 S, manufactured by TOAGOSEI CO., LTD.).

A preferable specific example of the polymerizable oligomer in the present invention is at least one kind of an oligomer selected from a polymer of an alkyl (meth)acrylate and a copolymer of an alkyl (meth)acrylate and polystyrene, with the oligomer having a number average molecular weight of 1,000 to 20,000, and with the oligomer having a (meth)acryloyl group at a terminal.

(ii) Amino-Group-Containing Monomer

As the amino-group-containing monomer, a preferable example is any one of the compounds represented by formula (E2) set forth below.

[Chemical formula 31]

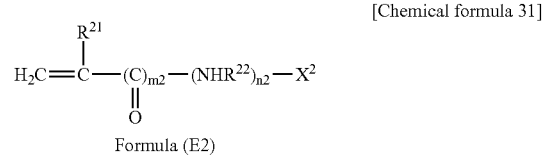

Formula (E2)

In the above-described formula (E2), $R^{21}$ represents a hydrogen atom or a methyl group. $R^{22}$ represents an alkylene group having 1 to 8 carbon atoms, preferably 1 to 6 carbon atoms, and especially preferably 2 to 3 carbon atoms.

$X^2$ represents —N($R^{23}$)($R^{24}$), or —$R^{25}$N($R^{26}$)($R^{27}$), wherein $R^{23}$ and $R^{24}$ each represent a hydrogen atom, an alkyl group having 1 to 6 carbon atoms, or a phenyl group, and $R^{25}$ represents an alkylene group having 1 to 6 carbon atoms, and $R^{26}$ and $R^{27}$ each represent a hydrogen atom, an alkyl group having 1 to 6 carbon atoms, or a phenyl group.

$R^{23}$ and $R^{24}$ of the —N($R^{23}$)($R^{24}$) are preferably a hydrogen atom, an alkyl group having 1 to 4 carbon atoms, or a phenyl group, and $R^{25}$ of the —$R^{25}$N($R^{26}$)($R^{27}$) is preferably an alkylene group having 2 to 6 carbon atoms, and $R^{26}$ and $R^{27}$ are preferably an alkyl group having 1 to 4 carbon atoms.

m2 and n2 each represent 1 or 0. The cases where m2=1 and n2=1 and where m2=1 and n2=0 are preferred. (The resultant monomers correspond to the monomers represented by formulae (E3) and (E4) set forth below.)

In the present invention, among the monomers represented by formula (E2), preferred are at least one monomer selected from the monomers represented by formula (E3) or (E4) set forth below.

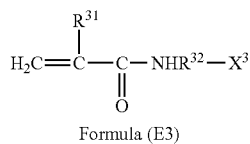

[Chemical formula 32]

Formula (E3)

In the above-described formula (E3), $R^{31}$ has the same meaning as $R^{21}$. $R^{32}$ has the same meaning as $R^{22}$. $X^3$ has the same meaning as $X^2$.

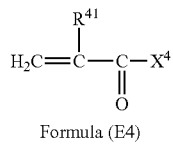

[Chemical formula 33]

Formula (E4)

In the above-described formula (E4), $R^{41}$ has the same meaning as $R^{21}$. $X^4$ has the same meaning as $X^2$, and $X^4$ is preferably —N($R^{43}$)($R^{44}$) (wherein $R^{43}$ and $R^{44}$ have the same meanings as $R^{23}$ and $R^{24}$), or —$R^{45}$N($R^{46}$)($R^{47}$) (wherein $R^{45}$, $R^{46}$, and $R^{47}$ have the same meaning as $R^{25}$, $R^{26}$, and $R^{27}$).

Preferable examples of the monomer represented by the above-described formula (E2) include (meth)acrylamides such as dimethyl (meth)acrylamide, diethyl(meth)acrylamide, diisopropyl(meth)acrylamide, di-n-butyl(meth)acrylamide, di-1-butyl(meth)acrylamide, morpholino(meth)acrylamide, piperidino(meth)acrylamide, N-methyl-2-pyrrolidyl (meth)acrylamide, and N,N-methylphenyl(meth)acrylamide; and aminoalkyl(meth)acrylamides such as 2-(N,N-dimethylamino)ethyl (meth)acrylamide, 2-(N,N-diethylamino)ethyl (meth)acrylamide, 3-(N,N-diethylamino)propyl(meth)acrylamide, 3-(N,N-dimethylamino) propyl(meth)acrylamide, 1-(N,N-dimethylamino)-1,1-dimethylmethyl(meth)acrylamide, and 6-(N,N-diethylamino)hexyl(meth)acrylamide.

(iii) Polymerizable Monomer Having Ether Group

As the polymerizable monomer having an ether group, preferred are at least one monomer selected from the monomers represented by formula (E1) set forth below.

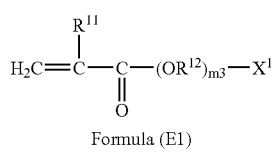

[Chemical formula 34]

Formula (E1)

In the above formula (E1), $R^{11}$ represents a hydrogen atom or a methyl group. $R^{12}$ represents an alkylene group having 1 to 8 carbon atoms, preferably an alkylene group having 1 to 6 carbon atoms, and more preferably an alkylene group having 2 to 3 carbon atoms. $X^1$ represents —$OR^{13}$ or —$OCOR^{14}$. Wherein, $R^{13}$ represents a hydrogen atom, an alkyl group having 1 to 18 carbon atoms, a phenyl group, or a phenyl group substituted with an alkyl group having 1 to 18 carbon atoms. $R^{14}$ represents an alkyl group having 1 to 18 carbon atoms. Also, m3 denotes a number of 2 to 200, preferably 5 to 100, and particularly preferably 10 to 100.

No particular restriction is imposed on the polymerizable monomer having an ether group as long as the monomer is polymerizable and has an ether group, and the monomer can be appropriately selected from ordinary monomers. Examples thereof include polyethylene glycol mono(meth)acrylate, polypropylene glycol mono(meth)acrylate, polyethylene glycol polypropylene glycol mono(meth)acrylate, and polytetramethylene glycol monomethacrylate. These materials may be commercially available products or may be those synthesized properly. Examples of these commercially available products include methoxypolyethylene glycol methacrylate (trade name: NK ESTER M-40G, M-90G, and M-230G (manufactured by Toagosei Co., Ltd.); trade name: BLENMER-PME-100, PME-200, PME-400, PME-1000, PME-2000, and PME-4000 (manufactured by Nippon Oil & Fats Co., Ltd.)), polyethylene glycol monomethacrylate (trade name: BLENMER-PE-90, PE-200, and PE-350 (manufactured by Nippon Oil & Fats Co., Ltd.)); polypropylene glycol monomethacrylate (trade name: BLENMER-PP-500, PP-800, and PP-1000 (manufactured by Nippon Oil & Fats Co., Ltd.)), polyethylene glycol polypropylene glycol monomethacrylate (trade name: BLENMER-70PEP-370B (manufactured by Nippon Oil & Fats Co., Ltd.)), polyethylene glycol polytetramethylene glycol monomethacrylate (trade name: BLENMER-55PET-800 (manufactured by Nippon Oil & Fats Co., Ltd.)), and polypropylene glycol polytetramethylene glycol monomethacrylate (trade name: BLENMER-NHK-5050 (manufactured by Nippon Oil & Fats Co., Ltd.)).

(iv) Other Monomers

The above-described graft copolymers may contain, additionally, the above-described other monomer(s) as a copolymer unit. The other monomers are not particularly limited, and they can be properly selected in accordance with purposes. Examples of the other monomers include aromatic vinyl compounds (e.g., styrene, α-methyl styrene, vinyl toluene), alkyl (meth)acrylates (e.g., methyl (meth)acrylate, ethyl (meth)acrylate, n-butyl (meth)acrylate, i-butyl (meth)acrylate), alkylaryl (meth)acrylates (e.g., benzyl (meth)acrylate), glycidyl (meth)acrylate, vinyl carboxylates (e.g., vinyl acetate, vinyl propionate), vinyl cyanides (e.g., (meth)acrylonitrile, α-chloro acrylonitrile), aliphatic conjugate dienes (e.g., 1,3-butadiene, isoprene), and (meth)acrylic acid. Among these monomers, preferred are unsaturated carboxylic acids, alkyl (meth)acrylates, alkylaryl (meth)acrylates, and vinyl carboxylates.

The content of the other monomers in the above-described graft copolymers is, for example, preferably in the range of from 5 to 70 mass %. If the content is less than 5 mass % 1, it sometimes becomes difficult to control physical properties of the coating film. If the content is more than 70 mass %, it sometimes becomes difficult for the graft copolymer to fully exhibit its capacity as a dispersing agent.

Preferable specific examples of the graft copolymers include:

(11) A copolymer of 3-(N,N-dimethylamino)propylacrylamide/polyethyleneglycol mono(meth)acrylate/terminal-methacryloylated polymethyl (meth)acrylate,

(12) A copolymer of 3-(N,N-dimethylamino)propylacrylamide/polyethyleneglycol mono(meth)acrylate/terminal-methacryloylated polystyrene,
(13) A copolymer of 3-(N,N-dimethylamino)propylacrylamide/polyethyleneglycol mono(meth)acrylate/methyl (meth)acrylate/terminal-methacryloylated polystyrene,
(14) A copolymer of 3-(N,N-dimethylaminopropylacrylamide/polyethyleneglycol mono(meth)acrylate/a copolymer of terminal-methacryloylated methyl (meth)acrylate and 2-hydroxyethylmethacrylate,
(15) A copolymer of 3-(N,N-dimethylamino)propylacrylamide/polyethyleneglycol mono(meth)acrylate/a copolymer of terminal-methacryloylated methyl (meth)acrylate and 2-hydroxyethylmethacrylate,
(16) A copolymer of 3-(N,N-dimethylamino)propylacrylamide/polyethyleneglycol mono(meth)acrylate/a copolymer of terminal-methacryloylated methyl (meth)acrylate and 2-hydroxyethylmethacrylate,
(17) A copolymer of 3-(N,N-dimethylamino)propylacrylamide/polypropyleneglycol mono(meth)acrylate/terminal-methacryloylated polymethyl (meth)acrylate,
(18) A copolymer of 3-(N,N-dimethylamino)propylacrylamide/polyethyleneglycol polypropyleneglycol mono (meth)acrylate/terminal-methacryloylated polymethyl (meth)acrylate,
(19) A copolymer of 3-(N,N-dimethylamino)propylacrylamide/polyethyleneglycol polytetramethyleneglycol mono (meth)acrylate/terminal-methacryloylated polymethyl (meth)acrylate,
(20) A copolymer of 3-(N,N-dimethylamino)propylacrylamide/polypropyleneglycol polytetramethyleneglycol mono (meth)acrylate/terminal-methacryloylated polymethyl (meth)acrylate.

Among these copolymers, preferred are (11), (14), and (18). More preferred is a compound represented by formula (D4) set forth below. In formula (D4), Me represents a methyl group.

mass parts of the pigment. When the content is less than 0.1 mass parts, it sometimes causes no improvement in dispersion stability of the organic nanoparticles. The dispersing agent may be used singly or in combination of plural dispersing agents.

In order to further improve uniform dispersibility and preservability of organic particles, the content of the dispersing agent is preferably in the range of from 0.1 to 1,000 mass parts, more preferably from 1 to 500 mass parts, and furthermore preferably from 5 to 20 mass pails, based on 100 mass parts of the organic particles. When the content is less than 0.1 mass parts, it sometimes causes no improvement in dispersion stability of the organic nanoparticles.

[Production Apparatus]

Favorable embodiments of the production apparatus for use in production of the organic nanoparticles by the production method according to the present invention will be explained below, but it should not be construed that these embodiments restrict the technological scope of the present invention.

(Exemplary Production Apparatus 1)

FIG. 1-1 is a schematic view of a production apparatus for use in an embodiment of the production method according to the present invention. In FIG. 1-1, the organic material solution is supplied through a supply pipe 14 into a container 11 continuously. A poor solvent 11a is placed in the container 11, and the bulk poor solvent forced to flow in a convective manner therein continuously by the effect of stirring.

Figures 1, 2:
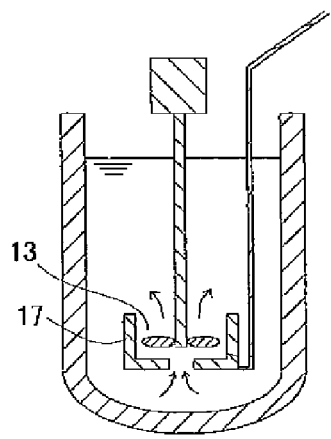

FIG. 1-2 is a schematic view illustrating a production apparatus for use in another more preferable embodiment of the present invention, which further has a mixing chamber (stirring zone) 13 in the container 11 of the production apparatus of FIG. 1-1. The mixing chamber 13 is disposed at a position below the liquid surface of the poor solvent and is filled with the poor solvent inside. Further, the bulk poor solvent in the reaction container 11 is made to flow in a convective manner

[Chemical formula 35]

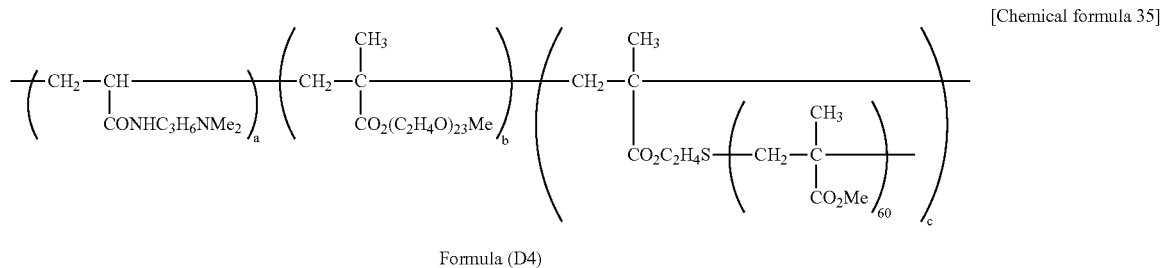

Formula (D4)

a:b:c = 15:20:65 (mass ratio)

The above-described graft copolymers can be obtained by subjecting components that constitute units of the above-described copolymers to, for example, radical polymerization in a solvent. At the time of the radical polymerization, a radical polymerization initiator may be used. Further, there can be used a chain transfer agent (e.g., 2-mercapto ethanol and dodecyl mercaptan). A pigment dispersing agent containing a graft copolymer can be also prepared with reference to descriptions of JP-A-2001-31885.

In order to further improve uniform dispersibility and preservability of organic nanoparticles, the content of the dispersing agent is preferably in the range of from 0.1 to 1,000 mass parts, more preferably from 1 to 500 mass parts, and furthermore preferably from 5 to 20 mass parts, based on 100 upward (in the direction indicated by an arrow in the figure) in the mixing chamber 13 at all times by the effect of stirring in the mixing chamber 13.

Figures 1, 2, 3:
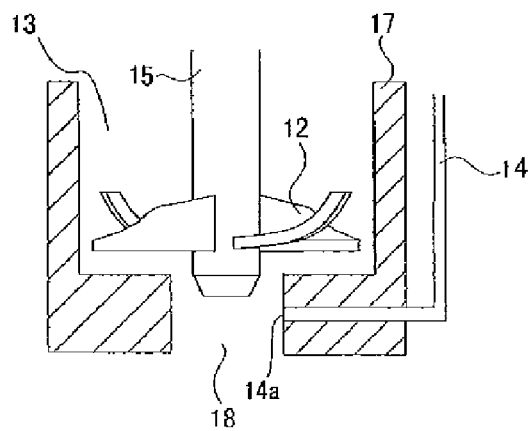

FIG. 1-3 is a partially enlarged sectional view schematically showing the mixing chamber 13 in an embodiment of the production apparatus of FIG. 1-2. The solution of the organic material is fed through the feed pipe 14 into the mixing chamber 13. In this embodiment, the mixing chamber 13 is formed of a casing 17 composed of a right-angled square tube having a constant sectional area. The upper end of the casing 17 is an open end (open portion), and the lower end of the casing is provided with a circular hole 18 so that the poor solvent in the mixing chamber 13 is in communication with the bulk poor solvent outside the stirring zone (in the construction shown in the figure, a zone of the poor solvent 11a except the mixing chamber 13 corresponds to a zone outside the stirring zone, and is also referred to as "external stirring zone"). In this embodiment, the organic material solution feed pipe 14 is provided in a wall of which the lower end of the casing 17 is constituted, and is opened toward the above-described circular hole. Further, the inside of the mixing chamber 13 is provided with the stirring blade 12 which is attached to the shaft 15 and which is rotated by the motor 16. The rotation of the stirring blade 12 causes the poor solvent to circulate upward in the mixing chamber 13 through the circular hole 18 at all times.

The stirring blade 12 provided in the above mixing chamber 13 must generate desired mixing strength in the mixing chamber. The mixing strength is presumed to be an important operation factor to the size of a droplet upon mixing of the solution of the organic material.

Further it is preferable to properly select the stirring blade 12 having an ability to draw out the organic nanoparticles to be formed in a mixing space quickly/immediately to discharge the organic nanoparticles to the outside of the mixing chamber 13 quickly/immediately, in order that giant particles may be prevented from being formed, specifically, the formed organic nanoparticles may be prevented from remaining in the mixing chamber 13 to: be bonded to other organic nanoparticles to become larger particles; or be exposed to the solution of the organic material fed into the mixing chamber 13 to become larger particles.

The stirring blade 12 may be of any type, as long as it can attain the aforementioned effects, and, for example, any of a turbine type and a fan turbine type can be used.

Further, as described above, the casing 17 is preferably constituted of a square tube. Thus, a flow produced by the stirring blade 12 is disturbed by a corner of the casing 17, whereby a mixing effect can be further enhanced, without the need for an additional member such as a baffle plate.

FIG. 1-4 is a partially enlarged sectional view illustrating a mixer provided with two stirring blades (a stirring blade for mixing 19a and a stirring blade for discharging 19b) in the mixing chamber, in another embodiment of the production apparatus of FIG. 1-2. By providing two stirring blades as described above, it is possible to independently select an ability to control mixing strength and an ability to discharge the thus-formed organic pigment particles to the outside of the mixing chamber, thereby such an operation can be performed that the mixing strength and the amount of a circulating solvent each are independently set to a desired value.

(Exemplary Production Apparatus 2)

FIG. 2 is a schematic sectional view illustrating another embodiment of the production apparatus for use in the production method according to the present invention. In FIG. 2, the organic material solution and the poor solvent are supplied respectively through supply pipes 24a and 24b into a stirring chamber 21a continuously. A produced organic material particle dispersion is immediately drawn out through the discharge pipe 23, in order that giant particles can be prevented from being formed, specifically, organic material particles formed in the stirring vessel 21a may be prevented from remaining in the stirring vessel 21a to: be bonded to other organic pigment particles to become larger particles; or be exposed to the solution of the organic material fed from the feed pipe 24a or 24b to become larger particles.

FIG. 3 is a schematic sectional view illustrating yet another embodiment of the apparatus for use in the production method according to the present invention. In the apparatus as shown in FIG. 3, a stirring device 50 have: a cylindrical stirring vessel 38 provided with two liquid feed ports 32 and 33 into which the solution of the organic material and the poor solvent are made to flow, respectively, and a liquid discharge port 36 for discharging a mixed liquid that has been subjected to stirring; and a pair of stirring blades 41 and 42 as stirring means for controlling a state where a liquid is stirred in the stirring vessel 38 by being rotated in the stirring vessel 38.

The stirring vessel 38 is constituted of: a cylindrical vessel main body 39 with its central axis directed in a vertical direction; and sealing plates 40 as vessel walls for capping the upper and lower opening ends of the vessel main body 39. Further, each of the stirring vessel 38 and the vessel main body 39 is formed of a non-magnetic material excellent in magnetic permeability. The two liquid feed ports 32 and 33 are provided at positions close to the lower end of the vessel main body 39, and the liquid discharge port 36 is provided at a position close to the upper end of the vessel main body 39.

Further, the pair of stirring blades 41 and 42 is placed at upper and lower opposing ends in the stirring vessel 38 to be distant from each other, and are rotated in directions opposite to each other. The respective stirring blade 41 and 42 constitutes a magnetic coupling C together with an external magnet 46 placed on the outside of the vessel wall (sealing plate 40) close to the respective stirring blade 41 and 42. That is, the respective blade 41 and 42 is coupled with the corresponding external magnet 46 by a magnetic force, and the blades are rotated in directions opposite to each other, by rotating the respective external magnets 46 with independent motors 48 and 49.

As indicated by a broken line arrow (X) and a solid line arrow (Y) in FIG. 3, the pair of stirring blades 41 and 42 placed in the vessel 38 to be opposed to each other forms stirring flows different from each other in direction in the vessel 38. Since the stirring flows formed by the respective stirring blades 41 and 42 are different from each other in flow direction, the flows collide with each other, to produce, in the vessel 38, high-speed turbulence that accelerates stirring in the vessel 38. The turbulence can: prevent a flow in the vessel 38 from being brought into a steady state; and inhibit the formation of cavities around the rotation axes of the stirring blades 41 and 42 even when the rotational speed of each of the stirring blades 41 and 42 is increased. At the same time, the turbulence can inhibit the occurrence of an inconvenience, in other words, the formation of a steady flow flowing in the stirring vessel 38 along the inner peripheral surface of the stirring vessel 38 without receiving a sufficient stirring action. Therefore, an increase in rotational speed of each of the stirring blades 41 and 42 can easily increase the processing speed. Further) at that time, the increase in rotational speed can inhibit the discharge of a liquid that has been insufficiently stirred and mixed owing to the fact that a liquid flow in the vessel 38 is brought into a steady state, thereby a deterioration in processing quality can be prevented.

Further, the respective stirring blades 41 and 42 in the stirring vessel 38 are coupled with the motors 48 and 49 placed outside the stirring vessel 38 by the magnetic couplings C. As a result, there is no need for inserting a rotation axis into each vessel wall of the stirring vessel 38, so the stirring vessel 38 can take a closed container structure free of a portion (a cavity) through which a rotation axis is inserted. Thus, it is possible to prevent leakage of a stirred and mixed liquid to the outside of the vessel from being occurred, and, at the same time, it is possible to prevent deterioration in processing quality due to contamination, for example, of a lubricating liquid for a rotation axis (a sealing liquid) as an impurity contaminated into the liquid in the vessel 38 from being occurred.

In the production method according to the present invention, it is possible to produce organic nanoparticles not only batchwise but also continuously, and also in an industrial scale, by using one of the production apparatuses of such configurations. It is also possible to make the ratio of the organic material solution to the poor solvent solution, supplied to the stirring chamber, consistently constant, by rapidly discharging the organic nanoparticle dispersion formed. Thus, the solubility of the organic material in the dispersion liquid can be kept constant during a time commencing on the initiation of the production of the organic nanoparticles and ending on the completion of the production, so monodisperse organic nanoparticles can be stably produced.

It is further possible to produce monodispersion organic nanoparticles more reliably, by preventing discharge of the organic nanoparticle dispersion insufficiently stirred and mixed because the liquid flow in the chamber changed to a steady state, and by preventing contamination of the lubricant fluid (sealing fluid) for the rotating shaft as an impurity to the liquid in the chamber.

(Exemplary Production Apparatus 3)

A production method by using a blade having shearing force will be described as yet another embodiment of the apparatus for use in the production method according to the present invention.

Herein, the "shearing force" as used in the present specification refers to a shear force (shear stress) to be exerted by a stirring blade on a droplet produced after the mixing of the solution of the organic material into the poor solvent.

The shape of the stirring unit for use in the present invention is not particularly limited, if it is a shape capable of applying high shearing force. Examples include a paddle blade, a turbine blade, a screw blade, and a Pfaudler blade, and preferable examples of the stirring unit include a dissolver blade and a stirring, emulsifying, and dispersing apparatus having a stirring zone constituted of a revolving turbine unit and a fixed stator unit placed around the turbine unit with a slight clearance.

Figures 1, 2, 3, 4:
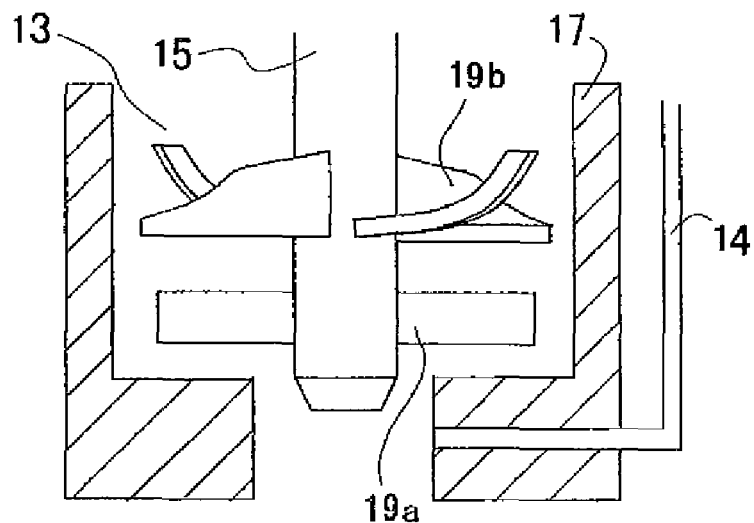
Figure 2:
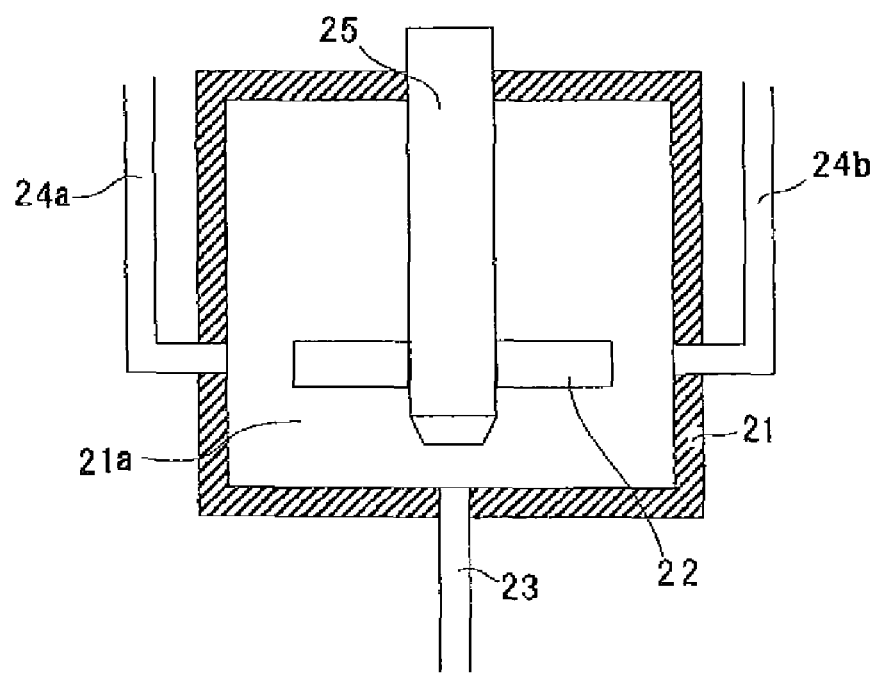
Figure 3:
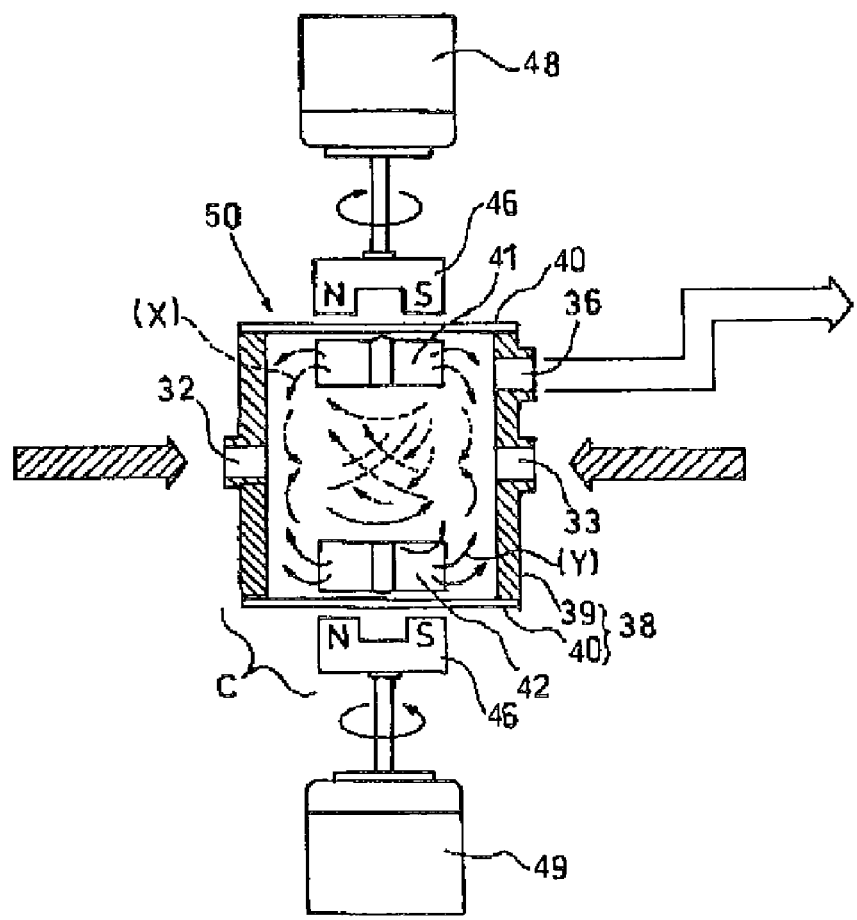
Figures 1, 4:
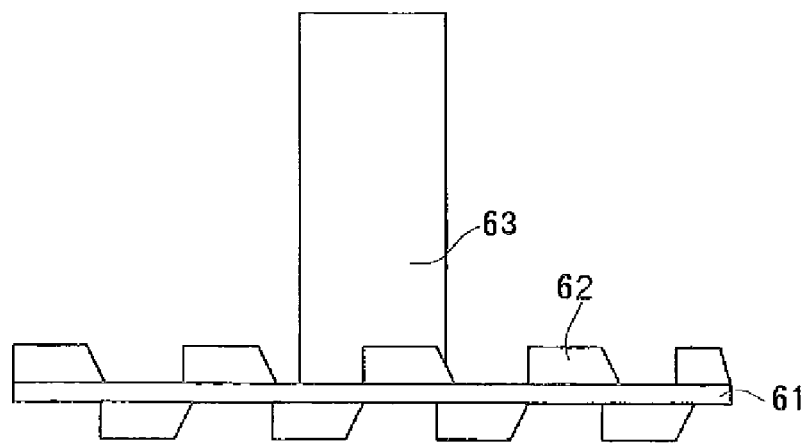
Figures 2, 4:
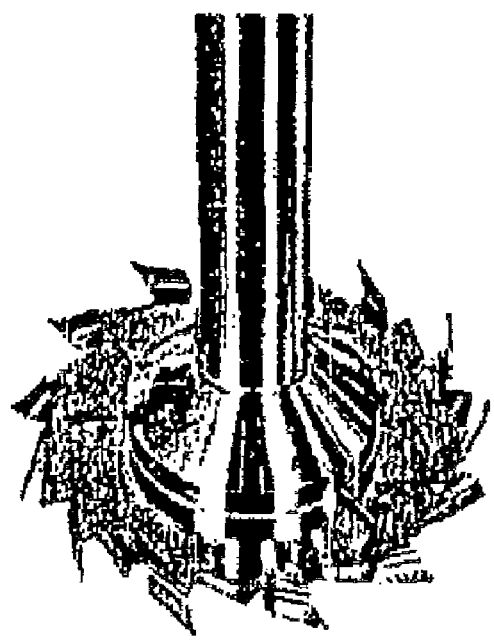

The dissolver blade is a special stirring blade giving high shearing force, and FIG. 4-1 is a schematic front view of an example thereof and FIG. 4-2 is a photograph substituted for drawing thereof.

Figure 5:
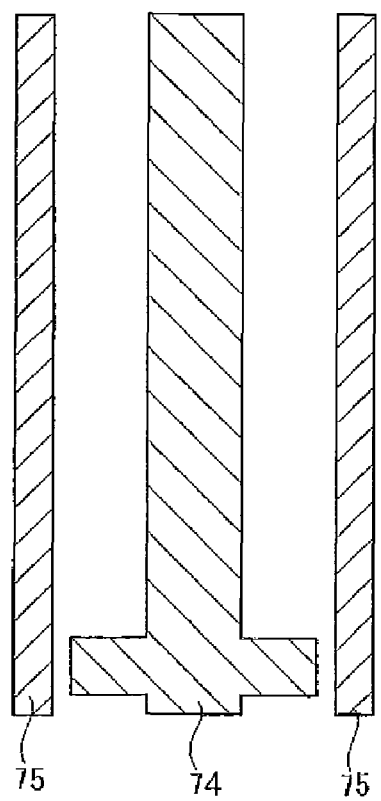
FIG. 5 is a schematic sectional view illustrating an example of the stirring zone consisting of a revolving turbine unit and a fixed stator unit placed surrounding the turbine unit with a small clearance, for use in the production method according to the present invention.

An apparatus as shown in FIG. 5, which has a stirring unit consisting of a revolving turbine unit and a fixed stator unit placed around it with a small clearance, is also preferably used, and examples of such a stirring, emulsifying, and dispersing apparatus include Physcotron manufactured by Microtech Co., Ltd., T.K Homomixer manufactured by Tokushu Kika Kogyo Co., Ltd., and ULTRA-TURRAX manufactured by IKA.

The stirring speed may vary according to the viscosity and temperature of the poor solvent and the kind and amount of the surfactant used, but preferably 100 to 10,000 rpm, more preferably 150 to 8000 rpm, and particularly preferably 200 to 6000 rpm. Unfavorably, excessively low rotating velocity leads to insufficient agitating efficiency, while excessively high velocity to incorporation of air bubbles in the poor solvent.

[Concentration]

In the method of producing organic nanoparticles of the present invention, the organic nanoparticle dispersion may be subjected to desalting and condensation, whereby a concentrated liquid suitable for a color filter coating liquid or for inkjet ink can be produced on an industrial scale.

Hereinafter, the method for concentration will be explained.

The condensation method is not particularly restricted as long as the organic nanoparticle liquid can be concentrated by the method. Examples of a preferable condensation method include: a method involving adding and mixing an extraction solvent to and with an organic nanoparticle dispersion, condensing and extracting the organic nanoparticles to the extraction solvent phase, and filtering the concentrated extract liquid through a filter or the like, to provide a concentrated nanoparticles liquid; a method involving sedimenting the organic nanoparticles by centrifugal separation for condensation; a method involving performing desalting and condensation by ultrafiltration; a method involving sublimating a solvent by vacuum freeze-drying for condensation; and a method involving drying a solvent under heat or reduced pressure for condensation. Alternatively, a combination of two or more of these methods is extremely preferably employed.

The concentration of the organic nanoparticles after concentration is preferably 1 to 100 mass %, more preferably 5 to 100 mass %, and particularly preferably 10 to 100 mass %.

Hereinafter, the method for concentration and extraction will be explained.

The extraction solvent that can be used in the concentration extraction is not particularly limited; and a preferable extraction solvent is one which is substantially incompatible (immiscible) with the dispersion solvent (e.g. an aqueous solvent) of the organic nanoparticle dispersion liquid, and which forms an interface when the solvent is left standing after the mixing. (The "substantially incompatible (immiscible) with" as used in the present specification refers to a state where compatibility between the solvents is low, and the amount of the extraction solvent to be dissolved in the dispersion solvent is preferably 50 mass % or less, and more preferably 30 mass % or less. Although the amount of the extraction solvent to be dissolved in the dispersion solvent has no particular lower limit, it is practical that the amount is 1 mass % or more in consideration of the compatibility of an ordinary solvent.) Further, the extraction solvent is preferably a solvent that causes weak aggregation to such a degree that the organic nanoparticles can be redispersed in the extraction solvent. In the present specification, 'weak, redispersible aggregation' means that flock can be redispersed without applying a high shearing force such as by milling or high-speed agitation. Such a state is preferable, because it is possible to prevent strong aggregation that may change the particle size and to swell the desired organic nanoparticles with the extraction solvent, besides the dispersion solvent such as water can be easily removed by filter filtration. As the extraction solvents, any of ester compound solvents, alcohol compound solvents, aromatic compound solvents, and aliphatic compound solvents are preferable; ester compound solvents, aromatic compound solvents, and aliphatic compound solvents are more preferable; ester compound solvents are particularly preferable.

Examples of the ester compound solvents include 2-(1-methoxy)propyl acetate, ethyl acetate, and ethyl lactate. Examples of the alcohol compound solvents include n-butanol and isobutanol. Examples of the aromatic compound solvents include benzene, toluene and xylene. Examples of the aliphatic compound solvents include n-hexane and cyclohexane. Furthermore, the extraction solvent may be a pure solvent of one of the preferable solvents above, or alternatively it may be a mixed solvent composed of plurality of the solvents.

An amount of the extraction solvent is not particularly limited, as long as the solvent can extract the organic nanoparticles, but the amount of the extraction solvent is preferably smaller than an amount of the organic nanoparticle dispersion liquid, taking extraction for concentration into consideration. When expressed by volume ratio, the amount of the extraction solvent to be added is preferably in the range of 1 to 100, more preferably in the range of 10 to 90, and particularly preferably in the range of 20 to 80, with respect to 100 of the organic nanoparticle dispersion liquid. A too-large amount may results in prolongation of the time for concentration, while a too-small amount may cause insufficient extraction and residual nanoparticles in the dispersion solvent.

After addition of the extraction solvent, the resultant mixture is preferably stirred and mixed well for sufficient mutual contact with the dispersion liquid. Any usual method may be used for stirring and mixing. The temperature at the time of addition and mixing of the extraction solvent is not particularly limited, but it is preferably 1 to 100° C. and more preferably 5 to 60° C. Any apparatus may be used for addition and mixing of the extraction solvent as long as it can favorably carry out each step. For example, a separatory funnel-like apparatus may be used.

As the method for ultrafiltration, methods used for desalting and concentrating silver halide emulsion can be used. Examples are those methods described in Research Disclosure, No. 10208 (1972), No. 13 122 (1975), No. 16 351 (1977) etc. While pressure difference and flow rate, which are important as the operational conditions, can be selected by referring to the characteristic curves mentioned in Haruhiko Oya, "Maku Riyo Gijutsu Handbook (Membrane Utilization Technique Handbook)", published by Saiwai Shobo (1978), p. 275, it is necessary to find out optimum conditions for treating a organic nanoparticle dispersion composition of interest in order to suppress aggregation of particles. As a method for supplementing the solvent lost due to passage through the membrane, there are the constant volume method where the solvent is continuously supplemented and the batch method where the solvent is intermittently added. The constant volume method is preferred in the present invention because of its relatively shorter desalting treatment time. As the solvent to be supplemented as described above, pure water obtained by ion exchange or distillation is generally used. A dispersing agent or a poor solvent for dispersing agent may be mixed in the pure water. Alternatively, the dispersing agent or the poor solvent for dispersing agent can also be directly added to the organic nanoparticle dispersion.

Figure 6:
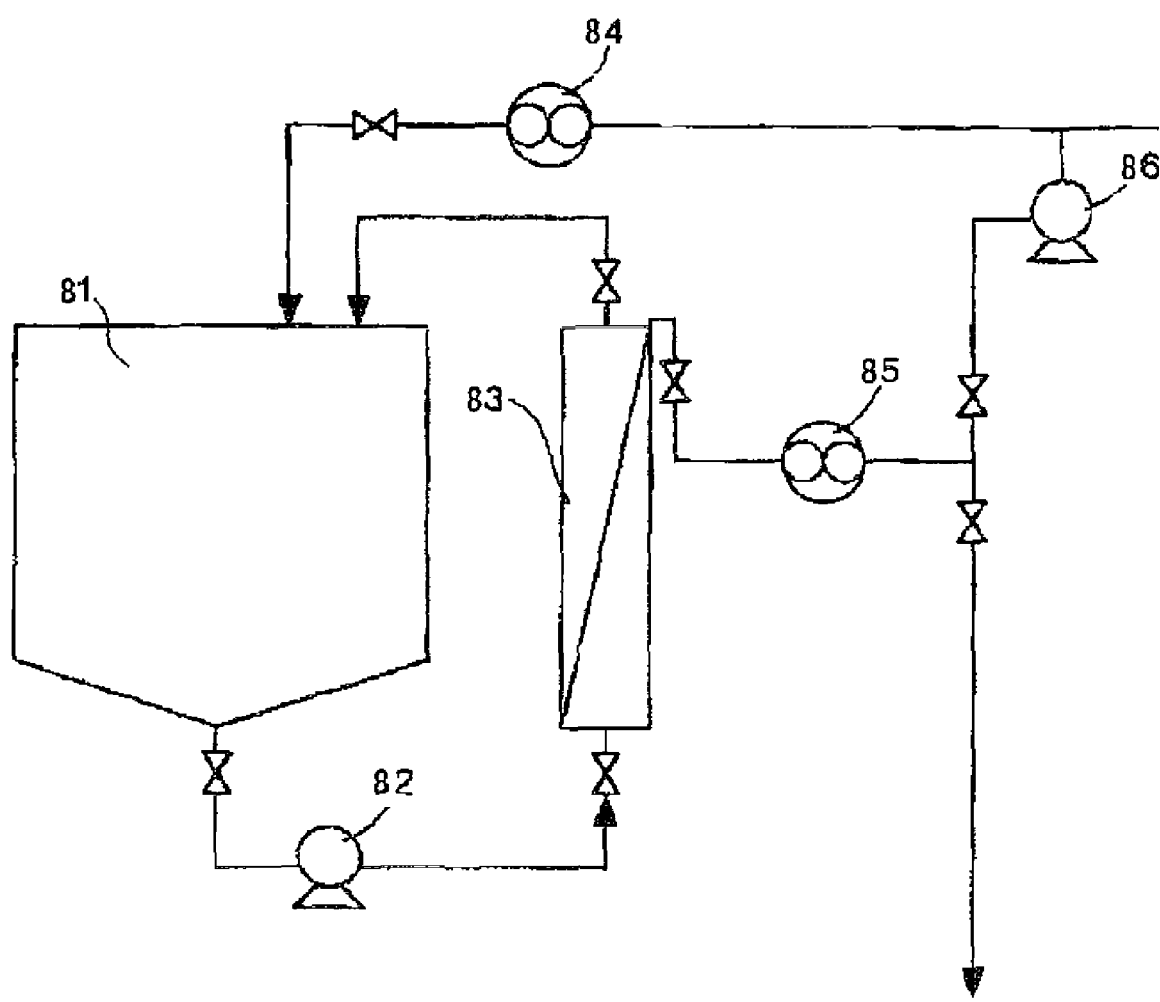
FIG. 6 is an explanatory drawing showing an embodiment of an ultrafiltration device that can be used in the production method of the present invention.

FIG. 6 shows an example of the constitution of a device for performing ultrafiltration. As shown in FIG. 6, the device includes: a tank 81 for storing dispersion of a silver salt of an aliphatic acid; a circulation pump 82 for circulating the dispersed product in the tank 81; and an ultrafiltration module 83 for removing a by-product inorganic salts in the dispersed product introduced by the circulation pump 82 as permeated water. The dispersed product from which the permeated water has been separated is returned to the inside of the tank 81 again, and a similar operation is repeatedly performed until a predetermined object of the removal of the by-product inorganic salts is achieved. Further, the device is equipped with: a flow meter 84 for measuring replenishment pure water which is used for replenishing the solvent lost by the permeated water by adding a constant amount of pure water; and a flow meter 85 for measuring permeated water which is used for determining the replenishment amount of pure water. In addition, the device is equipped with a reverse direction washing pump 86 for introducing water for diluting the permeated water.

As an ultrafiltration membrane, modules of plate type, spiral type, cylinder type, hollow yarn type, hollow fiber type and so forth, in which a membrane is already incorporated, are commercially available from Asahi Chemical Industry Co., Ltd., Daicel Chemical Industries, Ltd., Toray Industries, Inc., NITTO DENKO CORP. and so forth. In view of the total membrane area and washability, those of hollow yarn type and spiral type are preferred. The fractional molecular weight, which is an index of a threshold for substances that can permeate a membrane, must be determined based on the molecular weight of the used dispersing agent. In the present invention, those having a fractional molecular weight of 5,000 to 50,000, more preferably 5,000 to 15,000, are preferably used.

To separate a concentrated extract liquid from a dispersion solvent of the organic nanoparticle dispersion, filtration by using a filter is preferably carried out. As an apparatus for filter filtration, use can be made, for example, of a high-pressure filtration apparatus. Preferable examples of the filter to be used include nanofilter, ultrafilter, and the like. It is preferable to remove a residual dispersion solvent by filter filtration, to further concentrate organic nanoparticles in the thus-concentrated extract liquid and to obtain a concentrated nanoparticle liquid.

A method for freeze-drying is not particularly limited, and any method may be adopted as long as a person skilled in the art can utilize the method. Examples of the freeze-drying method include a coolant direct expansion method, a multiple freezing method, a heating medium circulation method, a triple heat exchange method, and an indirect heating freezing method. Of these, the coolant direct-expansion method or the indirect heating freezing method is preferably employed, and the indirect heating freezing method is more preferably employed. In each method, preliminary freezing is preferably performed before freeze-drying is performed. Conditions for the preliminary freezing are not particularly limited, but a sample to be subjected to freeze-drying must be uniformly frozen.

Examples of a device for the indirect heating freezing method include a small freeze-drying machine, an FTS freeze-drying machine, an LYOVAC freeze-drying machine, an experimental freeze-drying machine, a research freeze-drying machine, a triple heat exchange vacuum freeze-drying machine, a monocooling-type freeze-drying machine, and an HULL freeze-drying machine. Of these, the small freeze-drying machine, the experimental freeze-drying machine, the research freeze-drying machine, or the monocooling-type freeze-drying machine is preferably used, and the small freeze-drying machine or the monocooling-type freeze-drying machine is more preferably used.

The temperature for freeze-drying, which is not particularly limited, is, for example, about −190 to −4° C., preferably about −120 to −20° C., and more preferably about −80 to −60° C. The pressure for freeze-drying is not particularly limited either, and can be appropriately selected by a person skilled in the alt. It is recommended that freeze-drying be performed under a pressure of, for example, about 0.1 to 35 Pa, preferably about 1 to 15 Pa, and more preferably about 5 to 10 Pa. The time for freeze-drying is, for example, about 2 to 48 hours, preferably about 6 to 36 hours, or more preferably about 16 to 26 hours. It should be noted, however, that these conditions can be appropriately selected by a person skilled in the art. With regard to a method for freeze-drying, reference can be made to, for example, Pharmaceutical machinery and engineering handbook by JAPAN SOCIETY OF PHARMACEUTICAL MACHINERY AND ENGINEERING, Chijinshokan Co., Ltd., p. 120-129 (September, 2000), Vacuum handbook by ULVAC, Inc., Ohmsha, Ltd., p. 328-331 (1992), or Freezing and drying workshop paper by Koji Ito et al., No. 15, p. 82 (1965).

The centrifugal separation method will be explained.

A centrifugal separator to be used in the concentration of the organic particles by centrifugal separation may be any device as long as the device can sediment organic nanoparticles in an organic nanoparticle dispersion liquid (or in an organic nanoparticle concentrated extract liquid). Examples of the centrifugal separator include a widely used device, a system having a skimming function (function with which a supernatant layer is sucked during the rotation of the system, to discharge to the outside of the system), and a continuous centrifugal separator for continuously discharging solid matter.

As the conditions for centrifugal separation, the centrifugal force (a value representing a ratio of an applied centrifugal acceleration to the gravitational acceleration) is preferably 50 to 10,000, more preferably 100 to 8,000, and particularly preferably 150 to 6,000. The temperature at the time of centrifugal separation is preferably −10 to 80° C., more preferably −5 to 70° C., and particularly preferably 0 to 60° C., though a preferable temperature varies depending on the kind of the solvent of the dispersion liquid.

The drying method will be described.

For a device for use in the concentration of the organic nanoparticles by drying under reduced pressure, there is no particular limitation as long as the solvent of the organic nanoparticle dispersion liquid (or the organic nanoparticle concentrated extract) can be evaporated. Examples of the device include a widely used vacuum drier and rotary pump, a device capable of drying a liquid under heat and reduced pressure while stirring the liquid, and a device capable of continuously drying a liquid by passing the liquid through a tube the inside of which is heated and reduced in pressure.

The temperature for drying under heat and reduced pressure is preferably 30 to 230° C., more preferably 35 to 200° C., and particularly preferably 40 to 180° C. The pressure for the above-mentioned reduced pressure is preferably 100 to 100,000 Pa, more preferably 300 to 90,000 Pa, and particularly preferably 500 to 80,000 Pa.

According to the concentration method as described above, it is possible to efficiently concentrate the organic nanoparticles from organic nanoparticle dispersion liquid. With regard to the concentration ratio, for example, when the density of nanoparticles in the organic nanoparticle dispersion liquid as a raw material is defined as 1, the density in the concentrated organic nanoparticle paste can be concentrated to a magnification of preferably about 100 to 3,000, or more preferably about 500 to 2,000.

[Finely Dispersing]

In the production method of the present invention, organic particles in an aggregation state, for example formed by concentration, may be finely dispersed as needed. (In the present specification, the term "finely dispersing" means a process to release particles in a dispersion from the aggregation state, thereby to increase degree of dispersion.)

The organic particles contained in a liquid of organic particles condensed by the above-described extraction solvent, centrifugal separation, and drying etc. are ordinarily in the state of aggregation owing to condensation. In order to enable a rapid filtration and to regain an excellent dispersion state, it is preferred to obtain the organic particles as a flock that is aggregated to a degree capable of re-dispersion.

Therefore, the level of a dispersion obtained by an ordinary dispersing method is insufficient for subjecting it to finely dispersing process. Accordingly, a method that can obtain fine particles with a higher efficiency is desired. Even such aggregated organic particles can be made into a finely dispersed state in which the organic particles are properly dispersed, by a method of introducing a high molecular compound having a weight-average molecular weight of 1000 or more in a liquid of aggregated organic particles. The term "aggregated organic particles" used in the present invention means an assembly of organic particles gathered together by a secondary force, such as aggregates. In the case of nanometer-sized primary particles, they are sometimes referred to as "aggregated nanoparticles". (In the present specification, the term "aggregated organic particle liquid" means a liquid containing aggregated organic particles, and the liquid may be, for example, a dispersion, a concentrated liquid, a paste, or slurry as long as the liquid contains the aggregated organic particles.)

Hereinafter, the polymer compound for use in the method of producing organic nanoparticles according to the present invention will be explained in detail.

The polymer compound for use in the method of producing organic nanoparticles according to the present invention is preferably a polymer compound represented by the following formula (1).

[Chemical formula 36]

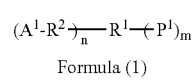

Formula (1)

In formula (1), $A^1$ represents a monovalent organic group having a group selected from the group consisting of an acidic group, a nitrogen-containing basic group, a urea group, a urethane group, a group having a coordinating oxygen atom, a hydrocarbon group having 4 or more carbon atoms, an alkoxy silyl group, an epoxy group, an isocyanate group, and a hydroxyl group, or a monovalent organic group containing an organic dye structure or heterocycle each of which may further be substituted. If n is two or more, plural $A^1$s may be the same or different.

Specifically, $A^1$ is not particularly limited. Examples of the "monovalent organic group having an acidic group" include a monovalent organic group having an acid group such as a carboxylic acid group, a sulfonic acid group, a monosulfuric acid ester group, a phosphoric acid group, a monophosphoric acid ester group, and a boric acid. Beside, examples of the "monovalent organic group having a nitrogen-containing basic group" include a monovalent organic group having an amino group (—$NH_2$), a monovalent organic group having a substituted imino group (—$NHR^8$, —$NR^9R^{10}$) (wherein $R^8$, $R^9$, and $R^{10}$ each independently represent an alkyl group having 1 to 20 carbon atoms, an aryl group having 6 to 20 carbon atoms, or an aralkyl group having 7 to 30 carbon atoms), a monovalent organic group having a guanidyl group represented by the following formula (a1) (wherein, in formula (a1), $R^{a1}$ and $R^{a2}$ each independently represent an alkyl group having 1 to 20 carbon atoms, an aryl group having 6 to 20 carbon atoms, or an aralkyl group having 7 to 30 carbon atoms), and a monovalent organic group having an amidinyl group represented by the following formula (a2) (wherein, in formula (a2), $R^{a3}$ and $R^{a4}$ each independently represent an alkyl group having 1 to 20 carbon atoms, an aryl group having 6 to 20 carbon atoms, or an aralkyl group having 7 to 30 carbon atoms).

[Chemical formula 37]

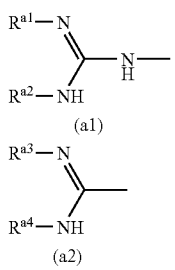

(a1)

(a2)

Examples of the "monovalent organic group having a urea group" include —NHCONHR$^{15}$ (wherein R$^{15}$ represents a hydrogen atom, an alkyl group having 1 to 20 carbon atoms, an aryl group having 6 to 20 carbon atoms, or an aralkyl group having 7 to 30 carbon atoms), and the like.

Examples of the "monovalent organic group having a urethane group" include —NHCOOR$^{16}$, —OCONHR$^{17}$ (wherein R$^{16}$ and R$^{17}$ each independently represent an alkyl group having 1 to 20 carbon atoms, an aryl group having 6 to 20 carbon atoms, or an aralkyl group having 7 to 30 carbon atoms), and the like.

Examples of the "monovalent organic group having 'a group having a coordinating oxygen atom'" include a group having an acetylacetonato group, a group having crown ether, and the like.

Examples of the "monovalent organic group having a hydrocarbon group having 4 or more carbon atoms" include an alkyl group having 4 or more carbon atoms (e.g., an octyl group, a dodecyl group), an aryl group having 6 or more carbon atoms (e.g., a phenyl group, a naphthyl group), an aralkyl group having 7 or more carbon atoms (e.g., a benzyl group), and the like. For the carbon atoms of these groups, there is no specific upper limit; it is, however, preferred that the number of carbon atoms is 30 or less. Examples of the "monovalent organic group having an alkoxy silyl group" include a group having a trimethoxy silyl group and triethoxy silyl group.

Examples of the "monovalent organic group having an epoxy group" include a group having a glycidyl group.

Examples of the "monovalent organic group having an isocyanate group" include a 3-isocyanatopropyl group.

Examples of the "monovalent organic group having a hydroxyl group" include a 3-hydroxypropyl group.

Among these groups represented by the above-described A$^1$, preferred is a monovalent organic group having any one of an acidic group, a nitrogen-containing basic group, a urea group, and a hydrocarbon group having 4 or more carbon atoms.

The above-described organic dye structure or heterocycle is not particularly limited. But, more specifically stated, examples of the organic dye structure include phthalocyanine compounds, insoluble azo compounds, azo lake compounds, anthraquinone compounds, quinacridone compounds, dioxazine compounds, diketopyrrolopyrrole compounds, anthrapyridine compounds, anthanthrone compounds, indanthrone compounds, flavanthrone compounds, perynone compounds, perylene compounds, and thioindigo compounds. Examples of the heterocycle include thiophene, furan, xanthene, pyrrole, pyrroline, pyrrolidine, dioxolan, pyrazole, pyrazoline, pyrazolidine, imidazole, oxazole, thiazole, oxadiazole, triazole, thiadiazole, pyran, pyridine, piperidine, dioxane, morpholine, pyridazine, pyrimidine, piperazine, triazine, trithiane, isoindoline, isoindolinone, benzimidazolone, succinimide, phthalimide, naphthalimide, hydantoin, indole, quinoline, carbazole, acridine, acridone, and anthraquinone.

The above-described organic dye structure or heterocycle may have a substituent T. Examples of the substituent T include an alkyl group having 1 to 20 carbon atoms (e.g., a methyl group, an ethyl group), an aryl group having 6 to 16 carbon atoms (e.g., a phenyl group, a naphthyl group), an acyloxy group having 1 to 6 carbon atoms (e.g., an acetoxy group), an alkoxy group having 1 to 6 carbon atoms (e.g., a methoxy group, an ethoxy group), a halogen atom (e.g., chlorine, bromine), an alkoxycarbonyl group having 2 to 7 carbon atoms (e.g., a methoxycarbonyl group, an ethoxycarbonyl group, a cyclohexyloxycarbonyl group), a cyano group, a carbonic acid ester group (e.g., t-butylcarbonate), a hydroxyl group, an amino group, a carboxyl group, a sulfonamido group, and N-sulfonylamido group.

Besides, the above-described A$^1$ can be represented by the following formula (4).

[Chemical formula 38]

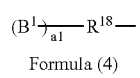

Formula (4)

In formula (4), B$^1$ represents a group selected from the group consisting of an acidic group, a nitrogen-containing basic group, a urea group, a urethane group, a group having a coordinating oxygen atom, a hydrocarbon group having 4 or more carbon atoms, an alkoxy silyl group, an epoxy group, an isocyanate group, and a hydroxyl group, or represents an organic dye structure or heterocycle each of which may further be substituted. R$^{18}$ represents a single bond, or (a1)-valent organic or inorganic connecting group. a1 represents 1 to 5. Herein, in the case where a1 is two or more, plural B$^1$s may be the same or different. Preferable embodiments of the group represented by formula (4) are the same as the above-described A$^1$.

R$^{18}$ represents a single bond, or a (a1+1)-valent connecting group. a1 represents 1 to 5. Examples of the connecting group represented by R$^{18}$ include those formed from atoms consisting of from 1 to 100 carbon atoms, from 0 to 10 nitrogen atoms, from 0 to 50 oxygen atoms, from 1 to 200 hydrogen atoms, and from 0 to 20 sulfur atoms, which groups may be unsubstituted or substituted with a substituent. R$^{18}$ is preferably an organic connecting group.

Specific examples of R$^{18}$ include structural units set forth below, or a group consisted of a combination of said structural units. In addition, the connecting group R$^{18}$ may have the aforementioned substituent T.

[Chemical formula 39]

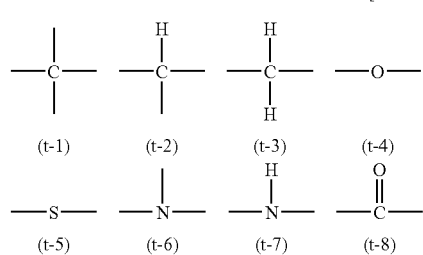

-continued

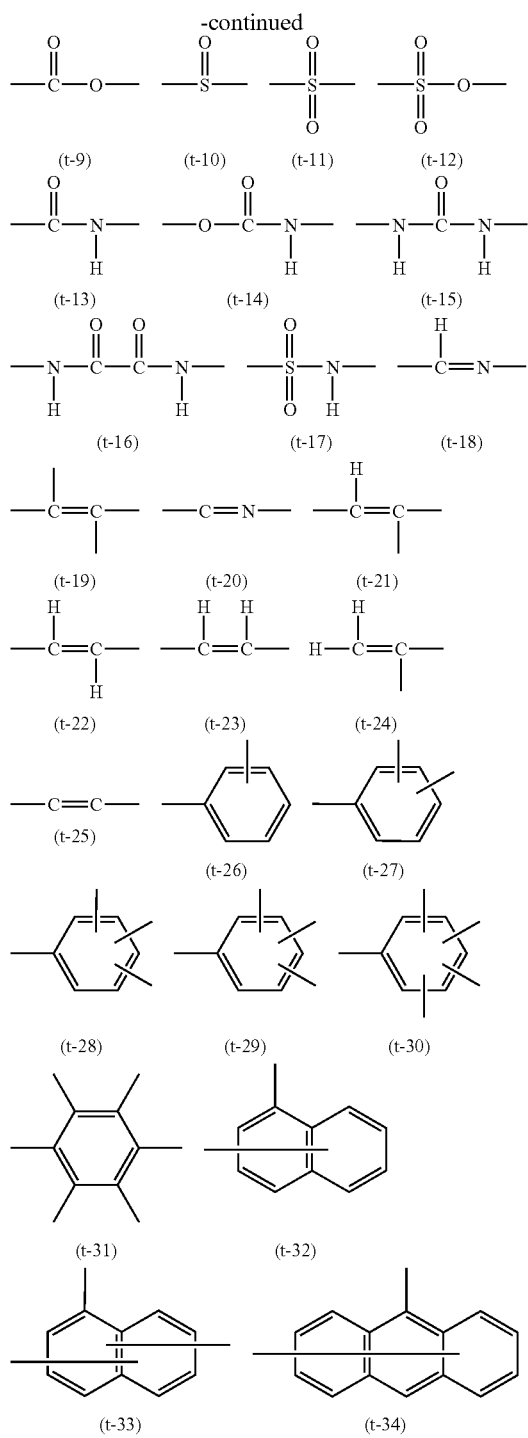

In the above-described formula (1), $R^1$ represents a (m+n)-valent connecting group. m+n is within the range of 3 to 10.

Examples of the (m+n)-valent connecting group represented by $R^1$ include those groups formed from atoms consisting of from 1 to 100 carbon atoms, from 0 to 10 nitrogen atoms, from 0 to 50 oxygen atoms, from 1 to 200 hydrogen atoms, and from 0 to 20 sulfur atoms, which groups may be unsubstituted or substituted with a substituent. $R^1$ is preferably an organic connecting group.

Examples of $R^1$ include the above-described groups of (t-1) to (t-34) or a group (which may have a ring structure) consisted of a combination of a plurality of said groups. In the case where the above-described connecting group $R^1$ has a substituent, examples of said substituent include the above-described substituent T.

$R^2$ represents a single bond or a divalent connecting group. Examples of $R^2$ include groups formed from atoms consisting of from 1 to 100 carbon atoms, from 0 to 10 nitrogen atoms, from 0 to 50 oxygen atoms, from 1 to 200 hydrogen atoms, and from 0 to 20 sulfur atoms, which groups may be unsubstituted or substituted with a substituent. Specific examples of $R^2$ include the above-described groups of t-3 to t-5, t-7 to t-18, t-22 to t-26, t-32 and t-34, or a group consisted of a combination of a plurality of said groups. It is preferred that $R^2$ have a sulfur atom at the position where said $R^2$ connect to $R^1$. In the case where $R^2$ has a substituent, examples of said substituent include the above-described substituent T.

In the above-described formula (1), m represents 1 to 8. m is preferably 1 to 5, more preferably 1 to 3, and particularly preferably 1 to 2.

n represents 2 to 9. n is preferably 2 to 8, more preferably 2 to 7, and particularly preferably 3 to 6.

In the above-described formula (1), $P^1$ represents a polymer compound residue (polymer skeleton). Such the polymer skeleton can be properly selected from ordinary polymers.

In order to form the polymer skeleton, it is preferred to use at least one kind selected from the group consisting of polymers or copolymers derived from a vinyl monomer, ester compound polymers, ether compound polymers, urethane compound polymers, amide compound polymers, epoxy compound polymers, silicone compound polymers, and modified compounds or copolymers of these polymers (e.g. copolymers of polyether/polyurethane, and copolymers of polyether/polymer derived from a vinyl monomer; these copolymers may be any one of a random copolymer, a block copolymer, and a graft copolymer)); more preferred to use at least one kind selected from the group consisting of polymers or copolymers derived from a vinyl monomer, ester compound polymers, ether compound polymers, urethane compound polymers, and modified compounds or copolymers of these polymers; and particularly preferred to use polymers or copolymers derived from a vinyl monomer.

Besides, it is preferred that these polymers are soluble in an organic solvent. If the polymer has a low affinity with the organic solvent, affinity of the polymer with a dispersing medium becomes weak in the case where said polymer is used, for example, as a pigment dispersing agent. Consequently, it becomes sometimes difficult to secure an adsorption layer enough for dispersion stabilization.

It is preferred that $P^1$ have a sulfur atom at the position where said $P^1$ connects to $R^1$.

Of the polymer compounds represented by the above-described formula (1), more preferred are those polymer compounds represented by the formula (2).

[Chemical formula 40]

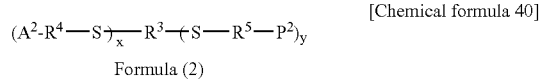

Formula (2)

In the above-described formula (2), $A^2$ has the same meaning as $A^1$ in the above-described formula (1). Specific and preferable embodiments of $A^2$ are the same as those of $A^1$. $A^2$ may have a substituent with examples thereof including the above-described substituent T.

In the above-described formula (2), $R^3$ represents a (x+y)-valent connecting group. $R^3$ has the same meaning as $R^1$. The preferable range of $R^3$ is the same as that of $R^1$. In this case where $R^3$ represents a (x+y)-valent connecting group, the value of said x and its preferable range are the same as those of n in formula (1). Similarly, the value of said y and its preferable range are the same as those of m; the value of said x+y and its preferable range are the same as those of m+n.

The connecting group represented by $R^3$ is preferably an organic connecting group. Preferred specific examples of the organic connecting groups are set forth below. However, the present invention is not limited to these.

[Chemical formula 41]

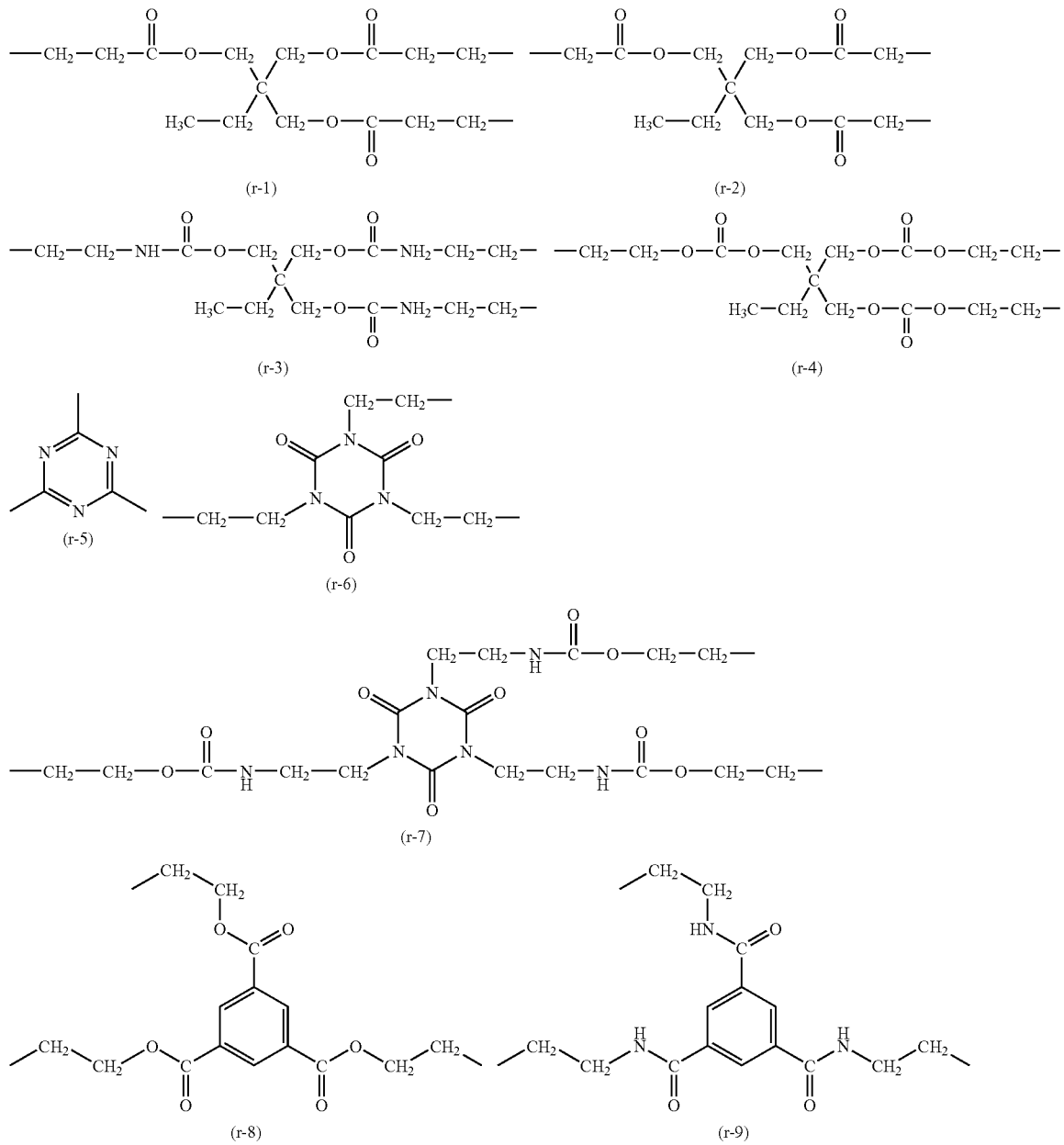

[Chemical formula 42]

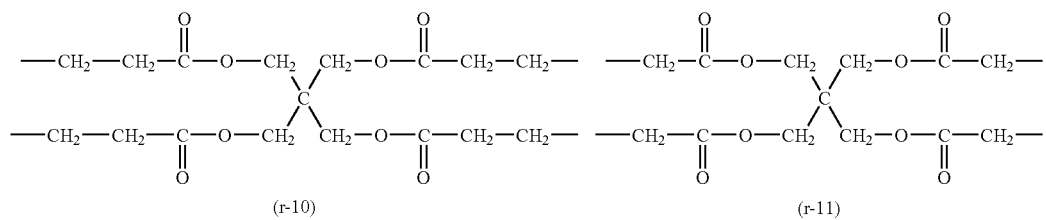

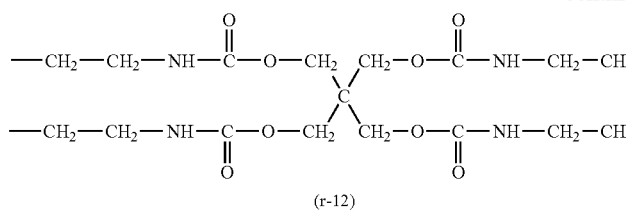

(r-12)

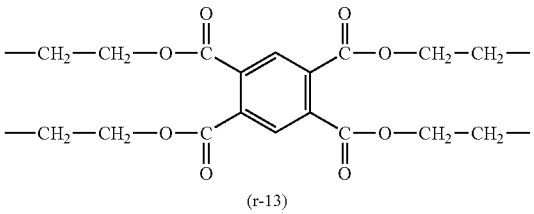

(r-13)

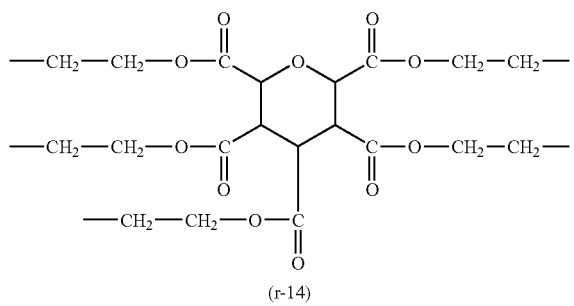

(r-14)

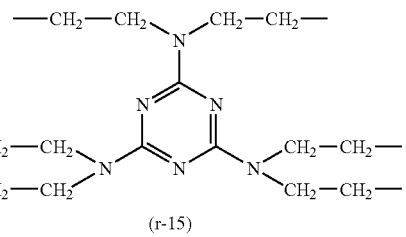

(r-15)

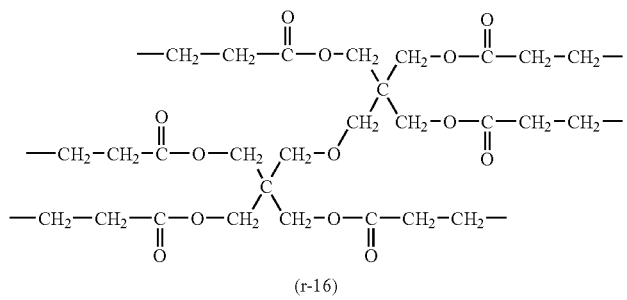

(r-16)

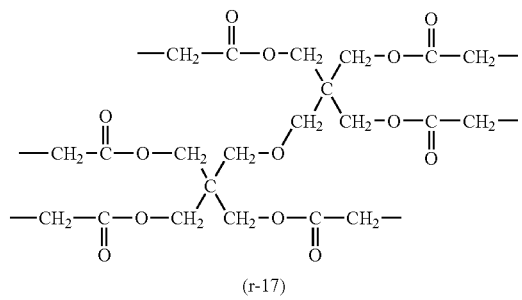

(r-17)

Among the above-described connecting groups, preferred are groups of (r-1), (r-2), (r-10), (r-11), (r-16), and (r-17), from the viewpoints of availability of raw materials, easiness of synthesis, and solubility in various solvents.

In the case where $R^3$ has a substituent, examples of said substituent include the above-described substituent T.

In the above-described formula (2), $R^4$ and $R^5$ each independently represent a single bond or a divalent connecting group.

As the "divalent connecting group" represented by the above-described $R^4$ and $R^5$, preferred are an optionally substituted, straight chain, branched, or cyclic alkylene, arylene, or aralkylene group, or —O—, —S—, —C(=O)—, —N($R^{19}$)—, —SO—, —SO$_2$—, —CO$_2$—, or —N($R^{20}$)SO$_2$—, or a divalent group formed by combining two or more of these groups (wherein $R^{19}$ and $R^{20}$ each independently represent a hydrogen atom or an alkyl group having 1 to 4 carbon atoms). The above-described divalent connecting group is preferably an organic connecting group.

As the $R^4$, preferred are a straight chain or branched, alkylene or aralkylene group, or —O—, —C(O)—, —N($R^{19}$)—, —SO$_2$—, —CO$_2$—, or —N($R^{20}$)SO$_2$—, or a divalent group formed by combining two or more of these groups. Especially preferred are a straight chain or branched, alkylene or aralkylene group, or —O—, —C(=O)—, —N($R^{19}$)—, or —CO$_2$—, or a divalent group formed by combining two or more of these groups.

As the $R^5$, preferred are a single bond, a straight chain or branched, alkylene or aralkylene group, or —O—, —C(=O)—, —N($R^{19}$)—, —SO$_2$—, —CO$_2$—, or —N($R^{20}$)SO$_2$—, or a divalent group formed by combining two or more of these groups. Especially preferred are a straight chain or branched, alkylene or aralkylene group, or —O—, —C(=O)—, —N($R^{19}$)—, or —CO$_2$—, or a divalent group formed by combining two or more of these groups.

In the case where $R^4$ or $R^5$ have a substituent, examples of said substituent include the above-described substituent T.

$P^2$ in formula (2) represents a polymer skeleton and can be properly selected from ordinary polymers. Preferred embodiments of the polymers are the same as $P^1$ in above-described formula (1) and a preferred embodiment thereof is also the same as $P^1$.

Among the polymer compounds represented by the above-described formula (2), especially preferred are polymer compounds in which $R^3$ is the above-described specific group of (r-1), (r-2), (r-10), (r-1), (r-16), or (r-17); $R^4$ is a single bond, a straight chain or branched, alkylene or aralkylene group, or —O—, —C(=O)—, —N($R^1$)—, or —CO$_2$—, or a divalent organic group formed by combining two or more of these groups; $R^5$ is a single bond, an ethylene group, a propylene group, or a connecting group represented by formula (s-a) or (s-b) set forth below; $P^2$ is a homopolymer or copolymer derived from a vinyl monomer, an ester compound polymer, an ether compound polymer, a urethane-series polymer, or a modified compound of these polymers; y is 1 to 2; and x is 3 to 6. In the following groups, $R^{21}$ represents a hydrogen atom or a methyl group, and l represents 1 or 2.

[Chemical formula 43]

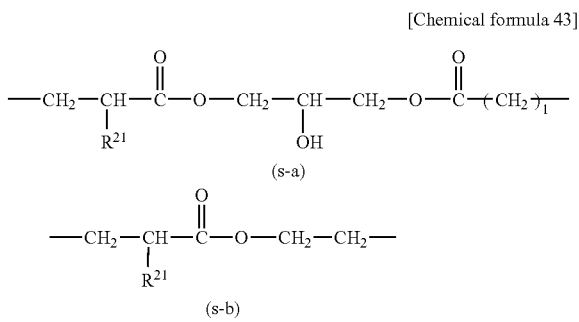

The weight-average molecular weight of the polymer compound used in the producing method of the present invention is at least 1,000, preferably from 3,000 to 100,000, more preferably from 5,000 to 80,000, and especially preferably from 7,000 to 60,000. If the weight-average molecular weight is within the above-described range, a plurality of functional groups introduced to the terminal(s) of the polymer fully exhibit their effects, and thus the polymer compound will exhibit excellent performances in terms of adsorption properties onto a solid surface, micelle-forming property, and surface activating property. Thereby, good dispersibility and dispersion stability can be attained.

The polymer compounds represented by formula (1) (including those represented by formula (2)) can be prepared, for example, by the following methods, but the production method is not limited thereto. Among the following synthetic methods, the following synthetic methods 2, 3, 4, and 5 are more preferable, and the following synthetic method 3, 4, and 5 are particularly preferable, from the point of simplicity of production.

1. Reaction of a polymer having a terminal functional group selected from carboxyl, hydroxyl, amino and other groups with an acid halide having multiple functional groups ($A^1$ or $A^2$ in the formula above), an alkyl halide having multiple functional groups ($A^1$ or $A^2$ in the formula above), an isocyanate having multiple functional groups ($A^1$ or $A^2$ in the Formula above), or the like 2. Michael addition of a polymer having a terminal carbon-carbon double bond with a mercaptan having multiple functional groups ($A^1$ or $A^2$ in the formula above)

3. Reaction of a polymer having a terminal carbon-carbon double bond with a mercaptan having multiple functional groups ($A^1$ or $A^2$ in the formula above) in the presence of a radical generator 4. Reaction of a polymer having terminal multiple mercaptan groups with a functional group ($A^1$ or $A^2$ in the formula above) having a carbon-carbon double bond in the presence of a radical generator 5. Radical polymerization of a vinyl monomer with using a mercaptan compound having multiple functional groups ($A^1$ or $A^2$ in the formula above) as a chain transfer agent Among the reactions above, the polymer compound for use in the production method according to the present invention (preferably, polymer compound represented by formula (2)) can be prepared, for example, by a method 2, 3, 4 or 5, but preparation by the method 5 is more preferable from the point of simplicity of production.

More specifically, radical polymerization by using a compound represented by the following formula (3) as the chain transfer agent is preferable.

[Chemical formula 44]

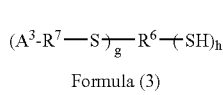

Formula (3)

In formula (3), $R^6$, $R^7$, $A^3$, g, and h respectively have the same meanings as $R^3$, $R^4$, $A^2$, x, and y in the aforementioned formula (2), and the preferable embodiments thereof are also the same.

Examples of the vinyl monomers include, but are not particularly limited to, (meth)acrylic esters, crotonic esters, vinyl esters, maleic diesters, fumaric diesters, itaconic diesters, (meth)acrylamides, vinyl ethers, vinyl alcohol esters, styrenes, (meth)acrylonitrile, and the like. Typical examples thereof include the following compounds.

Examples of the (meth)acrylic esters include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-hexyl (meth)acrylate, cyclohexyl (meth)acrylate, t-butylcyclohexyl (meth)acrylate, 2-ethylhexyl (meth)acrylate, t-octyl (meth)acrylate, dodecyl (meth)acrylate, octadecyl (meth)acrylate, acetoxyethyl (meth)acrylate, phenyl (meth)acrylate, 2-hydroxyethyl (meth)acrylate, 2-methoxyethyl (meth)acrylate, 2-ethoxyethyl (meth)acrylate, 2-(2-methoxyethoxy)ethyl (meth)acrylate, 3-phenoxy-2-hydroxypropyl (meth)acrylate, benzyl (meth)acrylate, diethylene glycol monomethylether (meth)acrylate, diethylene glycol monoethylether (meth)acrylate, triethylene glycol monomethylether (meth)acrylate, triethylene glycol monoethylether (meth)acrylate, polyethylene glycol monomethylether (meth)acrylate, polyethylene glycol monoethylether (meth)acrylate, β-phenoxyethoxyethyl (meth)acrylate, nonylphenoxypolyethylene glycol (meth)acrylate, dicyclopentenyl (meth)acrylate, dicyclopentenyloxyethyl (meth)acrylate, trifluoroethyl (meth)acrylate, octafluoropentyl (meth)acrylate, perfluorooctylethyl (meth)acrylate, dicyclopentanyl (meth)acrylate, tribromophenyl (meth)acrylate, tribromophenyloxyethyl (meth)acrylate and the like.

Examples of the crotonic esters include butyl crotonate, hexyl crotonate and the like.

Examples of the vinyl esters include vinyl acetate, vinyl propionate, vinyl butyrate, vinyl methoxyacetate, vinyl benzoate and the like.

Examples of the maleic diesters include dimethyl maleate, diethyl maleate, dibutyl maleate and the like.

Examples of the fumaric diesters include dimethyl fumarate, diethyl fumarate, dibutyl fumarate and the like.

Examples of the itaconic diesters include dimethyl itaconate, diethyl itaconate, dibutyl itaconate and the like.

Examples of the (meth)acrylamides include (meth)acrylamide, N-methyl(meth)acrylamide, N-ethyl(meth)acrylamide, n-propyl(meth)acrylamide, N-isopropyl(meth)acrylamide, N-n-butyl acryl(meth)amide, N-t-butyl(meth)acrylamide, N-cyclohexyl(meth)acrylamide, N-(2-methoxyethyl)(meth)acrylamide, N,N-dimethyl(meth)acrylamide, N,N-diethyl(meth)acrylamide, N-phenyl(meth)acrylamide, N-benzyl(meth)acrylamide, (meth)acryloylmorpholine, diacetone acrylamide and the like.

Examples of the styrenes include styrene, methylstyrene, dimethylstyrene, trimethylstyrene, ethylstyrene, isopropylstyrene, butylstyrene, hydroxystyrene, methoxystyrene, butoxystyrene, acetoxystyrene, chlorostyrene, dichlorostyrene, bromostyrene, chloromethylstyrene, hydroxystyrenes protected with a group that can be deprotected with an acidic substance (such as t-Boc), methyl vinylbenzoate, α-methylstyrene, and the like.

Examples of the vinyl ethers include methyl vinyl ether, butyl vinyl ether, hexyl vinyl ether, and methoxyethyl vinyl ether and the like.

In addition to the compounds mentioned above, (meth) acrylonitrile, vinyl group-substituted heterocyclic groups (e.g., vinylpyridine, vinylpyrrolidone, vinylcarbazole, etc.), N-vinylformamide, N-vinylacetamide, N-vinylimidazole, vinyl caprolactone, and the like can also be used.

In addition to the compounds above, for example, vinyl monomers having a functional group such as a urethane group, a urea group, a sulfonamide group, a phenol group, or an imide group may be used. Such a urethane- or urea-containing monomer can be prepared favorably, for example, by addition reaction between an isocyanate group and a hydroxyl or amino group. Specifically, it can be prepared, for example, by addition reaction between an isocyanate group-containing monomer and a compound having a hydroxyl group or a compound having a primary or secondary amino group, or by addition reaction between a hydroxyl group-containing monomer or a primary or secondary amino-group-containing monomer and a monoisocyanate.

The vinyl monomers may be polymerized alone or copolymerized in combination of two or more, and such a radical polymer is obtained by polymerization of corresponding vinyl monomers according a common method.

For example, such a polymer may be prepared by a method (solution polymerization method) of dissolving these vinyl monomers and a chain transfer agent in a suitable solvent, adding a radical polymerization initiator thereto, and allowing polymerization in solution at approximately 50° C. to 220° C.

The solvent for use in the solution polymerization can be chosen arbitrarily according to the monomers used and the solubility of the copolymer produced. Examples thereof include methanol, ethanol, propanol, isopropanol, 1-methoxy-2-propanol, 1-methoxy-2-propyl acetate, acetone, methylethylketone, methylisobutylketone, methoxypropyl acetate, ethyl lactate, ethyl acetate, acetonitrile, tetrahydrofuran, dimethylformamide, chloroform, and toluene. These solvents may be used as a mixture of two or more.

Examples of the radical polymerization initiators for use include azo compounds such as 2,2'-azobis(isobutylonitrile) (AIBN) and 2,2'-azobis-(2,4'-dimethylvaleronitrile), peroxides such as benzoyl peroxide, persulfate salts such as potassium persulfate and ammonium persulfate, and the like.

The compound represented by formula (3) can be synthesized by the following methods, but the following method 7 is more preferable, from the point of simplicity of production.

6. Conversion of a halide compound having multiple functional groups ($A^1$ or $A^2$ in the formula above) into a mercaptan compound (for example, reaction with thiourea and subsequent hydrolysis, direct reaction with NaSH, or reaction with $CH_3COSNa$ and subsequent hydrolysis)

7. Addition reaction between a compound having 3 to 10 mercapto groups in the molecule and a compound having a functional group ($A^1$ or $A^2$ in the formula above) and having a functional group reactive with mercapto group The "functional group reactive with mercapto group" in the method 7 is favorably, for example, an acid halide, an alkyl halide, an isocyanate or a carbon-carbon double bond.

Particularly preferably, the "functional group reactive with mercapto group" is a carbon-carbon double bond, and the addition reaction is a radical addition reaction. The carbon-carbon double bond is more preferably a monosubstituted or disubstituted vinyl group, from the point of reactivity with the mercapto group.

Typical examples of the "compounds having 3 to 10 mercapto groups in the molecule" include the following compounds:

[Chemical formula 45]

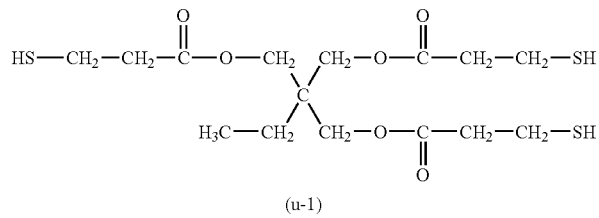

(u-1)

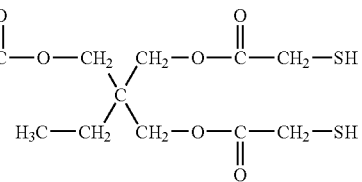

(u-2)

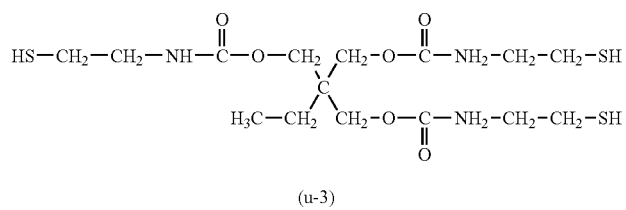

(u-3)

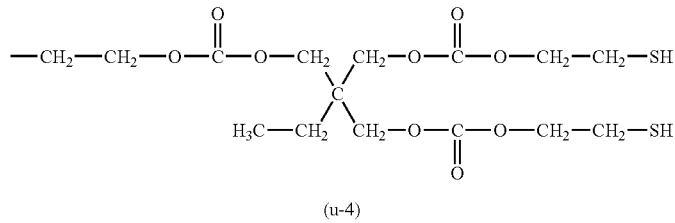

(u-4)

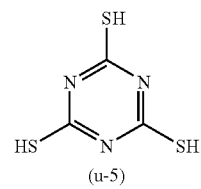

(u-5)

-continued
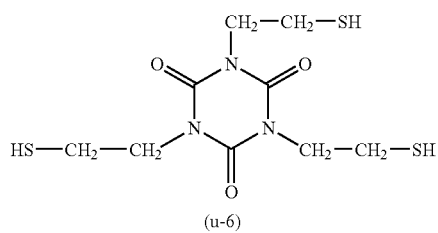
(u-6)
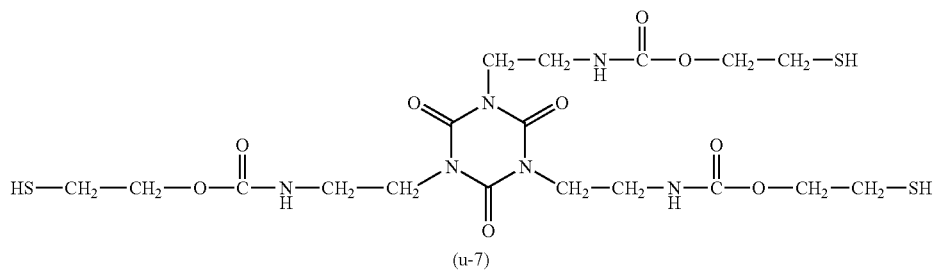
(u-7)
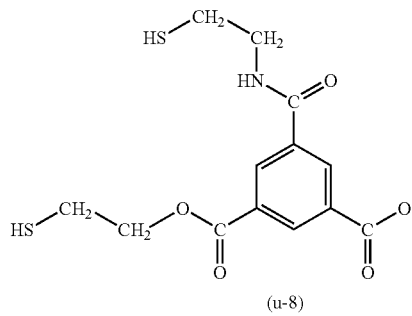
(u-8)
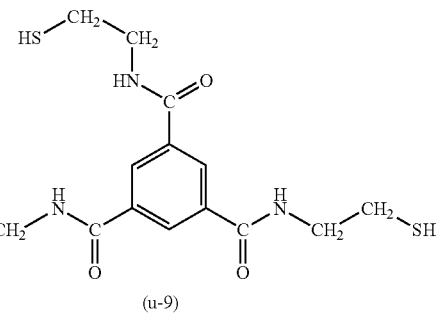
(u-9)
[Chemical formula 46]
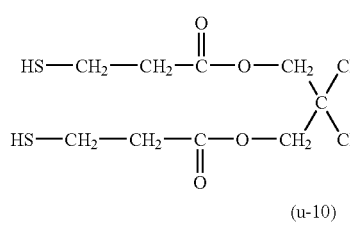
(u-10)
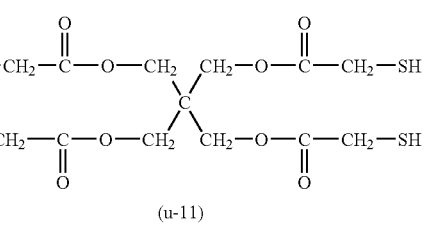
(u-11)
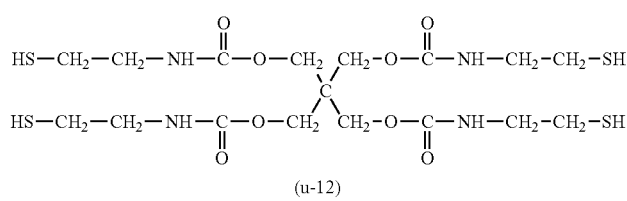
(u-12)
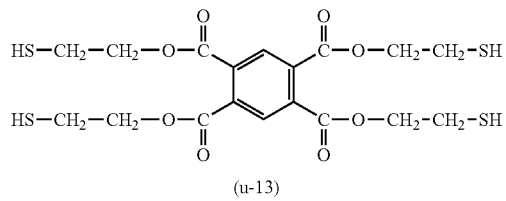
(u-13)
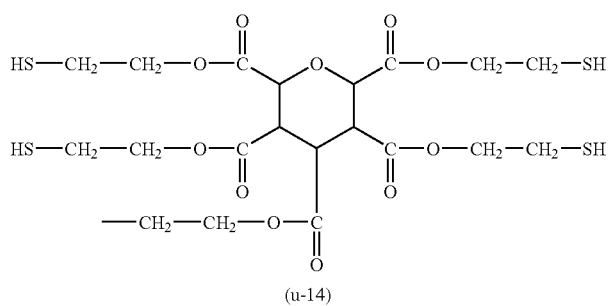
(u-14)
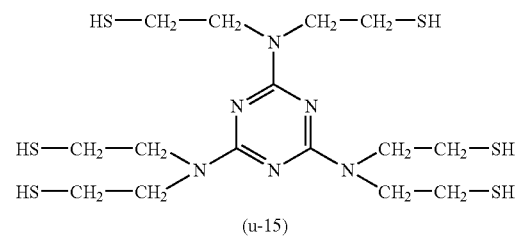
(u-15)

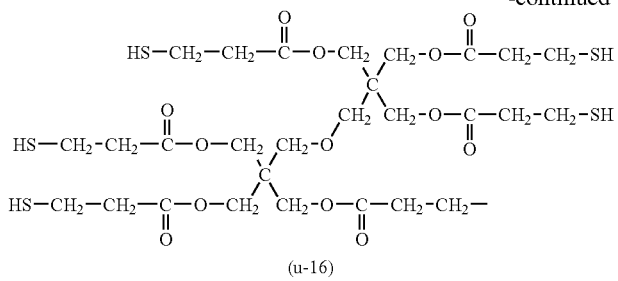

(u-16)

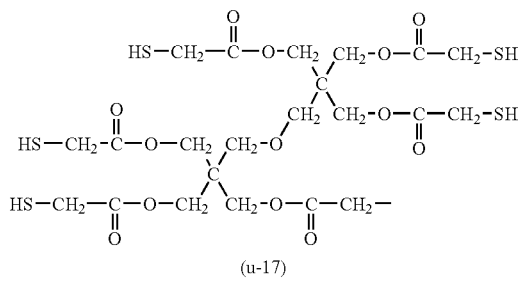

(u-17)

Among the above-described compounds, preferred are compounds of (u-1), (u-2), (u-10), (u-11), (u-16), and (u-17), from the viewpoints of availability of raw materials, easiness of synthesis, and solubility in various solvents.

The compound having a functional group ($A^1$ or $A^2$ in the formula above) and a carbon-carbon double bond is not particularly limited, and the examples thereof include the followings:

[Chemical formula 47]

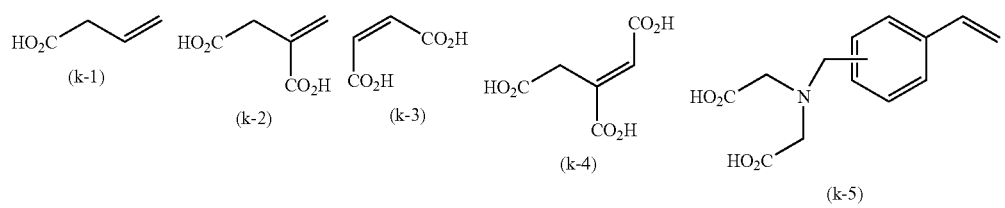

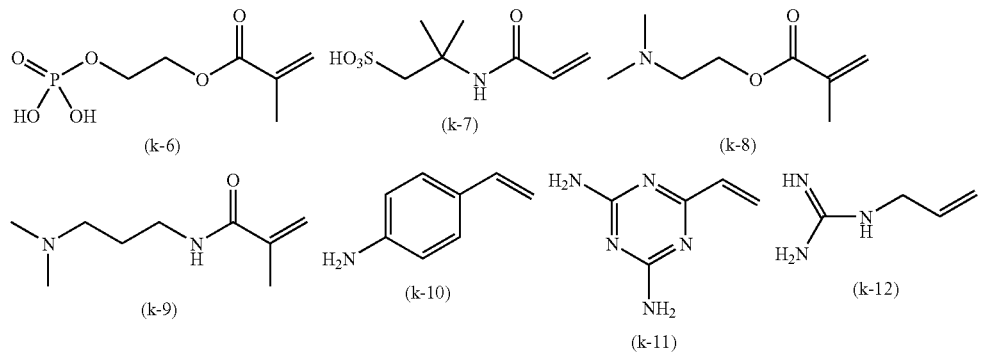

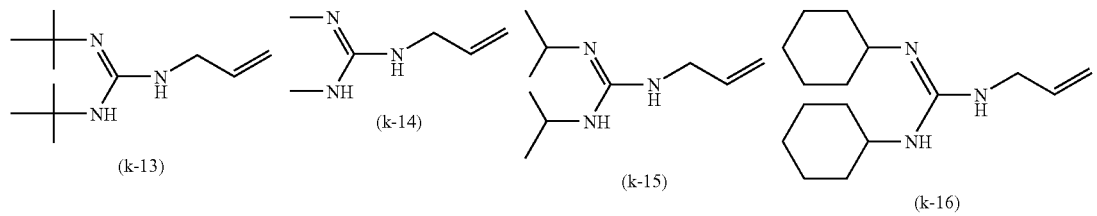

[Chemical formula 48]

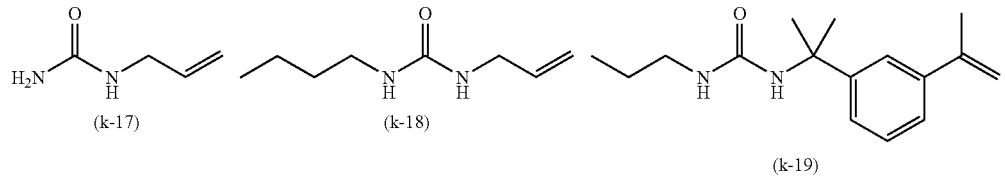

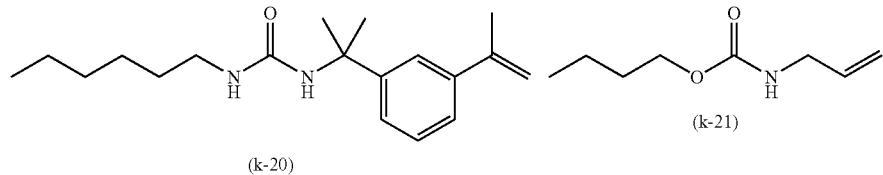

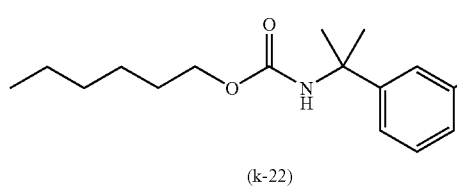
(k-22)
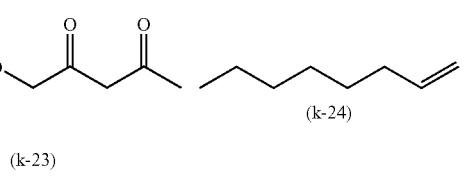
(k-23)     (k-24)
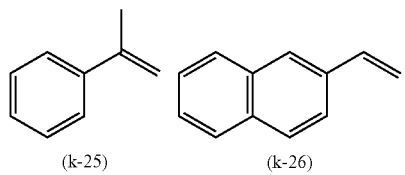
(k-25)   (k-26)   (k-27)
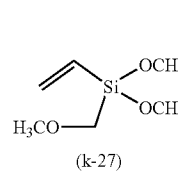
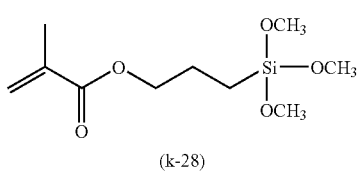
(k-28)
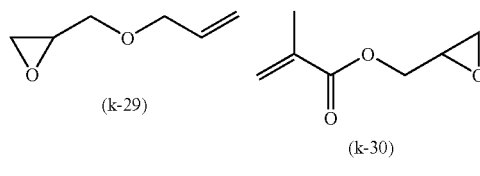
(k-29)   (k-30)   (k-31)
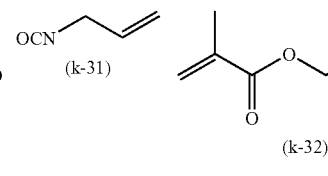
(k-32)   (k-33)
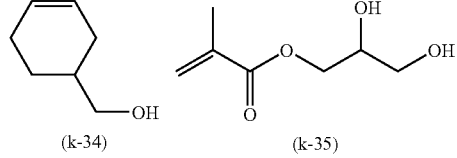
(k-34)   (k-35)
[Chemical formula 49]
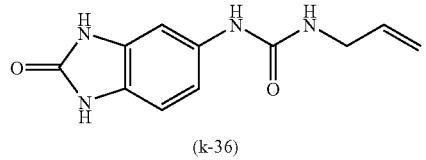
(k-36)
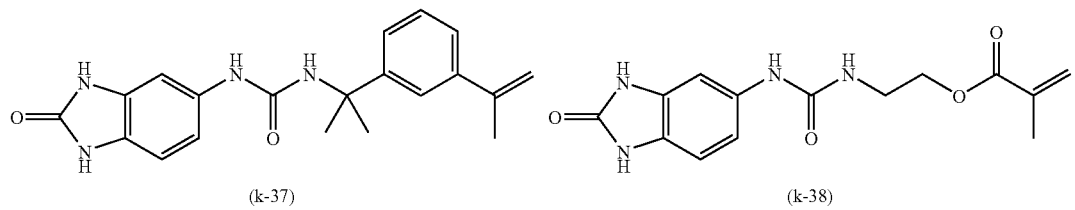
(k-37)   (k-38)
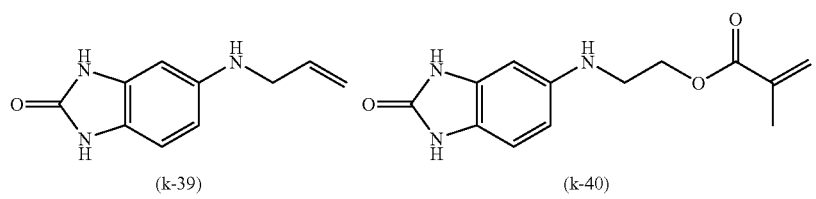
(k-39)   (k-40)
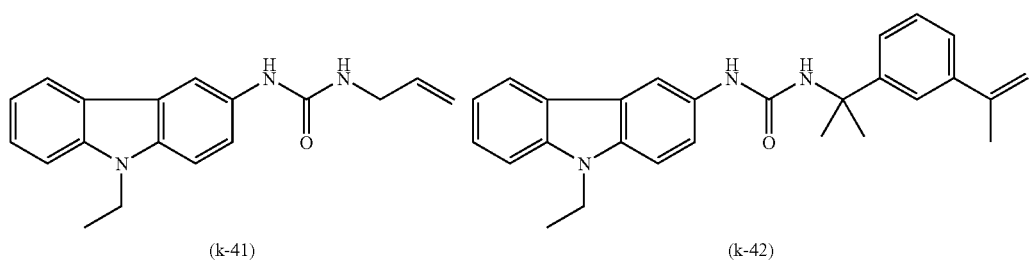
(k-41)   (k-42)

-continued
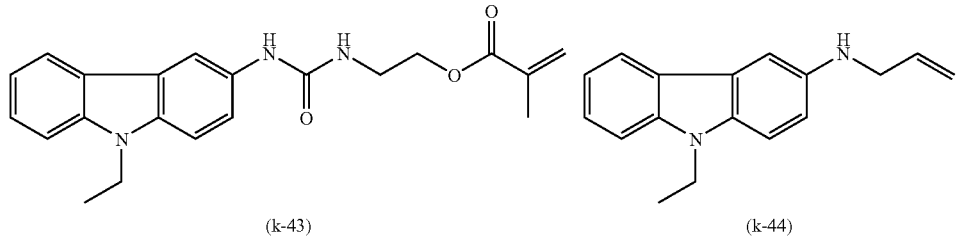
(k-43)　　　　　　　　　　　　　(k-44)
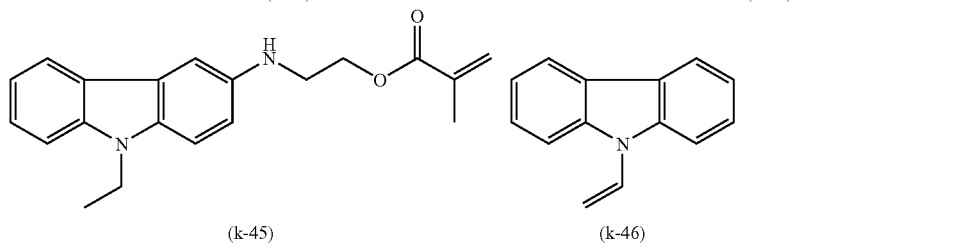
(k-45)　　　　　　　　　　　　　(k-46)
[Chemical formula 50]
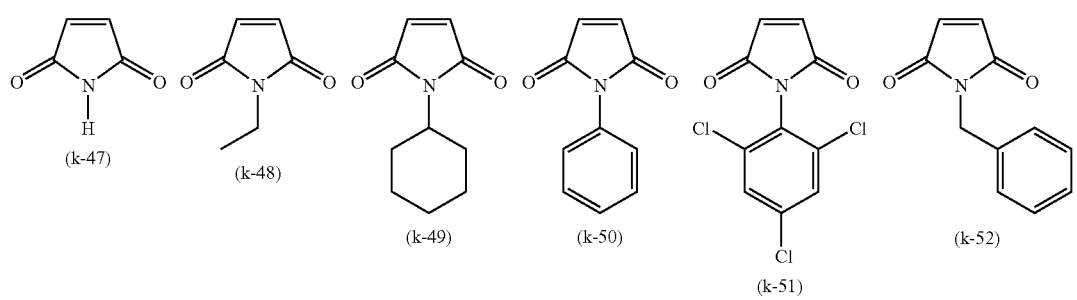
(k-47)　(k-48)　(k-49)　(k-50)　(k-51)　(k-52)
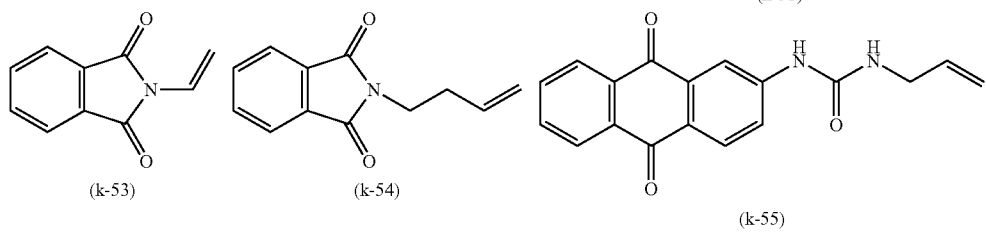
(k-53)　　　(k-54)　　　　　(k-55)
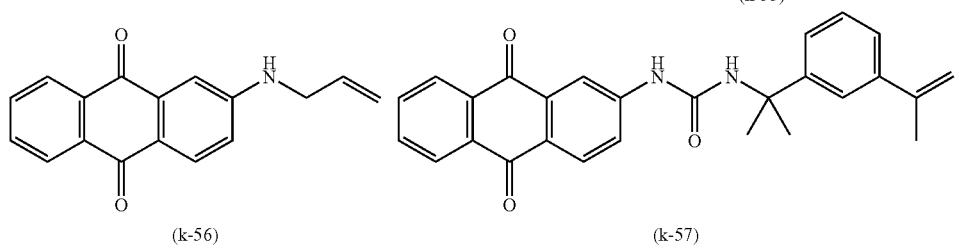
(k-56)　　　　　　　　　　(k-57)
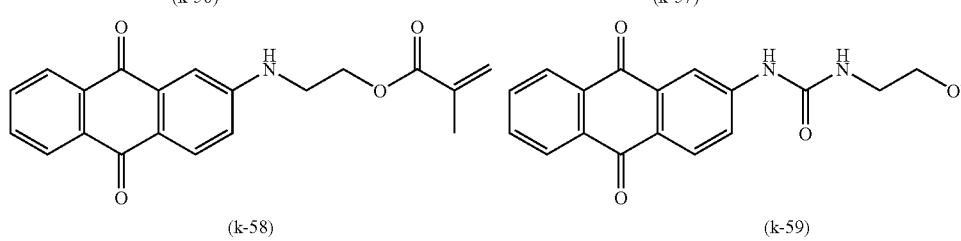
(k-58)　　　　　　　　　　(k-59)
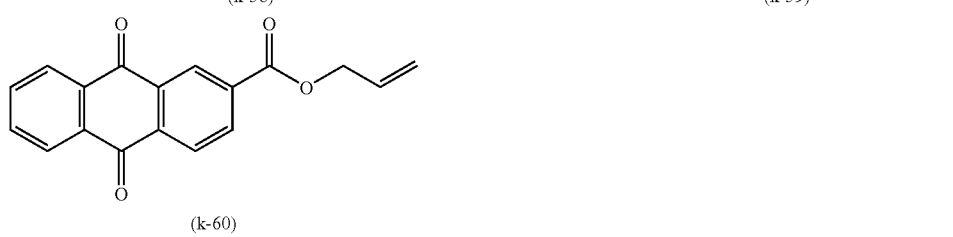
(k-60)

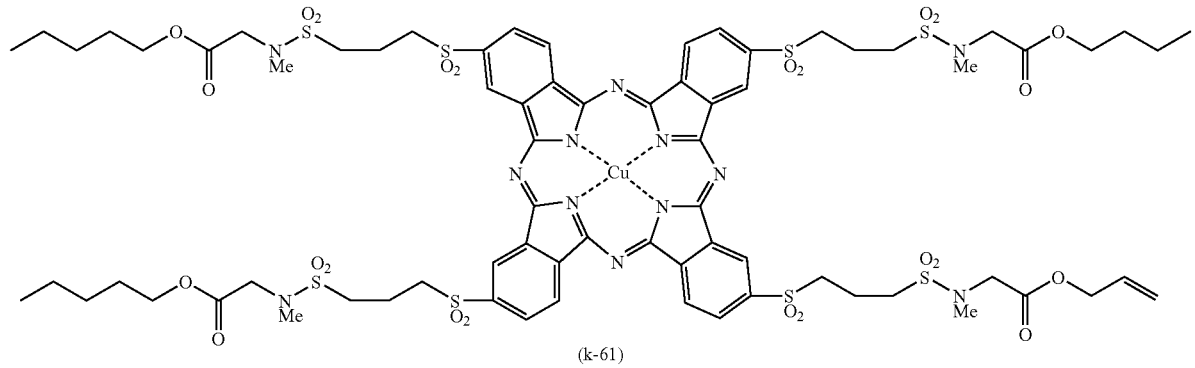

(k-61)

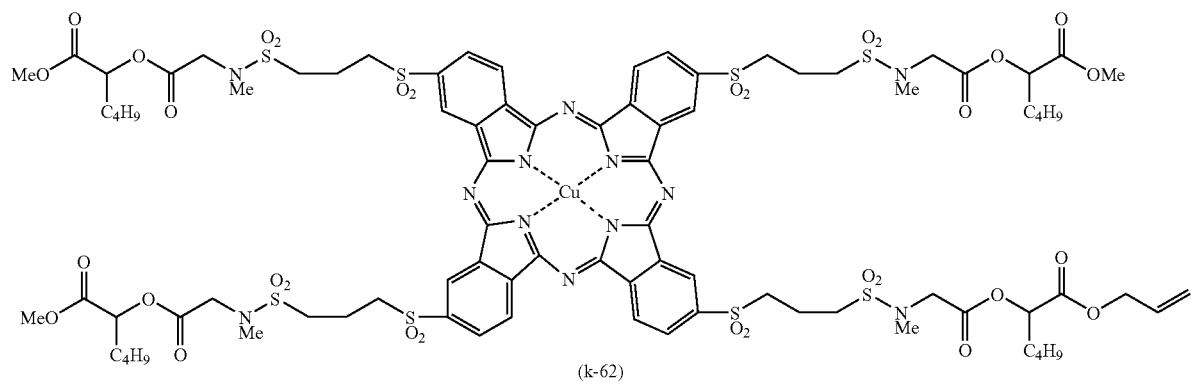

(k-62)

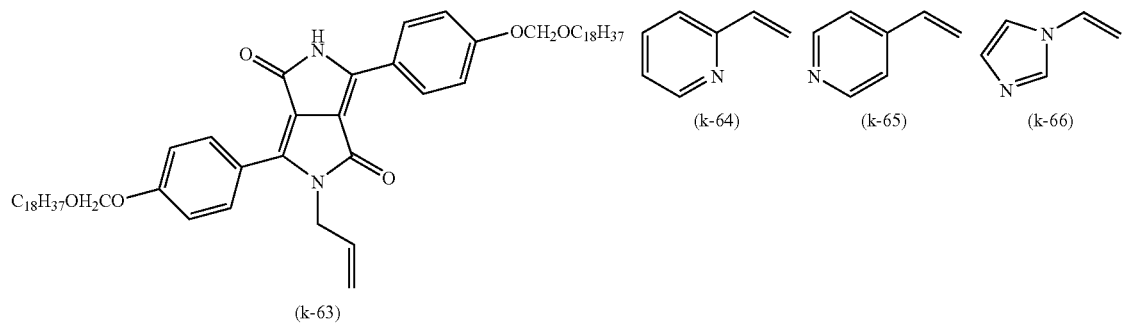

(k-63)  (k-64)  (k-65)  (k-66)

For example, the radical addition reaction product from the "compound having 3 to 10 mercapto groups in the molecule" and the "compound having at least one functional group selected from acidic groups, nitrogen atom-containing basic groups, a urea group, an urethane group, coordination oxygen atom-containing groups, hydrocarbon groups having 4 or more carbon atoms, alkoxysilyl groups, an epoxy group, an isocyanate group, and a hydroxyl group and additionally having a carbon-carbon double bond" can be prepared, for example, by using a method (thiol-ene reaction method) of dissolving the "compound having 3 to 10 mercapto groups in the molecule" and the "compound having at least one functional group selected from acidic groups, nitrogen atom-containing basic groups, a urea group, an urethane group, coordination oxygen atom-containing groups, hydrocarbon groups having 4 or more carbon atoms, alkoxysilyl groups, an epoxy group, an isocyanate group, and a hydroxyl group and additionally having a carbon-carbon double bond" in a suitable solvent, adding a radical generator thereto, and allowing addition reaction to proceed at approximately 50° C. to 100° C.

The solvent preferably used in the method can be chosen arbitrarily according to the "compound having 3 to 10 mercapto groups in the molecule", the "compound having at least one functional group selected from acidic groups, nitrogen atom-containing basic groups, a urea group, an urethane group, coordination oxygen atom-containing groups, hydrocarbon groups having 4 or more carbon atoms, alkoxysilyl groups, an epoxy group, an isocyanate group, and a hydroxyl group and additionally having a carbon-carbon double bond", and the solubility of the radical addition reaction product formed. Examples thereof include methanol, ethanol, propanol, isopropanol, 1-methoxy-2-propanol, 1-methoxy-2-propyl acetate, acetone, methylethylketone, methylisobutylketone, methoxypropyl acetate, ethyl lactate, ethyl acetate, acetonitrile, tetrahydrofuran, dimethylformamide, chloroform, and toluene. These solvents may be used as a mixture of two or more.

The radical generators favorably used include azo compounds such as 2,2'-azobis(isobutylonitrile) (AIBN) and 2,2'-azobis-(2,4'-dimethylvaleronitrile), peroxides such as benzoyl peroxide, persulfate salts such as potassium persulfate and ammonium persulfate, and the like.

Specific examples of the compound represented by formula (1) that can be preferably used in the producing method of the present invention are shown below. However, the present invention is not limited to these specific examples.

[Chemical formula 52]

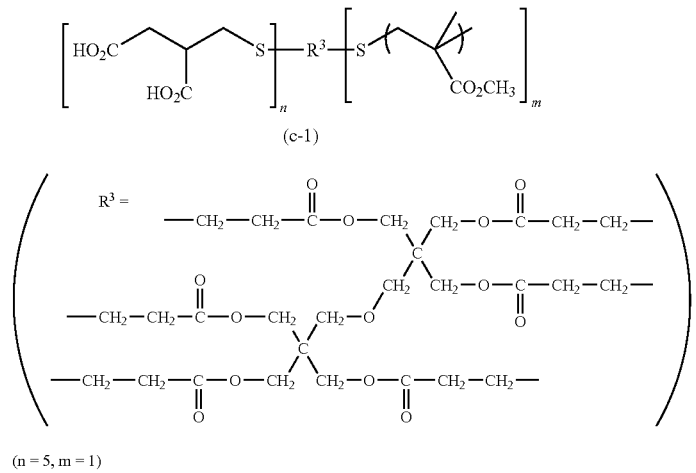

[Chemical formula 53]

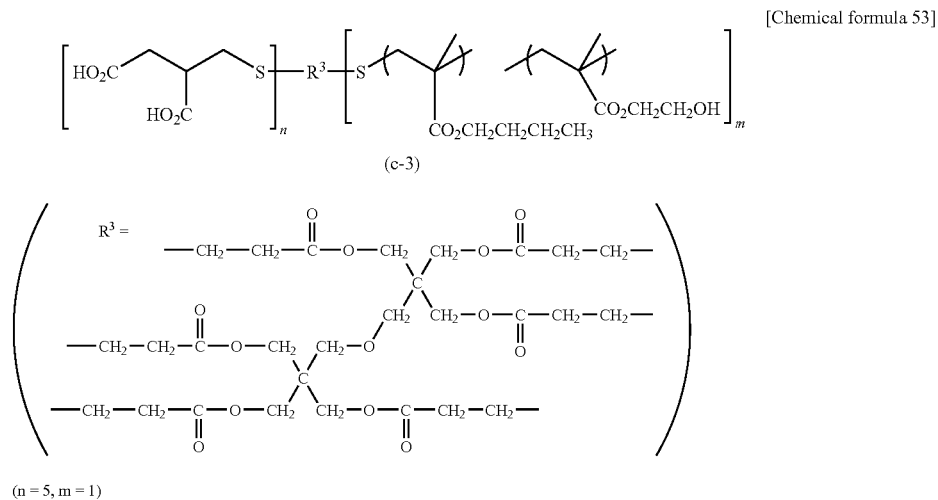

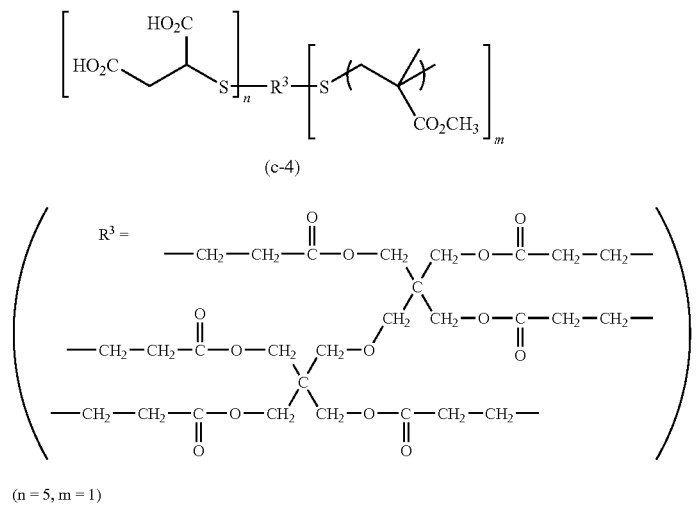

-continued
[Chemical formula 54]
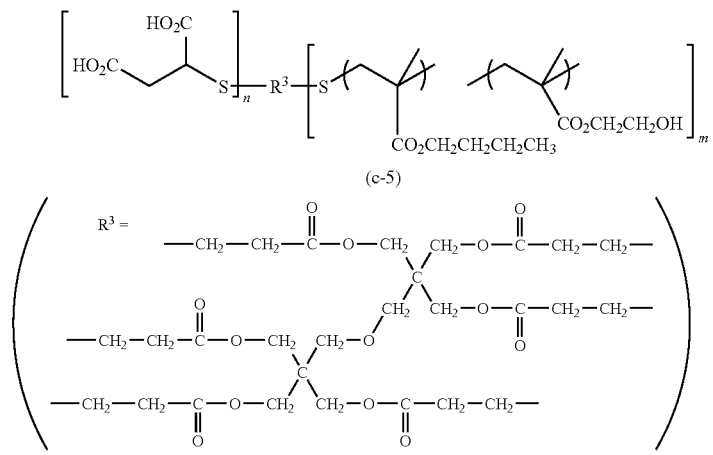
(c-5)
(n = 5, m = 1)
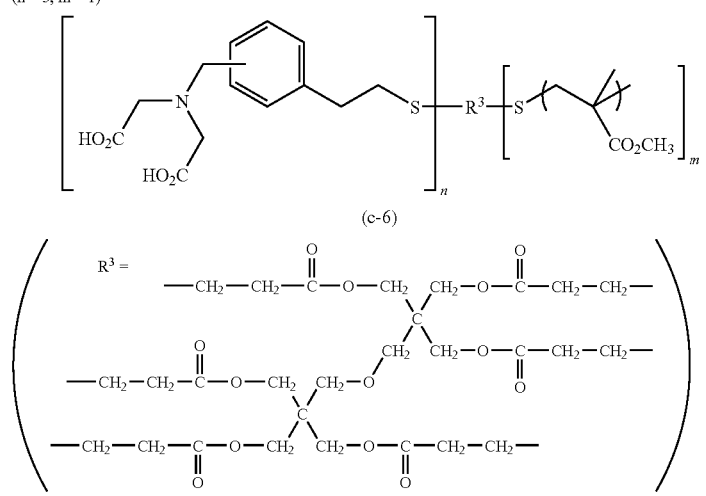
(c-6)
(n = 5, m = 1)
[Chemical formula 55]
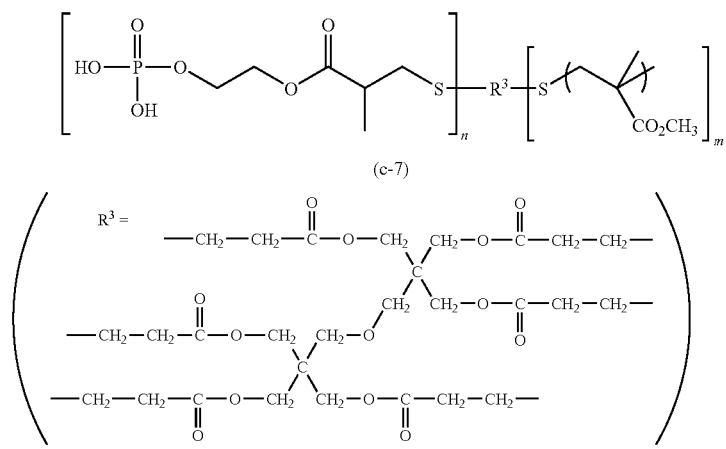
(c-7)
(n = 5, m = 1)
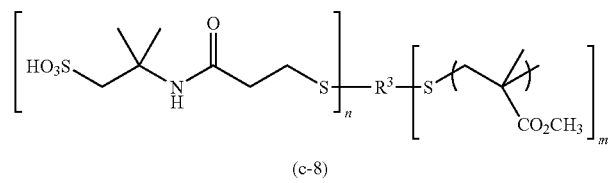
(c-8)

-continued
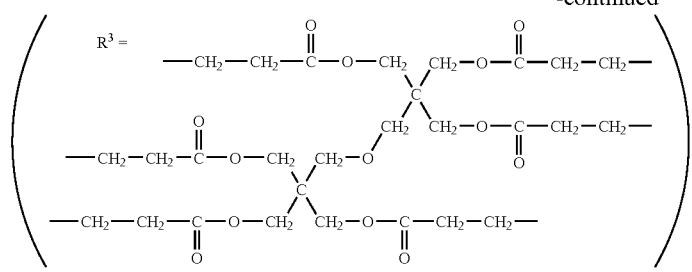
(n = 5, m = 1)
[Chemical formula 56]
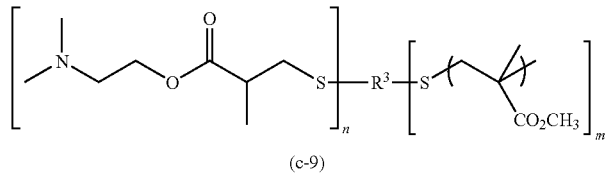
(c-9)
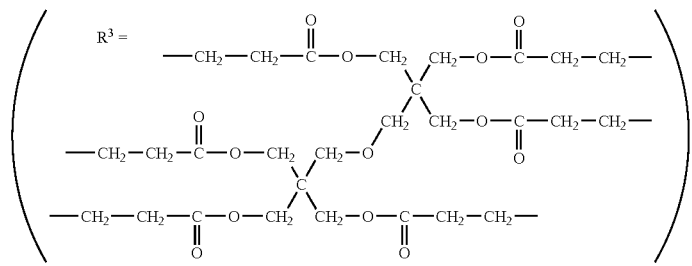
(n = 5, m = 1)
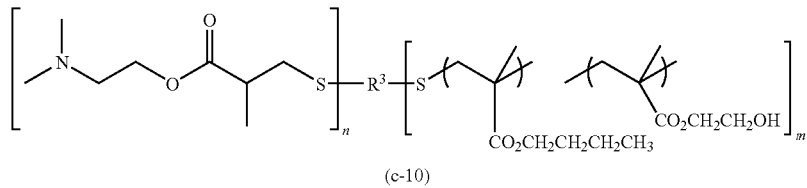
(c-10)
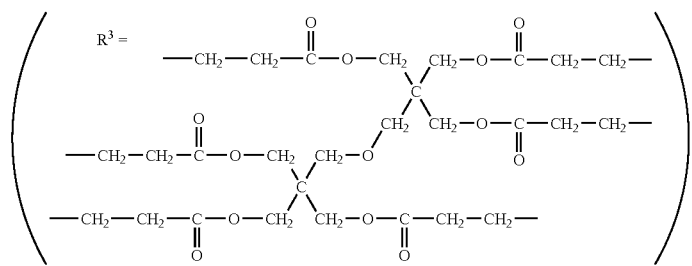
(n = 5, m = 1)
[Chemical formula 57]
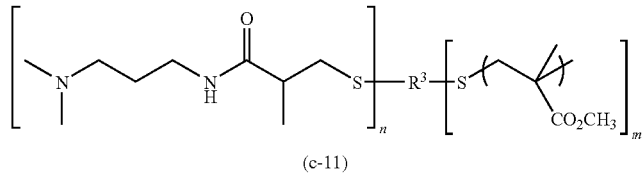
(c-11)

-continued
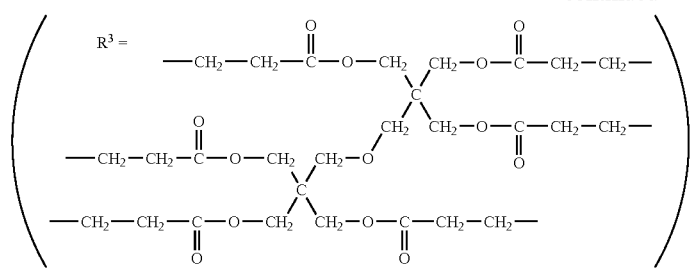
(n = 5, m = 1)
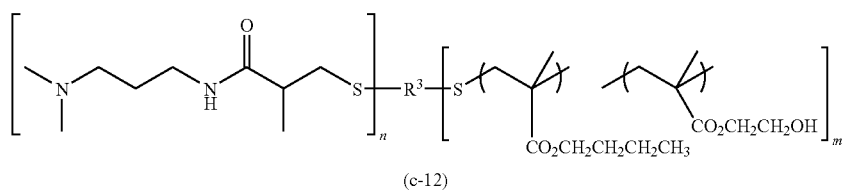
(c-12)
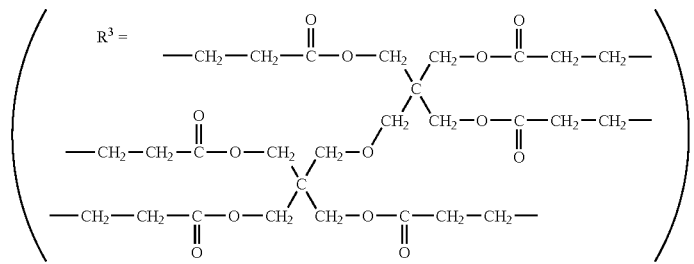
(n = 5, m = 1)
[Chemical formula 58]
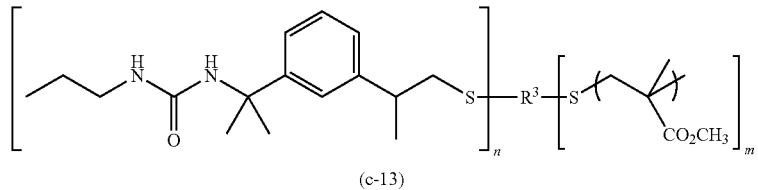
(c-13)
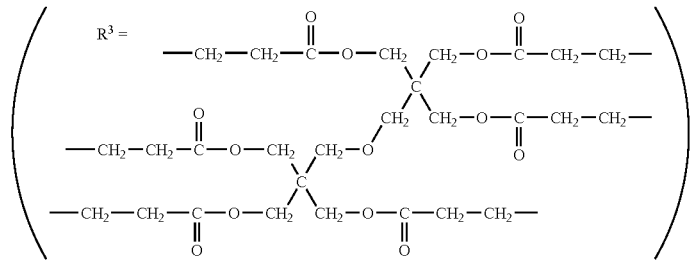
(n = 5, m = 1)
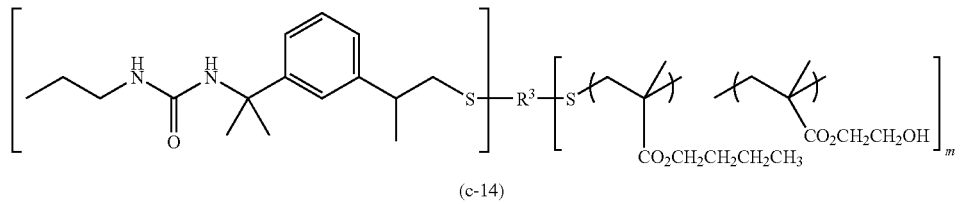
(c-14)

-continued
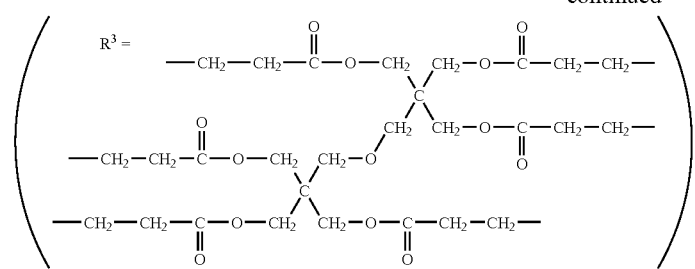
(n = 5, m = 1)
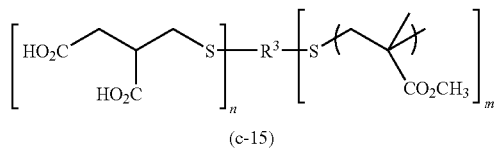
(c-15)
[Chemical formula 59]
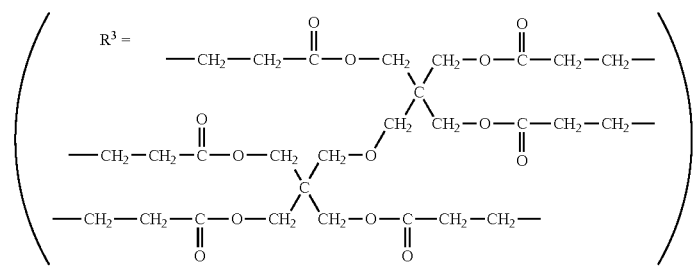
(n = 3, m = 1)
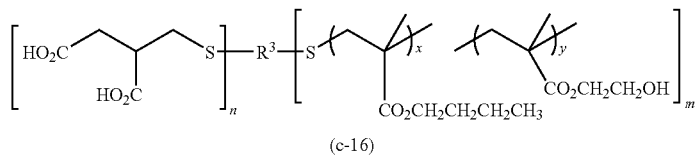
(c-16)
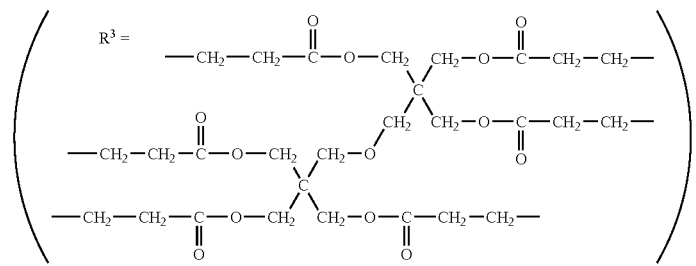
(n = 5, m = 1) (x:y = 9:1)
[Chemical formula 60]
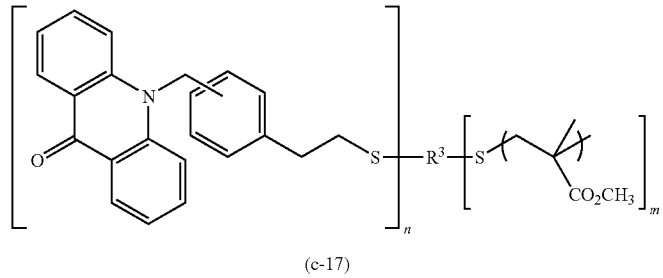
(c-17)

-continued
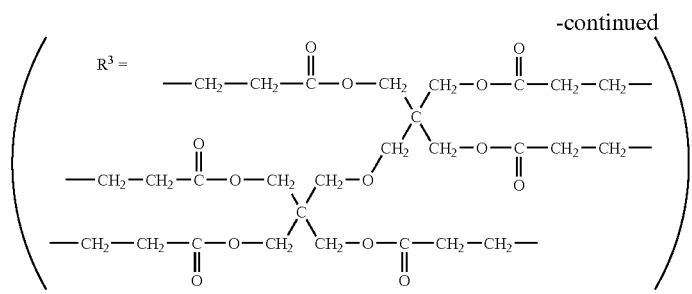
(n = 5, m = 1)
[Chemical formula 61]
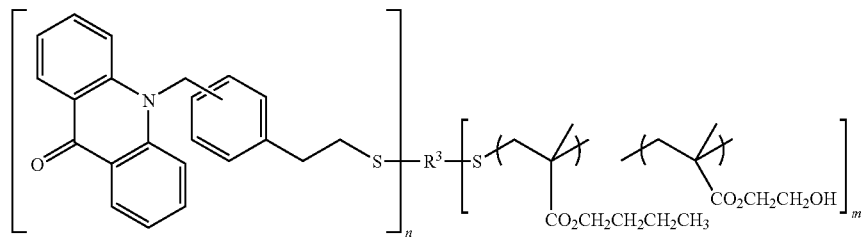
(c-19)
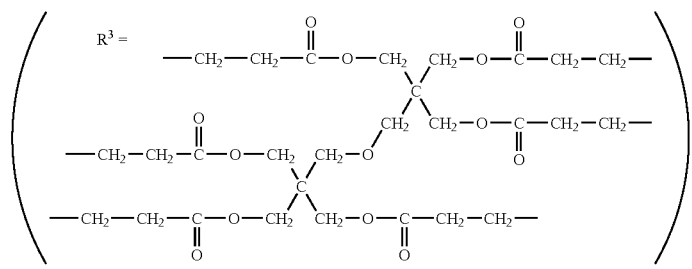
(n = 5, m = 1)
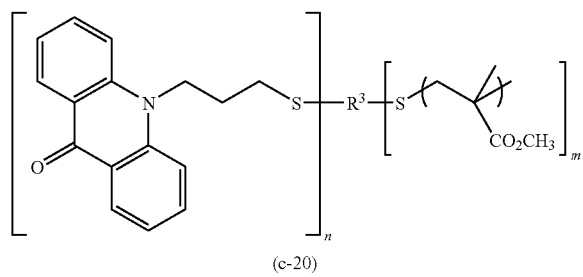
(c-20)
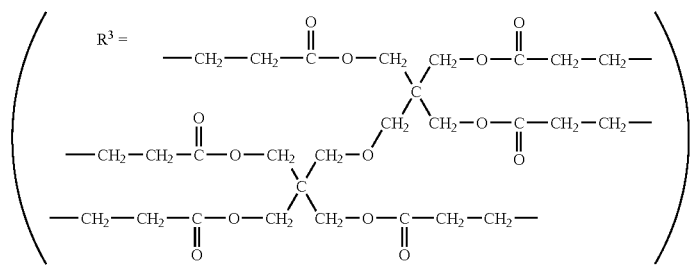
(n = 5, m = 1)

[Chemical formula 62]
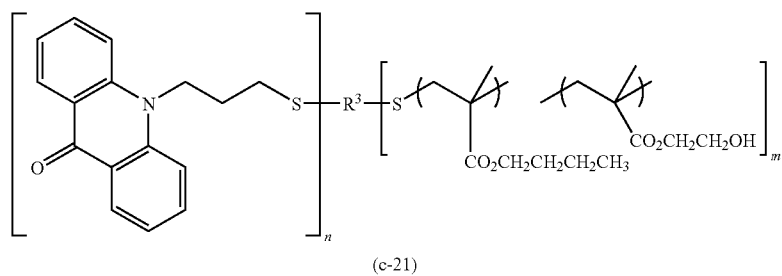
(c-21)
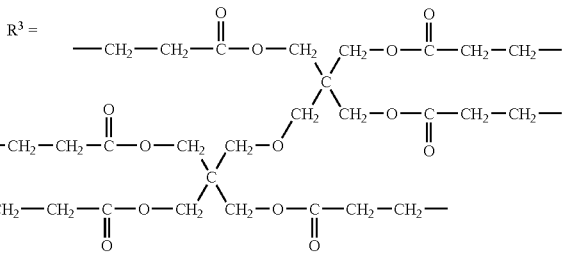
(n = 5, m = 1)
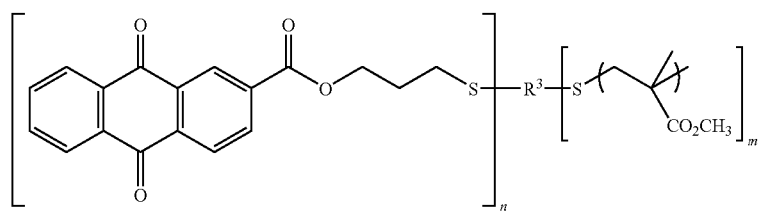
(c-22)
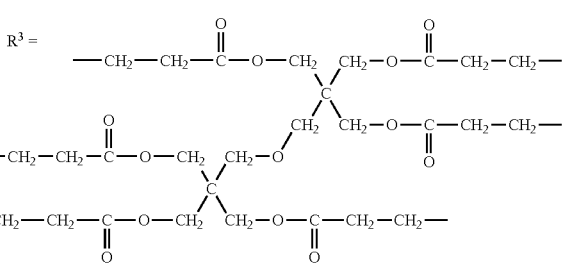
(n = 5, m = 1)
[Chemical formula 63]
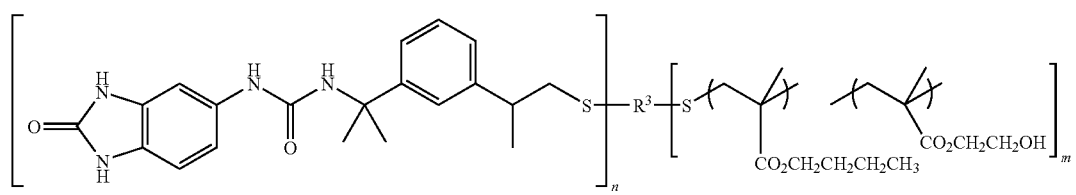
(c-23)
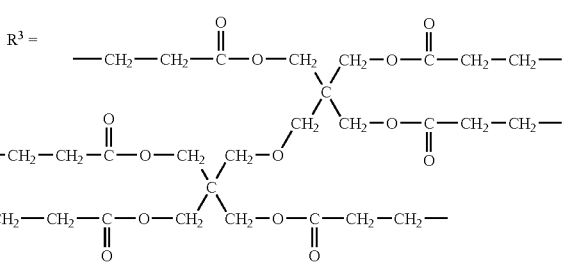
(n = 5, m = 1)

-continued
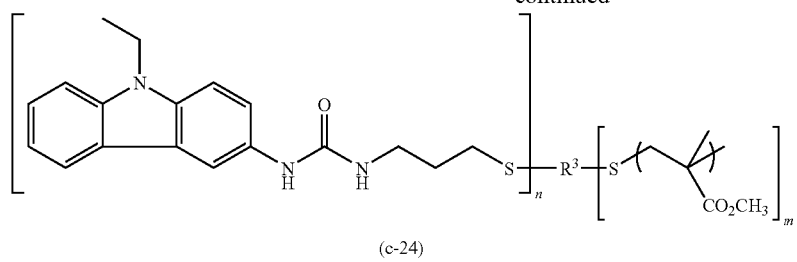
(c-24)
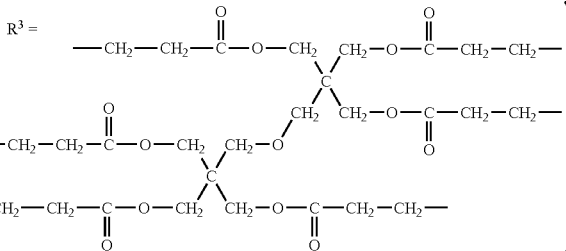
(n = 5, m = 1)
[Chemical formula 64]
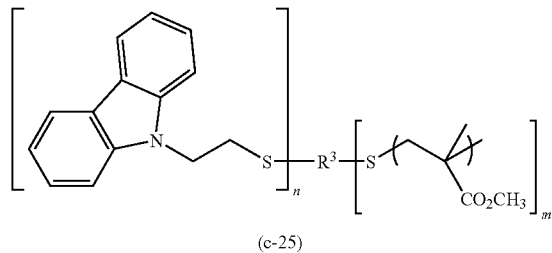
(c-25)
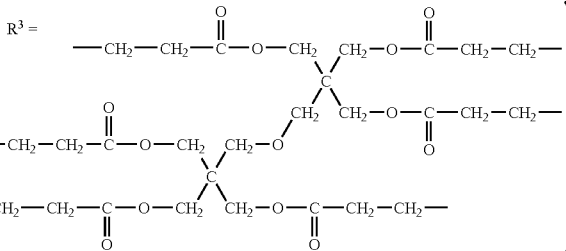
(n = 5, m = 1)
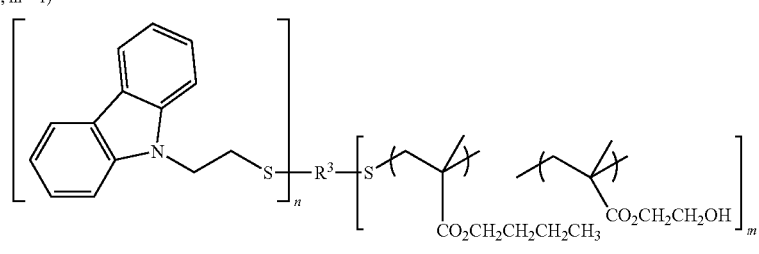
(c-26)
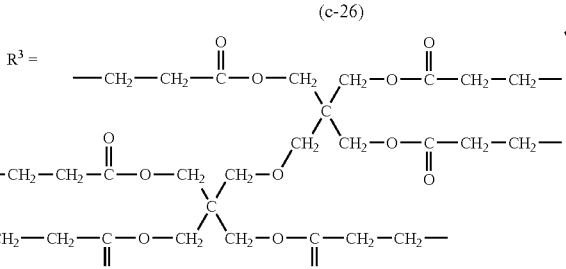
(n = 5, m = 1)

-continued
[Chemical formula 65]
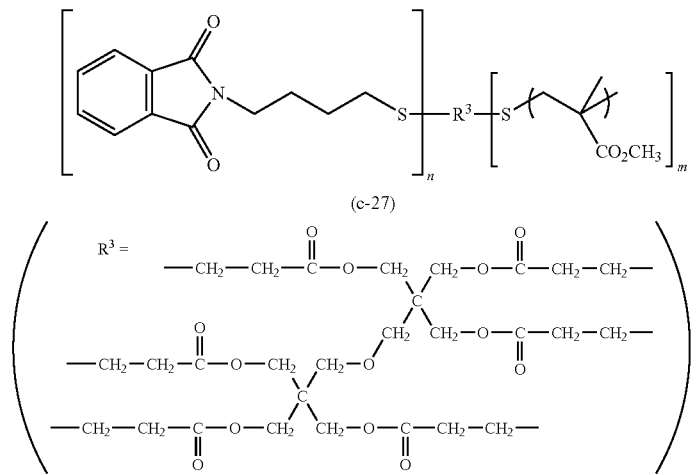
(c-27)
(n = 5, m = 1)
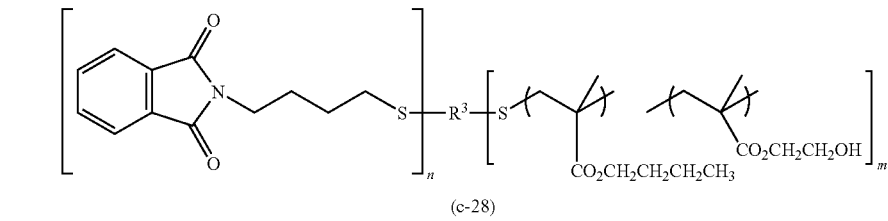
(c-28)
(n = 5, m = 1)
[Chemical formula 66]
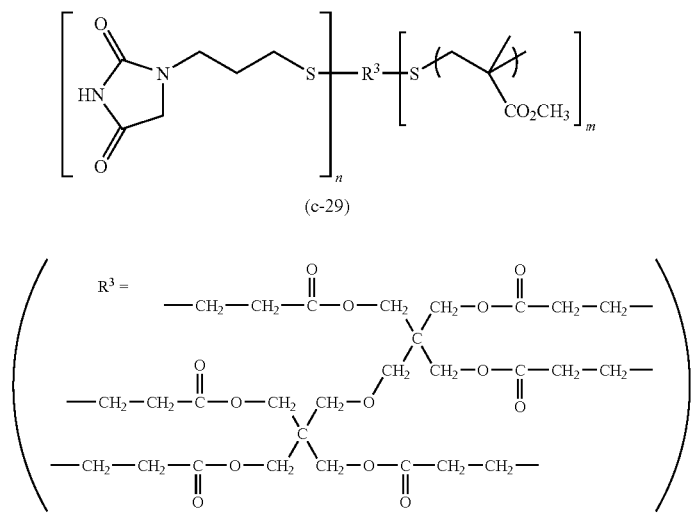
(c-29)
(n = 5, m = 1)

-continued
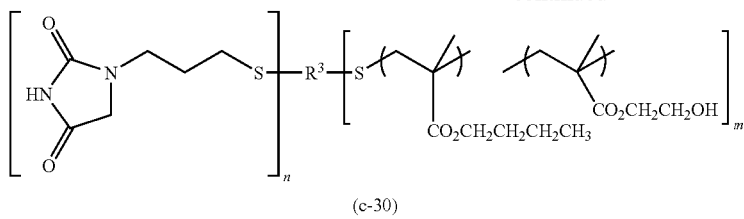
(c-30)
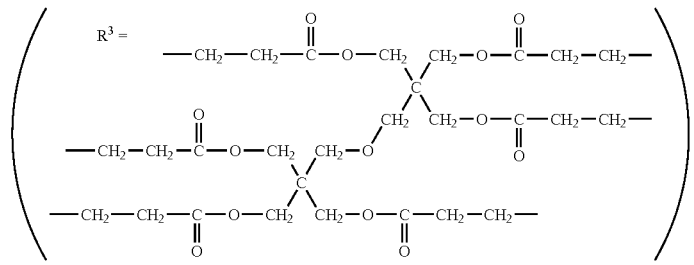
(n = 5, m = 1)
[Chemical formula 67]
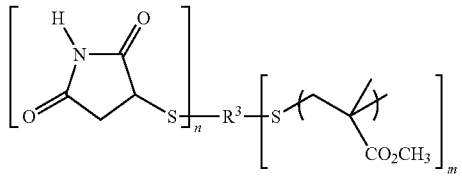
(c-31)
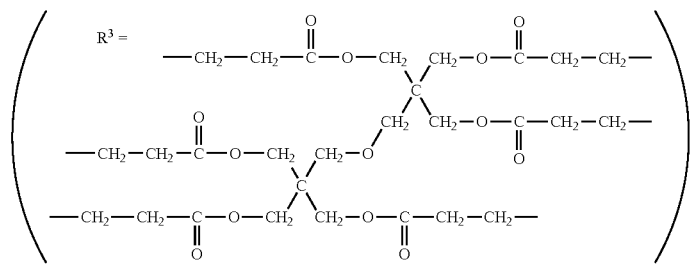
(n = 5, m = 1)
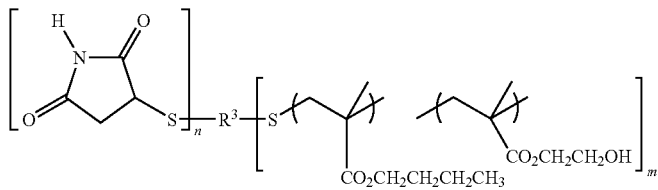
(c-32)
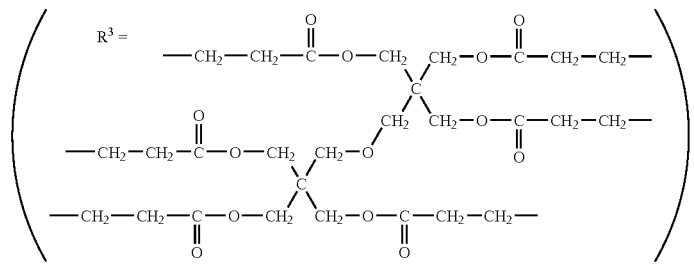
(n = 5, m = 1)

-continued
[Chemical formula 68]
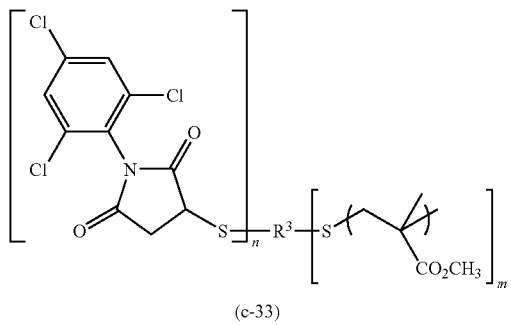
(c-33)
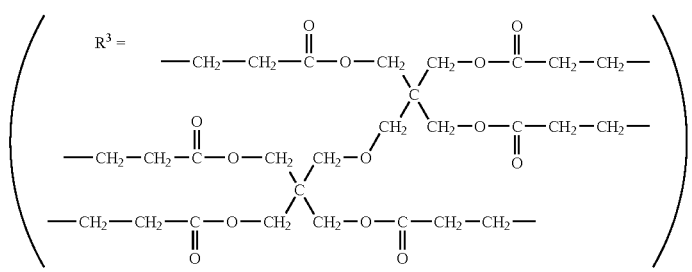
(n = 4.5, m = 1.5)
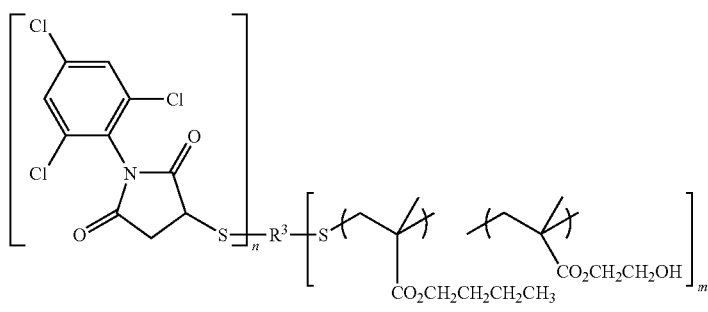
(c-34)
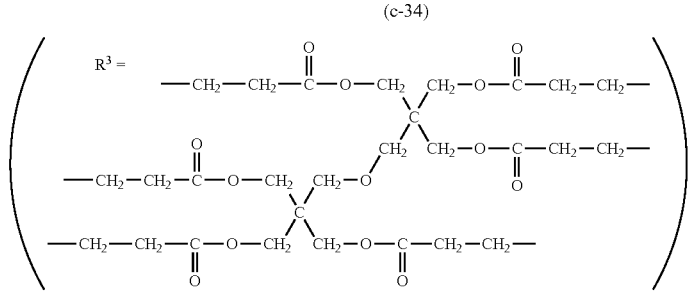
(n = 4.5, m = 1.5)
[Chemical formula 69]
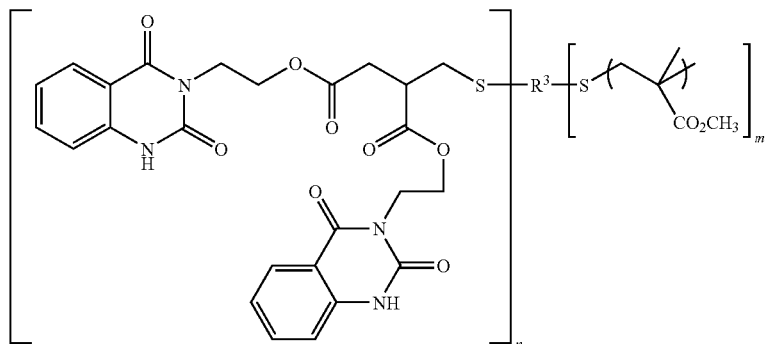
(c-35)

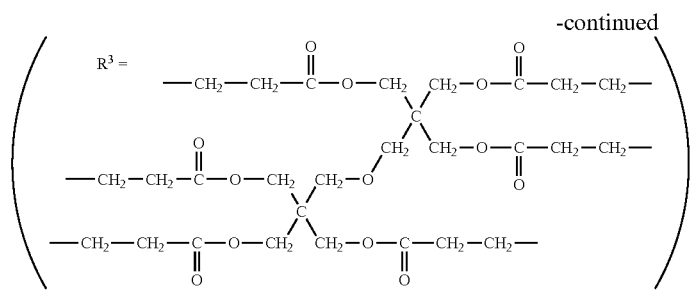

(n = 3, m = 1)

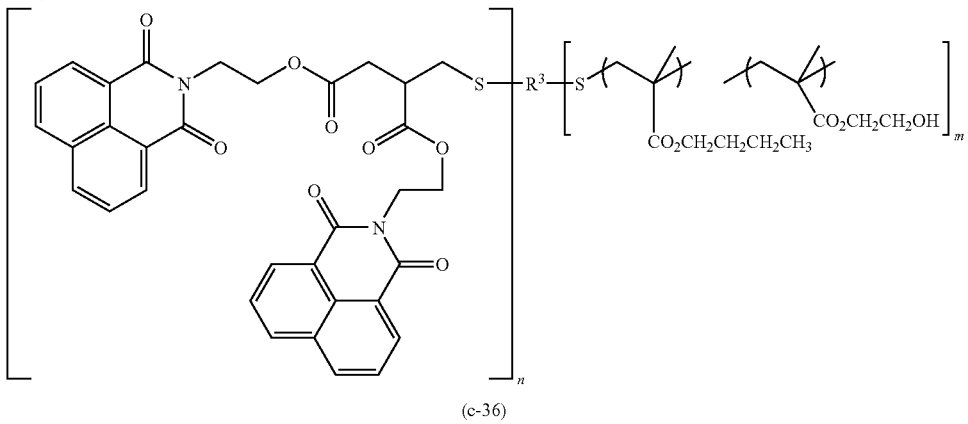

(c-36)

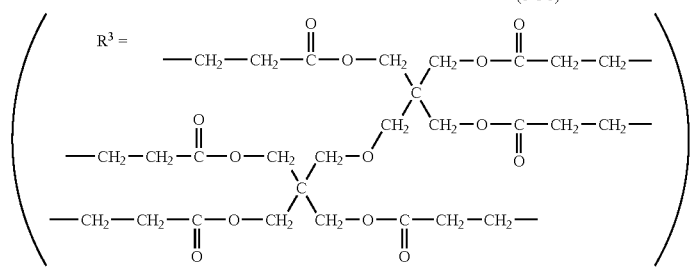

(n = 2.5, m = 1.5)

As the above-described polymer compound having a molecular weight of at least 1,000, it is possible to use any of the following polymer compounds having an acidic group (hereinafter, this compound is also referred to as an "acidic-group-containing polymer compound"). As the polymer compound, preferred is a polymer compound having a carboxyl group. More preferred are copolymer compounds containing (A) at least one kind of repeating unit derived from a compound having a carboxyl group and (B) at least one kind of repeating unit derived from a compound having a carboxylic acid ester group.

The repeating unit (A) derived from a compound having a carboxyl group is preferably a repeating unit represented by the following formula (1), and more preferably a repeating unit derived from acrylic acid or methacrylic acid; and the repeating unit (B) derived from a compound having a carboxylic acid ester group is preferably a repeating unit represented by the following formula (II), more preferably a repeating unit represented by the following formula (IV), and particularly preferably a repeating unit derived from benzyl acrylate, benzyl methacrylate, phenethyl acrylate, phenethyl methacrylate, 3-phenylpropyl acrylate, or 3-phenylpropyl methacrylate.

[Chemical formula 70]

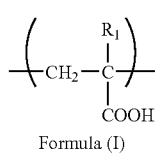

Formula (I)

($R_1$ represents a hydrogen atom or an alkyl group having 1 to 5 carbon atoms.)

[Chemical formula 71]

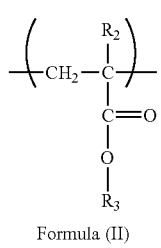

Formula (II)

($R_2$ represents a Hydrogen Atom or an Alkyl Group Having 1 to 5 Carbon Atoms. $R_3$ represents a group represented by the following formula (III).)

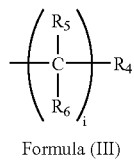

[Chemical formula 72]

Formula (III)

($R_4$ represents a hydrogen atom, an alkyl group having 1 to 5 carbon atoms, a hydroxy group, a hydroxyalkyl group having 1 to 5 carbon atoms, or an aryl group having 6 to 20 carbon atoms; $R_5$ and $R_6$ each represent a hydrogen atom or an alkyl group having 1 to 5 carbon atoms; and i represents a number of 1 to 5.)

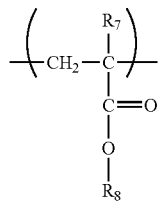

[Chemical formula 73]

Formula (IV)

($R_7$ represents a hydrogen atom or an alkyl group having 1 to 5 carbon atoms. $R_9$ represents a group represented by the following formula (V).)

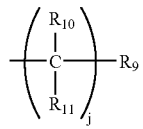

[Chemical formula 74]

Formula (V)

($R_9$ represents an alkyl group having 2 to 5 carbon atoms or an aryl group having 6 to 20 carbon atoms. $R_{10}$ and $R_{11}$ each represent a hydrogen atom or an alkyl group having 1 to 5 carbon atoms. j represents a number of 1 to 5.)

As to a polymerization ratio between the repeating unit (A) derived from a compound having a carboxyl group and the repeating unit (B) derived from a compound having a carboxylic acid ester group, a ratio (%) of the number of repeating units (A) to the total number of repeating units is preferably 3 to 40, and more preferably 5 to 35.

In the producing method of the present invention, the term "molecular weight" means a weight-average molecular weight, unless otherwise stated. Examples of a method of measuring the molecular weight include a chromatography method, a viscosity method, a light scattering method, and a sedimentation velocity method. In the present specification, a weight-average molecular weight calculated in terms of polystyrene, measured by gel permeation chromatography (carrier: tetrahydrofuran) is used, unless otherwise specifically indicated.

The polymer compound may be either water-soluble or oil-soluble, or may be water-soluble and oil-soluble.

The polymer compound may be added in a state of being dissolved in an aqueous solvent or an organic solvent, or may be added in a solid state. In addition, such addition methods may be combined. Examples of a method of adding the polymer compound in a state of being dissolved in a solvent include: a method involving adding, to an aggregated organic particles liquid, the polymer compound in a state of being dissolved in the same solvent as that of the aggregated organic particles liquid; and a method involving adding, to the aggregated organic particles liquid, the polymer compound in a state of being dissolved in a different solvent that is compatible with the solvent of the aggregated organic particles liquid. When the polymer compound is added in a state of being dissolved in a solvent, the concentration of the polymer compound is not particularly limited, but the concentration is preferably 1 to 70 mass %, more preferably 2 to 65 mass %, and particularly preferably 3 to 60 mass %.

The polymer compound may be added at the time of or before or after the formation of the organic nanoparticles, may be added at the time of or before or after concentration, may be added at the time of or before or after the dispersion of the aggregated organic particles after being subjected to concentration, or may be added after the completion of these steps. Alternatively, the polymer compound may be added in plural times by dividing the whole amount thereof into plural portions. In the producing method of the present invention, the above-described polymer compound having a weight-average molecular weight of 1,000 or more may be incorporated in a composition as a binder described below. For example, it is preferred that the polymer compound is added at the time of fining and dispersing the aggregated organic particles obtained after concentration of organic-particles-forming solution.

The polymer compound is added in an amount of preferably 0.1 to 1,000 parts by mass, more preferably 5 to 500 parts by mass, and particularly preferably 10 to 300 parts by mass, when the amount of the organic nanoparticles is set to 100 parts by mass.

Examples of the polymer compound having a molecular weight of 1,000 or more include, other than the aforementioned compounds, polyvinyl pyrrolidone, polyvinyl alcohol, polyvinyl methyl ether, polyethylene oxide, polyethylene glycol, polypropylene glycol, polyacrylamide, vinyl alcohol/vinyl acetate copolymer, partial-formal products of polyvinyl alcohol, partial-butyral products of polyvinyl alcohol, vinylpyrrolidone/vinyl acetate copolymer, polyethylene oxide/propylene oxide block copolymer, polyamides, cellulose derivatives, and starch derivatives. Besides, natural polymer compounds can also be used, examples of which include alginic acid salts, gelatin, albumin, casein, gum arabic, tragacanth gum, and ligninsulfonic acid salts. Examples of the polymer compound having an acidic group include polyvinyl sulfuric acid and concentrated naphthalenesulfonic acid.

Examples of the polymer compound having a carboxyl group include polyacrylic acid, polymethacrylic acid, and a cellulose derivative having a carboxyl group in any one of its side chains. Examples of the copolymer containing at least one kind of repeating unit (A) derived from a compound having a carboxyl group and at least one kind of repeating unit (B) derived from a compound having a carboxylic acid ester group, include a methacrylic acid copolymer, an acrylic acid copolymer, an itaconic acid copolymer, a crotonic acid copolymer, a maleic acid copolymer, and a partially-esterified maleic acid copolymer, as described in JP-A-59-44615, JP-B-54-34327, JP-B-58-12577, JP-B-54-25957, JP-A-59-53836, and JP-A-59-71048. In addition, particularly preferable examples of the copolymer include an acrylic acid/acrylate copolymer, a methacrylic acid/acrylate copolymer, an acrylic acid/methacrylate copolymer, a methacrylic acid/methacrylate copolymer, and a multiple-component copolymer containing acrylic acid or methacrylic acid, and an acrylate or methacrylate, and any other vinyl compound, as described in U.S. Pat. No. 4,139,391.

Examples of the vinyl compound include styrene or a substituted styrene (such as vinyltoluene or vinyl ethyl benzene); vinylnaphthalene or a substituted vinylnaphthalene; acrylamide; methacrylamide; acrylonitrile; and methacrylonitrile. Of those, styrene is preferable.

The polymer compound may be used singly or in combination of two or more thereof, or may be used in combination with a compound having a molecular weight of less than 1,000.

In the method of producing organic nanoparticles of the present invention, it is preferred that the dispersion of the organic nanoparticles include an organic solvent in an amount of preferably 60 mass % or more, and more preferably 65 mass % or more. The organic solvent is not particularly limited, and can be appropriately selected from common solvents. Preferred examples of the solvent include ester compound solvents, alcohol compound solvents, aromatic compound solvents, aliphatic compound solvents, and ketone compound solvents. Of those, ester compound solvents and ketone compound solvents are particularly preferable. Those solvents may be used singly or in combination of two or more thereof.

Examples of the ester compound solvents include 2-(1-methoxy)propyl acetate, ethyl acetate, ethyl lactate, and the like. Examples of the alcohol compound solvents include n-butanol, isobutanol, and the like. Examples of the aromatic compound solvents include benzene, toluene, xylene, and the like. Examples of the aliphatic compound solvents include n-hexane, cyclohexane, and the like. Examples of the ketone compound solvents include methylethylketone, acetone, cyclohexanone, and the like.

[Organic Nanoparticle Dispersion Composition]

Hereinafter, embodiments wherein the organic nanoparticles are made into compositions and used, for example, for color filter or inkjet ink, will be described in detail. The organic nanoparticles can be used, for example, as dispersed in a vehicle. The vehicle, if paint is taken as an example, means a portion of a medium in which a pigment is dispersed when the paint is in a liquid state. The vehicle is in a liquid state and contains a portion (binder) that bonds to the pigments to solidify a coated film and a component (organic solvent) that dissolves and dilutes the portion. In the present invention, the binder used in formation of the nanoparticles may be the same as or different from the binder for redispersion, and these binders may be called respectively a nanoparticle formation binder and a redispersion binder.

The concentration of organic nanoparticles in a dispersion composition of the organic nanoparticles after re-dispersion can be properly determined in accordance with a purpose of their use. However, the concentration of the organic nanoparticles is preferably in the range of from 2 to 30 mass %, more preferably in the range of from 4 to 20 mass %, and especially preferably in the range of from 5 to 15 mass %, based on the total amount of the dispersion composition. In the case where the organic nanoparticles are dispersed with such vehicles as described above, amounts of the binder and the dissolution and dilution component can be properly determined depending on, for example, the kind of the organic material. However, the amount of the binder is preferably in the range of from 1 to 30 mass %, more preferably in the range of from 3 to 20 mass %, and especially preferably in the range of from 5 to 15 mass %, based on the total amount of the dispersion composition. The amount of the dissolution and dilution component is preferably in the range of from 5 to 80 mass %, and more preferably in the range of from 10 to 70 mass %, based on the total amount of the dispersion composition.

In the aforementioned, concentrated, extracted nanoparticle liquid, it is preferred to cause aggregation of organic nanoparticles by concentration, in order to allow quick filtration through a filter, as previously described. It is preferred to cause aggregation by concentrating by centrifugal separation or drying.

Examples of a method that can be employed for fining and dispersing such aggregated nanoparticles, include a dispersing method with using a supersonic wave and a method involving applying physical energy.

Apparatus for ultrasonic wave irradiation is preferably an apparatus that is capable of applying an ultrasonic wave at 10 kHz or more, and examples thereof include an ultrasonic wave homogenizer, an ultrasonic wave cleaning machine, and the like. The liquid temperature during ultrasonic wave irradiation is preferably kept at 1 to 100° C., more preferably 5 to 60° C., since increase in the liquid temperature leads to thermal aggregation of nanoparticles (see Pigment dispersion technique-surface treatment and how to use dispersing agent, and evaluation for dispersibility-, TECHNICAL INFORMATION INSTITUTE CO., LTD, 1999). The temperature can be controlled, for example, by adjusting the temperature of dispersion, by adjusting the temperature of a temperature-controlling layer for controlling of dispersion temperature, or the like.

A dispersion machine to be used at the time of dispersing the concentrated organic nanoparticles by the application of physical energy is not particularly limited, and examples of the dispersion machine include a kneader, a roll mill, an attritor, a super mill, a dissolver, a homomixer, and a sand mill. Further, a high pressure dispersion method and a dispersion method of using fine particle beads are also exemplified as a preferable method.

<1> Dispersion Method

In the present invention, a preferable method of producing an organic nanoparticle dispersion composition is a method in which a coloring agent undergoes kneading-and-dispersing treatment with a resin ingredient so that the resulting kneaded-and-dispersed matter would have a relatively high viscosity of 10,000 mPa·s or more, preferably 100,000 mPa·s or more, at 25° C., and then the kneaded-and-dispersed matter is subjected to finely dispersing treatment after a solvent is added thereto, so that the resultant fine dispersion liquid would have a relatively low viscosity of 1,000 mPa·s or less, preferably 100 mPa·s or less, at 25° C.

Examples of a machine used in the kneading-and-dispersing treatment include a two-rod roll, a three-rod roll, a ball mill, a trom mill, a disper, a kneader, a cokneader, a homogenizer, a blender, a single screw extruder and a double screw extruder. These machines each carry out dispersion while giving a strong shearing force to ingredients to be dispersed. Then, a solvent is added, and the finely dispersing treatment is performed by mainly using a vertical or horizontal sand grinder, a pin mill, a slit mill, an ultrasonic dispersing machine or a high-pressure dispersing machine, together with beads which range in size from 0.1 mm to 1 mm and are made of glass, zirconia or the like. Further, precision dispersing treatment can also be performed by use of minute-particle beads smaller than 0.1 mm in size. Alternatively, it is possible to omit the kneading-and-dispersing treatment. In this case, heads dispersion is carried out using a pigment, a dispersing agent or a surface treating agent, and the acrylic copolymer and the solvent as recited in the present invention.

Alternatively, it is possible to carry out dispersion treatment of a main pigment and that of an auxiliary pigment separately, then mix the resulting dispersions, and further subject the resulting mixture to dispersion treatment, and it is also possible to subject a main pigment, together with an auxiliary pigment, to dispersing treatment.

Incidentally, details of kneading and dispersing operations are also described in T. C. Patton, *Paint Flow and Pigment Dispersion*, John Wiley & Sons (1964), and the methods published therein may be adopted.

<2> Examples of the Dispersing Agent (Dispersant)

To the organic nanoparticle dispersion composition, any of commonly-used pigment dispersing agents and surfactants may be added for the purpose of enhancing the dispersibility of pigments. As these dispersing agents, various kinds of compounds can be used. Examples of such compounds include phthalocyanine derivatives (EFKA-6745, a commercial product, manufactured by EFKA ADDITIVES), SOLSPERSE 5000 (manufactured by ZENECA); organosiloxane polymer KP341 (manufactured by Shin-Etsu Chemical Co., Ltd.), (meth)acrylic acid (co)polymers POLYFLOW No. 75, No. 90 and No. 95 (manufactured by Kyoeisha Yushi Kagaku Kogyo Co., Ltd.), a cationic surfactant such as W001 (manufactured by Yusho Co., Ltd.); nonionic surfactants, such as polyoxyethylene lauryl ether, polyoxyethylene stearyl ether, polyoxyethylene oleyl ether, polyoxyethylene octyl phenyl ether, polyoxyethylene nonyl phenyl ether, polyoxyethylene glycol dilaurate, polyethylene glycol distearate and sorbitan fatty acid ester; anionic surfactants such as W004, W005 and W017 (manufactured by Yusho Co., Ltd.); polymeric dispersants such as EFKA-46, EFKA-47, EFKA-47EA, EFKA POLYMER 100, EFKA POLYMER 400, EFKA POLYMER 401 EFKA POLYMER 450 (all of which are manufactured by Morishita & Co., Ltd.), and Disperse Aid 6, Disperse Aid 8, Disperse Aid 15 and Disperse Aid 9100 (all of which are manufactured by San Nopco Limited); various Solsperse dispersants including Solsperse 3000, 5000, 9000, 12000, 13240, 13940, 17000, 24000, 26000 and 28000 (manufactured by ZENECA); Adeka Pluronic L31, F38, L42, L44, L61, L64, F68, L72, P95, F77, P84, F87, P94, L101, P103, F108, L121 and P-123 (manufactured by ADEKA CORPORATION), and Isonet S-20 (manufactured by Sanyo Chemical Industries, Ltd.). In addition, the pigment dispersants disclosed in JP-A-2000-239554, the compound (C) disclosed in JP-B-5-72943, the compound of Synthesis Example 1 described in JP-A-2001-31885, and so on can be preferably used, too.

The compounds shown as the dispersants used in formation of the organic nanoparticles in the section of [Dispersing agent] can also be used favorably for redispersion.

In the organic nanoparticle dispersion composition, it is possible to make the organic nanoparticles after re-dispersion (primary particles) into finely-dispersed particles and adjust their sizes to a range of preferably 1 to 200 nm, more preferably 2 to 100 nm, particularly preferably 5 to 50 nm. The Mv/Mn of particles after re-dispersion is preferably from 1.0 to 2.0, more preferably from 1.0 to 1.8, and particularly preferably from 1.0 to 1.5.

According to the production method of the present invention, it is possible, for example, to condense and redisperse the pigment particles contained in the organic nanoparticle dispersion composition and the colored photosensitive resin composition described later, even though they have a very small particle diameter in the nanometer size range (e.g., 10 to 100 nm). Therefore, the color filter in which the present organic nanoparticle dispersion composition or colored photosensitive resin composition is used can have high optical density, excellent uniformity at the surface, and high contrast, and allows noise reduction of images.

Further, the method according to the present invention can disperse organic nanoparticles into a state of being uniformly fined to a high degree, therefore the organic nanoparticle dispersion composition or colored photosensitive composition containing the particles can deliver high coloring density even when the film thickness is thin and can ensure, for example, reduction in color filter thickness.

By incorporating pigment having a clear tone and a high coloring power as the pigment in the organic nanoparticle dispersion composition or colored photosensitive resin composition, the resulting compositions can be used to advantage as an image forming material for production of color proof, color filter or the like.

Furthermore, since an alkali developer is used in an exposure-development process for formation of colored images, a binder soluble in an alkaline aqueous solution can be used in the organic nanoparticle dispersion composition or colored photosensitive resin composition, and thereby an environmental requirement can also be satisfied.

In the present invention, it is also possible to use an organic solvent having a moderate drying property as the solvent (a dispersing medium for the pigment) to be used in the organic nanoparticle dispersion composition or the colored photosensitive resin composition, so the requirement for the drying capability after coating can be satisfied too.

[Inkjet Ink for Color Filter]

The inkjet ink for color filter according to the present invention contains (a) organic nanoparticles, (b) a polymerizable monomer and/or a polymerizable oligomer. The inkjet ink for color filter or the colored photosensitive resin composition may contain (a) organic nanoparticles, (b) a polymerizable monomer and/or a polymerizable oligomer, (c) a binder, and (d) a photopolymerization initiator or a photopolymerization initiator system. Hereinafter, the components (a) to (d) will be described.

(a) Organic Nanoparticles

Methods for preparing organic nanoparticles are already described in detail. The content of organic nanoparticles in inkjet ink for color filter is preferably from 3 to 90 mass %, more preferably from 20 to 80 mass %, and still more preferably from 25 to 60 mass %, based on the total solids in inkjet ink for color filter (the term "total solids" used in the invention refers to summation of all ingredients but the organic solvent in the ink composition). When the content is too high, there sometimes occurs an increase in viscosity of the resultant dispersion liquid and leading to a problem in production suitability. When the content is too low, on the other hand, sufficient coloring power cannot be obtained. In order to perform a function as a coloring agent, it is preferred that the fine particles have a particle diameter of 0.1 μm or less, especially 0.08 μm or less. For the purpose of toning, the pigment fine particles according to the invention may be used in combination with pigments in common use.

(b) Polymerizable Monomer and/or Polymerizable Oligomer

The polymerizable monomer and/or the polymerizable oligomer contained in the inkjet ink for the color filter of the present invention is preferably a monomer or oligomer which has two or more ethylenically unsaturated double bonds and which undergoes addition-polymerization by irradiation with light. The polymerizable monomer and the polymerizable oligomer may be a compound having at least one addition-polymerizable ethylenically unsaturated group therein and having a boiling point of 100° C. or higher at normal pressure.

Examples thereof include: a mono functional acrylate and a monofunctional methacrylate such as dipentaerythritol hexa(meth)acrylate, polyethylene glycol mono(meth)acrylate, polypropylene glycol mono(meth)acrylate, and phenoxyethyl(meth)acrylate; polyethylene glycol di(meth)acrylate, polypropylene glycol di(meth)acrylate, trimethylolethane triacrylate, trimethylolpropane tri(meth)acrylate, trimethylolpropane diacrylate, neopentyl glycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth)acrylate, trimethylolpropane tri(acryloyloxypropyl)ether, tri(acryloyloxyethyl)isocyanurate, tri(acryloyloxyethyl)cyanurate, glycerin tri(meth)acrylate; a polyfunctional acrylate or polyfunctional methacrylate which may be obtained by adding ethylene oxide or propylene oxide to a polyfunctional alcohol such as trimethylolpropane or glycerin and converting the adduct into a (meth)acrylate. Further, another preferred examples include those compounds that are obtained by addition reaction of ethylene oxide or propylene oxide to polyfunctional alcohol, followed by (meth)acrylation, as described in formulae (1) and (2) of JP-A-10-62986.

Examples of the monomer and oligomer further include urethane acrylates as described in JP-B-48-41708, JP-B-50-6034, and JP-A-51-37193; and polyester acrylates as described in JP-A 48-64183, JP-B-49-43191, and JP-B-52-30490; polyfunctional acrylates or polyfunctional methacrylates such as an epoxy acrylate which is a reaction product of an epoxy resin and (meth)acrylic acid.

Among these, trimethylolpropane tri(meth)acrylate, pentaerythritol tetra(meth)acrylate, dipentaerythritol hexa(meth)acrylate, and dipentaerythritol penta(meth)acrylate are preferable.

Further, other than the above, "polymerizable compound B" described in JP-A-11-133600 can be mentioned as a preferable example.

These polymerizable monomers and/or polymerizable oligomers preferably have a molecular weight of 200 to 1000, and they may be used singly or as a mixture of two or more kinds thereof. The content of the polymerizable monomer or polymerizable oligomer is generally in a range of from 5 mass % to 50 mass %, preferably from 10 mass % to 40 mass %, based on the total solid content in the ink-jet ink for color filter. If this content is too large, control of development properties becomes difficult, raising problems of production suitability. If the content is too small, a curing force at the time of exposure becomes insufficient.

(c) Binder

The binder is preferably an acidic group-containing binder, and may be added during preparation of the inkjet ink for color filter or the colored photosensitive resin composition, but preferably added during preparation of the organic nanoparticle dispersion composition or during formation of the organic nanoparticles. The binder may be preferably added to both or one of the organic pigment solution and the poor solvent for forming organic pigment particles by adding thereto the organic pigment solution. It is also preferable to add a binder solution, which is independently prepared, at the time of the formation of the organic pigment particles. The binder is preferably an alkali-soluble polymer having a polar group such as a carboxylic acid group or a carboxylate group at its side chain. Examples thereof include a methacrylic acid copolymer, an acrylic acid copolymer, an itaconic acid copolymer, a crotonic acid copolymer, a maleic acid copolymer, and a partially esterified maleic acid copolymer described in, for example, JP-A-59-44615, JP-B-54-34327, JP-B-58-12577, JP-B-54-25957, JP-A-59-53836, and JP-A-59-71048. The examples further include a cellulose derivative having a carboxylic acid group, a carboxylate group or the like at its side chain. In addition to the foregoing, a product obtained by adding a cyclic acid anhydride to a polymer having a hydroxyl group can also be preferably used. In addition, particularly preferable examples of the binder include a copolymer of benzyl (meth)acrylate and (meth)acrylic acid and a multi-component copolymer of benzyl (meth)acrylate, (meth)acrylic acid, and any other monomer described in U.S. Pat. No. 4,139,391. Each of these binder polymers each having a polar group may be used alone, or may be used in combination with an ordinary film formable polymer so that they are used in a state of a composition. The binder polymer is added in an amount of generally 10 to 200 parts by mass, and preferably 25 to 100 parts by mass with respect to 100 parts by mass of the organic nanoparticles.

Further, for the purpose of improving crosslinking efficiency, a polymerizable group may be included in the side chain, and ultraviolet curing resins and thermosetting resins are also useful. Examples of the polymers containing polymerizable groups are given below, but not limited to these, provided that an alkali soluble group, such as —COOH group, —OH group, and an ammonium group, and a carbon-carbon unsaturated bond, are included therein. For example, a compound which is obtained by reacting a compound having an epoxy ring, which has a reactivity with —OH group, and a carbon-carbon unsaturated bond group, such as glycidyl acrylate, with a copolymer which is composed of a monomer having —OH group, such as 2-hydroxyethylacrylate, a monomer having —COOH group, such as methacrylic acid, and a monomer which is copolymerizable with the forgoing two types of monomers, such as an acrylic compound, a vinyl compound or the like, can be used. As the compound having a reactivity with —OH group, a compound having an acryloyl group, and an acid anhydride, and an isocyanate group, in place of the epoxy ring, can be used. Further, a reaction product which is obtained by reacting a saturated- or unsaturated-polybasic acid anhydride with a compound obtained by reacting a compound having an epoxy ring with an unsaturated carboxylic acid, such as acrylic acid, as disclosed in JP-A-6-102669 and JP-A-6-1938 can also be used. Examples of the compound which has both an alkali-soluble group, such as a —COOH group, and a carbon-carbon unsaturated group include DIANAL NR series (manufactured by Mitsubishi Rayon Co., Ltd.), PHOTOMER 6173 (—COOH group-containing polyurethane acrylic oligomer, manufactured by Diamond Shamrock Co., Ltd.), VISCOAT R-264 and KS RESIST 106 (manufactured by Osaka Organic Chemical Industry Ltd.), CYCLOMER P series and PRAXEL CF200 series (manufactured by Daicel Chemical Industries, Ltd.), EBECRYL 3800 (manufactured by Daicel-UCB Company Ltd.), and the like.

Further as the binder resin, organic macromolecule polymers having a water-soluble atomic group at a part of side chains of the polymer can be used. It is preferable that the binder resin is a linear organic macromolecule polymer miscible with a monomer and is soluble in an organic solvent and an alkaline solution (preferably one developable with a weak alkaline aqueous solution). Examples of such an alkali-soluble resin include polymers which have a carboxylic acid in a side chain, such as the methacrylic acid copolymer, the acrylic acid copolymer, the itaconic acid copolymer, the crotonic acid copolymer, the maleic acid copolymer, the partially esterified maleic acid copolymer, and the like as disclosed in, for example, JP-A-59-44615, JP-B-54-34327, JP-B-58-12577, JP-B-54-25957, JP-A-59-53836, and JP-A-59-71048. Similarly, acidic cellulose derivatives which have a carboxylic acid in a side chain are useful. In addition to these, a polymer having a hydroxyl group to which an acid anhydride is added, and the like are also useful as the aforementioned alkali-soluble resin. Specifically, benzyl(meth)acrylate/(meth)acrylic acid copolymers and multi-component copolymers of benzyl(meth)acrylate/(meth)acrylic acid/other monomer are particularly preferred among these polymers. As the above-described alkali-soluble resin, use can be made of a copolymer (hereinafter sometimes referred to as "copolymer A") composed of at least (i) at least one kind of acid component monomer selected from maleic acid anhydride (MAA), acrylic acid (AA), methacrylic acid (MA), and fumaric acid (FA), and (ii) alkylpolyoxyethylene (meth)acrylate, and (iii) benzyl (meth)acrylate.

As the combination of the components in the above-described copolymer A, a composition ratio by mass of (i) an acid component monomer, (ii) alkylpolyoxyethylene (meth)acrylate $(Acr(EO)_n: CH_3(OC_2H_4)_nOCOC(R)=CH_2)$, and (iii) benzyl(meth)acrylate (Bz(M)A) is preferably 10-25/5-25/50-85, and more preferably 15-20/5-20/60-80. Besides, a weight average molecular weight (Mw) of the above-described copolymer in terms of polystyrene, according to GPC is preferably in the range of from 3,000 to 50,000, and more preferably from 5,000 to 30,000.

If the composition ratio by mass of (i) an acid component monomer is in the above-described range, alkali solubility and dissolution properties to solvents hardly decrease. Besides, if the composition ratio by mass of (ii) alkylpolyoxyethylene (meth)acrylate $(Acr(EO)_n: CH_3(OC_2H_4)_nOCOC(R)=CH_2)$ is in the above-described range, a solution of the composition is easily spread onto a substrate, and also dispersibility of the coloring agent hardly decrease. Therefore, effects of the present invention can be effectively attained. If the composition ratio by mass of (iii) benzyl (meth)acrylate (Bz(M)A) is in the above-described range, dispersion stability of the coloring agent, solubility of the coloring agent in a composition, and alkaline development suitability of the coating film hardly decrease.

The repeating number n of polyoxyethylene (EO)n in (ii) alkylpolyoxyethylene (meth)acrylate $(Acr(EO)_n: CH_3(OC_2H_4)_nOCOC(R)=CH_2)$ is preferably in the range of from 2 to 15, more preferably from 2 to 10, and especially preferably from 4 to 10. If the repeating number n is in the above-described range, a development residue hardly generates after development with an alkaline developer. In addition, such the range can prevent generation of coating unevenness that is caused by reduction in fluidity of the composition as a coating solution. Consequently, said range can prevent deterioration in both uniformity of the coating film thickness and saving of liquid.

These binder polymers having a polar group may be used singly or in the form of a composition containing the binder polymer together with an ordinary film-forming polymer. The addition amount of the binder polymer is generally in the range of from 10 to 200 mass parts, preferably from 25 to 100 mass parts, based on 100 mass parts of organic nanoparticles.

In the case where the binder is a polymer compound, the number of acid groups in the polymer compound is not particularly limited; but the number of repeating units each having an acid group(s) is preferably 5 to 100, and more preferably 10 to 100, when the number of repeating units in one molecule is set to 100. In addition, the polymerization ratio between (1) a repeating unit derived from a compound having a carboxyl group and (2) a repeating unit derived from a compound having a carboxylate group is preferably as follows: a ratio of the repeating unit (1) is 5 to 40 mol %, a ratio of the repeating unit (2) is 40 to 90 mol %, and a ratio of a repeating unit(s) except the repeating units (1) and (2) is 25 mol % or less. In addition, the molecular weight of the alkali-soluble binder polymer compound having an acid group is preferably 3,000 to 1,000,000, more preferably 4,000 to 200,000, and particularly preferably 5,000 to 80,000.

The polymer compound having a weight-average molecular weight of 1,000 or more described above can also be used favorably, and the content thereof then is generally 15 to 50 mass %, preferably 20 to 45 mass %, with respect to the total solid matters in the inkjet ink for color filter or the colored photosensitive resin composition. If the amount of the binder is too large, viscosity of a composition becomes too high, which causes problem in production suitability. On the other hand, if the amount of the binder is too small, problems in coating film formation arise.

(d) Photopolymerization Initiator or Photopolymerization Initiator Series

Examples of the photopolymerization initiator or the photopolymerization initiator series (in the present specification, the term "photo-polymerization initiator series" means a polymerization initiating composition that exhibits a function of photo-polymerization initiation with a plurality of compounds combined with each other) that can be contained in the ink-jet ink for the color filter of the present invention include vicinal polyketaldonyl compounds disclosed in U.S. Pat. No. 2,367,660, acyloin ether compounds described in U.S. Pat. No. 2,448,828, aromatic acyloin compounds substituted by an α-hydrocarbon described in U.S. Pat. No. 2,722,512, polynuclear quinone compounds described in U.S. Pat. No. 3,046,127 and U.S. Pat. No. 2,951,758, combinations of triarylimidazole dimer and p-aminoketone described in U.S. Pat. No. 3,549,367, benzothiazole compounds and trihalomethyl-s-triazine compounds described in JP-B-51-48516, trihalomethyl-triazine compounds described in U.S. Pat. No. 4,239,850, and trihalomethyloxadiazole compounds described in U.S. Pat. No. 4,212,976. In particular, trihalomethyl-s-triazine, trihalomethyloxadiazole, and triarylimidazole dimer are preferable.

In addition, "polymerization initiator C" described in JP-A-11-133600, and oximes such as 1-phenyl-1,2-propanedion-2-(o-ethoxycarbonyl)oxime, O-benzoyl-4'-(benzmercapto)benzoyl-hexyl-ketoxime, 2,4,6-trimethylphenylcarbonyl-diphenylphosphonyloxide, and hexafluorophosphoro-trialkylphenyl phosphonium salts can also be mentioned as preferable examples.

These photopolymerization initiators and photopolymerization initiator series each may be used singly. Alternatively, a mixture of two or more selected from these photopolymerizable initiators and photopolymerization initiator series may be used. In particular, it is preferable to use two or more kinds of photopolymerizable initiators and photopolymerization initiator series. When two or more kinds of photopolymerizable initiators and photopolymerization initiator series are used, the display property, particularly evenness of display, can be improved.

As to the content of the photo-polymerization initiator and the photo-polymerization initiator series, the content thereof is generally in the range of from 0.5 to 20 mass %, preferably from 1 to 15 mass %, based on the total solid content in the ink-jet ink for color filter. If the amount of the initiator or the initiator series is too large, exposure sensitivity becomes too high, which causes difficulty in control. If the amount of the initiator or the initiator series is too small, exposure sensitivity becomes too low.

(Other Additives)
[Solvent]

In addition to the above-described components, an organic solvent may further be used in the ink-jet ink for the color filter of the present invention. There is no limitation as to the organic solvent. Examples of the organic solvent include esters, such as ethyl acetate, n-butyl acetate, isobutyl acetate, amyl formate, isoamyl acetate, isobutyl acetate, butyl propionate, isopropyl butyrate, ethyl butyrate, butyl butyrate, an alkyl ester compound, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, alkyl 3-oxypropionate compound (e.g. methyl 3-oxypropionate and ethyl 3-oxypropionate), methyl 3-methoxypropionate, ethyl 3-methoxypropionate, methyl 3-ethoxypropionate, ethyl 3-ethoxypropionate; methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, and ethyl 2-oxobutanoate; ethers, such as diethylene glycol dimethyl ether, tetrahydrofuran, ethylene glycol monomethyl ether, ethylene glycol monoethyl ether, methylcellosolve acetate, ethylcellosolve acetate, diethylene glycol monomethyl ether, and propylene glycol methyl ether acetate; ketones, such as methyl ethyl ketone, methyl isobutyl ketone, cyclohexanone, cyclohexanol, 2-heptanone, and 3-heptanone; and aromatic hydrocarbons, such as toluene and xylene. Among these solvents, as the solvent to be used in the present invention, methyl 3-ethoxypropionate, ethyl 3-ethoxypropionate, ethyl cellosolve acetate, ethyl lactate, butyl acetate, methyl 3-methoxypropionate, 2-heptanone, cyclohexanone, ethyl carbitol acetate, butyl carbitol acetate, propylene glycol methyl ether acetate and the like are preferable. These solvents may be used singly or in combination of two or more thereof.

Further, if necessary, a solvent having a boiling point of from 180° C. to 250° C. may be used. Examples of the high boiling solvent include diethyleneglycol monobutylether, diethyleneglycol monoethyletheracetate, diethyleneglycol monoethylether, 3,5,5-trimethyl-2-cyclohexene-1-on, butyl lactate, dipropyleneglycol monomethyletheracetate, propyleneglycol monomethyletheracetate, propyleneglycol diacetate, propyleneglycol-n-propyletheracetate, diethyleneglycol diethylether, 2-ethylhexylacetate, 3-methoxy-3-methylbutylacetate, γ-butyllactone, tripropyleneglycol methylethylacetate, dipropyleneglycol n-butylacetate, propyleneglycol phenyletheracetate, and 1,3-butanediol diacetate.

The content of the solvent contained in the ink-jet ink for color filter is preferably 10 to 95 mass %, to the total content of the ink-jet ink for color filter.

[Surfactant]

Conventionally used color filters had a problem that the color of each pixel was deep in order to realize a high color purity, whereby unevenness of the film thickness of pixels was directly recognized as color unevenness. For this reason, it has been desired to suppress the film thickness change, which directly influences the film thickness of pixels.

In the color filter of the present invention, the inkjet ink for color filter preferably comprises a suitable surfactant from the viewpoint of achieving a uniform film thickness and of prevention of color unevenness caused by change in the film thickness effectively.

Preferable examples of the surfactant include surfactants disclosed in JP-A-2003-337424 and JP-A-11-133600. The content of the surfactant is preferably 5 mass % or less based on the total amount of the resin composition.

[Thermal Polymerization Inhibitor]

It is preferred that the inkjet ink for the color filter of the present invention includes a thermal polymerization inhibitor. Examples of the thermal polymerization inhibitor include hydroquinone, hydroquinone monomethyl ether, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), 2-mercaptobenzimidazole, and phenothiazine. The content of the thermal polymerization inhibitor is preferably 1 mass % or less based on the total amount of the inkjet ink for the color filter.

[Dye and Pigment to be Used Supplementary]

If necessary, in addition to the aforementioned coloring agent (pigment), other coloring agents (dyes or pigments) may be added to the inkjet ink for the color filter of the present invention. When the coloring agent is a pigment, the pigment is preferably dispersed in the inkjet ink for the color filter uniformly; therefore, the particle diameter of such a pigment is preferably 0.1 µm or smaller, more preferably 0.08 µm or smaller.

Examples of the dye and pigment include the colorants disclosed in paragraph Nos. [0038] to [0040] of JP-A-2005-17716, pigments disclosed in paragraph Nos. [0068] to [0072] of JP-A-2005-361447, and coloring agents disclosed in paragraph Nos. [0080] to [0088] of JP-A-2005-17521. The content of dyes or pigments to be used supplementary is preferably 5 mass % or less based on the total amount of inkjet ink for color filter.

[Ultraviolet Absorber]

If necessary, the inkjet ink for the color filter of the present invention may include an ultraviolet absorber. Examples of the ultraviolet absorber include compounds disclosed in JP-A-5-72724, a salicylate-based ultraviolet absorber, a benzophenone-based ultraviolet absorber, a benzotriazole-based ultraviolet absorber, a cyanoacrylate-based ultraviolet absorber, a nickel-chelate-based ultraviolet absorber, and a hindered-amine-based ultraviolet absorber.

Specific examples thereof include phenyl salicylate, 4-t-butyl phenylsalicylate, 2,4-di-t-butyl phenyl-3',5'-di-t-4'-hydroxybenzoate, 4-t-butyl phenylsalicylate, 2,4-dihydroxybenzophenone, 2-hydroxy-4-methoxybenzophenone, 2-hydroxy-4-n-octoxybenzophenone, 2-(2'-hydroxy-5'-methylphenyl)benzothiazole, 2-(2'-hydroxy-3'-t-butyl-5'-methylphenyl)-5-chlorobenzotriazole, ethyl-2-cyano-3,3-diphenyl acrylate, 2,2'-hydroxy-4-methoxybenzophenone, nickel dibutyl dithiocarbamate, bis(2,2,6,6-tetramethyl-4-pyridine)-sebacate, 4-t-butyl phenylsalicylate, phenyl salicylate, 4-hydroxy-2,2,6,6-tetramethylpiperidine condensate, succinic acid-bis(2,2,6,6-tetramethyl-4-piperidenyl)-ester, 2-[2-hydroxy-3,5-bis(α,α-dimethylbenzyl)phenyl]-2H-benzotriazole, and 7-{[4-chloro-6-(diethylamino)-5-triazine-2-yl]amino}-3-phenylcoumarin. The content of the ultraviolet absorber is preferably 5 mass % or less based on the total amount of the ink-jet ink for the color filter.

In addition to the aforementioned additives, the ink-jet ink for color filter of the present invention may further include an "adhesion auxiliary" described in JP-A No. 11-133600 and other additives.

In addition to the aforementioned additives, the ink-jet ink for color filter of the present invention may further include an "adhesion auxiliary" described in JP-A No. 11-133600 and other additives.

In the ink-jet ink for the color filter of the present invention, it is preferred to control the temperature of the ink so that a deviation of viscosity of the ink would be within ±5%. The viscosity at the time of injection is preferably from 5 to 25 mPa·s, more preferably from 8 to 22 mPa·s, and especially preferably from 10 to 20 mPa·s (the viscosity used in the present specification is a value at 25° C., unless specifically indicated otherwise). In addition to setting of the above-described injection temperature, the viscosity may be adjusted by controlling the kind of components to be contained in the ink and the amount thereof. The viscosity may be measured using ordinary equipments such as a cone-and-plate-system rotational viscometer and an E type viscometer.

It is preferred that the surface tension of the ink at the time of injection be from 15 to 40 mN/m, from the viewpoint of improvement in smoothness (flatness) of the pixel (surface tension used in the present specification is a value at 23° C. unless specifically indicated otherwise). The surface tension is more preferably from 20 to 35 mN/m, and most preferably from 25 to 30 mN/m. The surface tension may be adjusted by adding surfactants and selecting the kind of solvent to be used. The surface tension may be measured according to a platinum plate method using known measuring equipments such as a surface tension-measuring device (CBVP-Z, manufactured by Kyowa Interface Science Co., Ltd.) and a full automatic balancing type electro surface tensiometer ESB-V (manufactured by Kyowa Science).

[Spraying of the Ink-Jet Ink for the Color Filter]

As a method of spraying the inkjet ink for the color filter of the present invention, it is possible to employ any of various methods such as a method of continuously spraying an electrified ink and then controlling the ink by electric field, a method of intermittently spraying an ink using a piezoelectric element, and a method of intermittently spraying an ink with utilizing bubbles generated by heating the ink.

As to the inkjet method used for forming each pixel (image element), any of ordinary methods such as a method of thermally curing an ink, a photo-curing method, and a method of previously forming a transparent image-receiving layer on a substrate, followed by stroke of ink droplets.

As an inkjet head (hereinafter sometimes simply referred to as a bead), ordinary heads, such as continuous type heads and dot-on-demand type heads can be used. Of these dot-on-demand-type heads, preferred as thermal heads are those of the type having a movable bulb for discharge as described in JP-A-9-323420. As the piezo head, use can be made of heads described in, for example, EP 277,703A and EP 278,590A. It is preferred that the head has a temperature control function so that the temperature of the ink can be managed. Specifically, it is preferred to set an injection temperature so that the viscosity at the time of injection would be within the range of from 5 to 25 mPa·s and to control the temperature of the ink so that the deviation of the viscosity would be within ±5%. It is preferred that the head operates with a drive frequency in the range of from 1 to 500 kHz.

After formation of each pixel, it is possible to set a heat step in which a thermal processing (a so-called bake processing) is performed. In the heat step, a substrate having thereon a layer photo-polymerized by light irradiation is heated in a heating machine such as an electric furnace and a drying oven, or alternatively said substrate is irradiated using an infrared lamp. The temperature and time required for heating depend on a composition of the colored photosensitive composition and the thickness of the formed layer. Generally, it is preferred to heat at a temperature of from about 120° C. to about 250° C. for a time ranging from about 10 minutes to about 120 minutes, from such the viewpoints of attaining sufficient solvent resistance, alkali resistance, and ultraviolet absorbance.

The pattern shape of the thus-formed color filter is not particularly limited. Accordingly, it may be a stripe shape, which is a general black matrix shape, or a lattice shape, or a delta configuration shape.

In the present invention, it is preferred to use a preparation method in which a barrier rib is formed prior to the image element-forming step using an inkjet ink for color filter, and then the ink is supplied to a portion surrounded with the barrier rib. The barrier rib is not particularly limited. However, in the case where a color filter is formed, it is preferred to use a barrier rib having a black matrix function and a light shielding effect thereinafter, such the barrier rib is simply referred to as "barrier rib"). The barrier rib may be prepared by the same materials and according to the same method as ordinary black matrixes for color filter. Examples of the black matrix include those described in paragraph Nos. [0021] to [0074] of JP-A-2005-3861 and paragraph Nos. [0012] to [0021] of JP-A-2004-240039, and black matrixes for inkjet described in paragraph Nos. [0015] to [0020] of JP-A-2006-17980 and paragraph Nos. [0009] to [0044] of JP-A-2006-10875.

[Coating Film of the Colored Photosensitive Resin Composition]

The above-described colored photosensitive resin composition may be used to form a coating film. The thickness of the coating film may be property determined. However, the thickness is preferably in the range of from 0.5 μm to 5.0 μm, and more preferably from 1.0 μm to 3.0 μm. In the coating film formed using the colored photosensitive resin composition, a polymerized coating of the colored photosensitive resin composition may be formed by polymerizing the (c) monomer or oligomer incorporated in the composition, thereby to prepare a color filter having the thus-formed polymerized coating. (A preparation of the color filter will be described later.) Polymerization of the polymerizable monomer or polymerizable oligomer may be performed by causing the (d) photo-polymerization initiator or photo-polymerization initiator series to act by irradiation of light.

(Slit Nozzle)

The aforementioned coating film can be formed by coating the colored photosensitive resin composition by a general coating method, followed by drying. In the present invention, it is preferred that the colored photosensitive resin composition be coated by using a slit nozzle having a slit at a portion through which the coating liquid is discharged. Specifically, slit nozzles and slit coaters described in JP-A-2004-89851, JP-A-2004-17043, JP-A-2003-170098, JP-A-2003-164787, JP-A-2003-10767, JP-A-2002-79163, and JP-A-2001-310147 are preferably used.

As a method of coating the colored photosensitive resin composition on a substrate, a spin coating is excellent in such the point that a thin film of 1 μm to 3 μm can be uniformly coated with high precision. Therefore, the spin coating can be widely and generally used for preparation of color filters. In recent yeas, however, it is required to further improve production efficiency and production cost in accordance with inclination to large-sized liquid crystal display devices and mass production thereof. Therefore, the slit coating, which is more suited for coating on a wide and large area substrate than the spin coating, has been adopted in production of color filters. Besides, the slit coating is superior to the spin coating from the viewpoint of saving of liquid to be used; and the slit coating can obtain a uniform coating from a lesser coating amount.

The slit coating is a coating method characterized by the steps of using a coating head having a slit (gap) of a width of several ten microns at a tip and having a length corresponding to the coating width of a rectangular substrate, and moving the substrate and/or the coating head at a definite relative speed, while maintaining a clearance (gap) between the substrate and the coating head at a distance of from several ten microns to several hundred microns, and coating on the substrate a coating liquid fed from the slit in a predetermined discharge amount. The slit coating has such advantages as follows: (1) a liquid loss is less than a spin coating; (2) a workload at the time of conducting a wash processing is reduced because no coating liquid would be spattered; (3) no contamination (re-inclusion) owing to the spattered liquid component to a coating film would be caused; (4) a tact time is shortened because no dwell time to start up spinning is necessary; (5) it easily coats a large-sized substrate; and the like. From these advantages, the slit coating is suitable to production of a color filter for a large-sized-screen liquid crystal display device, and the slit coating has been expected as a coating method that is also useful for reduction in a coating amount of the liquid.

A coating film of much larger area can be formed by the slit coating than the spin coating. Therefore, it is necessary to keep a certain degree of relative speed between a coater and a material to be coated at the time when a coating liquid is discharged from a wide slit exit. For this reason, a good fluidity is required to a coating liquid used for the slit coating method. Further, it is particularly required for the slit coating to maintain various conditions of the coating liquid fed from a slit of the coating head to a substrate constant over the entire coating width. If solution physical properties such as fluidity and viscoelastic properties of the coating liquid are insufficient, a coating unevenness easily occurs, so that it becomes difficult to keep a coating thickness constant toward the direction of a coating width. Consequently, the coating unevenness causes such the problem that it is difficult to obtain a uniform coating.

In view of the above, various studies on improvement of fluidity and viscoelastic properties of the coating liquid have been made in order to obtain a uniform coating film with no unevenness. As mentioned above, many means have been proposed such as reduction in molecular weight of a polymer, selection of a polymer excellent in solubility in a solvent, selection from various solvents in order to control an evaporation rate, and application of a surfactant. However, these means were not satisfactory to improve the above-described problems.

[Photosensitive Resin Transfer Material]

Next, the photosensitive resin transfer material of the present invention is described below.

The photosensitive resin transfer material of the present invention is preferably formed by using the photosensitive resin transfer material as described in JP-A-5-72724, that is a composite film. The structure of the composite film may be, for example, a lamination in which a temporary support, a thermoplastic resin layer, an intermediate layer, a photosensitive resin layer, and a protective film are disposed in this order. The photosensitive resin transfer material according to the present invention is a material having a photosensitive resin layer provided by using the colored photosensitive resin composition described above.

(Temporary Support)

In the photosensitive resin transfer material of the present invention, it is necessary that the temporary support has flexibility and does not remarkably deform, shrink, or elongate even under pressure or under pressure and heat. Examples of such a temporary support include a polyethylene terephthalate film, a cellulose triacetate film, a polystyrene film, and a polycarbonate film. Among them, a biaxially-stretched polyethylene terephthalate film is particularly preferable.

(Thermoplastic Resin Layer)

The component used in the thermoplastic resin layer is preferably an organic polymer substance described in JP-A-5-72724. The substance can be preferably selected from organic polymer substances having a softening point of about 80° C. or lower according to the Vicat method (specifically, the method of measuring a polymer softening point according to American Material Test Method ASTMD 1235). Specifically, the substance may be an organic polymer, and examples thereof include: a polyolefin such as polyethylene or polypropylene; an ethylene copolymer such as a copolymer of ethylene and vinyl acetate or a saponified product thereof; a copolymer of ethylene and acrylic acid ester or a saponified product thereof, polyvinyl chloride; a vinyl chloride copolymer such as a copolymer of vinyl chloride and vinyl acetate or a saponified product thereof; polyvinylidene chloride; a vinylidene chloride copolymer; polystyrene; a styrene copolymer such as a copolymer of styrene and (meth)acrylic acid ester or a saponified product thereof; polyvinyl toluene; a vinyltoluene copolymer such as a copolymer of vinyltoluene and (meth)acrylic acid ester or a saponified product thereof; poly(meth)acrylic acid ester; a (meth)acrylic acid ester copolymer such as a copolymer of butyl (meth)acrylate and vinyl acetate; and a polyamide resin such as a vinyl acetate copolymer nylon, a copolymerized nylon, N-alkoxymethylated nylon, and N-dimethylaminated nylon.

(Intermediate Layer)

In the photosensitive resin transfer material of in the present invention, it is preferable to provide an intermediate layer so as to prevent mixing of components during application of a plurality of coating layers and during storage after the application. The intermediate layer is preferably an oxygen blocking film having oxygen blocking function described as "a separating layer" in JP-A-5-72724. By using such an oxygen blocking film, the exposure sensitivity is heightened, the time load of the exposing machine is decreased, and the productivity is improved.

The oxygen blocking film is preferably a film with a low oxygen permeability and is dispersible or soluble in water or an aqueous alkaline solution. Such a film may be properly selected from ordinary oxygen blocking films. Among them, a combination of polyvinyl alcohol and polyvinylpyrrolidone is particularly preferable.

(Protective Film)

It is preferable to provide a thin protective film on a photosensitive resin layer in order to protect the photosensitive resin layer from pollution or damage at storage. The protective film may comprise a material which is the same as or similar to that of the temporary support, but the protective film should be easily separated from the photosensitive resin layer. The protective film material may be, for example, silicone paper, polyolefin sheet or polytetrafluoroethylene sheet.

(Method of Producing of the Photosensitive Resin Transfer Material)

The photosensitive resin transfer material of the present invention can be prepared by: coating a temporary support with a coating liquid (coating liquid for thermoplastic resin layer) in which additives for a thermoplastic resin layer are dissolved and drying the coating liquid to form a thermoplastic resin layer; and then coating the thermoplastic resin layer with a coating liquid for intermediate layer containing a solvent which does not dissolve the thermoplastic resin layer, and drying the coating liquid for intermediate layer; and then, coating the intermediate layer with a coating liquid for photosensitive resin layer containing a solvent which does not dissolve the intermediate layer, and drying the coating liquid for photosensitive resin layer.

Alternatively, the photosensitive resin transfer material may be prepared by: preparing a sheet in which a thermoplastic resin layer and an intermediate layer are disposed on the aforementioned temporary support, and a sheet in which a photosensitive resin layer is disposed on a protective film, and adhering the sheets to each other such that the intermediate layer and the photosensitive resin layer contact each other. The photosensitive resin transfer material may also be prepared by: preparing a sheet in which a thermoplastic resin layer is disposed on the aforementioned temporary support, and a sheet in which a photosensitive resin layer and an intermediate layer are disposed on a protective film, and adhering the sheets to each other such that the thermoplastic resin layer and the intermediate layer contact each other.

In the photosensitive resin transfer material of the present invention, the thickness of the photosensitive resin layer is preferably 1.0 to 5.0 µm, more preferably 1.0 to 4.0 µm, and particularly preferably 1.0 to 3.0 µm. The thicknesses of respective layers are not limited to the above ranges. In general, the thickness of the temporary support is preferably 15 to 100 µm, the thickness of the thermoplastic resin layer is preferably 2 to 30 µm, the thickness of the intermediate layer is preferably 0.5 to 3.0 µm) and the thickness of the protective film is preferably 4 to 40 µm.

The coating operation in the production method above may be carried out, for example, with a common coating apparatus. However, in the present invention, it is preferably performed with a coating apparatus (slit coater) having a slit nozzle, as explained in the previous section of [Coating film of colored photosensitive resin composition]. Preferable examples of the slit coater are as described above.

[Color Filter]

The color filter of the present invention may be used as a color filter excellent in contrast. The term "contrast" used in the present specification means a ratio of the amount of transmitted light when polarization axes are parallel to the amount of transmitted light when polarization axes are perpendicular, with respect to a color filter placed between two polarizing plates (see, for example, The 7th Color Optics Conference 1990; Color Filter for 512-color 10.4"-size TFT-LCD; Ueki, Koseki, Fukunaga, Yamanaka).

The color filter having a high contrast enables enlarging a discrimination of brightness at the time when the color filter is combined with a liquid crystal. Therefore, the high contrast is a very important performance in enhancing replacement of CRTs by liquid crystal display devices. The contrast of the color filter according to the present invention is, if it is a monochromatic type, preferably 3,000 or more, more preferably 5,000 or more, and especially preferably 7,000 or more. With respect to a color filter having R pixel, G pixel, and B pixel, and, if necessary, further provided with a black matrix, the contrast is preferably 3,000 or more, more preferably 5,000 or more, and especially preferably 6,000 or more. The present invention is characterized in that such a high contrast can be realized thereby.

In the case where the color filter of the present invention is used as a color filter for a television monitor, the difference (ΔE) between the chromaticity of the red (R) photosensitive resin layer measured under a F10 light source and the target chromaticity for red shown in the following table, the difference (ΔE) between the chromaticity of the green (G) photosensitive resin layer measured under a F10 light source and the target chromaticity for green shown in the following table, the difference (ΔE) between the chromaticity of the blue (B) photosensitive resin layer measured under a F10 light source and the target chromaticity for blue shown in the following table, are each preferably 5 or less, more preferably 3 or less, still more preferably 2 or less.

|   | x | y | Y |
|---|---|---|---|
| R | 0.656 | 0.336 | 21.4 |
| G | 0.293 | 0.634 | 52.1 |
| B | 0.146 | 0.088 | 6.90 |

Herein, chromaticity in the present invention is measured by a microscopic spectrophotometer (OSP100 or 200, manufactured by Olympus Optics) and expressed in terms of xyY values of the xyz color system obtained by calculation as a result under an F10-light source at 2-degree viewing angle. In addition, the difference from the target chromaticity is expressed in terms of a color difference of a La*b* color system.

(Photosensitive Resin Layer)

The color filter of the present invention can be produced by, for example, a method of repeating, until the layers of the respective colors are provided, the process comprising: forming a photosensitive resin layer on a substrate; and exposing and developing the photosensitive resin layer. Black matrix may be introduced so as to partition the boundaries of the photosensitive resin layers, in accordance with the necessity.

In the above production method, formation of the photosensitive resin layer on a substrate may be conducted, for example, by (a) applying the respective colored photosensitive resin compositions by an ordinary coating device or by (b) using the aforementioned photosensitive resin transfer material so as to adhere the photosensitive resin layer by a laminator.

(a) Coating by Coating Apparatus

The colored photosensitive resin composition in production of the color filter according to the present invention, may be coated for example with a common coating apparatus, but in the present invention, it is preferably performed with a slit coater as described in the previous section of [Coating film of colored photosensitive resin composition]. Preferable examples of the slit coater are as described above. When the photosensitive resin layer is formed by coating, its film thickness is preferably 1.0 to 3.0 µm, more preferably 1.0 to 2.5 µm, and still more preferably 1.5 to 2.5 µm.

(b) Adhering by a Laminator

Using the photosensitive resin transfer material, the photosensitive resin layer formed into a film shape may be adhered to the substrate explained below by a heated and/or pressurized roller or flat plate by pressure adhesion or heat pressure adhesion. Specifically, laminators and laminating methods described in the following documents may be used: JP-A-7-10575, JP-A-11-77942, JP-A-2000-334936, and JP-A-2002-148794. From the viewpoint of suppression of contamination by foreign substances, it is preferable to use the method described in JP-A-7-110575. The preferred thickness of the film, when forming a photosensitive resin layer with the photosensitive resin transfer material according to the present invention, is the same as the thickness described in the section of [photosensitive resin transfer material].

(Substrate)

In the present invention, the substrate on which a color filter is to be formed may be, for example, a transparent substrate, and examples thereof include glass plates such as a soda glass plate having a silicon oxide film on its surface, a low-expansion glass, a non-alkali glass, and a quartz glass plate, and a plastic film.

By subjecting the substrate to a coupling treatment in advance, adhesion of the substrate to the colored photosensitive resin composition or the photosensitive resin transfer material can be improved. The method described in JP-A-2000-39033 is preferable as the coupling treatment. The thickness of the substrate is not particularly limited, and is preferably 700 to 1,200 μm in general, and more 500 to 1,100 μm.

(Oxygen Blocking Film)

In the color filter of the present invention, when the photosensitive resin layer is formed by application of the colored photosensitive resin composition, an oxygen blocking film may further be provided on the photosensitive resin layer, whereby the exposure sensitivity can be improved. Examples of the oxygen blocking film include the same ones as already mentioned in the description about the item of (Interlayer) of the [Photosensitive resin transfer material]. The thickness of the oxygen blocking film is not particularly limited, and the thickness is preferably 0.5 to 3.0 μm in general.

(Exposure and Development)

The color filter of the present invention can be obtained by repeating, until the resin layers of the respective colors are provided, the process comprising: arranging a predetermined mask over a photosensitive resin layer formed on a substrate; exposing the photosensitive resin layer to light from above the mask which has passed through the mask, the thermoplastic resin layer, and the intermediate layer, and then developing the photosensitive resin layer with a developer.

The light source for the exposure can be suitably selected from light sources capable of emitting lights within the wavelength region capable of curing the photosensitive resin layer (e.g. 365 nm, 405 nm, etc.). Specific examples thereof include an ultrahigh-pressure mercury lamp, a high-pressure mercury lamp, and a metal halide lamp. The exposure amount is usually about 5 to 200 mJ/cm$^2$, and preferably about 10 to 100 mJ/cm$^2$.

The developer is not particularly limited and may be an ordinary developer such as the developer described in JP-A-5-72724. The developer is preferably a developer of a type which dissolves a photosensitive resin layer; for example, a developer containing a compound with a pKa of 7 to 13 at a concentration of 0.05 to 5 mol/L is preferable. The developer may include a small amount of an organic solvent miscible with water.

Examples of the organic solvent miscible with water include methanol, ethanol, 2-propanol, 1-propanol, butanol, diacetonealcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, ε-caprolactam, and N-methylpyrrolidone. The concentration of the organic solvent is preferably 0.1 mass % to 30 mass %.

An ordinary surfactant may be further added to the developer. The concentration of the surfactant is preferably 0.01 mass % to 10 mass %.

The developing method may be an ordinary method such as paddle development, shower development, shower & spin development, or dip development.

Herein, the shower development will be explained. In the shower development, the developer is sprayed onto the exposed photosensitive resin layer with a shower, so that the uncured portion is removed. It is preferable to spray an alkaline solution having poor ability to dissolve the photosensitive resin layer by using a shower or the like before development, so as to remove the thermoplastic resin layer, the intermediate layer and the like. Further, after development, it is preferable to spray a cleaner or the like by using a shower while rubbing the surface with a brush or the like to remove the development residue.

The liquid temperature of the developer is preferably 20° C. to 40° C., and the pH of the developer is preferably 8 to 13.

In an embodiment of the present invention, at the time of the production of the color filter of the present invention, the colored photosensitive resin composition for forming a color filter are stacked to form a base, a transparent electrode is formed thereon, and protrusions for split-orientation is further provided thereon to form a spacer, as described in JP-A-11-248921 and Japanese Patent No. 3255107. This embodiment is preferable from the viewpoint of cost reduction.

When the colored photosensitive resin compositions are stacked by successive coating operations, the film thickness becomes smaller in every overlaying owing to the leveling of the coating liquid. For this reason, it is preferable to stack the four colors of K (black), R, G, and B and to provide protrusions for split-orientation thereon. On the other hand, when the transfer material having a thermoplastic resin layer is used, it is preferable to stack two or three colors since the thicknesses are maintained constant.

In order to prevent deformation of the photosensitive resin layer upon lamination by overlaying the transfer material and to maintain a constant thickness, the size of the base is preferably 25 μm×25 μm or larger, more preferably 30 μm×30 μm or larger.

[Liquid Crystal Display Device]

The liquid crystal display device of the present invention is excellent in definition such as black depth owing to the use of the color filter that is excellent in contrast according to the present invention. The liquid crystal display device of the present invention can be suitably used also as a large screen liquid crystal display device such as a display for a notebook computer and a television monitor.

[CCD Device]

The CCD device according to the present invention has a color filter containing the organic nanoparticles prepared by the production method according to the present invention. Hereinafter, components used in producing the CCD device according to the present invention will be described first.

An alkali-soluble resin used in CCD device is preferably a linear organic polymer that is soluble in organic solvents and can be developed with a weakly alkaline aqueous solution. Examples of the linear organic polymer include a polymer having a carboxylic acid on a side chain, such as a methacrylic copolymer, an acrylic copolymer, an itaconic copolymer, a crotonic copolymer, a maleic copolymer and a partially esterified maleic copolymer, described, for example, in JP-A-59-44615, JP-B-54-34327, JP-B-58-12577, JP-B-54-25957, JP-A-59-53836 and JP-A-59-71048, and also, an acidic cellulose derivative having a carboxylic acid on a side chain is useful. Particularly favorable among such resins are multi-component copolymers such as benzyl (meth)acrylate/(meth) acrylic acid copolymer and benzyl (meth)acrylate/(meth) acrylic acid/other monomer copolymer. In addition, water-soluble polymers such as 2-hydroxyethyl methacrylate, polyvinylpyrrolidone, polyethyleneoxide and polyvinylalcohol are also favorable.

Other examples include the polymers described in JP-A-7-140654 such as 2-hydroxypropyl (meth)acrylate/polystyrene macromonomer/benzyl methacrylate/methacrylic acid copolymer, 2-hydroxy-3-phenoxypropyl acrylate/polymethyl methacrylate macromonomer/benzyl methacrylate/methacrylic acid copolymer, 2-hydroxyethyl methacrylate/polystyrene macromonomer/methyl methacrylate/methacrylic acid copolymer, and 2-hydroxyethyl methacrylate/polystyrene macromonomer/benzyl methacrylate/methacrylic acid copolymer. The amount of the alkali-soluble resin added to the curing composition is preferably 5 to 90 mass %, more preferably 10 to 60 mass %, with respect to the total mass of the composition.

As the polymerizable monomer, compounds having an ethylenically unsaturated group, that have at least one addition polymerizable ethylene group and have a boiling point of 100° C. or higher at normal pressure, are preferable.

Examples of the compounds having at least one addition-polymerizable ethylenically unsaturated group and having a boiling point of 100° C. or higher at normal pressure include monofunctional acrylates or methacrylates such as polyethylene glycol mono(meth)acrylate, polypropylene glycol mono(meth)acrylate, and phenoxyethyl(meth)acrylate; and polyfunctional acrylates or methacrylates such as polyethylene glycol di(meth)acrylate, trimethylolethane tri(meth)acrylate, neopentyl glycol di(meth)acrylate, pentaerythrtol tri(meth)acrylate, pentaerythritol tetra(meth)acrylate, dipentaerythritol hexa(meth)acrylate, hexanediol(meth)acrylate, trimethylolpropane tri(acryloyloxypropyl)ether, tri(acryloyloxyethyl)isocyanurate, compounds obtainable by adding ethylene oxide or propylene oxide to a polyfunctional alcohol (e.g., glycerin or trimethylolethane) and then (meth) acrylating the resultant adduct, urethane acrylates as described in JP-B-48-41708, JP-B-50-6034 and JP-A-51-37193, polyester acrylates described in JP-A-48-64183, JP-B-49-43191 and JP-B-52-30490, and epoxy acrylates obtained as a reaction product between an epoxy resin and (meth)acrylic acid. In addition, photo-curable monomers and oligomers as described in Journal of the Adhesion Society of Japan, Vol. 20, No. 7, pages 300-308 are also useful.

The compounds represented by the following Formula (B-1) or (B-2) can also be used.

[Chemical formula 75]

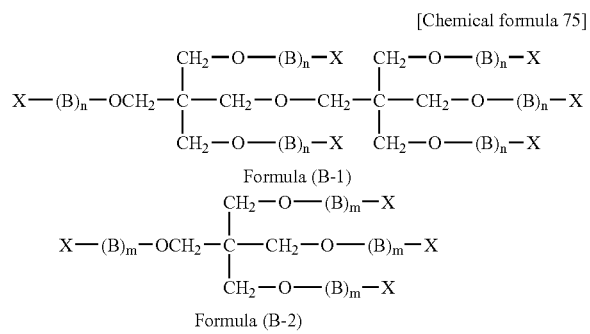

Formula (B-1)

Formula (B-2)

{In formulae (B-1) and (B-2), each B independently represents —(CH$_2$CH$_2$O)— or —(CH$_2$CH(CH$_3$)O)—; each X independently represents an acryloyl group, a methacryloyl group or a hydrogen atom, and the total number of the acryloyl and methacryloyl groups in formula (B-1) is 5 or 6, and that in Formula (B-2) is 3 or 4; each n independently represents an integer of 0 to 6, and the total of n's is 3 to 24; each n independently represents an integer of 0 to 6, and the total of m's is 2 to 16}.

These polymerizable monomers may be used in combination at any ratio, if the composition forms an adhesive coating film by irradiation of radiation ray. The content thereof is normally 5 to 90 mass %, preferably 10 to 50 mass %, with respect to the total solid matter in the composition.

Various dyes or inorganic or organic pigments may be used alone or in combination of two or more as the coloring agent.

The dye is not particularly limited, and any known dye used for color filters may be used. Specific examples thereof include dyes as described in JP-A-64-90403, JP-A-64-91102, JP-A-1-94301, JP-A-6-11614, Japanese Patent No. 2592207, U.S. Pat. No. 4,808,501, U.S. Pat. No. 5,667,920, U.S. Pat. No. 5,059,500, U.S. Pat. No. 5,667,920, JP-A-5-333207, JP-A-6-35183, JP-A-6-51115 and JP-A-6-194828. Dyes in various chemical structures such as pyrazole azo dyes, anilino azo dyes, triphenylmethane dyes, anthraquinone dyes, benzylidene dyes, oxonol dyes, pyrazolotriazole azo dyes, pyridone azo dyes, cyanine dyes, phenothiazine dyes, pyrrolo pyrazole azomethine dyes are used favorably. In particular, because the curing composition is curable at relatively lower temperature, it is possible to avoid problems of decomposition of dye when the film is exposed to high temperature during post-baking for providing the hardened film with durability, even when a dye lower in heat resistance than pigments is used.

Examples of the inorganic pigments include metal compounds such as metal oxides and metal complex salts, and specific examples thereof include metal oxides of iron, cobalt, aluminum, cadmium, lead, copper, titanium, magnesium, chromium, zinc, antimony and the like, and the mixed metal oxides thereof.

Examples of the organic pigments include C.I. Pigment Yellows 11, 24, 31, 53, 83, 85, 99, 108, 109, 110, 138, 139, 150, 151, 154, 167 and 185, C.I. Pigment Oranges 36, 38, 43 and 71, C.I. Pigment Reds 105, 122, 149, 150, 155, 171, 175, 176, 177, 209, 224, 242 and 254, C.I. Pigment Violets 19, 23, 32 and 39, C.I. Pigment Blues 1, 2, 15, 16, 22, 60, 66, 15:3 and 15:6, C.I. Pigment Greens 7, 36 and 37, C.I. Pigment Browns 25 and 28, C.I. Pigment Blacks 1 and 7, carbon black, and the like.

These organic pigments may be used alone or in combination, for improvement in color purity. Typical examples thereof are shown below. As the red pigment, an anthraquinone pigment, a perylene pigment, or a mixture thereof with at least one disazo yellow pigment or an isoindoline yellow pigment is used. An example of the anthraquinone pigment is C.I. Pigment Red 177, and an example of the perylene pigment is C.I. Pigment Red 155; and a mixture thereof with C.I. Pigment Yellow 83 or C.I. Pigment Yellow 139 is favorable, from the point of color reproducibility. The mass ratio of the red pigment to the yellow pigment is preferably 100:5 to 100:50. Favorably in the range above, it is possible to reduce the light transmittance of a light at a wavelength of 400 nm to 500 nm and raise the color purity.

As the green pigment, a halogenated phthalocyanine pigment or a mixture thereof with a disazo yellow pigment, a quinophtharone yellow dye, or an isoindoline yellow pigment is used favorably. For example, a mixture of C.I. Pigment Green 7, 36 or 37 and C.I. Pigment Yellow 83, 138 or 139 is favorable. The mass ratio of the green-pigment to the yellow pigment is preferably 100:5 to 100:100. Favorably in the range above, it is possible to reduce the light transmittance of a light at a wavelength of 400 nm to 450 nm and raise the color purity.

Examples of the blue pigments include phthalocyanine pigments, or the combination thereof with a dioxazine-series purple pigment. The combination is preferably C.I. Pigment blue 15:6 and C.I. Pigment Violet 23. The mass ratio of the blue pigment to the purple pigment is preferably 100:0 to 100:50. Favorably in the range above, it is possible to reduce the light transmittance of a light at a wavelength of 400 nm to 420 nm and raise the color purity.

In addition, it is possible to obtain a pigment-containing photosensitive resin excellent in dispersibility and dispersion stability, by using a powdery processed pigment, i.e., a pigment finely dispersed in an acrylic resin, maleic resin, vinyl chloride-vinyl acetate copolymer, ethylcellulose resin, or the like.

Alternatively, carbon, titanium oxide, iron oxide, or a mixture thereof is used favorably as the pigment for black matrix, and carbon or titanium oxide is preferable. The mass ratio is preferably in the range of 100:5 to 100:40. In the range above, the light transmittance of a light at longer wavelength is smaller, and the dispersion stability is excellent.

Examples of the solvent include esters, such as ethyl acetate, n-butyl acetate, isobutyl acetate, amyl formate, isoamyl acetate, isobutyl acetate, butyl propionate, isopropyl butyrate, ethyl butyrate, butyl butyrate, an alkyl ester compound, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, alkyl 3-oxypropionate compound (e.g. methyl 3-oxypropionate and ethyl 3-oxypropionate), methyl 3-methoxypropionate, ethyl 3-methoxypropionate, methyl 3-ethoxypropionate, ethyl 3-ethoxypropionate; methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, and ethyl 2-oxobutanoate; ethers, such as diethylene glycol dimethyl ether, tetrahydrofuran, ethylene glycol monomethyl ether, ethylene glycol monoethyl ether, methylcellosolve acetate, ethylcellosolve acetate, diethylene glycol monomethyl ether, diethylene glycol monoethyl ether, diethylene glycol monobutyl ether, propylene glycol methyl ether acetate, propylene glycol ethyl ether acetate, and propylene glycol propyl ether acetate; ketones, such as methyl ethyl ketone, cyclohexanone, 2-heptanone, and 3-heptanone; and aromatic hydrocarbons, such as toluene and xylene.

In particular, methyl 3-ethoxypropionate, ethyl 3-ethoxypropionate, ethyl cellosolve acetate, ethyl lactate, diethylene glycol dimethylether, butyl acetate, methyl 3-methoxypropionate, 2-heptanone, cyclohexanone, ethylcarbitol acetate, butylcarbitol acetate, propylene glycol methylether acetate, and the like are used favorably. The amount of the solvent added to the composition is normally 60 to 90 mass %, preferably 70 to 90 mass %.

These solvent may be used alone or in combination of two or more.

A sensitizer may be used in combination. Examples thereof include 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, benzyl, dibenzylacetone, p-(dimethylamino)phenyl styryl ketone, p-(dimethylamino)phenyl-p-methyl styryl ketone, benzoanthrone, and a benzothiazole-series compound described in JP-B-51-48516.

It can be prepared by mixing and dispersing the major components and other additives added as needed in a mixer or dispersing machine of various kinds.

The color filters for CCD devices are generally produced in the following manner. A color filter is obtained by preparing hardened layers in respective colors (3 or 4 colors) by repeating the following steps sequentially: a step of coating and drying a composition according to the present invention (color resist solution) on a substrate, a step of pattern-exposing the obtained, dried coating film with an i-ray stepper, a step of developing the film with alkali after exposure, and a step of heat-treating the resulting film.

More specifically, the curing composition above is coated on a suitable substrate to a dry film thickness of generally 0.1 to 5 µm, preferably 0.2 to 2 µm with a spinner or the like, and left in an oven at 85° C. for 2 minutes, to give a smooth coating film.

The substrate is not particularly limited, and examples thereof include glass plate, plastic plates, aluminum plate, electronic part base materials such as silicon wafer for image sensor, transparent resin plate, resin film, cathode-ray-tube-display screen, light-receiving surfaces of image-receiving tube, wafers formed with a solid-state image pickup device such as CCD, BBD, CID, and BASIS; adhesive image sensors of thin film semiconductor; liquid crystal display surface, color electrophotographic photosensitive drum, substrates for electrochromic (EC) display devices, and the like. The substrate is preferably subjected to a high-adherence treatment in order to improve adhesiveness to the color filter layer. Specifically, such treatment is achieved by coating a thin layer of a silane-coupling agent on the substrate followed by patterning of the curing composition, or a silane-coupling agent may be added to the curing composition in advance.

If there is level difference on the substrate surface, a smoothing film may be formed on the substrate for smoothing the surface and eliminating the level difference, and then, the curing composition according to the present invention be coated thereon. For example, image sensors such as CCD have a photoelectron converting unit (photodiode) generating electron according to the intensity of the light irradiated, on the silicon substrate, and a read-out gate unit outputting the generated electron; and, because irradiation on the read-out gate unit may cause noises prohibiting accurate data output, a lightproof film layer is normally formed on the read-out gate unit, which occasionally leads to level difference with the photodiode region having no lightproof film layer. A color resist formed directly on such level difference may lead to elongation of the optical path length and thus decline in image brightness and convergence efficiency. For improvement thereof and for elimination of the level difference, a transparent smoothening film is preferably formed between the CCD and the color filter. The material for the smoothening film may be, for example, a photocuring resist solution or a thermosetting resin such as acrylic-series or epoxy-series thermosetting resin.

After coating of the photocuring composition, the film is normally prebaked, to give a dry coating film after vaporization of the solvent. Examples of the pre-baking methods include drying under reduced pressure, indirect heat drying for example with high-temperature air, direct heat drying for example with a hot plate (approximately 80 to 140° C. for 50 to 200 seconds), and the like. The pattern obtained after development is post-baked for sufficient curing and for production of a long-lasting film superior in mechanical strength.

For example, in production of a color filter in three colors, the first-formed pattern is then subjected twice to coating with a resist solution in another color, exposure, and development. The post-baking is performed for prevention of the color mixing between the resist solution coated and the partial pattern deletion caused by exposure and development. The post-baking is similar in its method to the pre-baking above, but a temperature higher than that used in pre-baking is used for an extended period. For example, the temperature is approximately 180 to 250° C., and the period approximately 0.5 to 2 hours in the case of indirect heating in an oven, while the temperature is approximately 180 to 250° C. and the period approximately 2 to 10 minutes in the case of direct heating with a hot plate.

The light source for exposure is not particularly limited, and a light source distinctively superior in pattern-forming efficiency is the i-ray of mercury lamp. The characteristics of the present invention are more evident in production of a color filter for image sensor by using the i-ray, a line spectrum of mercury lamp, from the point that the present invention is suited for such a production process; but the light source may of course be used in production of LCD.

The developing solution used in developing the curing composition is not particularly limited, and any common developing solution may be used. In particular, a developing solution containing an organic alkali salt, specifically a quaternary ammonium salt such as tetramethylammonium hydroxide (TMAH), is preferable.

Any common photopolymerization initiator may be used as the polymerization initiator. Specific examples thereof include a vicinal polyketaldonyl compound described in U.S. Pat. No. 2,367,660, α-carbonyl compounds described in U.S. Pat. Nos. 2,367,661 and 2,367,670, an acyloin ether described in U.S. Pat. No. 2,448,828, an aromatic acyloin compound substituted with an α-hydrocarbon described in U.S. Pat. No. 2,722,512, a multinuclear quinone compound described in U.S. Pat. Nos. 3,046,127 and 2,951,758, a combination of a triaryllimidazole dimer and p-aminophenyl ketone described in U.S. Pat. No. 3,549,367, and a benzothiazole-series compound/trihalomethyl-s-triazine-series compound described in JP-B-51-48516.

The content of the photopolymerization initiator (including the common photopolymerization initiator) in the dye-containing negative-type curing composition is preferably 0.01 to 50 mass %, more preferably 1 to 30 mass %, and particularly preferably 1 to 20 mass %, with respect to the total solid matter (by mass) of the radical polymerizable monomer. When the content is in the above range, the composition can be polymerized and hardened sufficiently and would not cause a situation where the polymerization hardly proceeds or a situation where the resultant polymer have an increased polymerization rate but a decreased molecular weight, therefore resulting in weakened film strength.

The photopolymerization initiator may be used in combination with a sensitizer and a photostabilizer.

Examples thereof include benzoin, benzoin methyl ether, 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, xanthone, 2-methylxanthone, 2-methoxyxanthone, 2-ethoxyxanthone, thioxanthone, 2,4-diethylthioxanthone, acridone, 10-butyl-2-chloroacridone, benzyl, dibenzylacetone, p-(dimethylamino)phenyl styryl ketone, p-(dimethylamino)phenyl-p-methyl styryl ketone, benzophenone, p-(dimethylamino) benzophenone (or Michler's ketone), p-(diethylamino) benzophenone, benzoanthrone, a benzothiazole-series compound described in JP-B-51-48516, and TINUVIN 1130 and TINUVIN 400.

According to the production method of the present invention, it is possible to obtain organic nanoparticles fined into a nanometer size order efficiently and also possible to obtain organic nanoparticles having a nanometer size and being higher in monodispersity in a controlled manner. Also according to the production method of the present invention, it is possible, in preparation of an organic particle dispersion, to obtain nanoparticles in a concentrated state as needed, and also possible to obtain organic nanoparticles which would be efficiently made into a dispersed state from the state of aggregate particles in a concentrated liquid. Further, according to the production method of the present invention, it is possible to produce organic nanoparticles and the dispersion thereof suitable as a coating solution for color filter or as an inkjet ink in the industrial scale. In addition, the color filter containing the organic nanoparticles according to the present invention is higher in color purity and contrast and also excellent in weather resistance, and thus, the liquid crystal display device using the same is advantageously excellent in blackness and color reproducibility and improved in display irregularity.

The present invention will be described in more detail based on examples given below, but the invention is not meant to be limited by these.

EXAMPLES

Example 1

Examples Using a Pyrrolopyrrole Compound Pigment and an Acidic Group-Containing Polymer Compound Example 1-1

A 15-mmol/L pigment solution was prepared by dissolving a pigment (Pigment Red 254) in a solution prepared by mixing 1-methyl-2-pyrrolidone and a 1-mol/L aqueous sodium hydroxide solution at a ratio of 6:1 (mass ratio). Water was separately provided as a poor solvent.

100 ml of the pigment solution was injected at a flow rate of 50 ml/min by using an NP-KX-500 large-volume nonpulsating pump manufactured by Nihon Seimitsu Kagaku Co., Ltd. into 1,000 ml of the water as the poor solvent whose temperature had been controlled to 1° C. and which had been stirred with a GK-0222-10 Ramond stirrer manufactured by Fujisawa Pharmaceutical Co., Ltd. at 500 rpm, whereby an organic pigment particle dispersion was prepared.

The particle diameter and degree of monodispersion of the thus-prepared organic particle dispersion were measured with a Nanotrac UPA-EX 150 manufactured by NIKKISO Co., Ltd. As a result, the dispersion had a number average particle diameter of 31 μm and a degree of monodispersion of 1.40.

To the prepared organic pigment particle dispersion (having a pigment particle concentration of about 0.05 mass %), was added 500 ml of 2-(1-methoxy)propylacetate, and the whole was stirred at 25° C. for 10 minutes at 500 rpm. After that, the resultant was left standing for 1 day, and pigment particles were extracted to a 2-(1-methoxy)propylacetate phase, whereby a concentrated extract liquid was obtained.

The concentrated extract liquid containing the extracted pigment particles was filtered by using an FP-010 filter manufactured by SUMITOMO ELECTRIC FINE POLYMER INC., whereby a paste-like concentrated pigment liquid [I] (having a pigment particle concentration of 30 mass %) was obtained.

An organic particle dispersion [I] having the following composition according to the present invention was prepared by using the above paste-like concentrated pigment liquid [I].

| Paste-like concentrated pigment liquid [I] | 21.3 g |
|---|---|
| Pigment-dispersing agent A (Exemplified compound (7.), one of the compounds represented by formula (D1)) | 0.6 g |
| Methacrylic acid/benzyl methacrylate copolymer* | 15.8 g |
| 1-Methoxy-2-propylacetate | 42.3 g |

*Copolymerization molar ratio 28/72, weight average molecular weight: 30,000, 40 mass % 1-methoxy-2-propylacetate solution The organic particle dispersion [1] having the above composition was stirred with a motor mill M-50 (manufactured by Igar Japan), by using zirconia beads each having a diameter of 0.65 mm, at a circumferential speed of 9 m/s. Liquids prepared after stirring for 1 hour, 3 hours, 5 hours, 9 hours, and 15 hours were defined as Pigment Liquid Samples (1) to (5), respectively.

Film samples were produced for evaluating the performance of these pigment liquid samples. Each of Pigment Liquid Samples (1) to (5) obtained the above was applied to a glass substrate (75 mm×75 mm) with a Spin Coater 1H-D7 manufactured by MIKASA CO., LTD, and the resultant was dried with a hot plate at 100° C. for 2 minutes, whereby each of Film Samples (1) to (5) was produced.

Example 1-2

150 mmol/L of a pigment solution was prepared by dissolving a pigment (Pigment Red 254) in a solution prepared by mixing dimethyl sulfoxide and 8-mol/L aqueous solution of potassium hydroxide at a ratio of 6:1. Water was separately prepared as a poor solvent.

100 ml of the pigment solution was injected at a flow rate of 50 ml/min by using an NP-KX-500 large-volume nonpulsating pump manufactured by Nihon Seimitsu Kagaku Co., Ltd. into 1,000 ml of the water as the poor solvent whose temperature had been controlled to 1° C. and which had been stirred with a GK-0222-10 Ramond stirrer manufactured by Fujisawa Pharmaceutical Co., Ltd. at 500 rpm, whereby organic pigment particle dispersion was prepared.

The particle diameter and degree of monodispersion of the thus-prepared organic particle dispersion were measured with a Nanotrac UPA-EX 150 manufactured by NIKKISO Co., Ltd. As a result, the dispersion had a number average particle diameter of 32 nm and a degree of monodispersion of 1.41.

To the prepared organic pigment particle dispersion (having a pigment particle concentration of about 0.5 mass %), was added 500 ml of 2-(1-methoxy)propylacetate, and the whole was stirred at 25° C. for 10 minutes at 500 μm. After that, the resultant was left standing for 1 day, and pigment particles were extracted to a 2-(1-methoxy)propylacetate phase, whereby a concentrated extract liquid was obtained.

The concentrated extract liquid containing the extracted pigment particles was filtered by using an FP-010 filter manufactured by SUMITOMO ELECTRIC FINE POLYMER INC., whereby a paste-like concentrated pigment liquid [II] (having a pigment particle concentration of 35 mass %) was obtained.

| Paste-like concentrated pigment liquid [II] | 18.3 g |
|---|---|
| Pigment-dispersing agent A | 0.6 g |
| Methacrylic acid/benzyl methacrylate copolymer* | 15.8 g |
| 1-Methoxy-2-propylacetate | 45.3 g |

*Copolymerization molar ratio 28/72, weight average molecular weight: 30,000, 40 mass % 1-methoxy-2-propylacetate solution Pigment Liquid Samples (6) to (10) were obtained from the organic particle dispersion [II] having the above composition according to the present invention, in the same manner as in Example 1-1. Film Samples (6) to (10) were each prepared from Pigment Liquid Samples (6) to (10) obtained in the same manner as in Example 1-1.

Example 1-3

Pigment Liquid Samples (11) to (15) were each prepared in the same manner as in Example 1-1 except that the methacrylic acid/benzyl methacrylate copolymer was changed to 15.8 g of a methacrylic acid/benzyl methacrylate/styrene copolymer (molar ratio 27:60:13, weight average molecular weight: 28,000, 40 mass % 1-methoxy-2-propylacetate solution).

Film Samples (11) to (15) were each prepared from Pigment Liquid Samples (11) to (15) obtained in the same manner as in Example 1-1.

Example 1-4

Pigment Liquid Samples (16) to (20) were each prepared in the same manner as in Example 1-1 except that the methacrylic acid/benzyl methacrylate copolymer was changed to 15.8 g of a methacrylic acid/propyl methacrylate/styrene copolymer (molar ratio 26:62:12, weight average molecular weight: 29,000, 40 mass % 1-methoxy-2-propylacetate solution).

Film Samples (16) to (20) were each prepared from Pigment Liquid Samples (16) to (20) obtained in the same manner as in Example 1-1.

Example 1-5

Pigment Liquid Samples (21) to (25) were each prepared in the same manner as in Example 1-1 except that the methacrylic acid/benzyl methacrylate copolymer was changed to 15.8 g of a methacrylic acid/methyl methacrylate/styrene copolymer (molar ratio 25:62:13, weight average molecular weight: 30,000, 40 mass % 1-methoxy-2-propylacetate solution).

Film Samples (21) to (25) were each prepared from Pigment Liquid Samples (21) to (25) obtained in the same manner as in Example 1-1.

Example 1-6

Pigment Liquid Samples (26) to (30) were each prepared in the same manner as in Example 1-1 except that the methacrylic acid/benzyl methacrylate copolymer was changed to 15.8 g of a polyacrylic acid (weight average molecular weight: 33,000, 40 mass % 1-methoxy-2-propylacetate solution).

Film Samples (26) to (30) were each prepared from Pigment Liquid Samples (26) to (30) obtained in the same manner as in Example 1-1.

Example 1-7

Pigment Liquid Samples (31) to (35) were each prepared in the same manner as in Example 1-1 except that the methacrylic acid/benzyl methacrylate copolymer was changed to 15.8 g of a polyvinyl sulfuric acid (weight average molecular weight: 32,000, 40 mass % 1-methoxy-2-propylacetate solution). Film Samples (31) to (35) were each prepared from Pigment Liquid Samples (31) to (35) obtained in the same manner as in Example 1-1.

Example 1-8

Pigment Liquid Samples (36) to (40) were each prepared in the same manner as in Example 1-1 except that the methacrylic acid/benzyl methacrylate copolymer was changed to 15.8 g of a polyvinyl alcohol (weight average molecular weight: 31,000, 40 mass % 1-methoxy-2-propylacetate solution).

Film Samples (36) to (40) were each prepared from Pigment Liquid Samples (36) to (40) obtained in the same manner as in Example 1-1.

Example 1-9

Pigment Liquid Samples (41) to (45) were each prepared in the same manner as in Example 1-1 except that the pigment-dispersing agent A was not added.

Film Samples (41) to (45) were each prepared from Pigment Liquid Samples (41) to (45) obtained in the same manner as in Example 1-1.

Example 1-10

Pigment Liquid Samples (46) to (50) were each prepared in the same manner as in Example 1-1 except that the methacrylic acid/benzyl methacrylate copolymer was changed to a methacrylic acid/benzyl methacrylate copolymer (copolymerization molar ratio 28/72, weight average molecular weight: 10,000, 40 mass % 1-methoxy-2-propylacetate solution).

Film Samples (46) to (50) were each prepared from Pigment Liquid Samples (46) to (50) obtained in the same manner as in Example 1-1.

Example 1-11

Pigment Liquid Samples (51) to (55) were each prepared in the same manner as in Example 1-1 except that the methacrylic acid/benzyl methacrylate copolymer was changed to a methacrylic acid/benzyl methacrylate copolymer (copolymerization molar ratio 28/72, weight average molecular weight: 4,000, 40 mass % 1-methoxy-2-propylacetate solution).

Film Samples (51) to (55) were each prepared from Pigment Liquid Samples (51) to (55) obtained in the same manner as in Example 1-1.

Comparative Example 1

Comparative example 1-1

Pigment Liquid Samples (56) to (60) were each prepared in the same manner as in Example 1-1 except that the paste-like concentrated pigment liquid [I] was changed to 6.4 g of Pigment Red 254 (powder sample) and the amount of 1-methoxy-2-propylacetate was changed to 57.2 g. Film Samples (56) to (60) were each prepared from Pigment Liquid Samples (56) to (60) obtained in the same manner as in Example 1-1.

Comparative Example 1-2

Pigment Liquid Samples (61) to (65) were each prepared in the same manner as in Example 1-1 except that the methacrylic acid/benzyl methacrylate copolymer was not added. The preparation of Film Samples (61) to (65) was attempted from Pigment Liquid Samples (61) to (65) obtained in the same manner as in Example 1-1, but each of these Samples was not formed layer. Therefore, Film Samples (61) to (65) were not obtained.

Comparative Example 1-3

Pigment Liquid Samples (66) to (70) were each prepared in the same manner as in Example 1-1 except that the methacrylic acid/benzyl methacrylate copolymer was changed to a methacrylic acid/benzyl methacrylate copolymer (copolymerization molar ratio 28/72, weight average molecular weight: 800, 40 mass % 1-methoxy-2-propylacetate solution).

Film Samples (66) to (70) were each prepared from Pigment Liquid Samples (66) to (70) obtained in the same manner as in Example 1-1.

The viscosity of each of Pigment Liquid Samples (1) to (70) was measured with an E type viscometer (VISCONIC-ELD, manufactured by TOKI SANGYO CO., LTD.). Tables 1-1 and 1-2 show the results.

TABLE 1-1

| Sample No. | | Dispersion time (hour) | Viscosity (mPa · s) |
| --- | --- | --- | --- |
| Pigment Liquid Sample (1) | Example (1-1) | 1 | 28 |
| Pigment Liquid Sample (2) | | 3 | 28 |
| Pigment Liquid Sample (3) | | 5 | 28 |
| Pigment Liquid Sample (4) | | 9 | 28 |
| Pigment Liquid Sample (5) | | 15 | 28 |
| Pigment Liquid Sample (6) | Example (1-2) | 1 | 29 |
| Pigment Liquid Sample (7) | | 3 | 29 |
| Pigment Liquid Sample (8) | | 5 | 29 |
| Pigment Liquid Sample (9) | | 9 | 29 |
| Pigment Liquid Sample (10) | | 15 | 29 |
| Pigment Liquid Sample (11) | Example (1-3) | 1 | 30 |
| Pigment Liquid Sample (12) | | 3 | 30 |
| Pigment Liquid Sample (13) | | 5 | 30 |
| Pigment Liquid Sample (14) | | 9 | 30 |
| Pigment Liquid Sample (15) | | 15 | 30 |
| Pigment Liquid Sample (16) | Example (1-4) | 1 | 26 |
| Pigment Liquid Sample (17) | | 3 | 26 |
| Pigment Liquid Sample (18) | | 5 | 26 |
| Pigment Liquid Sample (19) | | 9 | 26 |
| Pigment Liquid Sample (20) | | 15 | 26 |
| Pigment Liquid Sample (21) | Example (1-5) | 1 | 27 |
| Pigment Liquid Sample (22) | | 3 | 27 |
| Pigment Liquid Sample (23) | | 5 | 27 |
| Pigment Liquid Sample (24) | | 9 | 27 |
| Pigment Liquid Sample (25) | | 15 | 27 |
| Pigment Liquid Sample (26) | Example (1-6) | 1 | 31 |
| Pigment Liquid Sample (27) | | 3 | 31 |
| Pigment Liquid Sample (28) | | 5 | 31 |
| Pigment Liquid Sample (29) | | 9 | 31 |
| Pigment Liquid Sample (30) | | 15 | 31 |
| Pigment Liquid Sample (31) | Example (1-7) | 1 | 35 |
| Pigment Liquid Sample (32) | | 3 | 35 |
| Pigment Liquid Sample (33) | | 5 | 35 |
| Pigment Liquid Sample (34) | | 9 | 35 |
| Pigment Liquid Sample (35) | | 15 | 35 |

TABLE 1-2

| Sample No. | | Dispersion time (hour) | Viscosity (mPa·s) |
|---|---|---|---|
| Pigment Liquid Sample (36) | Example (1-8) | 1 | 26 |
| Pigment Liquid Sample (37) | | 3 | 26 |
| Pigment Liquid Sample (38) | | 5 | 26 |
| Pigment Liquid Sample (39) | | 9 | 26 |
| Pigment Liquid Sample (40) | | 15 | 26 |
| Pigment Liquid Sample (41) | Example (1-9) | 1 | 32 |
| Pigment Liquid Sample (42) | | 3 | 32 |
| Pigment Liquid Sample (43) | | 5 | 32 |
| Pigment Liquid Sample (44) | | 9 | 32 |
| Pigment Liquid Sample (45) | | 15 | 32 |
| Pigment Liquid Sample (46) | Example (1-10) | 0.1 | 26 |
| Pigment Liquid Sample (47) | | 0.2 | 26 |
| Pigment Liquid Sample (48) | | 0.3 | 26 |
| Pigment Liquid Sample (49) | | 0.5 | 26 |
| Pigment Liquid Sample (50) | | 1 | 26 |
| Pigment Liquid Sample (51) | Example (1-11) | 1 | 30 |
| Pigment Liquid Sample (52) | | 3 | 30 |
| Pigment Liquid Sample (53) | | 5 | 30 |
| Pigment Liquid Sample (54) | | 9 | 30 |
| Pigment Liquid Sample (55) | | 15 | 30 |
| Pigment Liquid Sample (56) | Comparative example (1-1) | 1 | 26 |
| Pigment Liquid Sample (57) | | 3 | 26 |
| Pigment Liquid Sample (58) | | 5 | 26 |
| Pigment Liquid Sample (59) | | 9 | 26 |
| Pigment Liquid Sample (60) | | 15 | 26 |
| Pigment Liquid Sample (61) | Comparative example (1-2) | 1 | 30 |
| Pigment Liquid Sample (62) | | 3 | 30 |
| Pigment Liquid Sample (63) | | 5 | 30 |
| Pigment Liquid Sample (64) | | 9 | 30 |
| Pigment Liquid Sample (65) | | 15 | 100 |
| Pigment Liquid Sample (66) | Comparative example (1-3) | 1 | 26 |
| Pigment Liquid Sample (67) | | 3 | 26 |
| Pigment Liquid Sample (68) | | 5 | 26 |
| Pigment Liquid Sample (69) | | 9 | 26 |
| Pigment Liquid Sample (70) | | 15 | 26 |

Film Samples (1) to (70) were each observed with an optical microscope (at a magnification of 500). A portion measuring 175 μm by 130 μm was captured. The resultant image was divided into 1,220,000 pixels, and was evaluated for concentration variation on the basis of a coefficient of variation (=the standard deviation of a concentration/the average value for the concentration). In addition, light-scattering of each film sample was evaluated as an absorbance at 700 mm measured with an 8453 type spectrophotometer manufactured by Agilent. The absorbance of 0.02 or less is designated by ○, the absorbance of 0.02 to 0.05 is designated by Δ, and the absorbance of 0.05 or more is designated by x. Tables 1-3 and 1-4 show the results.

TABLE 1-3

| Sample No. | | Dispersion time (hour) | Variation coefficient of concentration (%) | Absorbance at 700 nm |
|---|---|---|---|---|
| Film Sample (1) | Example (1-1) | 1 | 10 | ○ |
| Film Sample (2) | | 3 | 8 | ○ |
| Film Sample (3) | | 5 | 7 | ○ |
| Film Sample (4) | | 9 | 7 | ○ |
| Film Sample (5) | | 15 | 7 | ○ |
| Film Sample (6) | Example (1-2) | 1 | 10 | ○ |
| Film Sample (7) | | 3 | 8 | ○ |
| Film Sample (8) | | 5 | 7 | ○ |
| Film Sample (9) | | 9 | 7 | ○ |
| Film Sample (10) | | 15 | 7 | ○ |
| Film Sample (11) | Example (1-3) | 1 | 10 | ○ |
| Film Sample (12) | | 3 | 8 | ○ |
| Film Sample (13) | | 5 | 7 | ○ |
| Film Sample (14) | | 9 | 7 | ○ |
| Film Sample (15) | | 15 | 7 | ○ |
| Film Sample (16) | Example (1-4) | 1 | 10 | ○ |
| Film Sample (17) | | 3 | 8 | ○ |
| Film Sample (18) | | 5 | 7 | ○ |
| Film Sample (19) | | 9 | 7 | ○ |
| Film Sample (20) | | 15 | 7 | ○ |
| Film Sample (21) | Example (1-5) | 1 | 12 | ○ |
| Film Sample (22) | | 3 | 10 | ○ |
| Film Sample (23) | | 5 | 9 | ○ |
| Film Sample (24) | | 9 | 7 | ○ |
| Film Sample (25) | | 15 | 7 | ○ |
| Film Sample (26) | Example (1-6) | 1 | 15 | ○ |
| Film Sample (27) | | 3 | 12 | ○ |
| Film Sample (28) | | 5 | 10 | ○ |
| Film Sample (29) | | 9 | 8 | ○ |
| Film Sample (30) | | 15 | 7 | ○ |
| Film Sample (31) | Example (1-7) | 1 | 17 | ○ |
| Film Sample (32) | | 3 | 13 | ○ |
| Film Sample (33) | | 5 | 10 | ○ |
| Film Sample (34) | | 9 | 9 | ○ |
| Film Sample (35) | | 15 | 8 | ○ |

TABLE 1-4

| Sample No. | | Dispersion time (hour) | Variation coefficient of concentration (%) | Absorbance at 700 nm |
|---|---|---|---|---|
| Film Sample (36) | Example (1-8) | 1 | 20 | Δ |
| Film Sample (37) | | 3 | 15 | ○ |
| Film Sample (38) | | 5 | 11 | ○ |
| Film Sample (39) | | 9 | 9 | ○ |
| Film Sample (40) | | 15 | 9 | ○ |
| Film Sample (41) | Example (1-9) | 1 | 10 | ○ |
| Film Sample (42) | | 3 | 9 | ○ |
| Film Sample (43) | | 5 | 7 | ○ |
| Film Sample (44) | | 9 | 7 | ○ |
| Film Sample (45) | | 15 | 7 | ○ |
| Film Sample (46) | Example (1-10) | 1 | 10 | ○ |
| Film Sample (47) | | 3 | 8 | ○ |
| Film Sample (48) | | 5 | 7 | ○ |
| Film Sample (49) | | 9 | 7 | ○ |
| Film Sample (50) | | 15 | 7 | ○ |
| Film Sample (51) | Example (1-11) | 1 | 12 | ○ |
| Film Sample (52) | | 3 | 10 | ○ |
| Film Sample (53) | | 5 | 8 | ○ |
| Film Sample (54) | | 9 | 7 | ○ |
| Film Sample (55) | | 15 | 7 | ○ |
| Film Sample (56) | Comparative example (1-1) | 1 | 30 | X |
| Film Sample (57) | | 3 | 28 | X |
| Film Sample (58) | | 5 | 25 | Δ |
| Film Sample (59) | | 9 | 11 | ○ |
| Film Sample (60) | | 15 | 10 | ○ |
| Film Sample (61) to (65) | Comparative example (1-2) | Film Sample could not be prepared. | | |
| Film Sample (66) | Comparative example (1-3) | 1 | 25 | X |
| Film Sample (67) | | 3 | 22 | X |
| Film Sample (68) | | 5 | 18 | Δ |
| Film Sample (69) | | 9 | 15 | ○ |
| Film Sample (70) | | 15 | 12 | ○ |

The results above show that it is possible to obtain nanoparticles and the dispersion thereof giving a film uniform in concentration by the method according to the present invention.

Dispersing methods using various dispersing machines (roll mill, ball mill, attriter, etc.), which are conventional organic pigment-dispersing methods, result in progression of undesirable fining of the pigment particles in the dispersions obtained and increase in viscosity. This could cause following problems: it becomes difficult to discharge the dispersion from the dispersing machine or feed it through the pipeline, and it causes gelation during storage and become unusable. Thus by conventional methods, it was difficult to provide a pigment dispersion which can form a film uniform in concentration.

In contrast, the method of producing organic nanoparticles of the present invention makes it possible to obtain organic particles in a state of being fined and in a state of having excellent flowability, and gives a dispersion resistant to increase in viscosity, thus it is possible to provide nanoparticles and the dispersion thereof giving a film uniform in concentration. It was also possible to obtain a film uniform in concentration in a quite short period of time, about half of that needed by conventional methods. The results indicate that it is possible to achieve significant increase in productivity. Further, it is understood that the production process for the particles can achieve further efficiency by use of a polymer compound having a particular molecular weight.

The reagents used in the Examples and Comparative Examples above are as shown below.

| Reagent | Manufacturer |
| --- | --- |
| Pigment Red 254 (Irgaphore Red B-CF) | Ciba Specialty Chemicals company |
| Polyvinyl pyrrolidone K-30 | Wako Pure Chemical Industries, Ltd. |
| 2-(1-Methoxy) propyl acetate | Wako Pure Chemical Industries, Ltd. |
| Dimethylsulfoxide | Wako Pure Chemical Industries, Ltd. |
| 1-mol/l Aqueous solution of sodium hydroxide | Wako Pure Chemical Industries, Ltd. |
| 28% methanol solution of sodium methoxide | Wako Pure Chemical Industries, Ltd. |

Example 2

Examples 2-1 to 2-4

Examples Using a Pyrrolopyrrole Compound Pigment and an Acidic Group-Containing Polymer Compound Example 2-1

33.3 ml of a 28% solution of sodium methoxide in methanol, 50 mg of a pigment C.I. Pigment Red 254 (Irgaphor Red BT-CF, trade name, manufactured by Ciba Specialty Chemicals company), and 100.0 g of polyvinyl pyrrolidone were added to 1,000 ml of dimethyl sulfoxide (manufactured by Wako Pure Chemical Industries, Ltd.), to prepare a pigment solution A. Separately, 1,000 ml of water containing 16 ml of 1-mol/l hydrochloric acid was prepared as a poor solvent.

100 ml of the pigment solution A was fed with a NP-KX-500 large-volume pulse-free pump (trade name, manufactured by Nihon Seimitsu Kagaku Co., Ltd.), at a flow rate of 100 ml/min into 1,000 ml of water as the poor solvent controlled to a temperature of 18° C. and being stirred at 500 rpm by a GK-0222-10 Ramond stirrer (product name, manufactured by Fujisawa Pharmaceutical Co., Ltd.), thereby forming organic pigment particles, to give a pigment dispersion A. Analysis of the particle diameter and the monodispersion degree of the pigment dispersion liquid by using Nanotrack UPA-EX150 manufactured by Nikkiso showed a number-average diameter of 29 nm and a Mv/Mn ratio of 1.29.

The thus-prepared pigment nanoparticle dispersion was subjected to centrifugal separation with a high-speed centrifugal refrigerating machine HIMAC SCR20B manufactured by Hitachi Koki Co., Ltd. under the conditions of at 3,500 rpm (2,000 g) for 1 hour. Then, the supernatant was discarded, and the sedimented pigment nanoparticle concentrated paste was collected. The pigment content in the paste, as determined by using type 8453 spectrophotometer manufactured by Agilent, was 12.5 mass %.

50.0 cc of ethyl lactate was added to 16.0 g of the pigment nanoparticle paste prepared; the mixture was agitated in a dissolver at 1,500 rpm for 60 minutes and then, filtered through FP-010 filter manufactured by Sumitomo Electric Fine Polymer Inc., to give a paste-like concentrated pigment liquid A (nanopigment concentration: 33 mass %).

[Preparation of Pigment Dispersion Composition]

A pigment dispersion composition A in the following composition was prepared by using the paste.

| | |
| --- | --- |
| Paste-like concentrated pigment liquid A mentioned above | 19.5 g |
| Pigment-dispersing agent A | 0.6 g |
| Methacrylic acid/benzyl methacrylate copolymer* | 6.4 g |
| 1-methoxy-2-propylacetate | 45.3 g |

The pigment-dispersing agent A was prepared according to the method described in JP-A-2000-239554.
*copolymerization molar ratio 28/72, weight average molecular weight: 30,000, 40 mass % 1-methoxy-2-propylacetate solution The pigment dispersion composition in the composition above was dispersed in a motor mill M-50 (manufactured by Eiger, Japan) by using zirconia beads having a diameter of 0.65 nm n at a peripheral speed of 9 m/s for 1 hour.

Example 2-2

A pigment solution B, a pigment dispersion B, a paste-like concentrated pigment liquid B, and a pigment dispersion composition B were prepared in the same manner as in Example 2-1, except that, the pigment dispersant A used in forming the nanopigment particles in the pigment dispersion composition A in Example 2-1 was replaced with the pigment dispersant B (exemplary compound (c) represented by Formula (D3)). Analysis of the particle diameter and the monodispersion degree according to Example 2-1 showed a number-average diameter of 33 nm and a Mv/Mn ratio of 1.34. The pigment dispersant B was prepared according to the method described in JP-B-5-72943.

Example 2-3

A pigment solution C, a pigment dispersion C, a paste-like concentrated pigment liquid C, and a pigment dispersion composition C were prepared in the same manner as in Example 2-1, except that, the pigment dispersant A used in forming the nanopigment particles in the pigment dispersion composition A in Example 2-1 was replaced with the pigment dispersant C (the compound represented by Formula (D4)). Analysis of the particle diameter and the monodispersion degree according to Example 2-1 showed a number-average diameter of 32 nm and a Mv/Mn ratio of 1.33. The pigment dispersant C was prepared according to the method described in JP-A-2001-31885.

Example 2-4

A pigment solution D, a pigment dispersion D, a paste-like concentrated pigment liquid D, and a pigment dispersion composition D were prepared in the same manner as in Example 2-1, except that, the pigment dispersant A used in forming the nanopigment particles in the pigment dispersion composition A of Example 2-1 was not used. Analysis of the particle diameter and the monodispersion degree according to Example 2-1 showed a number-average diameter of 31 nm and a Mv/Mn ratio of 1.33.

Examples 2-5~2-8

Examples Containing a Polymer Compound Represented by Formula (1)

Example 2-5

A pigment solution E, a pigment dispersion E, a paste-like concentrated pigment liquid E, and a pigment dispersion composition E were prepared in the same manner as in Example 2-1, except that 6.4 g of the methacrylic acid/benzyl methacrylate copolymer used in the pigment dispersion composition A in Example 2-1 was replaced with 3.2 g of a polymer compound (C-16). Analysis of the particle diameter and the monodispersion degree according to Example 2-1 showed a number-average diameter of 33 nm and a Mv/Mn ratio of 1.31.

Example 2-6

A pigment solution F, a pigment dispersion F, a paste-like concentrated pigment liquid F, and a pigment dispersion composition F were prepared in the same manner as in Example 2-2, except that 6.4 g of the methacrylic acid/benzyl methacrylate copolymer used in the pigment dispersion composition B in Example 2-2 was replaced with 3.2 g of a polymer compound (C-16). Analysis of the particle diameter and the monodispersion degree according to Example 2-2 showed a number-average diameter of 30 nm and a Mv/Mn ratio of 1.29.

Example 2-7

A pigment solution G, a pigment dispersion G, a paste-like concentrated pigment liquid G, and a pigment dispersion composition G were prepared in the same manner as in Example 2-3, except that 6.4 g of the methacrylic acid/benzyl methacrylate copolymer used in the pigment dispersion composition C in Example 2-3 was replaced with 3.2 g of a polymer compound (C-16). Analysis of the particle diameter and the monodispersion degree according to Example 2-3 showed a number-average diameter of 32 nm and a Mv/Mn ratio of 1.33.

Example 2-8

A pigment solution H, a pigment dispersion H, a paste-like concentrated pigment liquid H, and a pigment dispersion composition H were prepared in the same manner as in Example 2-4, except that 6.4 g of the methacrylic acid/benzyl methacrylate copolymer used in the pigment dispersion composition D in Example 2-4 was replaced with 3.2 g of a polymer compound (C-16). Analysis of the particle diameter and the monodispersion degree according to Example 2-4 showed a number-average diameter of 30 nm and a Mv/Mn ratio of 1.28.

Comparative Example 2

Comparative example 2-1

In the following manner, a pigment dispersion composition I having the composition described below was prepared with a beads-utilized dispersing machine.

| | |
|---|---|
| Pigment (Pigment Red 254) | 6.4 g |
| Pigment-dispersing agent A | 0.6 g |
| Polyvinylpyrrolidone (manufactured by Wako Pure Chemical Industries, Ltd., K30, molecular weight: 40,000) | 6 g |
| Methacrylic acid/benzyl methacrylate copolymer* | 6.4 g |
| 1-methoxy-2-propylacetate | 45.3 g |

*copolymerization molar ratio 28/72, weight average molecular weight: 30,000, 40 mass % 1-methoxy-2-propylacetate solution A powdered pigment (Pigment Red 254), 6 g of polyvinyl pyrrolidone and a methacrylic acid/benzyl methacrylate copolymer were charged into a 1-methoxy-2-propylacetate solution followed by stirring, to prepare a mixture solution. Then, the mixture was subjected to dispersion treatment for 9 hours by using zirconia beads 0.65 mm in diameter and a Motor Mill M-50 (made by Eiger Japan Co., Ltd.) under a condition that the circumferential velocity was set at 9 m/s. Analysis of the particle diameter and the monodispersion degree according to Example 2-1 showed a number-average diameter of 82 nm and a Mv/Mn ratio of 1.56.

Comparative Example 2-2

A pigment dispersion composition J in the following composition was prepared in the following manner:

| | |
|---|---|
| Pigment (Pigment Red 254) | 6.4 g |
| Sodium chloride | 64.0 g |
| Methacrylic acid/benzyl methacrylate copolymer* | 6.4 g |

*copolymerization molar ratio 28/72, weight average molecular weight: 30,000, 40 mass % 1-methoxy-2-propylacetate solution Sodium chloride, a pigment powder (pigment red 254), and a methacrylic acid/benzyl methacrylate copolymer were added to 1-methoxy-2-propyl acetate solution, and the mixture was kneaded in a double-screw kneader at 80° C. for 10 hours. After kneading, the mixture was taken to 500 mass parts of 1 mass % hydrochloric acid aqueous solution of 80° C., and then stirred for 1 hour, followed by filtration, washing with a hot water, drying, and grinding. Thereafter, 2.4 g of propylene glycol mono methyl ether acetate per 1 g of the ground product were added and mixed. The resultant pigment composition was dispersed with using zirconia beads of 0.65 mm in diameter, at a peripheral speed of 9 m/s, for 1 hour, using a motor mill M-50 (manufactured by Eigar Japan). The thus-obtained pigment dispersion composition was designated as pigment dispersion composition J. Analysis of the particle diameter and the monodispersion degree according to Example 2-1 showed a number-average diameter of 63 nm n and a Mv/Mn ratio of 1.88.

The pigment dispersion compositions A to J were prepared by using the following reagents:

| Reagent | Manufacturer |
| --- | --- |
| Pigment Red 254 (Irgaphore Red BT-CF) | Ciba Specialty Chemicals company |
| 1-Methyl-2-pyrrolidone | Wako Pure Chemical Industries, Ltd. |
| Dimethylsulfoxide | Wako Pure Chemical Industries, Ltd. |
| 2-(1-Methoxy) propyl acetate | Wako Pure Chemical Industries, Ltd. |
| 1-mol/l Aqueous solution of sodium hydroxide | Wako Pure Chemical Industries, Ltd. |
| 8-mol/l Aqueous solution of potassium hydroxide | Wako Pure Chemical Industries, Ltd. |

The thus-obtained pigment dispersion compositions were each applied to a glass substrate to give a layer thickness of 2 μm to thereby produce respective samples. As a backlight unit, a three-wavelength cold-cathode-tube light source (FWL18EX-N, trade name, manufactured by Toshiba Lighting & Technology Corporation) provided with a diffuser plate was used. Each of the samples was placed between two sheets of polarizing plates (HLC2-2518, trade name, the polarizing plates were manufactured by Sanritz Corporation), and then amounts of transmitted light at the time when polarization axes of two polarizing plates were parallel and the time when the polarization axes were perpendicular were measured. The ratio of these transmitted light amounts was defined as a contrast (see *Color Filter for* 512 *color display* 10.4"-*size TFT-LCD*, co-authored by Ueki, Koseki, Fukunaga, and Yamanaka, The seventh Color Optics Conference (1990), etc.). Chromaticity was measured using a color luminance meter (BM-5 (trade name), manufactured by Topcon Techno House Corporation). The above-described two sheets of polarizing plates, sample, and color luminance meter were placed at the following positions: A polarizing plate was disposed at the distance of 13 mm from the backlight. A cylinder of 11 mm in diameter and 20 mm in length was disposed at the distance of 40 mm to 60 mm from the backlight. The light transmitted through the cylinder was irradiated to a color filter disposed at the distance of 65 mm from the backlight. The transmitted light was passed through another polarizing plate disposed at the distance of 100 mm from the backlight and measured with a color luminance meter disposed at the distance of 400 mm from the backlight. The measuring angle in the color luminance meter was set to 2°. The light amount of the backlight was set so that its brightness (luminance) would be 1280 cd/m$^2$, when the two sheets of polarizing plates were arranged in a position of parallel nicol and no color filter was disposed.

Each of the samples was irradiated by a 90 mW/cm$^2$ high-pressure mercury lamp for 24 hours, and the color difference between before and after irradiation was determined as an indicator of light fastness. The chromaticity in the present invention was determined by using a microspectrophotometer (OSP100 or 200, manufactured by Olympus Optics), and expressed as values xyY in the xyz color system that were calculated as the result obtained at a visual field angle of 2 degrees to a F10 light source. The difference in chromaticity was expressed by the color difference in the La*b* color system. The color difference is desirably smaller.

The contrast and the light fastness of the samples obtained from the pigment dispersion compositions A to J thus determined are summarized in Table 2-A.

TABLE 2-A

| Sample | Contrast | Light fastness (Color difference) |
| --- | --- | --- |
| Pigment dispersion composition A | 15000 | 2.2 |
| Pigment dispersion composition B | 14900 | 2.3 |
| Pigment dispersion composition C | 14600 | 2.1 |
| Pigment dispersion composition D | 13000 | 2.5 |
| Pigment dispersion composition E | 16500 | 2.0 |
| Pigment dispersion composition F | 16000 | 2.1 |
| Pigment dispersion composition G | 15000 | 2.0 |
| Pigment dispersion composition H | 16000 | 1.8 |
| Pigment dispersion composition I | 7200 | 2.8 |
| Pigment dispersion composition J | 7500 | 4.5 |

As shown in Table 2-A, dispersions prepared by forming organic particles in a dispersed state as nanometer-sized particles according to the production method of the present invention were significantly superior in contrast and light fastness to the samples I and J of Comparative Examples. In addition, samples E to H prepared by using the polymer compound represented by formula (1) were more superior in attaining both high contrast and high light fastness, among the samples according to the present invention.

Example 2-9

The pigment dispersion composition A was mixed with other components into the composition shown in the following Table 2-1, to give a colored photosensitive resin composition for color filter A.

TABLE 2-1

| Composition components | Content (Unit: part) |
| --- | --- |
| Pigment dispersion composition | 44.5 |
| Propylene glycol monomethyl ether acetate | 7.6 |
| Methyl ethyl ketone | 37 |
| Binder-1 | 0.7 |
| DPHA solution | 3.8 |
| 2-Trichloromethyl-5-(p-styrylstyryl)-1,3,4-oxadiazole | 0.12 |
| 2,4-Bis(trichloromethyl)-6-[4'-(N,N-bisethoxycarbonyl-methyl)amino-3'-bromophenyl]-s-triazine | 0.05 |
| Phenothiazine | 0.01 |
| Surfactant 1 | 0.06 |
| <Binder 1> | |
| Polymer (random copolymer of benzyl methacrylate-methacrylic acid-methyl methacrylate (benzyl methacrylate:methacrylic acid:methyl methacrylate = 38/25/37 by mol), molecular weight: 40,000) | 27 mass parts |
| Propylene glycol monomethyl ether acetate | 73 mass parts |
| <DPHA liquid> | |
| Dipentaerythritol hexaacrylate (containing 500 ppm of polymerization inhibitor MEHQ; manufactured by Nippon Kayaku Co., Ltd., trade name: KAYARAD DPHA) | 76 mass parts |
| Propylene glycol monomethyl ether acetate | 24 mass parts |

TABLE 2-1-continued

<Surfactant 1>

| | |
|---|---|
| The following compound 1 | 30 mass parts |
| Methyl ethyl ketone | 70 mass parts |

[Chemical formula 76]

$$—(CH_2—CH)_{40}— \quad —(CH_2—CH)_x— \quad —(CH_2—CH)_y—$$
$$\quad\quad | \quad\quad\quad\quad\quad\quad | \quad\quad\quad\quad\quad\quad |$$
$$\quad\quad O{=}C \quad\quad\quad\quad\quad O{=}C \quad\quad\quad\quad\quad O{=}C$$
$$\quad\quad | \quad\quad\quad\quad\quad\quad | \quad\quad\quad\quad\quad\quad |$$
$$OCH_2CH_2C_nF_{2n+1} \quad\quad O(PO)_7H \quad\quad\quad O(EO)_7H$$

Compound 1
(n = 6, x = 55, y = 5,
Mw = 33940, Mw/Mn = 2.55
PO: Propylene oxide, EO: Ethylene oxide)

Colored photosensitive resin compositions for color filter B to J were prepared in the same manner, except that the pigment dispersion composition A was replaced with the pigment dispersion compositions B to J.

Each of the aforementioned colored photosensitive compositions for preparation of color filter was coated on a glass substrate by using a spin coater, and the film was dried at 100° C. for 2 minutes, to obtain a film having a thickness of approximately 2 µm. The film was then exposed to an ultra-high-pressure mercury lamp under nitrogen stream and developed with 1% aqueous sodium carbonate solution. The light fastness and contrast of R component of each film obtained, as determined in the same manner as in Example 2, are summarized in the following Table 2-B.

TABLE 2-B

| Sample | Contrast | Light fastness (Color difference) |
|---|---|---|
| Colored photosensitive resin composition A | 14500 | 2.2 |
| Colored photosensitive resin composition B | 14200 | 2.3 |
| Colored photosensitive resin composition C | 14000 | 2.1 |
| Colored photosensitive resin composition D | 12200 | 2.5 |
| Colored photosensitive resin composition E | 15900 | 2.0 |
| Colored photosensitive resin composition F | 15300 | 2.1 |
| Colored photosensitive resin composition G | 14400 | 2.0 |
| Colored photosensitive resin composition H | 15200 | 1.8 |
| Colored photosensitive resin composition I | 6500 | 2.8 |
| Colored photosensitive resin composition J | 7100 | 4.5 |

As shown in Table 2-B, colored photosensitive resin compositions containing the dispersion prepared by forming organic particles in a dispersed-state as nanometer-sized particles according to the production method of the present invention were significantly superior in contrast and light fastness to the samples I and J for comparison. In addition, samples E to H prepared by using the compound represented by Formula (1) were more superior in attaining both contrast and light fastness, among the samples according to the present invention.

Example 2-10

Production of Color Filter (Production by Application Using Slit Nozzle)

[Formation of Black (K) Image]

A non-alkali glass substrate was washed by a UV washing device, then brush-washed with a cleaner, and then subjected to ultrasonic washing with ultrapure water. The substrate was heat-treated at 120° C. for 3 minutes to stabilize the surface state.

The glass substrate was cooled and its temperature was adjusted to 23° C. Then, the substrate was coated with a colored photosensitive resin composition K1 having a composition shown in the following Table 2 by a coater for a glass substrate (trade name: NH-1600 manufactured by FAS Japan) having a slit nozzle. Subsequently, a part of the solvent was removed by drying with a VCD (vacuum drying apparatus; manufactured by Tokyo Ohka Kogyo Co., Ltd.) for 30 seconds to eliminate the fluidity of the coating layer, and the glass substrate with the coating layer was pre-baked at 120° C. for 3 minutes to give a photosensitive resin layer K1 having a thickness of 2.4 µm.

TABLE 2-2

| Composition components | Content (Unit: part) |
|---|---|
| K pigment dispersion 1 (carbon black) | 25 |
| Propylene glycol monomethyl ether acetate | 8.0 |
| Methyl ethyl ketone | 53 |
| Binder 2 | 9.1 |
| Hydroquinone monomethyl ether | 0.002 |
| DPHA liquid | 4.2 |
| 2,4-Bis(trichloromethyl)-6-[4'-(N,N-bisethoxycarbonylmethyl)amino-3'-bromophenyl]-s-triazine | 0.16 |
| Surfactant 1 | 0.044 |

Using a proximity-type exposure machine having a ultra-high pressure mercury lump (manufactured by Hitachi High-Tech Electronics Engineering Co., Ltd.), the substrate was pattern-exposed at an exposure of 300 mJ/cm$^2$ with a distance of 2000 µm between the photosensitive resin layer and the surface of an exposing mask (quartz exposure mask having an image pattern) while allowing the substrate and the mask to stand straight.

Then, pure water was sprayed through a shower nozzle to uniformly moisten the surface of the photosensitive resin layer K1, and shower developing was performed at 23° C. for 80 seconds with a KOH-based developer (containing KOH and a nonionic surfactant, trade name: CDK-1, manufactured by Fuji Film Electronic Materials Co., Ltd., diluted by 1/100) at a flat nozzle pressure of 0.04 MPa to obtain a patterning image. Subsequently, ultrapure water was sprayed through an ultrahigh pressure washing nozzle at a pressure of 9.8 MPa to remove the residue, to obtain a black (K) image K. Subsequently, the substrate having the black image thereon was heat-treated at 220° C. for 30 minutes.

[Formation of Red (R) Pixels]

Using a colored photosensitive resin composition R1 having a composition described in Table 2-3 below, heat-treated R pixels were formed on the substrate having the K image formed thereon, in the same manner as the formation of the black (K) image.

The thickness of the photosensitive resin layer R1, and the coating amounts of the pigments (C.I.P.R.254 and C.I.P.R.177) are shown below.

| | |
|---|---|
| Thickness of the photosensitive resin layer (µm) | 1.60 |
| Coating amount of the pigments (g/m$^2$) | 1.00 |
| Coating amount of C.I.P.R.254 (g/m$^2$) | 0.80 |
| Coating amount of C.I.P.R.177 (g/m$^2$) | 0.20 |

TABLE 2-3

| Composition components | Content (Unit: part) |
| --- | --- |
| R-pigment dispersion A | 40 |
| R-pigment dispersion 2 (C.I.P.R. 177) | 4.5 |
| Propylene glycol monomethyl ether acetate | 7.6 |
| Methyl ethyl ketone | 37 |
| Binder 1 | 0.7 |
| DPHA solution | 3.8 |
| 2-Trichloromethyl-5-(p-styrylstyryl)-1,3,4-oxadiazole | 0.12 |
| 2,4-Bis(trichloromethyl)-6-[4'-(N,N-bisethoxycarbonylmethyl)-amino-3'-bromophenyl]-s-triazine | 0.05 |
| Phenothiazine | 0.01 |
| Surfactant 1 | 0.06 |

[Formation of Green (G) Pixels]

Using a colored photosensitive resin composition G1 having a composition described in Table 2-4 below, heat treated G pixels were formed on the substrate having the K image and R pixels formed thereon, in the same manner as the formation of the black (K) image. The thickness of the photosensitive resin layer G1, and the coating amounts of the pigments (C.I.P.G.36 and C.I.P.Y.150) are shown below.

| | |
| --- | --- |
| Thickness of the photosensitive resin layer (μm) | 1.60 |
| Coating amount of the pigments (g/m$^2$) | 1.92 |
| Coating amount of C.I.P.G.36 (g/m$^2$) | 1.34 |
| Coating amount of C.I.P.Y.150 (g/m$^2$) | 0.58 |

TABLE 2-4

| Composition components | Content (Unit: part) |
| --- | --- |
| G pigment dispersion 1 (C.I.P.G. 36) | 28 |
| Y pigment dispersion 1 (C.I.P.Y. 150) | 15 |
| Propylene glycol monomethyl ether acetate | 29 |
| Methyl ethyl ketone | 26 |
| Cyclohexanone | 1.3 |
| Binder 2 | 2.5 |
| DPHA liquid | 3.5 |
| 2-Trichloromethyl-5-(p-styrylstyryl)-1,3,4-oxadiazole | 0.12 |
| 2,4-Bis(trichloromethyl)-6-[4'-(N,N-bisethoxycarbonylmethyl)amino-3'-bromophenyl]-s-triazine | 0.05 |
| Phenothiazine | 0.01 |
| Surfactant 1 | 0.07 |

[Formation of Blue (B) Pixels]

Using a colored photosensitive resin composition Bl having a composition described in Table 2-5 below, heat-treated B pixels were formed on the substrate having the K image, the R pixels, and the G pixels formed thereon, in the same manner as the formation of the black (K) image, so that a desired color filter was obtained.

The thickness of the photosensitive resin layer Bl, and the coating amounts of the pigments (C.I.P.B.15:6 and C.I.P.V.23) are shown below.

| | |
| --- | --- |
| Thickness of the photosensitive resin layer (μm) | 1.60 |
| Coating amount of the pigments (g/m$^2$) | 0.75 |
| Coating amount of C.I.P.B.15:6 (g/m$^2$) | 0.705 |
| Coating amount of C.I.P.V.23 (g/m$^2$) | 0.045 |

TABLE 2-5

| Composition components | Content (Unit: part) |
| --- | --- |
| B pigment dispersion 1 (C.I.P.B.15:6) | 8.6 |
| B pigment dispersion 2 (C.I.P.B.15:6 + C.I.P.V.23) | 15 |
| Propylene glycol monomethyl ether acetate | 28 |
| Methyl ethyl ketone | 26 |
| Binder 3 | 17 |
| DPHA liquid | 4.0 |
| 2-Trichloromethyl-5-(p-styrylstyryl)-1,3,4-oxadiazole | 0.17 |
| Phenothiazine | 0.02 |
| Surfactant 1 | 0.06 |

Herein, preparation of the colored photosensitive resin compositions K1, R1, G1 and B1 described in the above Tables 2-2 to 2-5 will be explained.

The colored photosensitive resin composition K1 was obtained by: measuring off the K pigment dispersion 1 and propylene glycol monomethyl ether acetate respectively in the amounts shown in Table 2-2, then mixing them at a temperature of 24° C. (±2° C.) and stirring the mixture at 150 rpm for 10 minutes, then measuring off methyl ethyl ketone, the binder 2, hydroquinone monomethyl ether, the DPHA liquid, 2,4-bis(trichloromethyl)-6-[4'-(N,N-bisethoxycarbonylmethyl)amino-3'-bromophenyl]-s-triazine, and the surfactant 1 respectively in the amounts shown in Table 2-2, then adding them to the above mixture in this order at a temperature of 25° C. (±2° C.), and then stirring the resultant mixture at 150 rpm at a temperature of 40° C. (±2° C.) for 30 minutes.

In the composition shown in Table 2-2, the following components had the following compositions:

| <K pigment dispersion 1> | |
| --- | --- |
| Carbon black (trade name: Nipex 35, manufactured by Degussa, Japan) | 13.1 mass parts |
| Dispersant (compound 2J shown below) | 0.65 mass part |
| Polymer (random copolymer of benzyl methacrylate and methacrylic acid (benzyl methacrylate/methacrylic acid = 72/28 by mol), molecular weight: 37,000) | 6.72 mass parts |
| Propylene glycol monomethyl ether acetate | 79.53 mass parts |
| <Binder 2> | |
| Polymer (random copolymer of benzyl methacrylate and methacrylic acid (benzyl methacrylate/methacrylic acid = 78/22 by mol), molecular weight: 38,000) | 27 mass parts |
| Propylene glycol monomethyl ether acetate | 73 mass parts |

[Chemical formula 77]

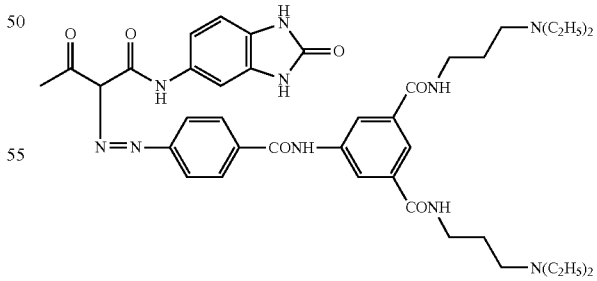

Compound 2J

The colored photosensitive resin composition R1 was obtained by: measuring off the R pigment dispersion A, the R pigment dispersion 2, and propylene glycol monomethyl ether acetate respectively in the amounts shown in Table 2-3, then mixing them at a temperature of 24° C. (±2° C.) and stirring the mixture at 150 rpm for 10 minutes, then measuring off methyl ethyl ketone, the binder 1, the DPHA liquid, 2-trichloromethyl-5-(p-styrylstyryl)-1,3,4-oxadiazole, 2,4-bis(trichlormethyl)-6-[4'-(N,N-bisethoxycarbonylmethyl) amino-3'-bromophenyl]-s-triazine, and phenothiazine respectively in the amounts shown in Table 2-3, then adding them to the above mixture in this order at a temperature of 24° C. (+2° C.) and then stirring the resultant mixture at 150 rpm for 30 minutes, then measuring off the surfactant 1 in the amount shown in Table 2-3, then adding the surfactant 1 to the mixture at a temperature of 24° C. (±2° C.), then stirring the resultant mixture at 30 rpm for 5 minutes, and then filtering the mixture with a nylon mesh #200.

Among the compositions shown in Table 2-3, the R pigment dispersion A was a dispersion obtained in the same manner as the pigment dispersion composition A of Example 2-1, and was adjusted to include the components in the following amounts (part by mass):

| <R pigment dispersion A> | |
|---|---|
| Paste-like concentrated pigment liquid A prepared in Examples 2-1 (C.I.P.R.254) | 23 mass parts |
| Dispersant (compound 2J shown above) | 0.8 mass part |
| Polymer (random copolymer of benzyl methacrylate and methacrylic acid (benzyl methacrylate/methacrylic acid = 72/28 by mol), molecular weight: 30,000) | 8 mass parts |
| Propylene glycol monomethyl ether acetate | 68.2 mass parts |
| <R pigment dispersion 2> | |
| C.I.P.R.177 (trade name: Cromophtal Red A2B, manufactured by Ciba Specialty Chemicals company) | 18 mass parts |
| Polymer (random copolymer of benzyl methacrylate and methacrylic acid (benzyl methacrylate/methacrylic acid = 72/28 by mol), molecular weight: 30,000) | 12 mass parts |
| Propylene glycol monomethyl ether acetate | 70 mass parts |

The colored photosensitive resin composition G1 was obtained by measuring off the G pigment dispersion 1, the Y pigment dispersion 1, and propylene glycol monomethyl ether acetate respectively in the amounts shown in Table 2-4, then mixing them at a temperature of 24° C. (±2° C.) and stirring the mixture at 150 rpm for 10 minutes, then measuring off methyl ethyl ketone, cyclohexanone, the binder 2, the DPHA liquid, 2-trichloromethyl-5-(p-styrylstyryl)-1,3,4-oxadiazole, 2,4-bis(trichloromethyl)-6-[4'-(N,N-bisethoxycarbonylmethyl)amino-3'-bromophenyl]-s-triazine, and phenothiazine respectively in the amounts shown in Table 2-4, then adding them to the above mixture in this order at a temperature of 24° C. (±2° C.), then stirring the resultant mixture at 150 rpm for 30 minutes, then measuring off the surfactant 1 in the amount shown in Table 2-4, then adding the surfactant 1 to the mixture at a temperature of 24° C. (±2° C.), then stirring the resultant mixture at 30 rpm for 5 minutes, and then filtering the mixture with a nylon mesh #200.

Among the compositions shown in Table 2-4, the G pigment dispersion 1 was "GT-2 (trade name)" manufactured by Fujifilm Electronic Materials Co., Ltd. As the Y pigment dispersion 1, "CF Yellow EX3393 (trade name)" manufactured by Mikuni Shikiso Co., Ltd. was used.

The colored photosensitive resin composition B1 was obtained by: measuring off the B pigment dispersion 1, the B pigment dispersion 2, and propylene glycol monomethyl ether acetate respectively in the amounts shown in Table 2-5, then mixing them a temperature of 24° C. (+2° C.) and stirring the mixture at 150 rpm for 10 minutes, then measuring off methyl ethyl ketone, the binder 3, the DPHA liquid, 2-trichloromethyl-5-(p-styrylstyryl)-1,3,4-oxadiazole, and phenothiazine respectively in the amounts shown in Table 2-5, then adding them to the above mixture in this order at a temperature of 25° C. (+2° C.), then stirring the mixture at 150 rpm at a temperature of 40° C. (±2° C.) for 30 minutes, then measuring off the surfactant 1 in the amount shown in Table 2-5, then adding the surfactant 1 to the mixture at a temperature of 24° C. (±2° C.), then stirring the mixture at 30 rpm for 5 minutes, and then filtering the mixture with a nylon mesh #200.

In the composition shown in Table 2-5, as the B pigment dispersion 1, "trade name: CF Blue EX3357" manufactured by Mikuni Shikiso Co., Ltd. was used; and as the B pigment dispersion 2, "trade name: CF Blue EX3383" manufactured by Mikuni Shikiso Co, Ltd. was used.

The binder 3 had the following composition.

| <Binder 3> | |
|---|---|
| Polymer (random copolymer of benzyl methacrylate-methacrylic acid-methyl methacrylate (benzyl methacrylate:methacrylic acid:methyl methacrylate = 36/22/42 by mol), molecular weight: 38,000) | 27 mass parts |
| Propylene glycol monomethyl ether acetate | 73 mass parts |

Each R pigment dispersion B to H was prepared, by replacing the concentrated pigment liquid A used in the R pigment dispersion A with the concentrated pigment liquids B to H. Color filters B to H were prepared in the same manner as the color filter A, except that the R pigment dispersion A was replaced with the R pigment dispersions B to H, respectively.

Comparative Example 2-3

Color filters I and J were prepared, by replacing the paste-like concentrated pigment liquid A used in R pigment dispersion A with the pigment dispersion composition I or J, in the process for manufacturing the color filter A.

The contrast and the light fastness of respective color filters, as determined in the same manner as in Example 2, are summarized in Table 2-C. Presence of the deposits in the R pixel region of each color filter A to F was determined under an optical microscope (MX-50, manufactured by Olympus Optics) at a magnification of 500 times. A sample containing no foreign matter or fouling in or at the terminal of a pixel was regarded as "deposit-free and uniform", while that containing foreign matters or foulings in or at the terminal of a pixel and observed unevenness was regarded as "with-deposit". The results are summarized in Table 2-C.

TABLE 2-C

| Color filter | Contrast | Light fastness (Color difference) | Presence/Absence of deposition |
|---|---|---|---|
| A | 9800 | 2.2 | deposit-free and uniform |
| B | 9600 | 2.3 | deposit-free and uniform |
| C | 9500 | 2.1 | deposit-free and uniform |
| D | 7400 | 2.5 | deposit-free and uniform |
| E | 10900 | 2.0 | deposit-free and uniform |
| F | 10700 | 2.1 | deposit-free and uniform |
| G | 10000 | 2.0 | deposit-free and uniform |
| H | 10700 | 1.8 | deposit-free and uniform |
| I | 3500 | 2.8 | with-deposit |
| J | 4000 | 4.5 | with-deposit |

The results indicate that the color filters according to the present invention are significantly superior in contrast and light fastness to the comparative samples I and J. A color difference of 2 or more is a difference distinguishable by the observer. The difference expands during use for an extended period (e.g., one year or more), causing distinct difference on the display screen. The color filters according to the present invention were all favorable color filters higher in contrast and free of deposition. On the other hand, the color filters of Comparative Examples, which were lower in contrast and showed deposition, were not at a level satisfying the practical requirements demanded. In addition, the samples E to H prepared by using the polymer compound represented by Formula (1) exhibited much higher contrast and were free of deposition, and were superior also in light fastness, among the samples of Examples.

Example 2-11

Production and Evaluation of Liquid Crystal Display Device

Liquid crystal display devices were prepared by using the color filters A to H, and the display characteristics thereof were evaluated.
(Formation of ITO Electrode)
A glass substrate having a color filter formed thereon was loaded in a sputter apparatus, and 1300 Å thick ITO (indium tin oxide) was vacuum deposited at 100° C. on the whole surface of the said glass substrate. Thereafter, annealing at 240° C. for 90 minutes was performed, to crystallize the ITO. Thus, ITO transparent electrode was formed.
(Formation of Spacer)
A spacer was formed on the thus-prepared ITO transparent electrode in the same manner as the spacer-forming method described in Example 1 of JP-A-2004-240335.
(Formation of Protrusion for Controlling Orientation of Liquid Crystal)
Using a coating liquid for a positive type photosensitive resin layer described below, a protrusion for controlling orientation of liquid crystal was formed on the ITO transparent electrode formed with the above-described spacer.
Herein, exposure, development, and bake steps were carried out according to the following method.
A proximity-type exposure equipment (manufactured by Hitachi High-Tech Electronics Engineering Co., Ltd.) was set so that a certain photo mask would be located at the distance of 100 μm from the surface of the photosensitive resin layer. A proximity exposure was carried out through the said photo mask in an exposure energy of 150 mJ/cm² using an ultra-high pressure mercury lamp.
Subsequently, development was conducted by spraying a 2.38% tetramethyl ammonium hydroxide solution on to the substrate at 33° C. for 30 seconds using a shower-type developing apparatus. In this manner, unnecessary portions (exposed portions) of the photosensitive resin layer were removed by development. Thereby, on the substrate at the same side as the color filter, was formed the objective protrusion for controlling orientation of liquid crystal that was made by patterning the photosensitive resin layer into a desired shape.
After that, the substrate for a liquid crystal display device having formed thereon the protrusion for controlling orientation of the liquid crystal was baked under the conditions of 230° C. for 30 minutes. Thereby, a cured protrusion for controlling orientation of the liquid crystal was formed on the substrate for a liquid crystal display device.

| <Formulation of positive-type photosensitive-resin-layer coating liquid> | |
|---|---|
| Positive-type resist solution (FH-2413F manufactured by Fuji Film Electronics Materials) | 53.3 mass parts |
| Methyl ethyl ketone | 46.7 mass parts |
| Megafac F-780F (manufactured by Dainippon Ink & Chemicals Incorporation) | 0.04 mass part |

(Production of liquid crystal display devices)

An alignment film composed of polyimide was further provided on the thus-obtained substrate for a liquid crystal display device. Thereafter, a sealing agent made of an epoxy resin was printed at the positions corresponding to the outer frame of the black matrix that was disposed so as to surround the periphery of the pixels of the color filter. In addition, after dropping thereon a liquid crystal for MVA-mode, the above-described substrate and a counter substrate were stuck together. The stuck substrates were subjected to a thermal processing to cure the sealing agent. On each surface of the thus-obtained liquid crystal cell, a polarizing plate HLC2-2518 manufactured by Sanritz Corporation was stuck together. Subsequently, a backlight with a three-wavelength cold-cathode tube light source (FWL18EX-N manufactured by Toshiba Lighting & Technology Corporation) was formed, and the backlight was set at the back side of the liquid crystal cell provided with the polarizing plates. Thus, the liquid crystal display device was produced.

Comparative Example 2-4

Production and Evaluation of Liquid Crystal Display Devices

Liquid crystal display devices were prepared in the same manner as in Example 2-11, by using the color filters I and J, and the display characteristics thereof were evaluated.
Liquid crystal display devices prepared by using the color filters according to the present invention had excellent display characteristics superior in display blackness and red reproducibility and free of display irregularity, compared to liquid crystal display devices prepared by using the color filters of Comparative Examples.

Example 2-12

Production of Color Filter (Production by Lamination of Photosensitive Resin Transfer Material)

[Production of Photosensitive Resin Transfer Material]
A thermoplastic resin layer coating liquid having the following formulation H1 was coated on a polyethylene terephthalate film temporary support with a thickness of 75 μm using a slit nozzle, followed by drying. Then, an intermediate layer coating liquid having the following formulation P1 was coated thereon, and dried. Further, the colored photosensitive resin composition K1 was coated thereon and dried. In this way, a thermoplastic resin layer with a dry film thickness of 14.6 μm, an intermediate layer with a dry film thickness of 1.6 μm, and a photosensitive resin layer with a dry film thickness of 2.4 μm were provided on the temporary support. Further, a protective film (polypropylene film with a thickness of 12 μm) was adhered onto the photosensitive resin layer by pressure.
As described above, a photosensitive resin transfer material K1 was produced in which the temporary support, the thermoplastic resin layer, the intermediate layer (oxygen blocking film), and the black (K) photosensitive resin layer were unified.

| <Formulation H1 for thermoplastic resin layer coating liquid> | |
|---|---|
| Methanol | 11.1 mass parts |
| Propylene glycol monomethyl ether acetate | 6.36 mass parts |
| Methyl ethyl ketone | 52.4 mass parts |
| Methyl methacrylate-(2-ethylhexyl acrylate)-benzyl methacrylate-methacrylic acid copolymer (copolymer composition ratio (mole ratio): Methyl methacrylate/2-ethylhexyl acrylate/benzyl methacrylate/methacrylic acid = 55/11.7/4.5/28.8, molecular weight = 90,000, Tg: about 70° C.) | 5.83 mass parts |
| Styrene-acrylic acid copolymer (copolymerization composition ratio (mole ratio): Styrene/acrylic acid = 63/37, molecular weight = 10,000, Tg: about 100° C.) | 13.6 mass parts |
| Compound obtained by dehydration-condensation of bisphenol A with 2 equivalents of pentaethylene glycol monomethacrylate (trade name: 2,2-bis[4-methacryloxypolyethoxy)phenyl]propane manufactured by Shin-Nakamura Chemical Co., Ltd.) | 9.1 mass parts |
| Surfactant 1 described above | 0.54 mass part |
| <Formulation P1 for intermediate layer coating liquid> | |
| PVA205 (polyvinyl alcohol, manufactured by Kuraray Co., Ltd., saponification degree = 88%, polymerization degree 550) | 32.2 mass parts |
| Polyvinylpyrrolidone (trade name: K-30 manufactured by ISP Japan Ltd.) | 14.9 mass parts |
| Distilled water | 524 mass parts |
| Methanol | 429 mass parts |

Photosensitive resin transfer materials R101, G101 and B01 were produced in the same manner as the production of the photosensitive resin transfer material K1, except that the colored photosensitive resin composition K1 used in production of the photosensitive resin transfer material K1 was replaced respectively by colored photosensitive resin compositions R101, G101 or B101 having the compositions shown in Tables 2-6 to 2-8 below. The methods for producing the colored photosensitive resin compositions R101, G101 and B101 were similar to the methods for producing the colored photosensitive resin compositions R1, G1 or B1, respectively.

TABLE 2-6

R101

| Composition components | Content (Unit: part) |
|---|---|
| R pigment dispersion A | 40 |
| R pigment dispersion 2 (C.I.P.R.177) | 4.5 |
| Propylene glycol monomethyl ether acetate | 7.6 |
| Methyl ethyl ketone | 37 |
| Binder 1 | 0.8 |
| DPHA liquid | 4.4 |
| 2-trichloromethyl-5-(p-styrylstyryl)-1,3,4-oxadiazole | 0.14 |
| 2,4-Bis(trichloromethyl)-6-[4'-(N,N-bisethoxycarbonyl-methyl)amino-3'-bromophenyl]-s-triazine | 0.06 |
| Phenothiazine | 0.01 |
| Additive 1 | 0.52 |
| Surfactant 1 | 0.06 |

TABLE 2-7

G101

| Composition components | Content (Unit: part) |
|---|---|
| G pigment dispersion 1 (C.I.P.G.36) | 28 |
| Y pigment dispersion 1 (C.I.P.Y.150) | 15 |
| Propylene glycol monomethyl ether acetate | 29 |
| Methyl ethyl ketone | 26 |
| Cyclohexanone | 1.3 |
| Binder 2 | 3.0 |
| DPHA liquid | 4.3 |
| 2-trichloromethyl-5-(p-styrylstyryl)-1,3,4-oxadiazole | 0.15 |

TABLE 2-7-continued

G101

| Composition components | Content (Unit: part) |
|---|---|
| 2,4-Bis(trichloromethyl)-6-[4'-(N,N-bisethoxycarbonylmethyl)amino-3'-bromophenyl]-s-triazine | 0.06 |
| Phenothiazine | 0.01 |
| Surfactant 1 | 0.07 |

TABLE 2-8

B101

| Composition components | Content (Unit: part) |
|---|---|
| B pigment dispersion 1 (C.I.P.B.15:6) | 8.6 |
| B pigment dispersion 2 (C.I.P.B.15:6 + C.I.P.V.23) | 15 |
| Propylene glycol monomethyl ether acetate | 28 |
| Methyl ethyl ketone | 26 |
| Binder 3 | 18.5 |
| DPHA liquid | 4.3 |
| 2-trichloromethyl-5-(p-styrylstyryl)-1,3,4-oxadiazole | 0.17 |
| Phenothiazine | 0.02 |
| Surfactant 1 | 0.06 |

In the compositions shown in Table 2-6, as the additive 1, a phosphoric-ester-based special surfactant (trade name: HIP-LAAD ED152, manufactured by Kusumoto Chemicals Ltd.) was used.

[Formation of Black (K) Image]

A non-alkali glass substrate was washed with a rotating brush having nylon hairs while spraying a glass cleaner liquid regulated at 25° C. by a shower for 20 seconds, then the glass substrate was washed with pure water shower. Thereafter, a silane coupling solution (a 0.3 mass % aqueous solution of N-β(aminoethyl)γ-aminopropyltrimethoxysilane, trade name: KBM603, manufactured by Shin-Etsu Chemical Co., Ltd.) was sprayed for 20 seconds by a shower, and the substrate was washed with a pure water shower. This substrate was heat-treated by a substrate pre-heating apparatus at 100° C. for 2 minutes, and was supplied to the next laminator.

The protective film of the photosensitive resin transfer material K1 was peeled off, and the substrate heated to 100°

C. was laminated with the photosensitive resin transfer material K1 at a rubber roller temperature of 13° C., a linear pressure of 100 N/cm, and a conveying rate of 2.2 n/min, using a laminator (Lamic II type, manufactured by Hitachi Industries Co., Ltd.).

After the temporary support was peeled off at the interface with the thermoplastic resin layer; the thermoplastic resin layer was pattern-exposed at an exposure intensity of 70 mJ/cm$^2$, in a proximity exposure machine (manufactured by Hitachi High-Technologies Corp.) having an ultrahigh-pressure mercury lamp, in a condition where the support and the mask (a quartz exposure mask having an image pattern) were placed to stand vertically and the distance between the exposure mask surface and the thermoplastic resin layer was set to 200 μm.

Then, shower development was performed with a triethanolamine-based developer (containing 30% triethanolamine, T-PD2, trade name, a product of Fuji Photo Film Co., Ltd., diluted by 1/12 with purified water (or a dilute solution obtained by adding 11 parts of purified water to 1 part T-PD2)) at 30° C. for 50 seconds at a flat nozzle pressure of 0.04 MPa, so that the thermoplastic resin layer and the interlayer were removed.

Subsequently, using a sodium-carbonate-based developer (containing 0.38 mol/l of sodium bicarbonate, 0.47 mol/l of sodium carbonate, and 5% of sodium dibutylnaphthalenesulfonate, an anionic surfactant, an anti-foaming agent, and a stabilizer, trade name: T-CD1, manufactured by Fuji Photo Film Co., Ltd., diluted by 1/5 with purified water), another shower developing was performed at 29° C. for 30 seconds under a cone-type nozzle pressure of 0.15 MPa, to develop the photosensitive resin layer, so that the patterning image was obtained.

Subsequently, using a cleaner (a dilute solution containing T-SD3, trade name, manufactured by Fuji Photo Film Co., Ltd., diluted by 1/10 with purified water), the residue was removed by a shower and a rotating brush having nylon hairs at 33° C. for 20 seconds under a cone-type nozzle pressure of 0.02 MPa, so that a black (K) image was obtained. Thereafter, after the substrate was subjected to post exposure to light of 500 mJ/cm$^2$ from the resin layer side emitted by an ultrahigh pressure mercury lamp, heat-treatment was performed at 220° C. for 15 minutes.

The substrate having the K image formed thereon was washed with a brush in the same manner as described above, and then washed with pure water shower, and then supplied to a substrate pre-heating apparatus without using a silane coupling liquid.

[Formation of Red (R) Pixels]

Heat-treated red (R) pixels were obtained by using the photosensitive resin transfer material R101, in the same steps as the photosensitive resin transfer material K1 was processed. The exposure was 40 mJ/cm$^2$, and the development with the sodium-carbonate-based developer was performed at 35° C. for 35 seconds. The thickness of the photosensitive layer R101, and the coating amounts of the pigments (C.I.P.R.254 and C.I.P.R.177) are shown below.

| | |
|---|---|
| Thickness of the photosensitive resin layer (μm) | 2.00 |
| Coating amount of the pigments (g/m$^2$) | 1.00 |
| Coating amount of C.I.P.R.254 (g/m$^2$) | 0.80 |
| Coating amount of C.I.P.R.177 (g/m$^2$) | 0.20 |

The substrate having the K image and the R pixels thereon was washed again with a brush in the same manner as described above, and washed with pure water shower, and supplied to a substrate pre-heating apparatus without using a silane coupling liquid.

[Formation of Green (G) Pixels]

Heat-treated green (G) pixels were obtained by using the photosensitive resin transfer material G101, in the same steps as the photosensitive resin transfer material R101 was processed. The exposure was 40 mJ/cm$^2$, and the development with the sodium-carbonate-based developer was performed at 34° C. for 45 seconds. The thickness of the photosensitive layer G101 and the coating amounts of the pigments (C.I.P.G.36 and C.I.P.Y.150) are shown below.

| | |
|---|---|
| Thickness of the photosensitive resin layer (μm) | 2.00 |
| Coating amount of the pigments (g/m$^2$) | 1.92 |
| Coating amount of C.I.P.G.36 (g/m$^2$) | 1.34 |
| Coating amount of C.I.P.Y.150 (g/m$^2$) | 0.58 |

This substrate having the K image, the R pixels, and G pixels thereon was washed again with a brush in the same manner as described above, then washed with pure water shower, then supplied to the substrate pre-heating apparatus without using a silane coupling liquid.

[Formation of Blue (B) Pixels]

Heat-treated blue (B) pixels were obtained by using the photosensitive resin transfer material B101 in the same manner as the formation of the red (R) image with the photosensitive resin transfer material R101. The exposure was 30 mJ/cm$^2$, and the development with the sodium-carbonate-based developer was performed at 36° C. for 40 seconds. The thickness of the photosensitive resin layer B101 and the coating amounts of the pigments (C.I.P.B.15:6 and C.I.P.V.23) are shown below.

| | |
|---|---|
| Thickness of the photosensitive resin layer (μm) | 2.00 |
| Coating amount of the pigments (g/m$^2$) | 0.75 |
| Coating amount of C.I.P.B.15:6 (g/m$^2$) | 0.705 |
| Coating amount of C.I.P.V.23 (g/m$^2$) | 0.045 |

This substrate having the K image, the R pixels, the G pixels, and the B pixels thereon was baked at 240° C. for 50 minutes to obtain a color filter A1.

Color filters B1 to H1 were prepared in the same manner as the color filter A1, except that the R pigment dispersion A was replaced with R pigment dispersions B to H.

Comparative Example 2-5

Color filters I1 to J1 were prepared in a similar manner to the color filter A1, except that the R pigment dispersion A was replaced with R pigment dispersions I and J.

The contrast, color difference, and presence or absence of deposit of the thus-obtained color filters A1 to J1, as determined in the same manner as in Example 2-10, are summarized in Table 2-D.

TABLE 2-D

| Color filter | Contrast | Light fastness (Color difference) | Presence/ Absence of deposition |
|---|---|---|---|
| A1 | 6000 | 2.1 | deposit-free and uniform |
| B1 | 5900 | 2.3 | deposit-free and uniform |
| C1 | 5800 | 2.2 | deposit-free and uniform |

TABLE 2-D-continued

| Color filter | Contrast | Light fastness (Color difference) | Presence/Absence of deposition |
|---|---|---|---|
| D1 | 5600 | 2.5 | deposit-free and uniform |
| E1 | 6900 | 2.0 | deposit-free and uniform |
| F1 | 6300 | 2.0 | deposit-free and uniform |
| G1 | 6100 | 2.0 | deposit-free and uniform |
| H1 | 6300 | 1.9 | deposit-free and uniform |
| I1 | 3000 | 2.7 | with-deposit |
| J1 | 3500 | 4.6 | with-deposit |

The results in Table 2-D show that it is possible to produce color filters A1 to H1 that are extremely high in contrast, superior in light fastness and resistant to deposition without irregularity in the R pixel region, by using dispersions which were prepared by forming the organic particles in a dispersed state as the nanometer-sized particles, according to the production method of the present invention. Color filters E1 to H1 prepared by using the polymer compound represented by Formula (1) were further higher in contrast among the samples according to the present invention, and moreover they were superior in weather resistance and free of deposition.

Example 2-13

Production and Evaluation of Liquid Crystal Display Device

Liquid crystal display devices were prepared in the same manner as in Example 2-11 by using the color filters A1 and H1, and the display characteristics thereof were evaluated.

Comparative Example 2-6

Production and Evaluation of Liquid Crystal Display Device

Liquid crystal display devices were prepared in the same manner as in Example 2-11 by using the color filters I1 and J1, and the display characteristics thereof were evaluated.

The liquid crystal display devices prepared by using the color filters according to the present invention had favorable display characteristics superior in display blackness and red reproducibility and free of display irregularity, compared to the liquid crystal display devices prepared by using the comparative color filters.

Example 3

Examples Using a Dioxazine Pigment

Example 3-1

Pigment dispersions VA to VH, paste-like concentrated pigment liquids VA to VH, and pigment dispersion compositions VA to VH were prepared in the same manner as in Examples 2-1 to 2-8, except that C.I. Pigment Red 254 (Irgaphor Red BT-CF) used in the pigment dispersion compositions in Examples 2-1 to 2-8 was replaced with C.I. Pigment Violet 23 (Hostaperm Violet RL-NF manufactured by Clariant).

Pigment dispersion composition VI and VJ were prepared in the same manner as in Comparative Examples 2-1 and 2-2, except that the pigment C.I. Pigment Red 254 used in preparation of the pigment dispersion compositions of Comparative Example 2-1 and 2-2 was replaced with C.I. Pigment Violet 23.

The number-average particle diameter and the Mv/Mn ratio of the pigment particles in each dispersion composition were determined in the same manner as in Example 2. Results are as shown below.

TABLE 3-A

| Sample | Number average particle diameter | Mv/Mn |
|---|---|---|
| Pigment dispersion composition VA | 34 nm | 1.30 |
| Pigment dispersion composition VB | 36 nm | 1.36 |
| Pigment dispersion composition VC | 35 nm | 1.33 |
| Pigment dispersion composition VD | 33 nm | 1.34 |
| Pigment dispersion composition VE | 32 nm | 1.33 |
| Pigment dispersion composition VF | 33 nm | 1.31 |
| Pigment dispersion composition VG | 33 nm | 1.36 |
| Pigment dispersion composition VH | 34 nm | 1.31 |
| Pigment dispersion composition VI | 86 nm | 1.65 |
| Pigment dispersion composition VJ | 70 nm | 1.72 |

The contrast of the pigment dispersion compositions VA to VJ was determined in the same manner as in Example 2. Results are as shown below.

TABLE 3-B

| Sample | Contrast |
|---|---|
| Pigment dispersion composition VA | 10600 |
| Pigment dispersion composition VB | 10300 |
| Pigment dispersion composition VC | 11000 |
| Pigment dispersion composition VD | 12000 |
| Pigment dispersion composition VE | 12900 |
| Pigment dispersion composition VF | 12800 |
| Pigment dispersion composition VG | 12000 |
| Pigment dispersion composition VH | 11800 |
| Pigment dispersion composition VI | 3600 |
| Pigment dispersion composition VJ | 5000 |

The results show that the dispersions obtained by forming organic particles in a dispersed-state as the nanometer-sized particles by the production method according to the present invention were extremely superior in contrast and light fastness to the comparative samples VI and VJ.

Example 3-2

Colored photosensitive resin compositions for color filter VA to VJ were prepared in the same manner as in Example 2-9, except that the pigment dispersion composition A in the colored photosensitive composition A prepared in Example 2-9 was replaced with the pigment dispersion compositions VA to VJ, respectively. The contrast of the colored photosensitive resin compositions obtained was determined in the same manner as in Example 2-9. Results are shown below.

TABLE 3-C

| Sample | Contrast |
|---|---|
| Colored photosensitive resin composition VA | 11100 |
| Colored photosensitive resin composition VB | 12000 |
| Colored photosensitive resin composition VC | 11900 |
| Colored photosensitive resin composition VD | 12700 |
| Colored photosensitive resin composition VE | 13900 |
| Colored photosensitive resin composition VF | 13300 |
| Colored photosensitive resin composition VG | 12800 |
| Colored photosensitive resin composition VH | 12600 |
| Colored photosensitive resin composition VI | 4600 |
| Colored photosensitive resin composition VJ | 6100 |

The above results show that the colored photosensitive resin compositions containing the nanometer-sized particles obtained by the production method according to the present invention were extremely superior in contrast to the samples VI and VJ containing pigments obtained with a commonly-used Eiger mill or fined by salt milling method.

Example 3-3

Preparation of Color Filters (by Coating with a Slit Nozzle)

A color filter VA was prepared in the same manner as in Example 2-10, except that, in the color filter A prepared in Example 2-10, the R pigment dispersion A was replaced with the following R pigment dispersion 1 and the B pigment dispersion 2 with the following B pigment dispersion VA.

| <R pigment dispersion 1> | |
| --- | --- |
| C.I.P.R.254 (trade name: Irgaphor Red B-CF, manufactured by Ciba Specialty Chemicals company) | 8 mass parts |
| Dispersant (compound 1J shown above) | 0.8 mass part |
| Polymer (random copolymer of benzyl methacrylate and methacrylic acid (benzyl methacrylate/methacrylic acid = 72/28 by mol), molecular weight: 37,000) | 8 mass parts |
| Propylene glycol monomethyl ether acetate | 83.2 mass parts |
| <B pigment dispersion VA> | |
| Past-like condensed pigment liquid VA | 3.64 mass parts |
| C.I.P.B.15:6 | 11.1 mass parts |
| Dispersant (compound 1J shown above) | 0.8 mass part |
| Polymer (random copolymer of benzyl methacrylate and methacrylic acid (benzyl methacrylate/methacrylic acid = 72/28 by mol), molecular weight: 30,000) | 4.9 mass parts |
| Propylene glycol monomethyl ether acetate | 80 mass parts |

B pigment dispersions VB to VH were prepared, by replacing the concentrated pigment liquid VA used for the B pigment dispersion VA with the concentrated pigment dispersions VB to VH, respectively. Color filters VB to VH were prepared in the same manner as the color filter VA, except that the B pigment dispersion VA was replaced with the B pigment dispersions VB to VH, respectively.

Color filters VI and VJ were prepared in the same manner as the color filter VA, except that the paste-like concentrated pigment liquid VA used for the B pigment dispersion VA was replaced with the pigment dispersion compositions VI and VJ. The contrast of each color filter was determined in the same manner as in Example 2, and the results are shown in the following Table 3-D.

TABLE 3-D

| Sample | Contrast |
| --- | --- |
| Color filter VA | 5300 |
| Color filter VB | 5000 |
| Color filter VC | 5500 |
| Color filter VD | 5900 |
| Color filter VE | 6200 |
| Color filter VF | 6000 |
| Color filter VG | 6000 |
| Color filter VH | 5700 |
| Color filter VI | 4000 |
| Color filter VJ | 4500 |

The results in Table 3-D show that the color filters containing the nanoparticles obtained by the production method according to the present invention were very superior in contrast to the color filters of Comparative Examples prepared by using pigments obtained with using a commonly-used Eiger mill or by salt milling method.

Example 3-4

Preparation and Evaluation of Liquid Crystal Display Devices

Liquid crystal display devices were prepared by using the color filters VA to VJ, and the display characteristics thereof were determined in the same manner as in Example 2-11. The results showed that the liquid crystal display devices containing the color filters according to the present invention were superior both in display blackness and blue reproducibility to liquid crystal display devices containing the color filters of Comparative Example and showed favorable display characteristics.

Example 3-5

Preparation of Color Filters (by Lamination of Photosensitive Resin Transfer Material)

A color filter VA1 was prepared in the same manner as in Example 2-12, except that, in the color filter A1 prepared in Example 2-12, the R pigment dispersion A was replaced with the aforementioned R pigment dispersion 1 and the B pigment dispersion 2 with the aforementioned B pigment dispersion VA.

In addition, color filters VB1 to VH1 were prepared in the same manner as the color filter VA1, except that the B pigment dispersion VA was replaced with the B pigment dispersions VB to VH, respectively.

Further, color filters VI1 and VJ1 were prepared in the same manner as the color filter VA1, except that the B pigment dispersion VA was replaced with the pigment dispersion compositions VI and VJ.

The contrast of each color filter was determined in the same manner as in Example 2, and the results are shown in the following Table 3-E.

TABLE 3-E

| Sample | Contrast |
| --- | --- |
| Color filter VA1 | 5500 |
| Color filter VB1 | 5100 |
| Color filter VC1 | 5700 |
| Color filter VD1 | 6000 |
| Color filter VE1 | 6200 |
| Color filter VF1 | 6100 |
| Color filter VG1 | 6000 |
| Color filter VH1 | 5800 |
| Color filter VI1 | 4000 |
| Color filter VJ1 | 4500 |

The results in Table 3-E show that the color filters containing the nanoparticles obtained by the production method according to the present invention are very superior in contrast to the color filters of Comparative Examples prepared by using pigments obtained with using a commonly-used Eiger mill or by salt milling method.

Example 3-6

Preparation and Evaluation of Liquid Crystal Display Devices

Liquid crystal display devices were prepared respectively by using the color filters VA1 to VJ1, in the same manner as in Example 3-4, and the display characteristics thereof were evaluated. The liquid crystal display devices prepared by using the color filters according to the present invention had display favorable characteristics superior in display blackness and blue reproducibility, compared to the liquid crystal display devices prepared by using the color filters for comparison.

Example 4

Paste-like concentrated pigment liquids A-10 and A-100 were prepared in the same manner as the paste-like concentrated pigment liquid A of Example 2-1, except that the pigment and the solvent used in the process of mixing the pigment solution with the poor solvent were used in amounts respectively of 10 times and 100 times larger. In addition, color filters A1-10 and A1-100 were prepared in the same manner as in Example 2-12 by using the same.

Further, paste-like concentrated pigment liquid H-10 and H-100 were prepared, in the same manner as the paste-like concentrated pigment dispersion H of Example 2-8, except that the pigment and the solvent used in the process of mixing the pigment solution with a poor solvent were used in amounts respectively of 10 times and 100 times larger. Further, color filters H1-10 and H1-100 were prepared in the same manner as in Example 2-12 by using the same.

Evaluation results on the contrast of the color filters are shown in Table 4-A.

TABLE 4-A

| Sample | Contrast |
|---|---|
| Color filter A1 | 6000 |
| Color filter A1-10 | 6400 |
| Color filter A1-100 | 6700 |
| Color filter H1 | 6300 |
| Color filter H1-10 | 6500 |
| Color filter H1-100 | 6900 |

The results in Table 4-A show that it is possible to prepare a color filter higher in contrast with the organic nanoparticles obtained by the production method according to the present invention and to preserve the favorable characteristics or even improve the characteristics even when the scale of the nanoparticle production is raised. It is thus possible to produce a high-quality color filter at high productivity by the production method of the present invention.

Example 5

Examples Containing a Pyrrolopyrrole Compound Pigment

Example 5-1

Color filters were prepared in the same manner as Color filters A to J and Color filters A1 to J1, according to the aforementioned preparation procedures of these color filters and of the materials for the color filters, except that the pigment red 254 (Irgafor red BT-CF (trade name) manufactured by Ciba Specialty Chemicals) was replaced with Irgafor red BT-C (manufactured by Ciba Specialty Chemicals). Liquid crystal display devices were prepared by using the obtained color filters, and the liquid crystal display devices according to the present invention showed properties better than those of the liquid crystal display devices of Comparative Examples.

Example 5-2

Color filters were prepared in the same manner as Color Filters A to j and color filters A1 to J1 according to the aforementioned preparation procedures of these color filters and of the materials for the color filters, except that the pigment red 254 (Irgaphor Red BT-CF) was replaced with Irgaphor Red B-CF, Irgazin DPP Red BO, pigment red 255 (Irgazin DPP Red 5G), or pigment red 264 (Irgazin DPP Rubine TR) (all manufactured by Ciba Specialty Chemicals). Liquid crystal display devices were prepared by using the obtained color filters, and the liquid crystal display devices according to the present invention showed properties better than those of the liquid crystal display devices of Comparative Examples.

Example 5-3

Color filters were prepared in the same manner as Color Filters VA to VJ and VA1 to VJ1 according to the aforementioned preparation procedures of these color filters and of the materials for the color filters, except that the Pigment Violet 23 (Hostaperm Violet RL-NF) was replaced with Fastgen Super Violet BBL (manufactured by Dainippon Ink and Chemicals, Inc.), Violet RE 388-180NO (manufactured by Dainichiseika Color & Chemicals Mfg.), or Pigment Violet 37 (manufactured by Cromophtal Violet B Chiba Geigy). Liquid crystal display devices were prepared by using the obtained color filters, and the liquid crystal display devices according to the present invention showed properties better than those of the liquid crystal display devices of Comparative Examples.

Example 6

Examples Containing a Polymer Compound Represented by Formula (1)

Example 6-1

Preparation of Pigment Dispersion Composition L

[Preparation of Pigment Dispersion]

55.0 ml of a 28% solution of sodium methoxide in methanol, 70 mg of a pigment C.I. Pigment Red 254 (Irgaphor Red BT-CF, trade name, manufactured by Ciba Specialty Chemicals company), and 125.0 g of polyvinyl pyrrolidone were added to 1,500 ml of dimethyl sulfoxide (manufactured by Wako Pure Chemical Industries, Ltd.), to prepare a pigment solution L. The viscosity of the pigment solution L, as determined by using Viscomate VM-10A-L (trade name, manufactured by CBC Materials), was 16.8 mPa·s, when the liquid temperature of the pigment solution L was 20.0° C. Separately, 1,800 ml of water containing 20 ml of 1-mol/l hydrochloric acid (manufactured by Wako Pure Chemical Industries, Ltd.) was prepared as a poor solvent.

100 ml of the pigment solution L was fed through a feed pipe having a channel diameter of 0.8 mm, as driven by a NP-KX-500 large-volume pulse-free pump (trade name, manufactured by Nihon Seimitsu Kagaku Co., Ltd.), at a flow rate of 100 ml/min into 1,800 ml of water as the poor solvent controlled to a temperature of 20° C. and being stirred at 500 rpm by a GK-0222-10 Ramond stirrer (product name, manufactured by Fujisawa Pharmaceutical Co., Ltd.), thereby forming organic pigment particles, to give a pigment dispersion L. The number-average particle diameter Mn and the monodispersion degree (Mv/Mn) thereof were determined by using Nanotrack UPA-EX150 (trade name, manufactured by Nikkiso). Results are shown in the following Table 6-A.

The pigment nanoparticle dispersion prepared by the method above was concentrated through a filter cloth P89C manufactured by Shikishima Canvas Co., Ltd. in H-112 centrifugal filtration machine manufactured by Kokusan Co., Ltd., at 4,500 rpm for 90 minutes, and the pigment nanoparticle concentrated paste obtained was recovered.

The pigment content in the paste, as determined by using type 8453 spectrophotometer manufactured by Agilent, was 15.5 wt %.

A solution containing 0.1 g of the pigment dispersant A prepared according to the method described in JP-A-2000-239554 and 2.3 g of a polymer compound C-1 dissolved in 50.0 cc of ethyl lactate was added to 16.0 g of the pigment nanoparticle paste prepared; the mixture was agitated at 1,500 rpm for 60 minutes with a dissolver and then filtered through a FP-010 filter manufactured by Sumitomo Electric Fine Polymer Inc., to give a paste-like concentrated pigment liquid L (nanopigment concentration: 31.5 mass %).

[Preparation of Pigment Dispersion Composition L]

A pigment dispersion composition L in the following composition was preparation by using the aforementioned paste.

| | |
|---|---|
| The paste-like concentrated pigment liquid L | 20.4 g |
| 1,3-butylene glycol diacetate | 43.9 g |

The resultant pigment dispersion composition was dispersed with using zirconia beads of 0.65 mm in diameter, at a peripheral speed of 9 m/s, for 1 hour, using a motor mill M-50 (manufactured by Eigar Japan).

Example 6-2

Preparation of Pigment Dispersion Composition M

A pigment dispersion composition M was preparation in the same manner as in Example 6-1, except that the channel diameter of the feeding pipe for injection of the pigment solution L in Example 6-1 was changed to 0.25 mm and the injection flow rate to 8 ml/min. The number-average particle diameter and the monodispersion degree of the pigment dispersion M prepared were determined, in the same manner as in Example 6-1.

Example 6-3

Preparation of Pigment Dispersion Composition N

A pigment dispersion composition N was preparation in the same manner as in Example 6-1, except that the channel diameter of the feeding pipe for injection of the pigment solution L in Example 6-1 was changed to 2.20 mm and the injection flow rate to 400 ml/min. The number-average particle diameter and the monodispersion degree of the pigment dispersion N prepared were determined, in the same manner as in Example 6-1. Results are shown in the following Table 6-A.

Example 6-4

Preparation of Pigment Dispersion Composition O

A pigment dispersion composition O was prepared in the same manner as in Example 6-1, except that the polymer compound C-1 used in Example 6-1 was replaced with 5.75 of a methacrylic acid/benzyl methacrylate copolymer (molar ratio: 28/72, weight-average molecular weight: 30,000, 40% 1-methoxy-2-propyl acetate solution) and the addition amount of 1,3-butylene glycol diacetate was changed to 40.45 g.

Comparative Example 6-1

Preparation of Pigment Dispersion Composition P

In the following manner, a pigment dispersion composition P having the composition described below was prepared with a beads-mil dispersing machine.

| | |
|---|---|
| Pigment (Pigment Red 254) | 6.43 g |
| Pigment-dispersing agent A | 0.26 g |
| Polyvinylpyrrolidone | 7.10 g |
| Methacrylic acid/benzyl methacrylate copolymer* | 14.9 g |
| 1,3-butylene glycol diacetate | 35.80 g |

(copolymerization molar ratio 28/72, weight average molecular weight: 30,000, 40 mass % 1-methoxy-2-propylacetate solution)

Comparative Example 6-2

Preparation of Pigment Dispersion Composition Q

In the following manner, a pigment dispersion composition Q having the composition described below was prepared.

| | |
|---|---|
| Pigment (Pigment Red 254) | 6.43 g |
| Sodium chloride | 64.0 g |
| Methacrylic acid/benzyl methacrylate copolymer* | 14.9 g |

*copolymerization molar ratio 28/72, weight average molecular weight: 30,000, 40 mass % 1-methoxy-2-propylacetate solution Sodium chloride, a pigment powder (pigment red 254), and a methacrylic acid/benzyl methacrylate copolymer were added to 1,3-butylene glycol diacetate solution, and the mixture was kneaded in a double-screw kneader at 80° C. for 10 hours. After kneading, the mixture was taken to 500 mass parts of 1 mass % hydrochloric acid aqueous solution of 80° C., and then stirred for 1 hour, followed by filtration, washing with a hot water, drying, and grinding. Thereafter, 2.4 g of 1,3-butylene glycol diacetate per 1 g of the ground product were added and mixed. The resultant pigment composition was dispersed with using zirconia beads of 0.65 mm in diameter, at a peripheral speed of 9 m/s, for 1 hour, using a motor mill M-50 (manufactured by Eigar Japan). The thus-obtained pigment dispersion composition was designated as pigment dispersion composition Q.

The particle diameters and monodispersion degrees determined in Examples 6-1 to 6-4 and Comparative Examples 6-1 and 6-2 are summarized in the following Table 6-A.

TABLE 6-A (Table 6-A)

| | Number-averaged particle diameter (Mn) | Monodispersity (Mv/Mn) |
|---|---|---|
| Example 6-1 | 29.5 | 1.30 |
| Example 6-2 | 48.7 | 1.68 |
| Example 6-3 | 26.6 | 1.38 |
| Example 6-4 | 37.5 | 1.57 |

TABLE 6-A-continued (Table 6-A)

|  | Number-averaged particle diameter (Mn) | Monodispersity (Mv/Mn) |
|---|---|---|
| Comparative example 6-1 | 88.4 | 1.62 |
| Comparative example 6-2 | 65.6 | 2.55 |

Example 6-5

Production of Liquid Crystal Display Devices

[Production of Photosensitive Resin Transfer Material]

A thermoplastic resin layer coating liquid having the following formulation H2 was coated on a polyethylene terephthalate film temporary support with a thickness of 75 μm using a slit nozzle, followed by drying. Then, an intermediate layer coating liquid having the following formulation P2 was coated thereon, and dried. Further, the resin composition K2 having a light-blocking property and having the formulation shown in Table 6-B, was coated and dried thereon. The resultant temporary support was provided with the thermoplastic resin layer having a dry film thickness of 15 μm, the intermediate layer having a dry film thickness of 1.6 μm and the light-blocking resin layer having a dry film thickness of 2.4 μm. A protective film (polypropylene film having a thickness of 12 μm) was bonded thereon under pressure additionally.

In the above described procedure, a photosensitive resin transfer material was produced in which the temporary support, the thermoplastic resin layer, the intermediate layer (oxygen blocking film) and the light-blocking resin layer were unified; and it was designated as photosensitive resin transfer material K2.

*Formulation H2 for Thermoplastic Resin Layer Coating Liquid

| Methanol | 11.1 mass parts |
|---|---|
| Propylene glycol monomethyl ether acetate | 6.4 mass parts |
| Methyl ethyl ketone | 52.4 mass parts |
| Methyl methacrylate-(2-ethylhexyl acrylate)-benzyl methacrylate-methacrylic acid copolymer (copolymer composition ratio (mole ratio): Methyl methacrylate/2-ethylhexyl acrylate/benzyl methacrylate/methacrylic acid = 55/11.7/4.5/28.8, molecular weight = 100,000, Tg: about 70° C.) | 5.83 mass parts |
| Styrene-acrylic acid copolymer (copolymerization composition ratio (mole ratio): Styrene/acrylic acid = 63/37, molecular weight = 10000, Tg: 100° C.) | 3.6 mass parts |
| 2,2-bis[4-methacryloxypolyethoxy)phenyl]propane (manufactured by Shin-Nakamura Chemical Co., Ltd.) | 9.1 mass parts |
| Surfactant 1A | 0.54 mass part |

*Composition of Surfactant 1A (Megafac F-780F (Manufactured by DIC Corporation))

| Copolymer of 40 parts of $C_6H_{13}CH_2CH_2OCOCH=CH_2$, 55 parts of $H(OCH(CH_3)CH_2)_7OCOCH=CH_2$ and 5 parts of $H(OCH_2CH_2)_7OCOCH=CH_2$, (molecular weight: $3 \times 10^4$) | 30 mass parts |
|---|---|
| Methyl ethyl ketone | 70 mass part |

*Formulation P2 for Intermediate Layer (Oxygen Blocking Layer) Coating Liquid

| Polyvinyl alcohol (PVA205 (saponification degree = 88%); manufactured by Kuraray Co., Ltd.) | 32.2 mass parts |
|---|---|
| Polyvinylpyrrolidone (PVP, K-30; manufactured by ISP Japan Ltd.) | 14.9 mass parts |
| Methanol | 429 mass parts |
| Distilled water | 524 mass parts |

TABLE 6-B

| Composition components | Content (Unit: part) |
|---|---|
| K pigment dispersion 2 (carbon black) | 25 |
| Propylene glycol monomethyl ether acetate | 8.0 |
| Methyl ethyl ketone | 53 |
| Binder 4 | 9.1 |
| Hydroquinone monomethyl ether | 0.002 |
| DPHA liquid | 4.2 |
| 2,4-Bis(trichloromethyl)-6-[4'-(N,N-bisethoxycarbonylmethyl)amino-3'-bromophenyl]-s-triazine | 0.16 |
| Surfactant 1A | 0.044 |

Herein, preparation of the light-shielding resin composition K2 shown in the above Table 6-B is explained below.

The light-shielding resin composition K2 was prepared as follows: First, the K pigment dispersion 2 and propylene glycol monomethyl ether acetate were weighed out in the amounts shown in Table 6-B, respectively, and mixed together at a temperature of 24° C. (2° C.), and further stirred at 150 rpm for 10 minutes. Then, Binder 4, hydroquinone monomethyl ether, the DPHA liquid, 2,4-bis(trichloromethyl)-6-[4'-(N,N-bisethoxycarbonylmethyl)amino-3'-bromophenyl]-s-triazine and the surfactant 1A were weighed out in the amounts shown in Table 6-B, respectively, and added to the foregoing mixture in sequence in the described order at a temperature of 25° C. (2° C.), and further stirred at 150 rpm for 30 minutes at a temperature of 40° C. (±2° C.).

In the composition shown in Table 6-B,

*The K Pigment Dispersion 2 Had the Following Composition:

| Carbon black (manufactured by Degussa, trade name: Special Black250) | 13.1 mass parts |
|---|---|
| The above pigment dispersant A | 0.65 mass part |
| Polymer (random copolymer of benzyl methacrylate and methacrylic acid (benzyl methacrylate/methacrylic acid = 72/28 by mol), molecular weight: 37,000) | 6.72 mass parts |
| Propylene glycol monomethyl ether acetate | 79.53 mass parts |

*The Binder-4 Had the Following Composition:

| Polymer (random copolymer of benzyl methacrylate and methacrylic acid (benzyl methacrylate/methacrylic acid = 78/22 by mol), molecular weight: 40,000) | 27 mass parts |
|---|---|
| Propylene glycol monomethyl ether acetate | 73 mass parts |

*The DPHA Liquid Had the Following Composition:

| | |
|---|---|
| Dipentaerythritol hexaacrylate (containing 500 ppm of polymerization inhibitor MEHQ; manufactured by Nippon Kayaku Co., Ltd., trade name: KAYARAD DPHA) | 76 mass parts |
| Propylene glycol monomethyl ether acetate | 24 mass parts |

Incidentally, the surfactant 1A was identical with the surfactant 1A used in the thermoplastic resin layer coating solution H2.

[Formation of Light-Shielding Barrier Rib]

A non-alkali glass substrate was washed with a rotating brush having nylon hairs while spraying a glass cleaner liquid regulated at 25° C. by a shower for 20 seconds, then the glass substrate was washed with pure water shower. Thereafter, a silane coupling solution (a 0.3 mass % aqueous solution of N-β(aminoethyl)γ-aminopropyltrimethoxysilane, trade name: KBM603, manufactured by Shin-Etsu Chemical Co., Ltd.) was sprayed for 20 seconds by a shower, and the substrate was washed with a pure water shower. This substrate was heat-treated by a substrate pre-heating apparatus at 100° C. for 2 minutes.

The protective film of the photosensitive resin transfer material K2 was peeled off, and the substrate heated to 100° C. for 2 minutes was laminated with the photosensitive resin transfer material K2 at a rubber roller temperature of 130° C., a linear pressure of 100 N/cm, and a conveying rate of 2.2 m/min, using a laminator (Lamic II type, manufactured by Hitachi Industries Co., Ltd.).

After the temporary support was peeled off, the photosensitive resin was pattern-exposed by using a proximity-type exposure machine having an ultrahigh pressure mercury lamp (manufactured by Hitachi High-Tech Electronics Engineering Co., Ltd) at an exposure of 100 mJ/cm$^2$ with a distance of 200 μm between the photosensitive resin layer and the surface of the exposure mask (quartz exposure mask having image pattern), while allowing the substrate and the mask to stand straight. The mask used herein had a grid pattern, in which the radii of curvature of a salient angle on the side of the light-shielding barrier rib in the part corresponding to the boundary between each pixel and each light-shielding barrier rib was 0.6 μm.

Then, the thermoplastic resin layer and the interlayer (oxygen blocking layer) were removed by conducting shower development using a triethanolamine developer (containing 30% triethanolamine, T-PD2, trade name, a product of Fuji Photo Film Co., Ltd., diluted by 1/12 with purified water (or a dilute solution obtained by adding 11 parts of purified water to 1 part T-PD2)) at 30° C. for 50 seconds under a flat nozzle pressure of 0.04 MPa.

Successively thereto, the light-shielding resin layer was subjected to shower development using a sodium carbonate developer (a dilute solution obtained by adding 4 parts of purified water to 1 part T-CD1, wherein T-CD1 is the trade name of a product of Fuji Photo Film Co., Ltd. and composed of 0.38 mol/L of sodium hydrogen carbonate, 0.47 mol/L of sodium carbonate, 5% of sodium dibutylnaphthalenesulfonate, an anionic surfactant, an antifoaming agent and a stabilizer) at 29° C. for 30 seconds under a cone-type nozzle pressure of 0.15 MPa, thereby obtaining a barrier rib patterning (a pattern of a light-shielding barrier rib).

Successively thereto, the residue was removed by using a shower of a cleaner (T-SD3, trade name, a product of Fuji Photo Film Co., Ltd., diluted by 1/10 with purified water) and a rotating brush having nylon bristles, at 33° C. for 20 seconds, under a cone-type nozzle pressure of 0.02 MPa, thereby forming a light-shielding barrier rib. Thereafter, light of 500 mJ/cm$^2$ from an ultrahigh-pressure mercury lamp was applied as post exposure to the substrate, from the resin layer side, and a heat treatment at 240° C. for 50 minutes was further given to the substrate.

[Water-Repellency-Providing Plasma Treatment]

Thereafter, water-repellency-providing plasma treatment was performed in the following manner.

The light-shielding barrier rib-formed substrate was subjected to water-repellency-providing plasma treatment using a cathode-coupling parallel-plate plasma treatment apparatus under the following conditions;

Gas used: $CF_4$
Rate of gas flow: 80 sccm
Pressure: 40 Pa
RF power; 50 W
Treatment time: 30 sec

[Preparation of Inkjet Ink for Color Filter]

An ink was prepared by the method described in Example 1 of JP-A-2002-201387.

TABLE 6-C

| Ingredient Content in Composition (parts by mass) | R ink 1 | R ink 2 | R ink 3 | R ink 4 | R ink 5 | R ink 6 | G ink 1 | B ink 1 |
|---|---|---|---|---|---|---|---|---|
| Pigment dispersion composition L | 49 | | | | | | | |
| Pigment dispersion composition M | | 49 | | | | | | |
| Pigment dispersion composition N | | | 49 | | | | | |
| Pigment dispersion composition O | | | | 49 | | | | |
| Pigment dispersion composition P | | | | | 49 | | | |
| Pigment dispersion composition Q | | | | | | 49 | | |
| G pigment (C.I.P.G. 36) | | | | | | | 5.0 | |
| B pigment (C.I.P.B 15:6) | | | | | | | | 5.0 |
| Polymeric dispersant (Solperse 24000, manufactured by AVECIA) | 2.0 | 2.0 | 2.0 | 2.0 | 2.0 | 2.0 | 2.0 | 2.0 |
| Binder (benzyl methacrylate/methacrylic acid copolymer) | | | | | | | 4.6 | 4.6 |
| Dipentaerythritol pentaacrylate | 2.0 | 2.0 | 2.0 | 2.0 | 2.0 | 2.0 | 2.0 | 2.0 |
| Tripropylene grycol diacrylate | 5.0 | 5.0 | 5.0 | 5.0 | 5.0 | 5.0 | 5.0 | 5.0 |
| 2-methyl-1-[4-(methylthio)phenyl]-2-morpholinopropane)-1-one | 2.0 | 2.0 | 2.0 | 2.0 | 2.0 | 2.0 | 2.0 | 2.0 |
| Diethylene glycol monobutyl ether acetate, 29.9 dyn/cm | 39 | 39 | 39 | 39 | 39 | 39 | 81 | 81 |

The mixing of the ingredients shown in Table 6-C was carried out as follows: First, the pigment and the polymeric dispersant were charged into a part of the solvent, mixed and stirred with a three-rod roll and a beads mill, thereby preparing a pigment dispersion liquid. Separately, the other ingredients were charged into the remainder of the solvent, dissolved and dispersed with stirring, thereby preparing a binder solution. Then, the pigment dispersion liquid or the pigment dispersion composition was added little by little to the binder solution while thoroughly stirring the resulting mixture with a dissolver. Thus, an inkjet ink for color filter was prepared.

[Pixel Formation]

The R ink 1, the G ink 1 and the B ink 1 obtained above were first ejected into dents surrounded by the light-shielding barrier rib by using a piezoelectric head in the following manner, to give a color filter according to the present invention in the following way.

The head had 318 nozzles at a nozzle density of 150 nozzles per 25.4 mm in two nozzle row directions placed in parallel at a displacement of half nozzle gap, which eject 300 droplets per 25.4 mm of ink on the substrate in the nozzle placement direction.

The head and the ink were so controlled by circulation of hot water in the head that the temperature of the ink ejection region was kept at 50±0.5° C.

Ink ejection from the head was controlled by the piezoelectric drive signal sent to the head, to eject a droplet in an amount of 6 to 42 pl, and the ink was ejected in the present Example from the head onto a glass plate, while conveying the plate at the position 1 mm below the head. The conveying speed was adjustable in the range of 50 to 200 mm/s. The piezoelectric drive frequency may be raised up to 4.6 KHz, and the droplet quantity can be controlled by the setting.

The R, G, and B inks were ejected into the dents corresponding to the desired R, G and B colors, as the conveying speed and the drive frequency were so controlled that the coating amounts of the R, G, and B pigments would be respectively 1.1, 1.8, and 0.75 g/m$^2$.

The ejected ink is conveyed to the exposure unit, where it is irradiated by the light from a ultraviolet light-emitting diode (UV-LED). The UV-LED used was NCCU033 manufactured by Nichia Corporation. The LED emits a UV light at a wavelength of 365 nm from one chip, and the chip emits a light at an intensity of approximately 100 mW upon application of a current of approximately 500 mA. Multiple chips were placed at an interval of 7 mm, giving a total power of 0.3 W/cm$^2$ on the surface. The period from ink ejection to light exposure and the exposure period can be changed according to the medium traveling speed and the distance between the head and the LED. The ink after ejection was dried at 100° C. for 10 minutes and then subjected to exposure to light.

The light-exposure energy on the medium may be adjusted in the range of 0.01 to 15 J/cm$^2$ according to the settings of the distance and the traveling speed. The light-exposure energy was adjusted based on the traveling speed.

The exposure power and the light-exposure energy were determined by using a spectroradiometer URS-40D manufactured by Ushio Inc., and the integral values in the wavelength range of 220 nm to 400 nm were used.

The glass plate after ink ejection was baked in an oven at 230° C. for 30 minutes, for complete hardening of the light-shielding barrier rib and respective pixels.

A liquid crystal display device L was prepared in the same manner as in Example 2-11 by using the color filter prepared in the above.

Liquid crystal display devices M to Q were prepared in the same manner as the liquid crystal display device L, except that the R ink 1 used in preparation of the liquid crystal display device L was replaced with R inks 2 to 6, respectively.

Example 6-5

Evaluation of Inks and Liquid Crystal Display Devices

[Measurement of Contrast]

The contrast of each of the pigment dispersion compositions L to Q prepared in Examples 6-1 to 6-4 and Comparative Examples 6-1 and 6-2 was determined, in the same manner as in Example 2.

[Longtime Display Test of Liquid Crystal Display Device]

Images were made to show up continuously for 1,000 hours on the screen of each of the liquid crystal display devices made in the foregoing manners. The illuminance of red light (the illuminance of light in a red-display situation) was measured in a darkroom with an illuminometer UV-M10-S (made by ORC MANUFACTURING CO., LTD.) which was placed at a distance of 400 mm from the screen of each liquid crystal display device and the measuring angle of which was set at 2°. With respect to Examples and Comparative examples, illuminance values after the test relative to those before the test (after-test illuminance/before-test illuminance ratios) are shown in Table 6-D, together with data on the contrast of the pigment dispersion compositions.

It is understood that color filters prepared with the inkjet inks for color filter according to the present invention were high in contrast and had long-term display resistance satisfying practical requirements demanded for the color filter for liquid crystal display device.

TABLE 6-D

|  | Pigment dispersion composition | Inkjet ink | Liquid crystal display device | Contrast of inkjet ink | Long-term display test of liquid crystal display (%) |
|---|---|---|---|---|---|
| Example 6-1 | L | R ink 1 | L | 7700 | 100 |
| Example 6-2 | M | R ink 2 | M | 7200 | 101 |
| Example 6-3 | N | R ink 3 | N | 7600 | 100 |
| Example 6-4 | O | R ink 4 | O | 5100 | 102 |
| Comparative example 6-1 | P | R ink 5 | P | 3100 | 109 |
| Comparative example 6-2 | Q | R ink 6 | Q | 3800 | 114 |

Example 7

Pigment dispersion compositions R and S were prepared, by replacing the pigment red 254 used in preparation of the pigment dispersion composition L in Example 6-1 with pigment green 36 and pigment blue 15:6, respectively.

G ink 2 and B ink 2 were prepared, by replacing the pigment PG36 and the pigment PB15:6 used in preparation of the G ink 1 and the B ink 1 in the liquid crystal display device of example 6-5 respectively with pigment dispersion compositions R and S and the amount of diethylene glycol monobutylether acetate was reduced so that the pigment concentration was kept constant. A color filter was prepared, as the G ink 1 was replaced with G ink 2 and the B ink 1 with B ink 2. The color filter prepared by using the G ink 2 or the B ink 2 had favorable properties.

Example 8

Comparative Example 8-1

Preparation of Pigment Dispersion for CCD

Pigment dispersions: (1) green G, (2) blue B, and (3) red R in the following compositions were prepared by using the pigment dispersion composition P obtained in Comparative Example 6-1.

| Pigment dispersion (1) | |
| --- | --- |
| C.I.P.G.36 | 95 mass parts |
| C.I.P.G.7 | 30 mass parts |
| C.I.P.Y.139 | 45 mass parts |
| PLAAD ED151 (manufactured by Kusumoto Chemicals, Ltd.) | 20 mass parts |
| Copolymer of benzyl methacrylate/methacrylic acid (copolymerization molar ratio 70/30, weight-average molecular weight: 30,000) | 25 mass parts |
| Propylene glycol monomethyl ether acetate | 625 mass parts |

| Pigment dispersion (2) | |
| --- | --- |
| C.I.P.B.15:6 | 125 mass parts |
| C.I.P.V.23 | 20 mass parts |
| PLAAD ED151 (manufactured by Kusumoto Chemicals, Ltd.) | 40 mass parts |
| Copolymer of benzyl methacrylate/methacrylic acid (copolymerization molar ratio = 70/30, weight average molecular weight: 30,000) | 25 mass parts |
| Propylene glycol monomethyl ether acetate | 790 mass parts |

| Pigment dispersion (3) | |
| --- | --- |
| Pigment dispersion composition P | 600 mass parts |
| Polymer compound C-14 | 40 mass parts |
| Copolymer of benzyl methacrylate/methacrylic acid (copolymerization molar ratio = 70/30, weight average molecular weight: 30,000) | 25 mass parts |
| Propylene glycol monomethyl ether acetate | 345 mass parts |

(Preparation of Colored Resin Compositions)

The following composition was mixed uniformly in a stirrer with 200 parts by weight of each of the pigment dispersions in respective colors obtained above, to give a colored resin composition for color filter in each color.

| <Composition> | |
| --- | --- |
| Benzyl acrylate/methacrylic acid copolymer (copolymerization molar ratio = 70/30, weight average molecular weight: 30,000) | 35 mass parts |
| Dipentaerythritol pentaacrylate | 38 mass parts |
| Propylene glycol monomethyl ether acetate | 120 mass parts |
| Ethyl-3-ethoxypropionate | 40 mass parts |
| Halomethyltriazine-based initiator (Photopolymerization initiator, trade name: TAZ107, manufactured by Midori Kagaku) | 4 mass parts |

(Preparation of Color Filter and CCD Device)

The following composition was mixed by a stirrer, to give a resist solution for smoothening film.

| [Composition] | |
| --- | --- |
| Benzyl acrylate/methacrylic acid copolymer (copolymerization molar ratio = 70/30, weight average molecular weight: 30,000) | 165 mass parts |
| Dipentaerythritol pentaacrylate | 65 mass parts |
| Propylene glycol monomethyl ether acetate | 138 mass parts |
| Ethyl-3-ethoxypropionate | 123 mass parts |
| Halomethyltriazine-based initiator (Photopolymerization initiator, trade name: TAZ107, manufactured by Midori Kagaku) | 3 mass parts |

The smoothening resist solution obtained was uniformly coated by spin coating on a 6-inch silicon wafer having a photodiode formed thereon. The rotating speed during spin coating was so controlled to give a film having a thickness of approximately 1.5 μm when the coated film after application is heat-treated on a hot plate at a surface temperature of 100° C. for 120 seconds.

The coated film was hardened in an oven at 220° C. for 1 hour, to give a smoothing film uniformly covering the surface of the photodiode formed on the silicon wafer.

Then, the colored resin compositions for color filter in respective colors G, R, and B described above were coated in that order, on the smoothing film each in an amount of 100 parts by weight with respect to the resist solution preparation composition for smoothing film, and then, dried (prebaked), pattern-exposed, alkali-developed, rinsed, and hardened (post-baked), to form colored resin films, giving a color filter formed on the photodiode-carrying silicon wafer.

The patterning exposure was carried out through a 2-μm mask pattern by using an i-ray stepper (product name: FPA-3000i5+, manufactured by Canon Inc.) at an intensity of 500 mJ/cm$^2$.

The alkali development was performed by paddle development, by using a 40 mass % aqueous solution of an organic alkaline developer (trade name: CD-2000, manufactured by Fujifilm Electronic Materials) at room temperature for 60 seconds, and the substrate was rinsed by spin showering with purified water for 20 seconds, and additionally washed with purified water. The water droplets remaining thereon were removed by blowing with air at high temperature, and the substrate was air-dried, giving a pattern, which was then post-baked on a hot plate at a surface temperature of 200° C. for 5 minutes.

The CCD device thus obtained was mounted on a digital camera, and the photographic image of a color chart with gray-scale manufacture by KODAK taken under the same light source was evaluated visually on a monitor, showing some deformation of the image and fluctuation in the intensity of red color.

Example 8-1

A CCD device was prepared in the same manner as Comparative Example 8-1, except that the pigment dispersion composition P used in Comparative Example 8-1 was replaced with the pigment dispersion composition L. The CCD device was mounted on the digital camera and subjected to evaluation in the same manner as in Comparative Example 8-1, to found that an image in uniform smooth color without any fluctuation was obtained. It was also found that images with smaller fluctuation were obtained by replacing the pigment dispersion composition L with the pigment dispersion composition M to O.

Example 9

Examples Containing a Phthalocyanine Compound Pigment and a Polymer Compound Represented by Formula (1)

Example 9-1

Preparation of Pigment Dispersion Composition CL

[Preparation of Pigment Dispersion]
20.0 ml of a 28% solution of sodium methoxide in methanol, 30 g of a pigment C.I. Pigment Green 36 (Lionol Green 6YK, trade name, manufactured by Toyo Ink Mfg Co., Ltd.), and 70.0 g of polyvinyl pyrrolidone were added to 800 ml of dimethyl sulfoxide (manufactured by Wako Pure Chemical Industries, Ltd.), to prepare a pigment solution GL. The viscosity of the pigment solution GL, as determined by using Viscomate VM-10A-L (trade name, manufactured by CBC Materials), was 15.0 mPa·s, when the liquid temperature of the pigment solution GL was 20.0° C. Separately, 800 ml of water containing 12 ml of 1-mol/l hydrochloric acid (manufactured by Wako Pure Chemical Industries, Ltd.) was prepared as a poor solvent.

100 ml of the pigment solution GL was fed through a feed pipe having a channel diameter of 0.8 mm, as driven by a NP-KX-500 large-volume pulse-free pump (trade name, manufactured by Nihon Seimitsu Kagaku Co., Ltd.), at a flow rate of 100 ml/min into 800 ml of water as the poor solvent controlled to a temperature of 22° C. and being stirred at 500 rpm by a GK-0222-10 Ramond stirrer (product name, manufactured by Fujisawa Pharmaceutical Co., Ltd.), thereby forming organic pigment particles, to give a pigment dispersion GL. The number-average particle diameter Mn and the monodispersion degree (Mv/Mn) thereof were determined by using Nanotrack UPA-EX150 (trade name, manufactured by Nikkiso). Results are shown in the following Table 9-A.

The pigment nanoparticle dispersion prepared by the method above was concentrated through a filter cloth P89C manufactured by Shikishima Canvas Co., Ltd. in H-110A centrifugal filtration machine manufactured by Kokusan Co., Ltd., at 3,000 rpm for 160 minutes, and the pigment nanoparticle concentrated paste obtained was recovered.

The pigment content in the paste, as determined by using type 8453 spectrophotometer manufactured by Agilent, was 14.0 wt %.

A solution containing 0.2 g of the pigment dispersant A prepared according to the method described in JP-A-2000-239554 and 2.3 g of a polymer compound C-1 dissolved in 50.0 cc of ethyl lactate was added to 16.0 g of the pigment nanoparticle paste prepared; the mixture was agitated at 1,500 rpm for 60 minutes with a dissolver and then filtered through a FP-010 filter manufactured by Sumitomo Electric Fine Polymer Inc., to give a paste-like concentrated pigment liquid GL (nanopigment concentration: 33.5 mass %).

[Preparation of Pigment Dispersion Composition GL]
A pigment dispersion composition GL in the following composition was preparation by using the aforementioned paste.

| The paste-like concentrated pigment liquid GL | 19.2 g |
| 1,3-butylene glycol diacetate | 45.1 g |

The resultant pigment dispersion composition was dispersed with using zirconia beads of 0.65 mm in diameter, at a peripheral speed of 9 m/s, for 1 hour, using a motor mill M-50 (manufactured by Eigar Japan).

Example 9-2

Preparation of Pigment Dispersion Composition GM

A pigment dispersion composition GM was preparation in the same manner as in Example 9-1, except that the channel diameter of the feeding pipe for injection of the pigment solution GL in Example 9-1 was changed to 0.25 mm and the injection flow rate to 8 ml/min. The number-average particle diameter and the monodispersion degree of the pigment dispersion GM prepared were determined, in the same manner as in Example 9-1.

Example 9-3

Preparation of Pigment Dispersion Composition ON

A pigment dispersion composition GN was preparation in the same manner as in Example 9-1, except that the channel diameter of the feeding pipe for injection of the pigment solution GL in Example 9-1 was changed to 2.20 mm and the injection flow rate to 400 ml/min. The number-average particle diameter and the monodispersion degree of the pigment dispersion GN prepared were determined, in the same manner as in Example 9-1.

Example 9-4

Preparation of Pigment Dispersion Composition GO

A pigment dispersion composition GO was prepared in the same manner as in Example 9-1, except that the polymer compound C-1 used in preparation of the pigment dispersion preparation in Example 9-1 was replaced with 5.75 of a methacrylic acid/benzyl methacrylate copolymer (molar ratio: 28/72, weight-average molecular weight: 30,000, 40% 1-methoxy-2-propyl acetate solution) and the addition amount of 1,3-butylene glycol diacetate was changed to 40.45 g.

Comparative Example 9-1

Preparation of Pigment Dispersion Composition GP

In the following manner, a pigment dispersion composition GP having the composition described below was prepared with a beads-mil dispersing machine.

| Pigment (Pigment green 36) | 6.43 g |
| --- | --- |
| Pigment-dispersing agent A | 0.26 g |
| Polyvinylpyrrolidone | 7.10 g |
| Methacrylic acid/benzyl methacrylate copolymer * | 14.9 g |
| 1,3-butylene glycol diacetate | 35.80 g |

(* molar ratio 28/72, weight average molecular weight: 30,000, 40 mass % 1-methoxy-2-propylacetate solution)

Comparative Example 9-2

Preparation of Pigment Dispersion Composition GQ

In the following manner, a pigment dispersion composition GQ having the composition described below was prepared.

| Pigment (Pigment green 36) | 6.43 g |
| --- | --- |
| Sodium chloride | 64.0 g |
| Methacrylic acid/benzyl methacrylate copolymer * | 14.9 g |

* molar ratio 28/72, weight average molecular weight: 30,000, 40 mass % 1-methoxy-2-propylacetate solution Sodium chloride, a pigment powder (pigment green 36), and a methacrylic acid/benzyl methacrylate copolymer were added to 1,3-butylene glycol diacetate solution, and the mixture was kneaded in a double-screw kneader at 80° C. for 10 hours. After kneading, the mixture was taken to 500 mass parts of 1 mass % hydrochloric acid aqueous solution of 80° C., and then stirred for 1 hour, followed by filtration, washing with a hot water, drying, and grinding. Thereafter, 2.4 g of 1,3-butylene glycol diacetate per 1 g of the ground product were added and mixed. The resultant pigment composition was dispersed with using zirconia beads of 0.65 mm in diameter, at a peripheral speed of 9 m/s, for 1 hour, using a motor mill M-50 (manufactured by Eigar Japan). The thus-obtained pigment dispersion composition was designated as pigment dispersion composition GQ.

The particle diameters and monodispersion degrees determined in Examples 9-1 to 9-4 and Comparative Examples 9-1 and 9-2 are summarized in the following Table 9-A.

TABLE 9-A

|  | Number-averaged particle diameter (Mn) | Monodispersity (Mv/Mn) |
| --- | --- | --- |
| Example 9-1 | 30.3 | 1.29 |
| Example 9-2 | 46.2 | 1.54 |
| Example 9-3 | 27.5 | 1.33 |
| Example 9-4 | 39.5 | 1.46 |
| Comparative example 9-1 | 96.4 | 1.75 |
| Comparative example 9-2 | 72.2 | 2.83 |

Example 9-5

Production of Liquid Crystal Display Devices

Example 9-5

Evaluation of Inks and Liquid Crystal Display Devices

Color filters and crystal display devices were prepared in the same manner as in Example 6, except that the G inks 11 to 16 were prepared by replacing the pigment dispersion compositions L to Q shown in Table 6-C respectively with pigment dispersion compositions GL to GQ, and the R ink was prepared by using normal C.I.P.R. 254. Herein, the polarization plate HLC2-2518 used in Example 2 was replaced with G1220DUN (product name, manufactured by Nitto Denko Corp.).

[Characterization of Liquid Crystal Display]

The display characteristics of the liquid crystal display devices prepared were evaluated by ten examiners, from the points of display blackness and green reproducibility. The averages of 10 results according to the following 5 criteria are shown in Table 9-D. It is understood that the liquid crystal display devices GL to GO according to the present invention had display characteristics overwhelmingly superior to those in Comparative Examples GP and GQ.

5: Excellent both in display blackness and green reproducibility (very good)
4: No problem both with display blackness and green reproducibility (good)
3: Feel slight grayness with black display or unsatisfactory green reproducibility (fair)
2: Distinctively unfavorable both blackness and greenness, compared to those by cathode-ray-tube monitor (slightly bad)
1: Inferior in color reproducibility both in black and green (very bad)

TABLE 9-D

|  | Pigment dispersion composition | Inkjet ink | Liquid crystal display device | Contrast of Inkjet ink | Display characteristics of liquid crystal display |
| --- | --- | --- | --- | --- | --- |
| Example 9-1 | GL | G ink 11 | GL | 8200 | 5.0 |
| Example 9-1 | GM | G ink 12 | GM | 7100 | 4.7 |
| Example 9-1 | GN | G ink 13 | GN | 7500 | 4.8 |
| Example 9-1 | GO | G ink 14 | GO | 4600 | 4.5 |
| Comparative example 9-1 | GP | G ink 15 | GP | 3300 | 3.1 |
| Comparative example 9-1 | GQ | G ink 16 | GQ | 3000 | 2.2 |

Example 10

Comparative Example 10-1

Preparation of Pigment Dispersion for CCD

Pigment dispersions: (4) green G, (5) blue B, and (6) red R in the following compositions were prepared by using the pigment dispersion composition GP obtained in Comparative Example 9-1.

| Pigment dispersion (4) | |
|---|---|
| Pigment dispersion composition GP | 800 mass parts |
| C.I.P.G.7 | 30 mass parts |
| C.I.P.Y.139 | 45 mass parts |
| PLAAD ED151 (manufactured by Kusumoto Chemicals, Ltd.) | 20 mass parts |
| Copolymer of benzyl methacrylate/methacrylic acid (copolymerization molar ratio = 70/30, weight average molecular weight: 30,000) | 25 mass parts |
| Propylene glycol monomethyl ether acetate | 125 mass parts |
| Pigment dispersion (5) | |
| C.I.P.B.15:6 | 125 mass parts |
| C.I.P.V.23 | 20 mass parts |
| PLAAD ED151 (manufactured by Kusumoto Chemicals, Ltd.) | 40 mass parts |
| Copolymer of benzyl methacrylate/methacrylic acid (copolymerization molar ratio = 70/30, weight average molecular weight: 30,000) | 25 mass parts |
| Propylene glycol monomethyl ether acetate | 790 mass parts |
| Pigment dispersion (6) | |
| C.I.P.R.254 | 80 mass parts |
| C.I.P.Y.139 | 20 mass parts |
| PLAAD ED472 | 45 mass parts |
| Copolymer of benzyl methacrylate/methacrylic acid (copolymerization molar ratio = 70/30, weight average molecular weight: 30,000) | 25 mass parts |
| Propylene glycol monomethyl ether acetate | 820 mass parts |

(Preparation of Colored Resin Compositions)

The following composition was mixed uniformly in a stirrer with 200 parts by weight of each of the pigment dispersions in respective colors obtained above, to give a colored resin composition for color filter in each color.

| <Composition> | |
|---|---|
| Benzyl acrylate/methacrylic acid copolymer (copolymerization molar ratio = 70/30, weight average molecular weight: 30,000) | 35 mass parts |
| Dipentaerythritol pentaacrylate | 38 mass parts |
| Propylene glycol monomethyl ether acetate | 120 mass parts |
| Ethyl-3-ethoxypropionate | 40 mass parts |
| Halomethyltriazine-based initiator (Photopolymerization initiator, trade name: TAZ107, manufactured by Midori Kagaku) | 4 mass parts |

(Preparation of Color Filter and CCD Device)

The following composition was mixed by a stirrer, to give a resist solution for smoothening film.

| [Composition] | |
|---|---|
| Benzyl acrylate/methacrylic acid copolymer (copolymerization molar ratio = 70/30, weight average molecular weight: 30,000) | 165 mass parts |
| Dipentaerythritol pentaacrylate | 65 mass parts |
| Propylene glycol monomethyl ether acetate | 138 mass parts |
| Ethyl-3-ethoxypropionate | 123 mass parts |
| Halomethyltriazine-based initiator (Photopolymerization initiator, trade name: TAZ107, manufactured by Midori Kagaku) | 3 mass parts |

The smoothening resist solution obtained was uniformly coated by spin coating on a 6-inch silicon wafer having a photodiode formed thereon. The rotating speed during spin coating was so controlled to give a film having a thickness of approximately 1.5 µm when the coated film after application is heat-treated on a hot plate at a surface temperature of 100° C. for 120 seconds.

The coated film was hardened in an oven at 220° C. for 1 hour, to give a smoothing film uniformly covering the surface of the photodiode formed on the silicon wafer.

Then, the colored resin compositions for color filter in respective colors G, R, and B described above were coated in that order, on the smoothing film each in an amount of 100 parts by weight with respect to the resist solution preparation composition for smoothing film, and then, dried (prebaked), pattern-exposed, alkali-developed, rinsed, and hardened (post-baked), to form colored resin films, giving a color filter formed on the photodiode-carrying silicon wafer.

The patterning exposure was carried out through a 2-µm mask pattern by using an i-ray stepper (product name: EPA-3000i5+, manufactured by Canon Inc.) at an intensity of 500 mJ/cm$^2$.

The alkali development was performed by paddle development, by using a 40 mass % aqueous solution of an organic alkaline developer (trade name: CD-2000, manufactured by Fujifilm Electronic Materials) at room temperature for 60 seconds, and the substrate was rinsed by spin showering with purified water for 20 seconds, and additionally washed with purified water. The water droplets remaining thereon were removed by blowing with air at high temperature, and the substrate was air-dried, giving a pattern, which was then post-baked on a hot plate at a surface temperature of 200° C. for 5 minutes.

The CCD device thus obtained was mounted on a digital camera, and the photographic image of a color chart with a gray-scale color chart manufactured by KODAK taken under the same light source was evaluated visually on a monitor, showing some deformation of the image and fluctuation in the intensity of red color.

Example 10-1

A CCD device was prepared in the same manner as Comparative Example 10-1, except that the pigment dispersion composition GP used in Comparative Example 10-1 was replaced with the pigment dispersion composition GL. The CCD device was mounted on the digital camera and subjected to evaluation in the same manner as in Comparative Example 10-1, to found that an image in uniform smooth color without any fluctuation was obtained. It was also found that images with smaller fluctuation were obtained by replacing the pigment dispersion composition GL with the pigment dispersion composition GM to GO.

INDUSTRIAL APPLICABILITY

The organic fine particles obtained by the production method according to the present invention have a nanometer size and are monodispersion particles, give excellent optical properties when used in color filter, and are thus favorable for use in applications such as liquid crystal display device and CCD device.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2006-014399 filed in Japan on Jan. 23, 2006, Patent Application No. 2006-024630 filed in Japan on Feb. 1, 2006, Patent Application No. 2006-055274 filed in Japan on Mar. 1, 2006, and Patent Application No. 2006-129714 filed in Japan on May 8, 2006, each of which is entirely herein incorporated by reference.

The invention claimed is:

1. A method of producing organic nanoparticles, for use in production of a color filter in a liquid crystal device, comprising
dissolving an organic pigment material into a good solvent to form a solution,
mixing the solution with a poor solvent for the organic pigment, the poor solvent being compatible with the good solvent, but is the poor solvent for the organic pigment,
preparing a dispersion in which the organic pigment is being formed into organic fine particles of a size in the order of nanometer;
wherein the dispersion contains a polymer compound having a weight-average molecular weight of 1,000 or more represented by the following formula (2):

[Chemical formula 2]

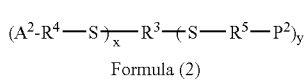

Formula (2)

wherein $R^3$ represents a (x+y)-valent connecting group: $R^4$ and $R^5$ each independently represent a single bond or a divalent connecting group; $A^2$ is a monovalent organic group having a group selected from the group consisting of an acidic group, a nitrogen-containing basic group, a urea group, and a hydrocarbon group having 4 or more carbon atoms; when x is 2 or more, $A^2$ may be the same as or different from each other; y is a number of 1 to 2: x is a number of 3 to 6; and $P^2$ is a group derived from at least one polymer or copolymer selected from the group consisting of vinyl monomer-based polymers or copolymers, ester compound polymers, ether compound polymers, urethane compound polymers, amide compound polymers, epoxy compound polymers, silicone compound polymers, and the modified polymers and copolymers thereof;
wherein at least one compound represented by formula (D1) is added as a dispersing agent in the preparation of the organic nanoparticles in the dispersion: Formula (D1)

wherein A represents a component capable of forming an azo dye together with X-Y; X represents a single bond, or a group selected from divalent connecting groups represented by structural formulae of formulae (i) to (v) set forth below; and Y represents a group represented by the following formula (D2);

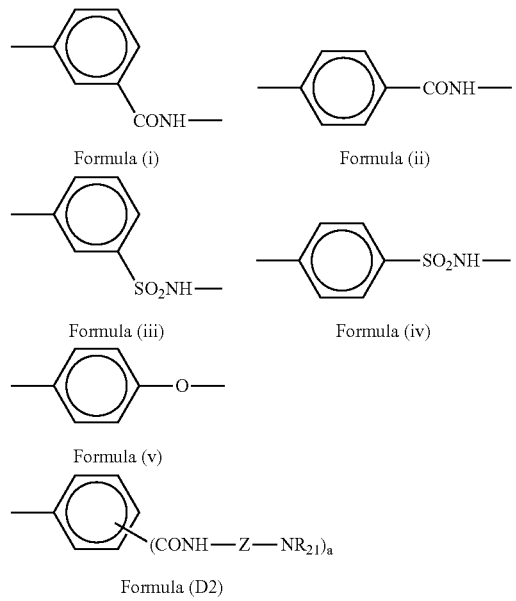

wherein Z represents a lower alkylene group; —$NR_{21}$ represents a lower alkylamino group, or a nitrogen-containing, 5- or 6-membered, saturated heterocyclic group; and a represents 1 or 2,
wherein the dispersing agent is added to at least one of the solution of an organic pigment and the poor solvent, and
wherein, in the preparation of the organic fine particles in the dispersion, the organic pigment solution and the poor solvent are mixed with each other, allowing formation of the organic fine particles, and the organic fine particles are concentrated and thereafter added with the polymer compound, to give a concentrated liquid of the organic fine particles,
wherein the organic pigment particles form flocks in the concentrated liquid, after the concentration step, that are aggregated to a degree capable of re-dispersion.

2. The method of producing organic nanoparticles according to claim 1, wherein the organic nanoparticles are particles of a pyrrolopyrrole compound pigment.

3. The method of producing organic nanoparticles according to claim 2, wherein the pyrrolopyrrole compound pigment is a pigment represented by the following formula (V):

[Chemical formula 3]

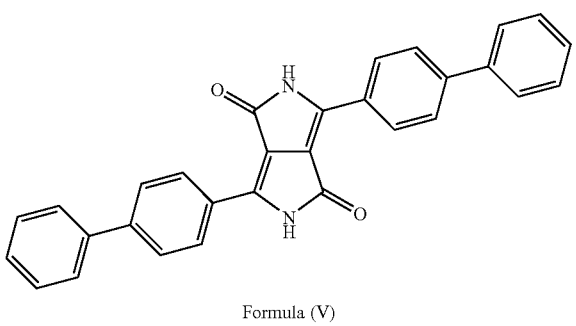

Formula (V)

4. The method of producing organic nanoparticles according to claim 2, wherein the pyrrolopyrrole compound pigment is a pigment represented by the following formula (Z):

[Chemical formula 4]

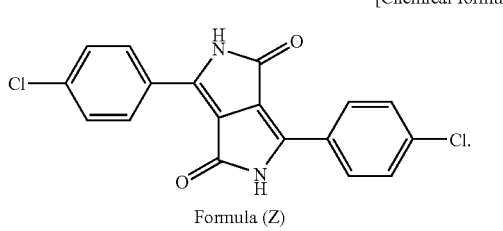

Formula (Z)

5. The method of producing organic nanoparticles according to claim 2, wherein the pyrrolopyrrole compound pigment is a pigment represented by the following formula (W):

[Chemical formula 5]

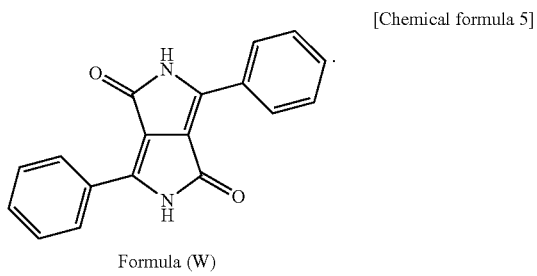

Formula (W)

6. The method of producing organic nanoparticles according to claim 1, wherein the organic nanoparticles are particles of a dioxazine compound pigment.

7. The method of producing organic nanoparticles according to claim 6, wherein the dioxazine compound pigment is C.I. Pigment Violet 37.

8. The method of producing organic nanoparticles according to claim 6, wherein the dioxazine compound pigment is C.I. Pigment Violet 23.

9. The method of producing organic nanoparticles according to claim 1, wherein the organic nanoparticles are particles of a phthalocyanine compound pigment.

10. The method of producing organic nanoparticles according to claim 9, wherein the phthalocyanine compound pigment is C.I. Pigment green 7.

11. The method of producing organic nanoparticles according to claim 9, wherein the phthalocyanine compound pigment is C.I. Pigment green 36.

12. The method of producing organic nanoparticles according to claim 9, wherein the phthalocyanine compound pigment is C.I. Pigment green 15:6.

13. The method of producing organic nanoparticles according to claim 1, wherein the polymer compound is a polymer compound having an acidic group.

14. The method of producing organic nanoparticles according to claim 1, wherein the acidic group of the polymer compound is a carboxyl group.

15. The method of producing organic nanoparticles according to claim 1, wherein the polymer compound has a weight-average molecular weight of 3,000 to 100,000.

16. The method of producing organic nanoparticles according to claim 1, wherein a pigment dispersant having an amino group coexists in any of the steps, in the preparation of the organic nanoparticles in the dispersion.

17. The method of producing organic nanoparticles according to claim 1, wherein the poor solvent for the organic pigment is a solvent selected from the group consisting of aqueous solvents, alcohol compound solvents, ketone compound solvents, ether compound solvents, ester compound solvents, and mixtures thereof.

18. The method of producing organic nanoparticles according to claim 1, wherein the good solvent for the organic pigment is a solvent selected from the group consisting of aqueous solvents, alcohol compound solvents, ketone compound solvents, ether compound solvents, sulfoxide compound solvents, ester compound solvents, amide compound solvents, and mixtures thereof.

19. The method of producing organic nanoparticles according to claim 1, wherein, in formation of the organic fine particles by mixing the organic pigment solution and the poor solvent, the fine particles are formed in 10 L or more of the poor solvent.

20. The method of claim 1, wherein the flocks in the concentrated liquid are re-dispersed to be in a dispersion state that is released from an aggregation state.

21. The method of claim 1, wherein the flocks in the concentrated liquid are re-dispersed in an organic solvent.

* * * * *